United States Patent
Gang et al.

(10) Patent No.: US 12,548,243 B2
(45) Date of Patent: Feb. 10, 2026

(54) 3D-ORGANIZED NANOMATERIALS THROUGH DNA-PRESCRIBED AND VALENCE-CONTROLLED MATERIAL

(71) Applicant: THE TRUSTEES OF COLUMBIA UNIVERSITY IN THE CITY OF NEW YORK, New York, NY (US)

(72) Inventors: Oleg Gang, Setauket, NY (US); Ye Tian, Nanjing (CN); Jason S. Kahn, New York, NY (US); Yan Xiong, New York, NY (US); Brian Minevich, New York, NY (US); Sanat K. Kumar, New York, NY (US)

(73) Assignee: THE TRUSTEES OF COLUMBIA UNIVERSITY IN THE CITY OF NEW YORK, New York, NY (US)

( * ) Notice: Subject to any disclaimer, the term of this patent is extended or adjusted under 35 U.S.C. 154(b) by 310 days.

(21) Appl. No.: 17/070,643

(22) Filed: Oct. 14, 2020

(65) Prior Publication Data

US 2021/0264663 A1     Aug. 26, 2021

Related U.S. Application Data

(60) Provisional application No. 62/914,792, filed on Oct. 14, 2019.

(51) Int. Cl.
| | |
|---|---|
| *G16B 15/10* | (2019.01) |
| *B82Y 30/00* | (2011.01) |
| *C12Q 1/68* | (2018.01) |
| *G06T 17/00* | (2006.01) |

(52) U.S. Cl.
CPC .............. *G06T 17/00* (2013.01); *C12Q 1/68* (2013.01); *G16B 15/10* (2019.02); *B82Y 30/00* (2013.01)

(58) Field of Classification Search
CPC .......... G06T 17/00; C12Q 1/68; G16B 15/10; B82Y 30/00; C12N 15/11
See application file for complete search history.

(56) References Cited

U.S. PATENT DOCUMENTS

| | | |
|---|---|---|
| 2005/0009079 A1 | 1/2005 | Anders et al. |
| 2016/0176988 A1 | 6/2016 | Zhang et al. |

FOREIGN PATENT DOCUMENTS

| | | |
|---|---|---|
| WO | WO 2005/034205 A2 | 4/2005 |
| WO | WO 2009/149091 A1 | 12/2009 |
| WO | WO 2016/109911 A1 | 7/2016 |

OTHER PUBLICATIONS

Tian et al., Lattice engineering through nanoparticle-DNA frameworks, Nature Materials, Feb. 2016, 15, 654-661 (Year: 2016).*

(Continued)

*Primary Examiner* — Anne M. Gussow
*Assistant Examiner* — Allisan E Schloop
(74) *Attorney, Agent, or Firm* — Baker Botts L.L.P.

(57) ABSTRACT

The present subject matter relates to a voxel and methods of organizing an object into a three-dimensional (3D) array using the voxel. The voxel can include a plurality of frames including at least one single stranded (ss) DNA motif with at least one free base, wherein the at least one ssDNA motif hybridizes with a complementary strand fragment of other frames.

10 Claims, 78 Drawing Sheets

Specification includes a Sequence Listing.

(56) References Cited

OTHER PUBLICATIONS

Wang et al., A DNA Crystal Designed to Contain Two Molecules per Asymmetric Unit, Journal of the American Chemical Society, Oct. 2010, 132, 15471-15473 (Year: 2010).*
Agarwal et al., "Mesophase behaviour of polyhedral particles," Nat Mater 10:230-235 (2011).
Baimuratov et al., "Quantum-dot supercrystals for future nanophotonics," Scientific Reports 3:1727 (2013) 9 pgs.
Chang et al., "High near-infrared photoluminescence quantum efficiency from PbS nanocrystals in polymer films," Synthetic Metals 148:257-261 (2005).
Chen et al., "Synthesis from DNA of a molecule with the connectivity of a cube," Nature 350:631-633 (1991).
Church et al., "Next-Generation Digital Information Storage in DNA," Science 337:1628 (2012) 2 pgs.
Damasceno et al., "Predictive Self-Assembly of Polyhedra into Complex Structures," Science 337(6093):453-457 (2012).
Damasceno et al., "Crystalline assemblies and densest packings of a family of truncated tetrahedra and the role of directional entropic forces," ACS Nano 6:609-614 (2012).
Douglas et al., "Self-assembly of DNA into nanoscale three-dimensional shapes," Nature 459:414-418 (2009).
Fu et al., "Interenzyme Substrate Diffusion for an Enzyme Cascade Organized on Spatially Addressable DNA Nanostructures," Journal of the American Chemical Society 134:5516-5519 (2012).
Gantapara et al., "Phase Diagram and Structural Diversity of a Family of Truncated Cubes: Degenerate Close-Packed Structures and Vacancy-Rich States," Phys Rev Lett 111:015501-1-015501-5 (2013) 13 pgs.
Halverson et al., "DNA-programmed mesoscopic architecture," Phys. Rev. E 87:062310 (2013).
Hao et al., "A device that operates within a self-assembled 3D DNA crystal," Nat. Chem. 9:824-827 (2017).
He et al., "Hierarchical self-assembly of DNA into symmetric supramolecular polyhedral," Nature 452:198-201 (2008).
Jang et al., "White-Light-Emitting Diodes with Quantum Dot Color Converters for Display Backlights," Advanced Materials 22:3076-3080 (2010).
Jones et al., "DNA-nanoparticle superlattices formed from anisotropic building blocks," Nature Materials 9:913-917 (2010).
Julin et al., "DNA origami directed 3D nanoparticle superlattice via electrostatic assembly," Nanoscale 11:4546-4551 (2019).
Kagan et al., "Electronic Energy Transfer in CdSe Quantum Dot Solids," Physical Review Letters 76(9): 1517-1520 (1996).
Kim et al., "Evidence of Quantum Resonance in Periodically-Ordered Three-Dimensional Superlattice of CdTe Quantum Dots," Nano Letters 15:4343-4347 (2015).
Kim et al., "Full-colour quantum dot displays fabricated by transfer printing," Nature Photonics 5:176-182 (2011).
Lalander et al., "DNA-Directed Self-Assembly of Gold Nanoparticles onto Nanopatterned Surfaces: Controlled Placement of Individual Nanoparticles into Regular Arrays," ACS Nano 4(10):6153-6161 (2010).
Lee et al., "A mechanical metamaterial made from a DNA hydrogel," Nat. Nanotechnol. 7:816-820 (2012).
Liu et al., "Diamond family of nanoparticle superlattices," Science 351:582-586 (2016).
Lu et al., "Superlattices assembled through shape-induced directional binding," Nature Communications 6:6912 (2015) 10 pgs.
Macfarlane et al., "Assembly and organization processes in DNA-directed colloidal crystallization," PNAS 106(26):10493-10498 (2009).
Macfarlane et al., "Nanoparticle superlattice engineering with DNA," Science 334:204-208 (2011).
Wertheim, "Fluids with Highly Directional Attractive Forces. III. Multiple Attraction Sites," J. Stat. Phys 42(3/4):459-476 (1986).
Murray et al., "Synthesis and Characterization of Monodisperse Nanocrystals and Close-Packed Nanocrystal Assemblies," Annual Review of Materials Science 30:545-610 (2000).

Niemeyer et al., "DNA-Directed Assembly of Bienzymic Complexes from In Vivo Biotinylated NAD(P)H:FMN Oxidoreductase and Luciferase," ChemBioChem, 02-03:242-245 (2002).
Nykypanchuk et al., "DNA-guided crystallization of colloidal nanoparticles," Nature 451:549-552 (2008).
Oliver, J. Quantum Dots: Global Market Growth and Future Commercial Prospects, BCC Research NAN027E (2016).
Pal et al., "DNA Directed Self-Assembly of Anisotropic Plasmonic Nanostructures," Journal of the American Chemical Society 133(44):17606-17609 (2011).
Park et al., "DNA-programmable nanoparticle crystallization," Nature 451:553-556 (2008).
PI: Hao Yan, Awardee Organization: Arizona State University, "DNA Directed Self-Assembly of Multicomponent Nanoarchitectures," NSF Grant #: 0545652 (2006).
PI: Thom LaBean, Awardee Organization: North Carolina State University, "Collaborative Research: Photonic and Electronic Devices Based on Self-Assembling DNA Templates," NSF Grant #: 1608847 (2016).
Qi et al., "DNA-directed self-assembly of shape-controlled hydrogels," Nature Communications 4:2275-2285 (2013).
Rogers et al., "Direct measurements of DNA-mediated colloidal interactions and their quantitative modeling," PNAS 108(38):15687-15692 (2011).
Rothemund et al., "Folding DNA to create nanoscale shapes and patterns," Nature 440:297-302 (2006).
Seeman, "DNA in a material world," Nature 421:427-431 (2003).
Seeman et al., "Nucleic Acid Junctions and Lattices," J. Theor. Biol., 99:237-247 (1982).
Sharma et al., "DNA-Tile-Directed Self-Assembly of Quantum Dots into two-Dimensional Nanopatterns," Angewandte Chemie 47(28):5157-5159 (2008).
Talapin et al., "Quasicrystalline order in self-assembled binary nanoparticle superlattices," Nature 461:964-967 (2009) [with English abstract].
Tang et al., "DNA-Directed Self-Assembly of Graphene Oxide with Applications to Ultrasensitive Oligonucleotide Assay," ACS Nano 5(5):3817-3822 (2011).
Tian et al., "Lattice Engineering via Nanoparticle-DNA Frameworks," Nat. Mater. 15:654-661 (2016).
Travesset, "Binary nanoparticle superlattices of soft-particle systems," Proc. Natl. Acad. Sci. USA 112:9563-9567 (2015).
Varilly et al., "A general theory of DNA-mediated and other valence-limited colloidal interactions," The Journal of Chemical Physics 137:094108 (2012) 16 pgs.
Vo et al., "Stoichiometric control of DNA-grafted colloid self-assembly," Proc. Natl. Acad. Sci. USA 112:4982-4987 (2015).
Wang et al., "An Organic Semiconductor Organized into 3D DNA Arrays by 'Bottom-Up' Rational Design," Angew. Chem. Int. Edit. 56:6445-6448 (2017).
Wilner et al., "Enzyme cascades activated on topologically programmed DNA scaffolds," Nature Nanotechnology 4:249-249 (2009).
Wood et al., "Colloidal quantum dot light-emitting devices," Nano Reviews 1:5202 (2010) 7 pgs.
Yager et al., "Periodic lattices of arbitrary nano-objects: modeling and applications for self-assembled systems," Journal of Applied Crystallography 47:118-129 (2014).
Zhang et al., "3D DNA Origami Crystals," Advanced Materials 30:1800273 (2018) 7 pgs.
Zhao et al., "Nanocaged enzymes with enhanced catalytic activity and increased stability against protease digestion," Nature Communications 7:10619 (2016) 9 pgs.
Zheng et al., "Two-Dimensional Nanoparticle Arrays Show the Organizational Power of Robust DNA Motifs," Nano Letters 6(7):1502-1504 (2006).
Zheng et al., "From Molecular to Macroscopic via the Rational Design of a Self-Assembled 3D DNA Crystal," Nature 461:74-77 (2009).

* cited by examiner

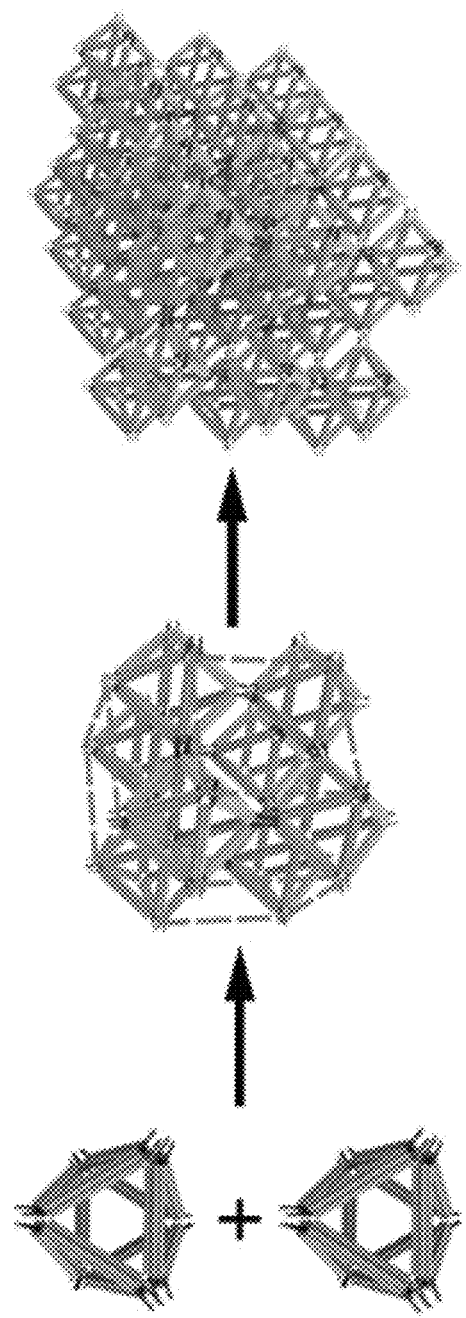
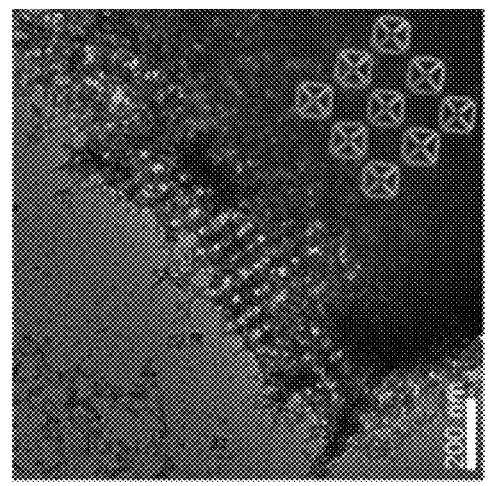
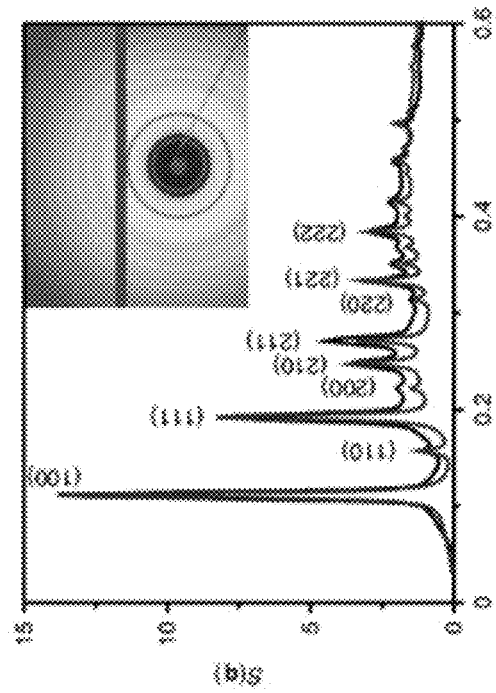
Fig. 2A
Fig. 2B
Fig. 2C

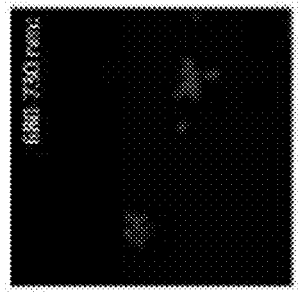
Fig. 27C
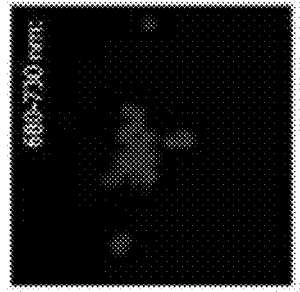
Fig. 27F
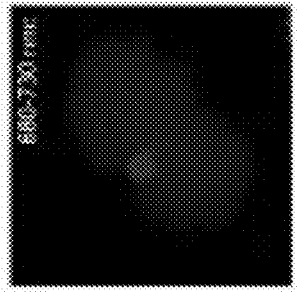
Fig. 27I
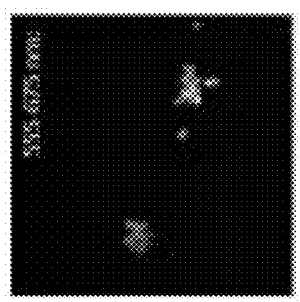
Fig. 27B
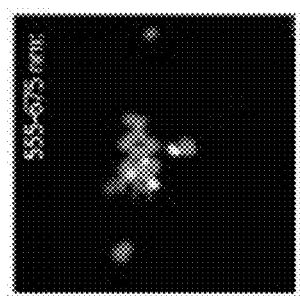
Fig. 27E
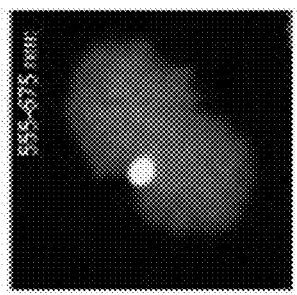
Fig. 27H
Fig. 27A
Fig. 27D
Fig. 27G

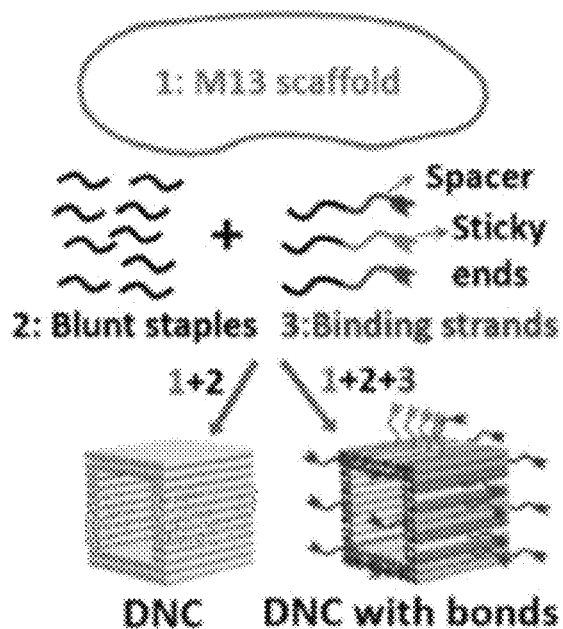 
Fig. 58A                    Fig. 58B
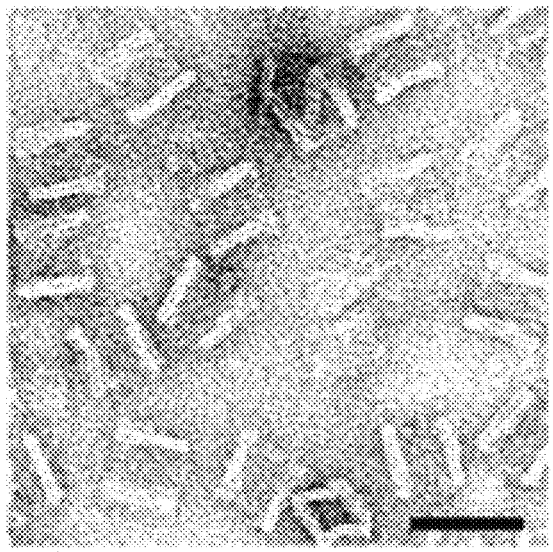 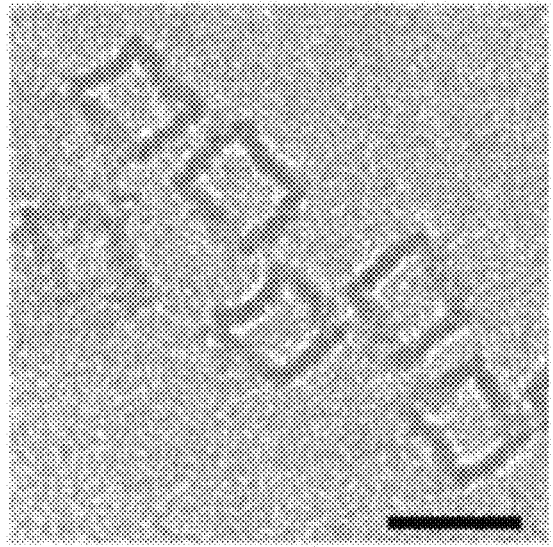
Fig. 58C                    Fig. 58D

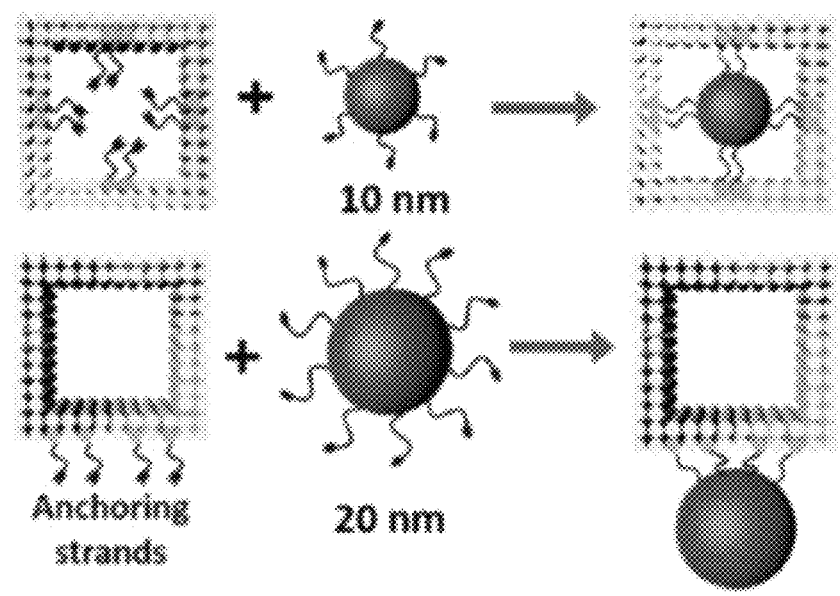
Fig. 58E
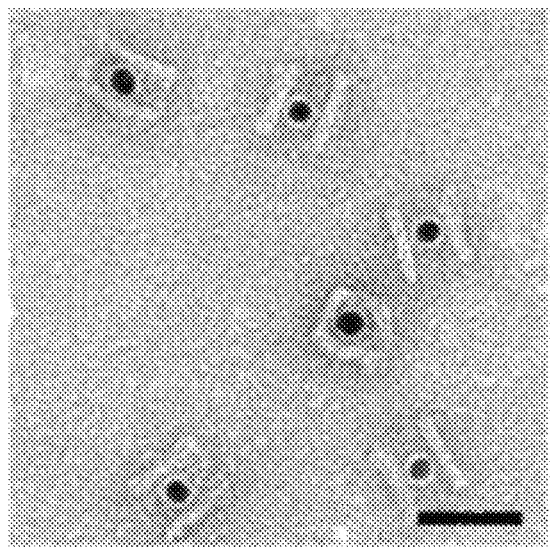 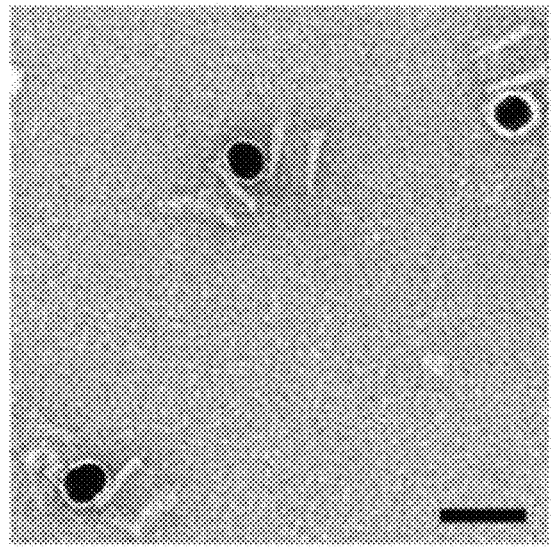
Fig. 58F  Fig. 58G

3D-ORGANIZED NANOMATERIALS THROUGH DNA-PRESCRIBED AND VALENCE-CONTROLLED MATERIAL

CROSS-REFERENCE TO RELATED APPLICATION

This application claims priority to U.S. Provisional Patent Application No. 62/914,792, which was filed on Oct. 14, 2019, the entire contents of which are incorporated by reference herein.

GRANT INFORMATION

This invention was made with government support under DE-SC0008772 and DE-SC0012704 awarded by the Department of Energy. The government has certain rights in the invention.

SEQUENCE LISTING

A Sequence Listing conforming to the rules of WIPO Standard ST.25 is hereby incorporated by reference. Said Sequence Listing has been filed as an electronic document via the USPTO patent electronic filing system in ASCII formatted text. The electronic document, created on Sep. 5, 2024, is entitled "070050.6413_ST25", and is 143,688 bytes in size.

BACKGROUND

The organization of nanoscale objects of various types into well-defined 3D arrays can transform nanoscale-synthesis into targeted material fabrication. Self-assembly of nanoscale objects into a system organization (lattice) can use both inter-object interactions and an object's specific shape in order to achieve a particular system organization. DNA can be a polymer capable of defining structural organization at small scales while being precisely programmable, meaning that it can target specific particles and materials to use in the self-assembly process.

However, certain methods cannot achieve desired lattices independent of specific nanoscale objects because of a coupling between the properties of the particles used and the resulting lattice. Even certain techniques using DNA cannot decouple particles from the assembly structure. As a result, such techniques require unique solutions, since each resulting structure relies on the interactions between the assembled particles and the underlying organizational structure.

Therefore, there is a need for self-assembly platforms that can be created independent of the nanoscale objects contained in the resulting lattice and which can assemble lattices using nanoscale objects of different natures.

SUMMARY

The disclosed subject matter provides techniques for organizing an object into a three-dimensional (3D) array using a voxel. The 3D array can contain an organic, an inorganic, a protein, an enzyme, or combinations thereof inside of the voxel.

In certain embodiments, the disclosed subject matter provides a voxel that can include a plurality of frames including at least one single-stranded (ss) DNA motif with at least one free base. In non-limiting embodiments, the ssDNA motif can hybridize with a complementary strand fragment of other frames.

In certain embodiments, the plurality of frames can include stand-alone DNA frames, polyhedral frames, or a combination thereof. In non-limiting embodiments, the plurality of frames can form a tetrahedra framework, an octahedra framework, a cubic framework, or a combination thereof.

In certain embodiments, the voxel can include at least one object in the voxel. In non-limiting embodiments, the object can include a gold nanoparticle, a streptavidin, a protein, a quantum dot (QD), an enzyme, or a combination thereof. In some embodiments, the object can include a metallic particle, a semiconductor particle, a protein superlattice, or combinations thereof. In non-limiting embodiments, the object can be a functionalized object.

In certain embodiments, the voxel can form a three-dimensional (3D) origami lattice. The 3D origami lattice can be a body-centered-cubic (BCC) lattice, a simple cubic (SC) lattice, or a cubic diamond lattice. In non-limiting embodiments, the voxel can be a DNA-prescribed voxel. In some embodiments, the voxel can be a valence-controlled voxel.

The disclosed subject matter provides a method for organizing an object into a three-dimensional (3D) array. The method can include creating a voxel that can include a plurality of frames by hybridizing at least one single-stranded (ss) DNA motif with at least one complementary strand fragment of the plurality of frames and inserting the object into the voxel by mixing the object and the voxel in a predetermined ratio. In non-limiting embodiments, the predetermined ratio between the object and the voxel is from about 1:1 to about 30:1.

In certain embodiments, the plurality of frames can include stand-alone DNA frames, polyhedral frames, or a combination thereof. In non-limiting embodiments, the plurality of frames can form a tetrahedra framework, an octahedra framework, a cubic framework, or a combination thereof.

In certain embodiments, the method can further include annealing the voxel to form a lattice. The lattice can be a three-dimensional (3D) origami lattice. In non-limiting embodiments, the 3D origami lattice can be a body-centered-cubic (BCC) lattice, a simple cubic (SC) lattice, or a cubic diamond lattice.

In certain embodiments, the method can further include functionalizing the object. In non-limiting embodiments, the functionalized object can be an inorganic object, a bio-organic object, an enzyme, and combinations thereof.

The presently disclosed subject matter will be further described below.

BRIEF DESCRIPTION OF THE DRAWINGS

FIGS. 2A-2C provide an example assembly of octahedra frames into DNA lattice. FIG. 2A shows an example ssDNA encoded octahedral frames with complementary strands (left) that are mixed to form a DNA lattice (right) and a unit cell (center) with three faces of the unit cell. FIG. 2B provides a graph showing 2D SAXS pattern and corresponding structure factor. FIG. 2C shows an example negative stained TEM image for DNA lattice formed by DNA octahedra.

FIG. 3A shows an example assembly of caged nanoparticles into SC lattice. FIG. 3B provides an example TEM image for AuNPs encaged by octahedra. FIG. 3C provides an example Z-contract annular-dark field Cryo-STEM imaging for nanoparticle caged 3D superlattice (R1). FIG. 3D provides an example assembly by route 2, R2. FIG. 3E provides a graph showing SAXS pattern and the corresponding structure factor S(q) for lattices of caged AuNP. FIG. 3F shows an example assembly of a binary system of octahedral frames with one frame empty and another one hosting AuNP. FIG. 3G provides a graph showing SAXS pattern and the related S(q) for the binary lattice shown in FIG. 3F.

FIG. 4A shows a graph showing experimental and calculated structure factors, S(q), for QDs caged superlattice. FIG. 4B shows an illustration of SC superlattice formed by QDs encaged into octahedra. FIG. 4C provides a graph showing experimental and calculated S(q) for the superlattice of cube encaged AuNP. FIG. 4D provides a schematic of BCC lattice of a vertex-driven assembly of cubes with encaged AuNPs. FIG. 4E provides a graph showing experimental and calculated S(q) for the superlattice of tetrahedron encaged AuNP. FIG. 4F shows a schematic of cubic diamond lattice of a vertex-driven assembly of tetrahedra with encaged AuNPs. FIGS. 4G-4I provide graphs showing lattice free energy theoretical prediction per frame for octahedral (4G), cubic (4H) and tetrahedral (4I) systems.

FIG. 5A is an illustration of the encaging of 6 streptavidin inside the DNA octahedra. FIG. 5B provides images showing a reference-based 2D class average as obtained from the cryo-TEM single-particle analysis. FIG. 5C provides an image showing cryo-TEM derived 3D density maps of the octahedron encaged proteins. FIG. 5D shows a confocal fluorescent microscopy image of formed crystallites with dye-labeled encaged proteins. FIG. 5E provides a graph showing experimental structure factors S(q) for empty DNA 3D lattice and for DNA lattice with 6 proteins placed in a DNA octahedra cage, as shown in FIG. 4A. FIG. 5F provides an illustration of the assembly of octahedra with encaged 6 streptavidin into 3D superlattice.

FIG. 6A shows fluorescence images demonstrating the assembled SC lattice from material voxels with QD525 and QD705. FIG. 6B shows fluorescence profiles over a range of sample analysis areas. FIG. 6C shows three different conditions (shown as I, II, III) examined to determine the effect of lattice packing and aggregation on the output of an enzymatic cascade. FIG. 6D illustrates a graph showing the production of the fluorescent product resorufin.

FIG. 16A shows a model of protein caged octahedron. FIG. 16B shows a cryo-EM image for one streptavidin inserted octahedral particles. FIG. 16C shows the reference-based 2D class average for one protein inserted octahedra as obtained from the cryo-TEM single-particle analysis.

FIG. 19A shows a large area fluorescence microscopy image of QD-525 superlattice using a 525 nm filter. FIG. 19B shows a large area fluorescence microscopy image of QD-525 superlattice using a 690 nm filter. FIG. 19C shows a small area fluorescence microscopy image of a single QD-525 superlattice using a 525 nm filter. FIG. 19D shows a small area fluorescence microscopy image of a single QD-525 superlattice using a 705 nm filter.

FIG. 20A provides a small area fluorescence microscopy image of a single QD-525 superlattice using a 525 nm band-pass filter. FIG. 20B provides fluorescence lifetime measurements for the QD-525 superlattice using multiple point scans.

FIG. 21A shows a large area fluorescence microscopy image of QD-705 superlattice using a 525 nm band-pass filter. FIG. 21B shows a large area fluorescence microscopy image of QD-705 superlattice using a 690 nm band-pass filter. FIG. 21C provides a small area fluorescence microscopy image of QD-705 superlattice using a 525 nm band-pass filter. FIG. 21D shows a small area fluorescence microscopy image of QD-705 superlattice using a 690 nm band-pass filter.

FIG. 22A shows a small area fluorescence microscopy image of a single QD-705 superlattice using a 525 nm band-pass filter. FIG. 22B shows fluorescence lifetime measurements for the QD-705 superlattice using multiple point scans.

FIG. 23A shows a large area fluorescence microscopy image of QD-525 and 705 superlattices using a 525 nm band-pass filter. FIG. 23B shows a large area fluorescence microscopy image of QD-525 and 705 superlattices using a 690 nm filter. FIG. 23C shows a small area fluorescence microscopy image of QD-525 and 705 superlattices using a 525 nm band-pass filter. FIG. 23D shows a small area fluorescence microscopy image of QD-525 and 705 superlattices using a 690 nm band-pass filter.

FIG. 24A shows a small area fluorescence microscopy image of a single QD-525 and 705 superlattices using 525 nm and 690 nm band-pass filters. FIG. 24B shows fluorescence lifetime measurements for the QD-525 and 705 superlattice using multiple point scans.

FIG. 25J provides a graph showing the mean intensity of the images.

FIG. 26J provides a graph showing the mean intensity of the images.

FIGS. 27A-27J provide fluorescence microscopy images of different area and corresponding spectra for QD-525 and 705 superlattices, using three band-pass filters; Detector 1: 500-550 nm (FIGS. 27A, 27D, and 27G), Detector 2: 555-675 nm, (FIGS. 27B, 27E, and 27H), Detector 3: 680-730 nm (FIGS. 27C, 27F, and 27I). FIG. 27J provides a graph showing the mean intensity of the images.

FIG. 29A shows a projection image (Scale bar: 500 nm) and its Fourier transform. FIG. 29B shows three Fourier masks that are related to the three domains that have different relative orientations. FIG. 29C shows an inverse Fourier transform of the Fourier masked results that illustrate where the masked domain is concentrated. FIG. 29D shows a combined image.

FIG. 49A shows a single patch particle. FIG. 49B shows an example of patchy particle bonding.

FIG. 50A shows patch particle design in Octahedron, FIG. 50B shows patch particle design in Cube, and FIG. 50C shows patch particle design in a tetrahedron.

FIG. 51A shows diagrams of a nanoparticle cluster coordinated by a sphere-like frame structure. FIG. 51B shows diagrams of designed DNA mesh frame origami and pentakis icosidodecahedron for programming designed nanoparticle cluster architectures.

FIG. 52A shows designed DNA mesh frames with different valence numbers. FIG. 52B shows NPs decorated with DNA that are assembled into clusters. FIG. 52C shows negative-stained TEM images of assembled NP clusters based on mesh frames with different valence modes. FIG. 52D shows NP cluster population histograms. FIG. 52E shows a reconstructed 3D structure of the triangular bipyramid (TBP) cluster from cryo-TEM based tomography (top) and designed center-to-center distances between NPs (bottom). FIG. 52F shows a reconstructed 3D structure of the octahedral cluster by cryo-TEM tomography (top) and designed NP distances (bottom).

FIG. 53A shows an extracted structure factor S(q) from in situ SAXS for designed clusters with the different mesh frame valence numbers (from bottom to top): two, three, four, five, and six, respectively. FIG. 53B shows interparticle distances derived from SAXS (squares) for NP clusters.

FIG. 54A shows a schematic of the spherical helix NP cluster. FIG. 54B shows negative-stained TEM images of spherical helix clusters (left) and population analysis of assembled spherical helix clusters (right). FIG. 54C shows designed NP positions of the spherical helix cluster on a sphere-like mesh frame (left) and particles on the equatorial plane of the sphere-like structure (right). FIG. 54D shows a spherical helix cluster reconstructed from cryo-TEM tomography. FIG. 54E shows center-to-center distances between adjacent NPs, D, and center-to-center distance between sphere-like mesh frame. FIG. 54F shows a computed CD spectrum and absorption spectrum for spherical helix clusters. FIG. 54G shows an experimental CD spectrum, Lorentzian fit, and absorption spectrum for spherical helix clusters.

FIG. 55A shows mesh frames programmed with a valence of TBP geometry and encoded sites at selected vertices, labeled from 1 to 5, results in polychromatic valence: (I-II) two-color valence. (III-V) three-color valence. FIG. 55B shows multitype NP clusters. FIG. 55C shows negative-stained TEM images of NP hetero-clusters. FIG. 55D shows population histograms for corresponding multitype NP clusters. FIG. 55E shows a cryo-TEM tomography reconstructed cluster (left) and designed interparticle distances (right).

FIG. 57A shows building blocks with different types of bonds. FIG. 57B shows schematics of programmable assembly of DNA nanochambers (DNCs).

FIGS. 58A-58G provide images and diagrams showing the construction of DNA nanochambers and their ability to carry AuNPs. FIG. 58A shows the formation of DNC by folding an M13 scaffold with 224 blunt staples. FIG. 58B shows agarose gel electrophoresis analysis of DNCs. FIG. 58C shows a negatively stained TEM image of DNCs. FIG. 58D shows a cryo-TEM image of DNCs. FIG. 58E shows schematics of encapsulating AuNPs in the cavity or on the sidewall of DNCs by anchoring strands. FIGS. 58F and 58G show TEM images of DNCs bound with (FIG. 58F) 10 nm AuNP in the cavity, and (FIG. 58G) 20 nm AuNP on the bundle of one sidewall.

FIGS. 59A-59C show TEM images of (FIG. 59A) empty 1D chains, (FIG. 59B) 1D alternating chains alternatively filled with 10 nm AuNPs, and (FIG. 59C) 1D homochains fully filled with 10 nm AuNPs. FIG. 59D shows a schematic for creating 1D polymer chain with a controlled monomer sequence of ABCD, where A, B, C, and D are four different kinds of DNCs. FIG. 59E shows TEM images of linear 1D chains consisting of two 10 nm AuNPs-filled and two empty DNCs in an alternating manner. FIG. 59F shows TEM images of helical 1D chains bound 20 nm AuNPs on the sidewall of DNCs in a helical architecture.

FIGS. 60A-60D show schematics and TEM images of 2D arrays assembled from two complementary DNCs with the varying number of sticky ends within the XY-plane: (FIG. 60A) 4 sticky ends, (FIG. 60B) 8 sticky ends, (FIG. 60C) sticky ends, and (FIG. 60D) 16 sticky ends. FIG. 60E provides a graph showing a statistical analysis of average 2D array size with increasing sticky ends, based on both experimental results and computational simulation.

FIG. 60F-60H shows Monte Carlo simulation snapshots of 2D arrays created by variation of binding strength: (FIG. 60F) 8 bonds, (FIG. 60G) 12 bonds, and (FIG. 60H) 16 bonds. FIG. 60I shows a TEM image of 2D square lattices fully filled with 10 nm AuNPs. FIG. 60J provides a graph showing a SAXS pattern of 2D square lattices filled with 10 nm AuNPs. FIG. 60K provides a chess-board-like 2D lattices alternatively filled with 10 nm AuNPs. FIG. 60L provides a graph showing a SAXS pattern of chess-board-like 2D lattices alternatively filled with 10 nm AuNPs.

FIG. 61A shows four types of DNA nanochambers (DNCs) with different binding modes. FIG. 61B provides a graph showing structure factor, $S(q)$, for assembly filled with AuNPs for different designs. FIG. 61C shows a TEM image of elongated 3D structures formed by empty DNCs. FIGS. 61D and 61E show TEM images of (FIG. 61D) AuNPs-filled and (FIG. 61E) empty 3D assembly for certain DNCs. FIGS. 61F-61H show Monte Carlo simulation snapshots of various 3D assembled structures created by variation of relative binding energies in XY-plane versus Z-axis: (FIG. 61F) fiber-like (Z-dominant) domains of 3D assembled DNCs with strong longitudinal bonds, (FIG. 61G) cubic-like domains of 3D assembled DNCs with balanced longitudinal and lateral bonds, and (FIG. 61H) pancake-like (XY-dominant) domains of 3D assembled DNCs with strong lateral bonds.

It is to be understood that both the foregoing general description and the following detailed description are exemplary and are intended to provide further explanation of the disclosed subject matter.

DETAILED DESCRIPTION

The disclosed subject matter provides techniques for organizing an object into a three-dimensional (3D) array using a voxel. The disclosed subject matter can be used for inorganic and bio-organic components of different intrinsic properties and shapes for organizing the components into the 3D array. The disclosed subject matter can also be used for creating light-emitting 3D arrays with diffraction-limited spectral purity, 3D enzymatic arrays, metamaterials, information storage devices, and combinations thereof.

Figure 1:
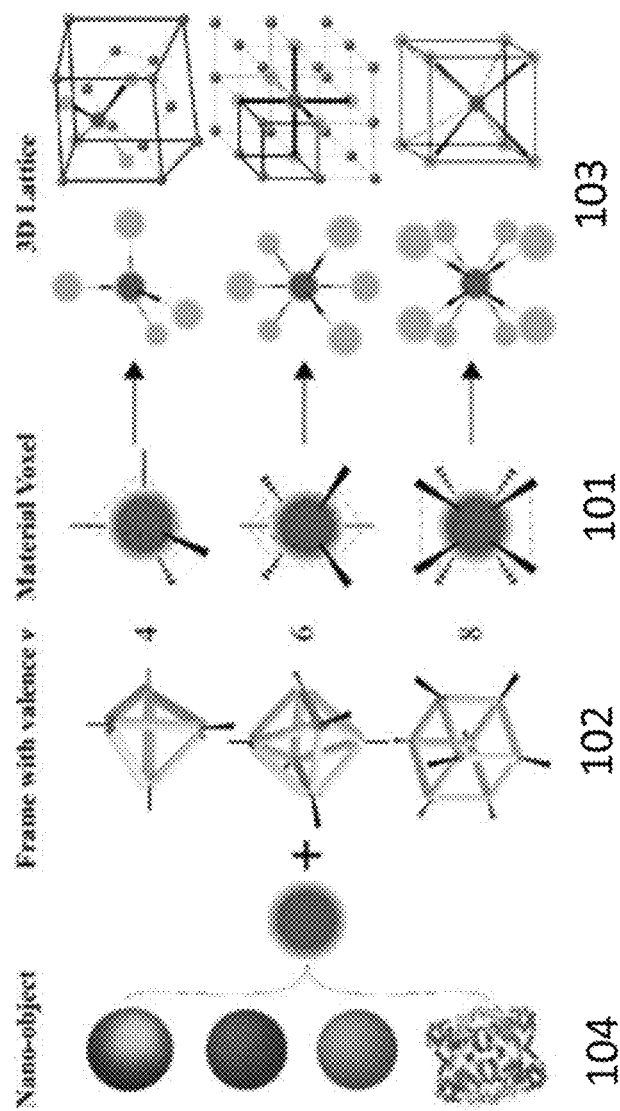
FIG. 1 provides schematics of the DNA material voxels platform for assembly of 3D lattices from inorganic (nanoparticles) and bioorganic (proteins) nano-objects with DNA frames in accordance with the presently disclosed subject matter.

In certain embodiments, the disclosed subject matter provides a voxel that can include a plurality of frames. As shown in FIG. 1, the voxel 101 can be a block that can have a valence determined by the vertices of the frame 102. The voxel 101 can be an elementary volumetric block carrying material property and its binding characteristics fully determined by frame shape that can lead to a 3D nanomaterial lattice 103. In non-limiting embodiments, the voxel can be a valence-controlled voxel. In some embodiments, the voxel can be a DNA-prescribed voxel. A DNA voxel can include a designed DNA object of specific shape (e.g., polyhedral frames, or container-like object) that can carry nanoscale cargo (e.g., nanoparticles, proteins, and enzymes). The DNA voxel can be empty or carry a nanoscale cargo. A valence-controlled voxel can have a prescribed number of binding regions at the prescribed location (e.g., at vertices). It can be in any desired location. In this way, a voxel valence can provide number and directionality for specific connectivity with other voxels. The location of binding regions can be full designed and even re-programmed for the same DNA object.

In certain embodiments, the plurality of frames can include at least one single-stranded (ss) DNA motif with at least one free base. The ss DNA motif can hybridize with a complementary strand fragment of other frames to form an inter-frame hybridization. For example, the plurality of frames can form an inter-frame hybridization via vertex-to-vertex hybridization. The hybridized frames can provide improved control over interactions encoding, energetics, and flexibility of interframe linkages. In non-limiting embodiments, the frame can possess a spatially determined valence (v) defined by its shape. The inter-frame hybridization can form an assembly with the ability to form an ordered lattice, whose type can be determined by the frame valence. In some embodiments, the plurality of frames can include stand-alone DNA frames, polyhedral frames, or a combination thereof. In non-limiting embodiments, the plurality of frames can include a frame where certain faces can be solid walls or spherical DNA objects with arbitrarily programmable valences.

In certain embodiments, the plurality of frames can form a tetrahedra framework, an octahedra framework, a cubic framework, or a combination thereof. For example, the plurality of frames can be hybridized to form a tetrahedra framework, an octahedra framework, a cubic framework, or a combination thereof.

In certain embodiments, the voxel can form a three-dimensional (3D) origami lattice. For example, the voxel can form a body-centered-cubic (BCC) lattice, a simple cubic (SC) lattice, or a cubic diamond lattice. In non-limiting embodiments, the 3D origami lattices can be formed from octahedral frames containing twelve 6-helix-bundle edges. The lattices formed from the octahedral frame can have a valence of 6 ($v=6$). The edge length of the lattices formed from the octahedral frame can be less than about 30 nm. In some embodiments, the edge length of the lattices formed from the octahedral frame can be from about 20m, to about 100 nm. In non-limiting embodiments, the voxel can form a 2D lattices with different square patterns including honeycomb, stacked hexagonal, and/or tetragonal lattices.

Each octahedron vertex (OB) can incorporate single-stranded (ss) DNA motifs with at least one free base. This construction can allow the hybridization of nucleotides with complementary strand fragments on another octahedron (OR). The vertex-driven 6-fold octahedral valency can yield ordered assemblies through vertex-to-vertex hybridization of frames. For example, the octahedral frame assemblies (e.g., with 22 complementary bases, 22 bases in first respective polyT domains, and 8 bases in second respective polyT domains) can form a well-ordered simple cubic (SC) lattice with 15 orders of resolution-limited Bragg peaks. In non-limiting embodiments, the size of the SC lattice can be up to about 200 µm, up to about 150 µm, up to about 100 µm, up to about 50 µm, up to about 25 µm, up to about 10 µm, up to about 5 µm, up to about 3 µm, up to about 2 µm, or up to about 1 µm. For example, the size of the SC lattice can be from about 150 µm to about 200 µm or from about 3 µm to about 5 µm.

In certain embodiments, the voxel can include at least one object 104. The object 104 can include a metallic particle, a semiconductor particle, a protein superlattice, or combinations thereof. In non-limiting embodiments, the object can have various shapes. For example, an inorganic object can have a cube, rod, octahedra, and/or spherical shape. Proteins and enzymes can be included in the voxel regardless of their shapes.

In certain embodiments, the object can be inserted into the voxel before assembling the voxel. For example, gold nanoparticles (AuNP) can be encaged inside the octahedra before these material voxels self-assemble. The AuNPs can be positioned in the middle of each octahedron by hybridization with its internal strands. Then mix OB and OR frames (with encaged AuNPs) and anneal to form a templated 3D AuNP array.

In certain embodiments, the object can be inserted into the voxel after assembling the voxel. For example, objects (e.g., AuNP) can be inserted into the voxel by adding the objects into a solution of formed, empty frame lattices over the octahedra at predetermined ratio. Annealing of the mixed solution can cause diffusion/distribution of at least one object into the ordered scaffold.

In certain embodiments, the ssDNA length of frames and/or inter-octahedra distance can be modified. In non-limiting embodiments, the ssDNA can be designable. For example, the range of the ssDNA length can be from about 5 to about 150 bases.

In certain embodiments, properties of the voxel can be modified with different valence. Various lattice symmetries can be formed by adjusting the valence of the voxel. For example, cubic frames (e.g., 8 valence) including twelve 6-helix bundle edges (6HB) with edge lengths about ~29 nm can be assembled to a well-ordered body-centered-cubic (BCC) lattice. In non-limiting embodiments, two kinds of cubes (i.e., CB and CR). CB and CR are the same cubic DNA frame with encoded vertices for inter-voxel connections. CB and CR have complementary ssDNA strands at the vertices. Each CB vertex can include three DNA strands complementary to the three CR vertex strands. Both cube populations can have another set of DNA sticky-ends at each vertex that point towards the cube center for binding with ssDNA of AuNPs for encaging of the AuNPs. This encapsulation can allow restoring the cube shape from their skewed empty forms to a normal, undistorted form. Cube assembly can be carried out by mixing CB and CR with encaged NPs, followed by annealing. The well-ordered BCC lattice can be in-line with a vertex-to-vertex hybridization of cubic frames.

In certain embodiments, the voxel can form a diamond lattice. For example, voxels with 4 valences can be hybridized between vertices of tetrahedral DNA frames, for which each edge can include a 10HB with length ~36 nm. Four internal DNA strands can bind to an object (e.g., AuNPs). Equal amounts of two kinds of tetrahedra possessing complementary sets of 6 sticky-end sequences at their vertices can be mixed and annealed to form the diamond lattice. Each tetrahedron can bind with four tetrahedra through its vertices.

In certain embodiments, at least one object can include a gold nano particle, a streptavidin, a protein, a quantum dot (QD), an enzyme, or a combination thereof. In non-limiting embodiments, the object can be inorganic materials, and/or the voxel can form a 3D protein arrays. For example, a streptavidin, a protein containing four high-affinity sites for biotin binding, can be inserted in the voxel. The voxel can include a plurality of hosting sites (e.g., 6 hosting sites) for an organic object (e.g., streptavidin). For example, there can be one hosting site at every vertex of a frame (e.g., $v=6$). In non-limiting embodiments, each site can include at least one ssDNA (e.g., four ssDNA) attached to the corresponding edges that form the vertex. Each streptavidin can bind to biotinylated DNA that is complementary to the edge-attached strands. In some embodiments, the voxel including an organic object can form a 3D origami lattice. For example, OB and OR frames with streptavidin and biotinylated DNA can be mixed and annealed.

In certain embodiments, the object can be functionalized. For example, the gold particles can be functionalized with thiolated oligonucleotides. The object can be mixed with the oligonucleotides in a predetermined ratio (e.g., 1:300). Quantum can be functionalized by mixing with excess biotinylated DNA (×10 molar excess). Streptavidin can be functionalized by mixing with biotinylated DNA to fabricate the streptavidin/DNA complex based on the specific binding of biotin and streptavidin. Enzymes can be functionalized by mixing with activated oligonucleotides in a predetermined ratio (e.g., 1:5).

In certain embodiments, the voxel can be used for optical applications and catalytic applications. For example, the voxel can be combined with quantum dots for the optical applications. Multiple distinct binding sites (e.g., 8) can be programed within the interior region of octahedron DNA origami using orthogonal, interior ssDNA overhangs. The OB and OR octahedra can each encoded to host a specific quantum dot (QD), which can have certain fluorescence emissions (e.g., 525 or 705 nm) resulting in two optically distinctive types of DNA material voxels. ssDNA-modified quantum dots can then be annealed into empty, fully-assembled material voxels lattices designed to either be half-filled by a single QD or fully-filled by two types of QD's at predetermined ration (e.g., 1:1 ratio).

In certain embodiments, a cascaded enzyme network organized within the disclosed 3D lattice can be used for the catalytic applications (e.g., 3D biomolecular arrays). Enzymes can be inserted into active high-density 3D arrays using material voxel, and further be manipulated and enhanced cascade reactions using such 3D packaging of enzymes. For example, ssDNA-modified glucose oxidase (GOx) and horseradish peroxidase (HRP) can bind, respectively, to a single interior hosting site within each OB and OR octahedra, forming two enzymatic types of material voxels, which can be co-assembled in the disclosed lattice. The assembled lattice architecture can provide an increased activity of the enzymatic cascade, high packing density, and co-localization of catalytic components.

The disclosed subject matter provides a method for organizing an object into a three-dimensional (3D) array. The method includes creating a voxel including a plurality of frames by hybridizing at least one single stranded (ss) DNA motif with at least one complementary strand fragment of the plurality of frames and inserting the object into the voxel by mixing the object and the voxel in a predetermined ratio.

In certain embodiment, the voxel can be designed to form octahedral, cubic, tetrahedral origami frames. In non-limiting embodiments, each edge of the octahedral and cubic frames can include a 6HB with length of 84 base pairs. For each 6HB, both ends can have one single-stranded DNA sticky end for binding with another frame. In some embodiments, for an octahedron, there can be four DNA sticky ends per vertex. For a cube lattice, there can be three DNA sticky ends per vertex. In non-limiting embodiments, each edge of the tetrahedron can include a 10HB, and both ends can have two single-stranded DNA sticky ends for binding with another frame in each 10HB. There can be six DNA sticky ends per vertex. In some embodiments, the DNA origami frames can be folded by mixing scaffold DNA, designed staple oligonucleotide, and sticky end strands extending from the vertices in a buffer/salt solution. The mixed solution can be annealed to obtain the target DNA structure.

In certain embodiments, the object can be encaged in the voxel by mixing the object and the voxel in a predetermined ratio. In non-limiting embodiments, the predetermined ratio between the object and the voxel can be from about 1:1 to about 30:1. For example, in order to insert nanoparticles/streptavidin inside the DNA cage, nanoparticle-DNA or streptavidin-DNA complex can be mixed with DNA frames at a ratio of about 1.5:1 or about 2:1, respectively. For the system of six streptavidin proteins caged within octahedra, the ratio of streptavidin-DNA complex and DNA frame can be about 15:1.

In certain embodiments, the mixed solution can be annealed by cooling to encage the object (e.g., particles or proteins) inside the DNA frame. These material-filled DNA frames can be then used to synthesize a lattice. In order to load QDs into the lattice, two complimentary octahedron DNA origami can be annealed without guest particles. Assembled DNA origami crystals can be mixed with the functionalized QDs, and a secondary annealing can be performed.

In certain embodiments, DNA-functionalized enzymes can be mixed with either formed octahedra DNA lattice, octahedra DNA lattice in order to create the 3D enzyme array.

In certain embodiments, the method can further include functionalizing the object. For example, the gold particles can be functionalized with thiolated oligonucleotides. The object can be mixed with the oligonucleotides in a predetermined ratio (e.g., 1:300). Quantum can be functionalized by mixing with excess biotinylated DNA (×10 molar excess). Streptavidin can be functionalized by mixing with biotinylated DNA to fabricate the streptavidin/DNA complex based on the specific binding of biotin and streptavidin. Enzymes can be functionalized by mixing with activated oligonucleotides in a predetermined ratio (e.g., 1:5).

In certain embodiments, the disclosed subject matter provides nanoparticle-based clusters that can allow harvesting of collective and emergent properties, with applications ranging from optics and sensing to information processing and catalysis. For example, the disclosed subject matter can provide cluster architectures that can be formed using components with programmable valence. The cluster assemblies can be formed by employing a three-dimensional (3D) DNA meshframe with spatial symmetry as a site-programmable scaffold, which can be prescribed with desired valence modes and affinity types. In non-limiting embodiments, the meshframe can be a versatile platform for the coordination of nanoparticles into desired cluster architectures. Target positions and types of bonds can be prescribed. The meshframe can offer designability over different valence modes using the underlying symmetry frame, including various subset symmetries, arbitrarily prescribed helix-like valence, and valence with different types of affinities. In some embodiments, the structures of assembled 3D clusters can be verified by electron microscopy imaging, cryo-EM tomography, or in-situ X-ray scattering methods.

In certain embodiments, the disclosed subject matter provides methods for creating a DNA nanochamber (DNC). The DNC can be a hollow cuboid nano-object with differentiated bonds. The bonds of the DNC can be prescribed and encoded along its three orthogonal axes. For example, by differentiating the bonds, one-(1D), two-(2D), and/or three-(3D) dimensional organized arrays can be formed. Through different binding modes, the DNC can be sequence encoded nanoscale heteropolymers, helical polymers, 2D lattices, or mesoscale 3D nanostructures with internal order. In non-limiting embodiments, the DNC can host a nanoscale cargo and be integrated with functional nano-objects and/or their organization in larger-scale systems.

In certain embodiments, the disclosed subject matter can also be used for creating light-emitting 3D arrays with diffraction-limited spectral purity and the disclosed 3D enzymatic arrays.

EXAMPLES

Example 1: Ordered Three-Dimensional Nanomaterials Using DNA-Prescribed and Valence-Controlled Material Voxels Design and folding of DNA origami frames: Octahedral, cubic and tetrahedral DNA origami frames were designed by caDNAno software. In the design, each edge of the octahedral and cubic frames was composed of a 6HB with length of 84 base pairs. For each 6HB, both ends have one single-stranded DNA sticky end for binding with another frame. For an octahedron, there are four DNA sticky ends per vertex, while for a cube there are three. Each edge of the tetrahedron was composed of a 10HB. For each 10HB, both ends have two single-stranded DNA sticky ends for binding with another frame. Thus, there are six DNA sticky ends per vertex. DNA origami frames were folded by mixing 10 nM M13mp18 scaffold DNA (Bayou Biolabs, LLC), 74 nM of each designed staple oligonucleotide and 100 nM of each of the sticky end strands extending from the vertices in a buffer/salt solution containing 1 mM EDTA, 12.5 mM magnesium chloride and 40 mM tris acetate with a pH around 8.0. The mixed solution was then annealed slowly by cooling from 90° C. to room temperature over 20 h to obtain the target DNA structure. Details of the interframe bonds and designs of the complementary DNA sequences can be found listed in Table 1 (for the octahedron) and Table 2 (for the cube).

| | System 1 | System 2 | System 3 | System 4 | System 5 | System 6 | System 7 | System 8 |
|---|---|---|---|---|---|---|---|---|
| m | 7 | 12 | 12 | 22 | 7 | 22 | 32 | 32 |
| l | 8 | 8 | 8 | 8 | 8 | 8 | 8 | 8 |
| n | 7 | 7 | 12 | 12 | 32 | 22 | 22 | 32 |

Table 1. Example systems of octahedral DNA frames, labeled 1 to 8, with different lengths of inter-vertex linking motifs used for assembly of empty DNA lattices and for lattices with encaged NPs. m bases is a poly T part from OB vertex, n bases is a poly T part from the OR vertex. Hybridization between these strands occurs with l (=8) complementary bases.

| | System 1 | System 2 | System 3 | System 4 |
|---|---|---|---|---|
| m | 7 | 12 | 32 | 32 |
| l | 8 | 8 | 8 | 8 |
| n | 7 | 12 | 12 | 32 |

Table 2. Example systems, labeled 1 to 4, for cubic DNA frames with different lengths of linking motifs used for assembly of empty DNA lattices and for the lattices with encaged NPs. PolyT part with m bases attached to the vertex of CB, and polyT part with n bases is attached to the CR vertex. Hybridization between these strands occurs with l (=8) complementary bases.

DNA functionalization of nanomaterials: Gold nanoparticles-Thiolated oligonucleotides, purchased from Integrated DNA Technologies (IDT), were first reduced by tris[2-carboxyethyl]phosphine (TCEP) and then purified by a size exclusion column (G-25, GE Healthcare) to remove small molecules. Spherical AuNP with a diameter of ~10 nm (Ted Pella Inc.) were then mixed with the oligonucleotides in a ratio of 1:300, followed by buffering the solution to obtain 10 mM phosphate buffer (pH 7) after 2 h. Following buffer addition, sodium chloride was slowly added into the solution until a final concentration of 0.3 M was reached. The solution was then aged at room temperature for at least 12 h. Excessive reagents were removed by centrifuging the solution four times and washing with 10 mM phosphate buffer with 0.1 M sodium chloride.

Quantum dots: Three different streptavidin-coated QDs (cadmium selenide/zinc sulfide) were purchased from Thermo Fisher Scientific with emissions of 525 nm, 605 nm and 725 nm. Each was mixed with excess biotinylated DNA (×10 molar excess) and aged over 12 h in the dark at room temperature (1×TAE buffer, 12.5 mM magnesium chloride) to obtain QD/DNA complexes.

Streptavidin: A solution of streptavidin-Cy3 conjugate was purchased from Sigma Aldrich. Biotinylated DNA was purchased from IDT, which was then mixed with streptavidin-CY3 and aged over 12 h in the dark to fabricate the streptavidin/DNA complex based on the specific binding of biotin and streptavidin.

Enzymes: GOx was purchased from Sigma Aldrich. HRP was purchased from Thermo Fisher Scientific. Enzymes were first mixed with Sulfo-EMCS in a ratio of 20:1 (Sulfo-EMCS:enzyme) in PBS buffer (pH 7.4) for 1.5 h at room temperature, and then purified by a Amicon 30 k cutoff filter. Thiolated oligonucleotides (IDT) were reduced by TCEP (1,000:1) in PBS buffer. The excess TCEP was removed by a size exclusion column (G-25, GE Healthcare). Next, sulfo-EMCS-treated enzymes were mixed with activated oligonucleotides with a ratio of 1:5 in PBS buffer and rotated at 4° C. overnight. The DNA attached enzymes were then purified by Amicon cutoff filter (50 k for GOx, 30 k for HRP). The number of DNA attached to the enzyme was quantified by ultravioletvisible light spectroscopy.

Thermal annealing of DNA origami frames: For empty DNA lattices, OB and OR were mixed in a 1:1 ratio (same method as for other origami topologies). For single 'cargo' inserted DNA lattices, OB, OR and 'cargo' complex were mixed with a ratio of 1:1:2 (same method as for other shapes). For the system of six streptavidin proteins, the ratio was 1:1:15. The mixed solution was then carefully annealed by cooling from 50° C. to room temperature at a rate of 0.2° C. h−1 to obtain the lattice.

Encaging materials in DNA frames and lattice. In order to insert nanoparticles/streptavidin inside the DNA cage, nanoparticle-DNA or streptavidin-DNA complex were mixed with DNA frames at a ratio of 1.5:1 or 2:1, respectively. For the system of six streptavidin proteins caged within octahedra, the ratio of streptavidin-DNA complex and DNA frame was 15:1. The mixed solution was then slowly annealed by cooling from 50° C. to room temperature with rate of 0.2° C. h−1 to encage the particles or proteins inside the DNA frame. These material-filled DNA frames were then used to synthesize a lattice.

In order to load QDs into the lattice, two complimentary octahedron DNA origami were annealed, following the lattice annealing protocol described previously, without any guest particles. Assembled DNA origami crystals were then mixed with the functionalized QDs and underwent a short (~4 h) secondary annealing protocol.

In order to create the enzymatic systems, DNA-functionalized enzymes were mixed with either formed octahedra DNA lattice (10 nM), octahedra DNA lattice melted for 1 h at 52° C. and immediately placed on ice (to form an amorphous aggregate), or free octahedra containing enzyme binding sites. These solutions were mixed in TE buffer (pH 7.5) containing 12.5 mM magnesium chloride. Because of the contribution of TAE buffer from the DNA samples, the final pH was measured to be pH 8.0. The sample was gently shaken at room temperature for 24 h. Glucose and Amplex Red were added at final concentrations of 150 mM and 200 M, respectively, with additional magnesium chloride to ensure the final concentration was maintained at 12.5 mM. Then 100 µl reactions were measured in a 96-well plate using a Tecan Infinite plate reader, with four repeats performed for each sample.

Dynamic light scattering: The dynamic light-scattering measurements were conducted using a Malvern Zetasizer ZS instrument at the backscattering angle of 173°. It was equipped with a laser source (633 nm) and a backscattering detector. For measuring the melting temperatures of each nanoparticle-frame assembly, the samples were cooled (lx TAE buffer with 12.5 mM magnesium chloride) slowly in the chamber of the machine from 50° C. to room temperature. The dependence of measured aggregate size versus temperature was obtained.

TEM and cryo-EM. The carbon-coated grids were glow discharged in a 0.39 mbar air atmosphere for 1 min using PELCO easiGlow (Ted Pella, Inc.). Before EM grid preparation, the sample was assessed for homogeneity by negative-stain electron microscopy. Then 3 µl of sample solution was applied to glow discharged carbon-coated lacey grids, incubated for 2 min at 10° C. and 95% humidity, blotted for 3 s and then plunged the sample into liquid ethane using a FEI Vitrobot IV. The grids were loaded into FEI Talos Arctica electron microscope operated at 200 kV high tension and collected images with EPU under low-dose mode at a magnification of ×92,000 and a pixel size of 1.55 Å. A Falcon III direct electron detector was used under linear mode for image recording with an under-focus range from 1.5 to 3.5 m. The dose rate was 20 electrons per A2 per second and total exposure time was 2 s. The total dose was divided into a 39-frame video and each frame was exposed for 0.05 s.

Cryo-STEM. Cryo-samples for imaging under STEM were prepared similar to that described above but blotted for only 0.5 s before plunging into the liquid nitrogen-cooled liquid ethane. The samples were then transferred to a cryogenic holder and imaged under a field-emission TEM (JEOL 2100F). The TEM was operated at 200 keV in the annular dark field scanning TEM mode.

SAXS. The SAXS measurements were conducted at the Coherent Hard X-ray and Complex Materials Scattering beamlines. The 2D scattering data were collected on area detectors placed downstream of the sample.

Self-assembly relies on a combination of inter-object interactions and an object's specific shape to achieve a system organization. The significant progress in designing shells and shapes of nanoscale objects provides a playground for exploring and understanding these relationships and mapping out the resulting phases. Despite significant progress in this field, it can be challenging to create desired organizations from specific nano-objects due to an intrinsic problem (e.g., a coupling between the properties of the objects and the resulting organization). Thus, from a material design point of view, nearly each system requires its own solution. The problem of forming ordered structures is even greater for biomolecules due their complex shapes and distributions of surface groups. While for the two-dimensional (2D) assemblies, surface patterning can be often used for scaffolding nano-objects, there is no viable option for building three-dimensional (3D) ordered arrays with the desired organizations.

DNA can be a polymer capable of define structural organization at small scales. Moreover, in this context, DNA is a precisely programmable material appropriate for directing 3D particle organization. Particles can be bound with single-stranded DNA chains and assembled using base-pairing of complementary sequences. This approach, however, cannot decouple particle properties, for example, its shell, size and shape, from the assembly structure. The problem of organizing biomolecules is even greater. Thus, an outstanding challenge is to establish platform approaches for assembly of nanoscale objects of different natures in 3D.

Here, 3D DNA frameworks were used to form from polyhedral DNA frames for organizing nano-objects that are contained inside frames. The versatility of this approach can extend to catalytic, biological and inorganic matrices, metamaterials, and information storage devices. One of the key difficulties for realizing this strategy was revealing the relationship between the design of frame and interframe connectivity and formation of the 3D ordered framework. A successful approach can be using DNA strand sets forming tensegrity triangles to precisely assemble 3D DNA molecular crystals. These crystals can incorporate organic semiconductors or DNA devices. However, the lattice type can be limited to that motif and the small guest species (<7 nm). DNA origami in the format of a tensegrity triangle was used to reproduce this type of lattice through stacking interactions with guest nanoparticles. Here, DNA origami frames of different shapes were used to both host desired nano-objects and access different lattice symmetries through vertex-to-vertex hybridization of frames. Unlike stacking, hybridization permits a great control over interactions encoding, energetics and flexibility of interframe linkages. Co-assembly of lattices of spherical nanoparticles and DNA frames of different shapes depend on the intricate balance of maximizing a number of particle-to-frame hybridizations and minimizing interframe interactions. Thus, formation of the lattice depends on the particle properties. In contrast, a 3D ordered lattice can be fully assembled purely from DNA frames with shapes of Platonic solids, such as a tetrahedron, octahedron and cube.

Here, Polyhedral frames were capable of interframe hybridization via vertex-to-vertex hybridization (FIG. 1). Thus, the DNA frame 101 possesses a spatially determined valence (v) defined by its shape. Interframe hybridization results in assembly with the ability to form an ordered lattice 102, whose type is determined by the frame valence. The frame can be empty or enclose nano-objects 103 (e.g., nanoparticles or proteins), correspondingly resulting in the formation of an empty DNA framework or arrays of precisely positioned nano-objects. This strategy allows to use the same assembly process for creating arrays of very different types of nano-objects (inorganic nanoparticles and proteins), since the assembly approach intrinsically decouples formation of the lattice 102 from the nano-objects 103 and their specific materials identity (FIG. 1, left). The DNA frame 101 with nano-object 103 inside (FIG. 1, middle) represents a building block for the formation of a 3D lattice 102 (FIG. 1, right). This block has a specific valence determined by the vertices of the DNA frame and carries a specific nanomaterial object inside (i.e., DNA material voxel 104). Instead of the optical signature associated with pixel terminology, a DNA material voxel 104 is an elementary volumetric block carrying material property and its binding characteristics are fully determined by the frame shape 101 that leads to a 3D nanomaterial lattice 102.

Figure 10:
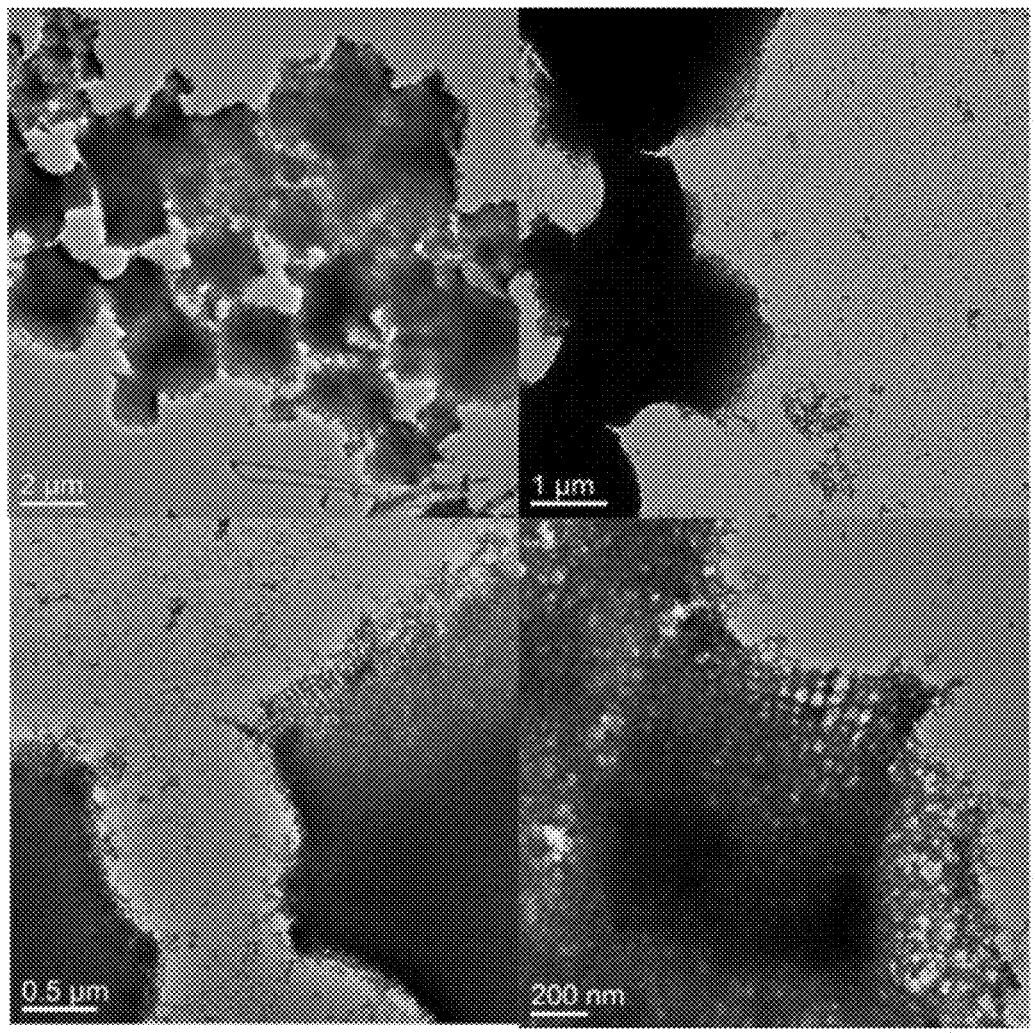
FIG. 10 provides negative stained TEM images of assembled 3D octahedral DNA lattices.

3D DNA origami lattices were formed from octahedral frames (valence, v=6, edge length is about 29 nm) containing twelve 6-helix-bundle edges (6HB), designed with caDNAno. Each octahedron vertex (OB) incorporates single-stranded (ss) DNA motifs with m+1 bases (FIG. 2A). FIG. 2A shows an example ssDNA encoded octahedral frames OB and OR (left) with complementary strands that are mixed to form a DNA lattice (right) and an unit cell (center) with three faces of the unit cell (dots). FIG. 2B provides a graph showing 2D SAXS pattern (inset) and corresponding structure factor, S(q), for 3D DNA lattice and a fit modelled using a SC lattice of DNA octahedra. FIG. 2C shows an example negative stained TEM image for DNA lattice formed by DNA octahedra. This construction allows for hybridization of 1 nucleotides with complementary strand fragments (1+n free bases, in FIG. 2A) on another octahedron (OR) (Table 1). Motifs m and n define the number of bases in respective polyT domains, while motif 1 refers to the number of complementary bases in the binding region between the two sequences. The vertex-driven sixfold octahedral valency can yield ordered assemblies through vertex-to-vertex hybridization of frames, which probed by small angle X-ray scattering (SAXS) and understand by comparing to a validated model accounting for the nano-object's form factor, DNA bundle arrangement and the lattice type. For the octahedral frame assemblies (l=8, m=22, n=22; no encapsulated nano-objects), the 2D SAXS pattern and the corresponding structure factor, S(q) (where q is the scattering vector), reveal a remarkably well-ordered simple cubic (SC) lattice with about 15 orders of resolution-limited Bragg peaks (FIG. 2B). Negative stained transmission electron microscopy (TEM) (FIG. 1C and FIG. 10) reveals domain sizes of 3-5 µm.

Figure 3C:
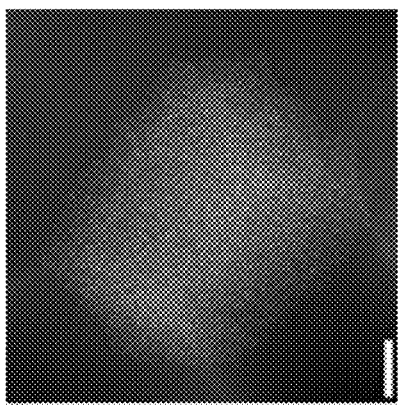
FIGS. 3A-3G show an example simple cubic (SC) lattice of gold nanoparticles (AuNP) assembled using material voxels based on DNA octahedra.
Figure 3B:
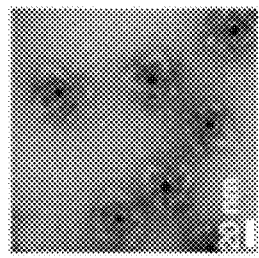
Figure 3E:
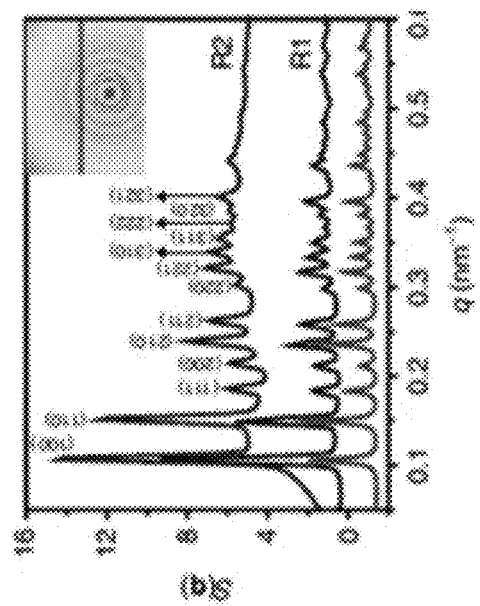
Figure 3A:
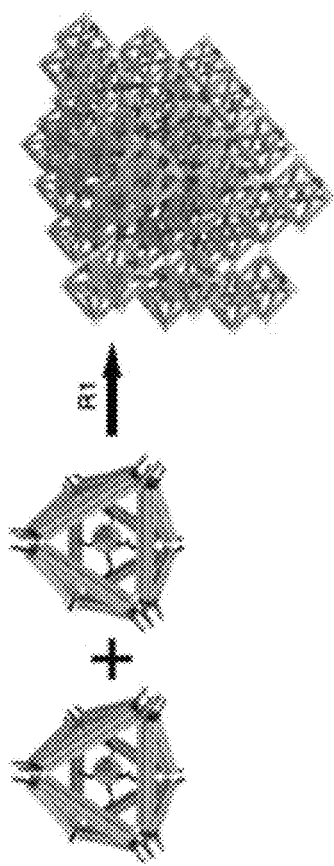
Figure 3D:
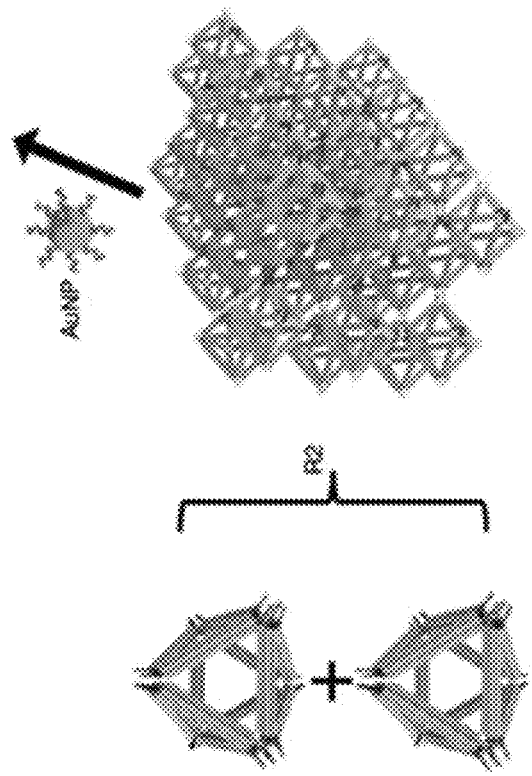
Figure 11:
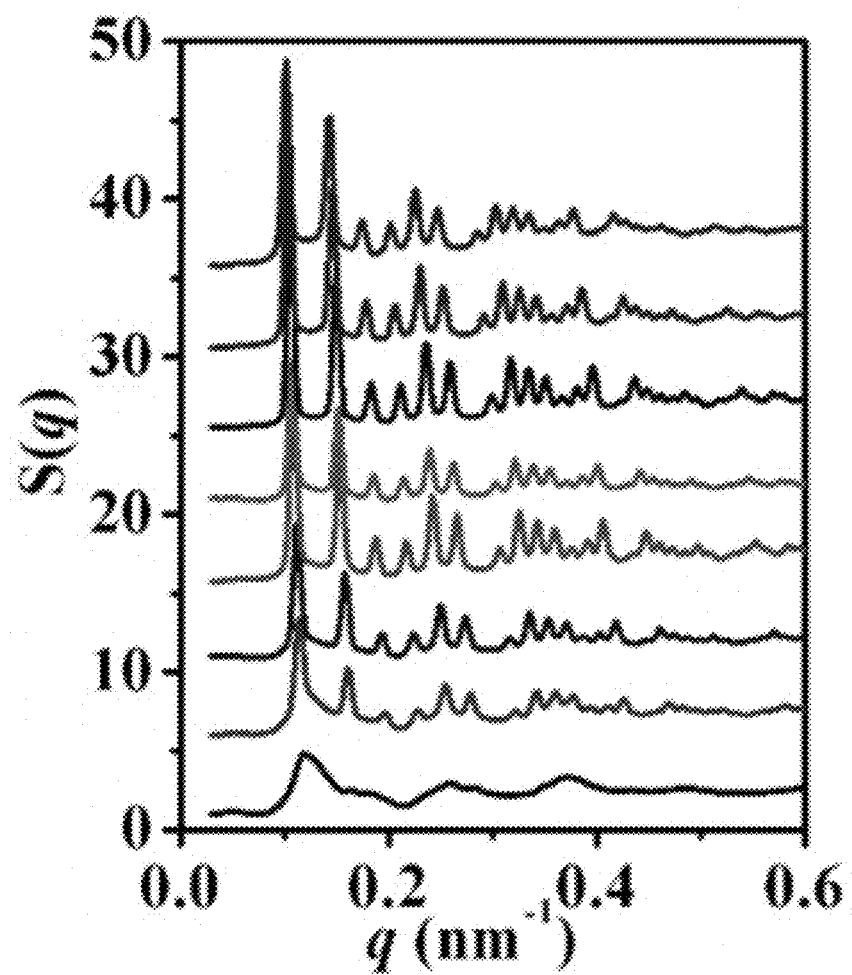
FIG. 11 provides a graph showing structure factor for simple cubic lattice formed by octahedral DNA with encaged gold NP of systems 1-8 (Top to bottom) in Table 1.
Figure 12:
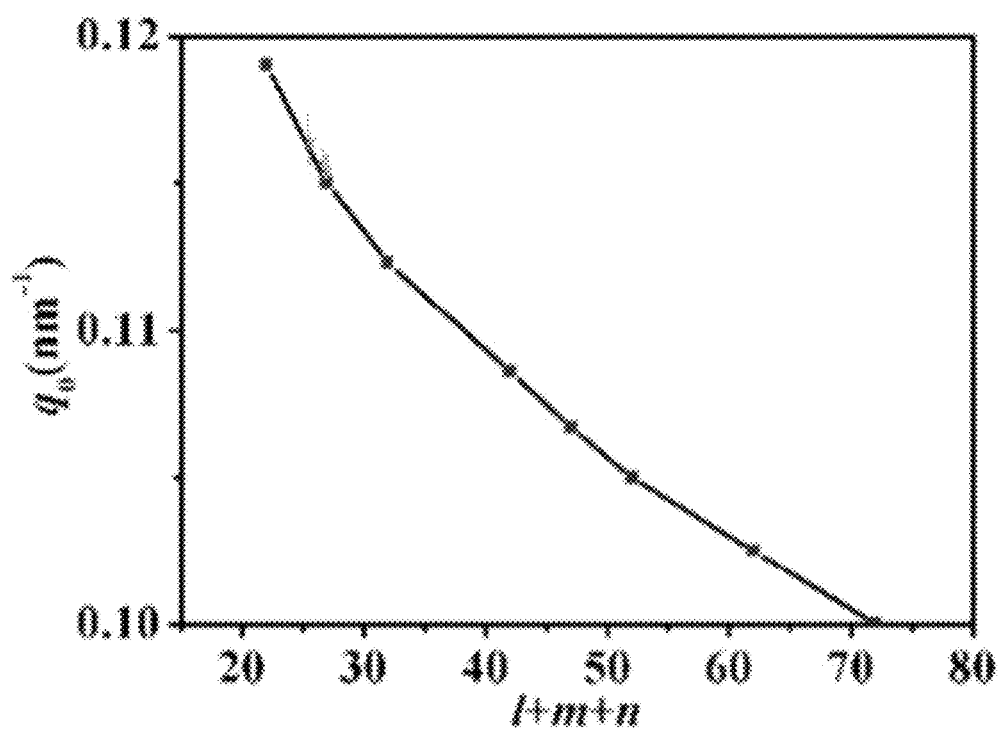
FIG. 12 provides $q_0$ values for the simple cubic systems formed by octahedral DNA that cages gold nanoparticles.

While formation of a stand-alone DNA framework offers proof-of-concept for this design approach, more relevant is to template nano-object organization into 3D arrays. Thus, 10 nm gold nanoparticles (AuNP) were first sequestered inside DNA octahedra before the material voxels self-assembled (FIG. 3A, R1). AuNPs are positioned in the middle of each octahedron by hybridization with its internal strands (FIG. 3B). Then, OB and OR frames (with encaged AuNPs) can be mixed and annealed to form a templated 3D AuNP array. In non-limiting embodiments, AuNP arrays can also be formed post facto (FIG. 3D, R2). Nanoparticles were added into a solution of formed, empty frame lattices at 2.5 times excess over the octahedra. Annealing allows for the diffusion/distribution of particles into the ordered scaffold. The resulting S(q) (FIG. 3E) is in close agreement with route 1. Thus, both routes successfully create the same 3D nanopar-ticle array. To explore the effect of intervertex linkage designs, the ssDNA length was modified and thus the interoctahedra distance d (Table 1 and FIGS. 11 and 12). Well-ordered SC lattices were observed for all but the smallest d values, possibly due to destabilizing electrostatic and steric effects at close separations.

Figure 3G:
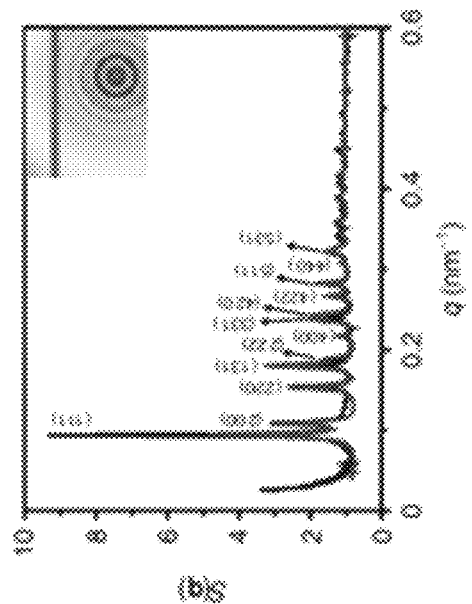
Figure 3F:
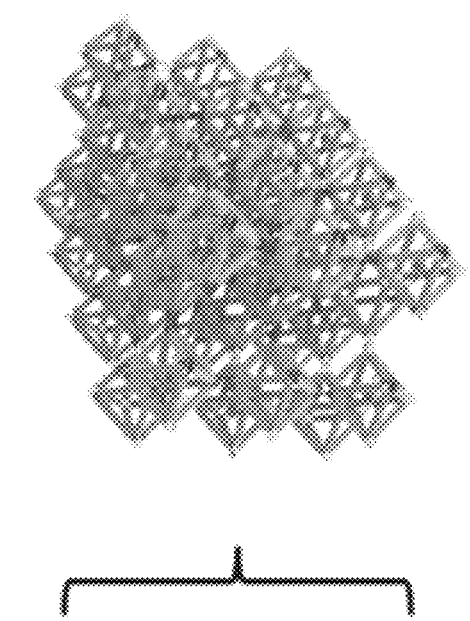
Figure 3F:
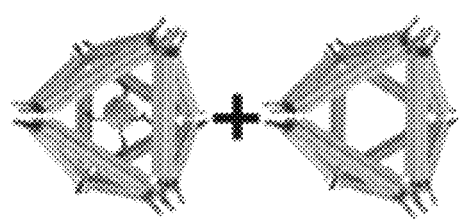

To further emphasize this approach's versatility, one of the two types of cages can be selected to prefill with nanoparticles while leaving the other empty. Thus, even within the restriction of identical DNA cage scaffolds, a totally different nanoparticle superlattice results (FIG. 3F). Approximately 20 recognizable SAXS peaks (FIG. 3G, black curve), where the peak position ratios q/q1=1: root (4/3): root (8/3): root (11/3:2) . . . correspond to a face-centered-cubic lattice with a lattice constant of 81.2 nm. Detailed S(q) modelling confirms (FIG. 3G, red curve) that the nanaoparticles are located precisely in every second octahedron in the frame lattice (FIG. 2).

Figure 4A:
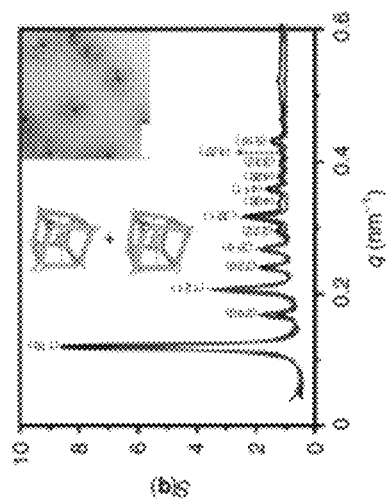
FIGS. 4A-4I provide an example assembly of nanoparticles from different materials and frames of different geometries into SC, BCC and cubic diamond superlattices.
Figure 4B:
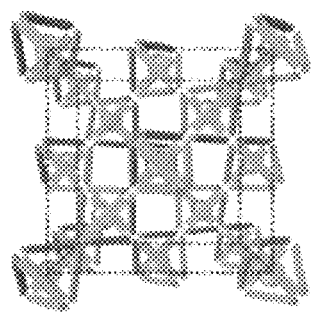

An advantage of this assembly method can be that nano-objects of different kinds can be organized in 3D ordered arrays in a similar manner. For example, encaged quantum dots (QD, cadmium selenide, 5 nm core, FIG. 4A, inset) were assembled using material voxels based on the same type of DNA octahedra. Modelling shows excellent agreement between the calculated and measured SC S(q) (FIG. 4A, structure illustrated in FIG. 4B).

Figure 4C:
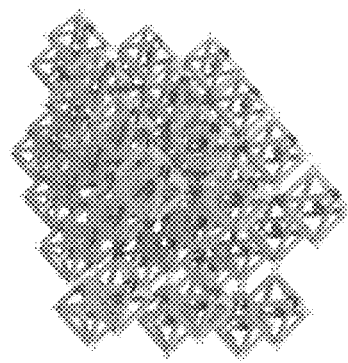
Figure 13:
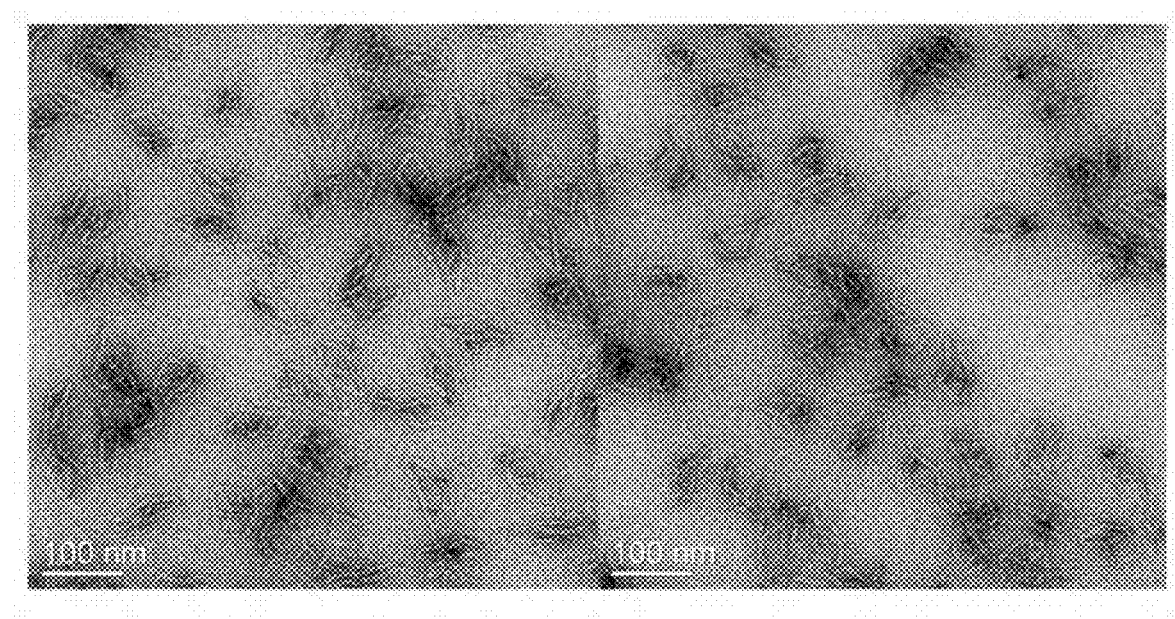
FIG. 13 provides negative stained TEM images of cubic frames.
Figure 14:
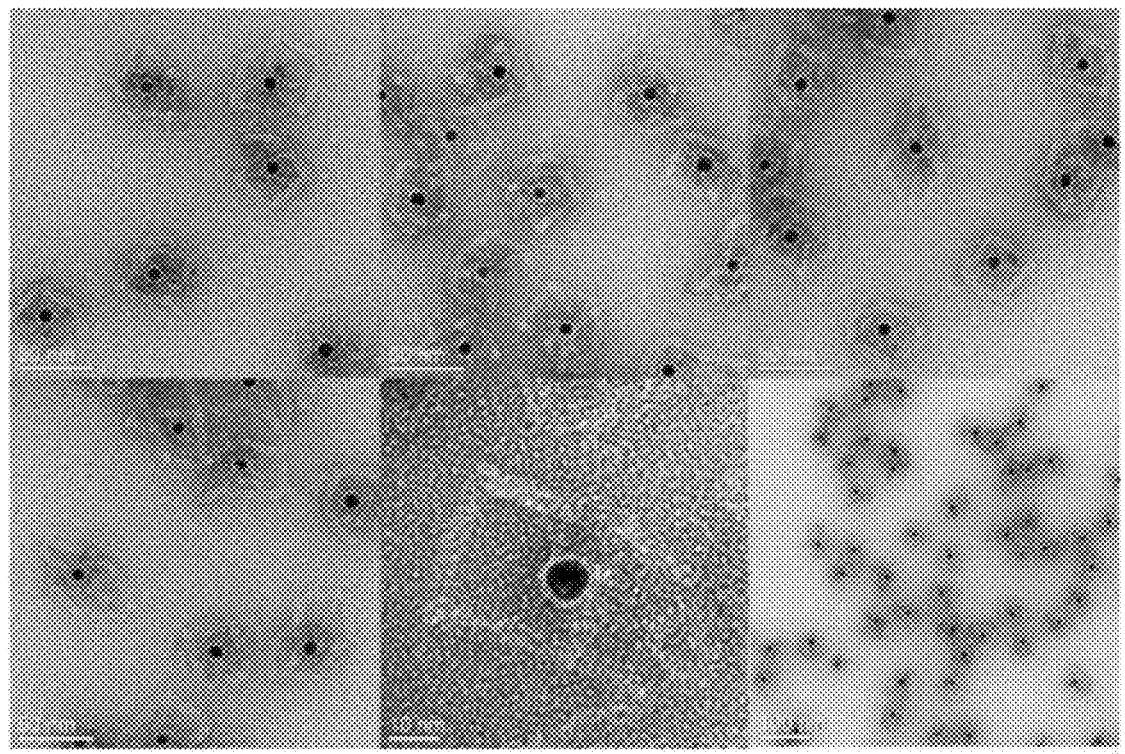
FIG. 14 provides negative stained TEM images of 10 nm gold nanoparticle inside DNA cubic frames.

This versatile lattice formation strategy can be expanded to create other symmetries using DNA material voxels with different valence values. Cubic frames (v=8) composed of twelve 6HB with edge lengths similar (~29 nm) to the octahedral frames were assembled (FIG. 13). Two kinds of cubes (CB and CR) were used, where each CB vertex contained three DNA strands complementary to the three CR vertex strands (FIG. 4C). Both cube populations have another set of DNA sticky ends at each vertex that point towards the cube centre for binding with ssDNA of 10 nm AuNPs. TEM images (FIG. 4A and FIG. 14) show that the AuNPs are encaged with high fidelity; this encapsulation presumably helps to restore cube shape from their skewed empty forms to a normal, undistorted form. Cube assembly was carried out by mixing CB and CR with encaged nanoparticles, followed by annealing as described above. The experimental data and model S(q) (FIG. 4A, curve), reveal a well-ordered body-centered-cubic (BCC) lattice, which is in-line with a vertex-to-vertex hybridization of cubic frames. Considering the nearest interparticle distance (66.2 nm), each CB is connected to CRs at eight vertices yielding the BCC arrangement.

Figure 4D:
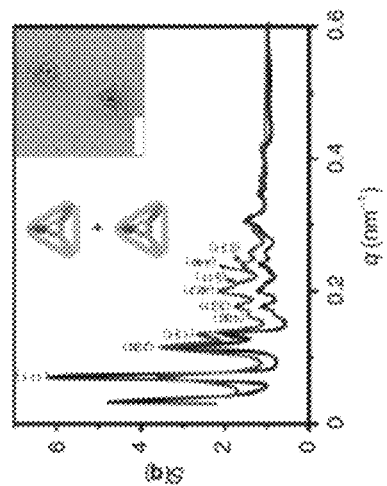
Figure 4E:
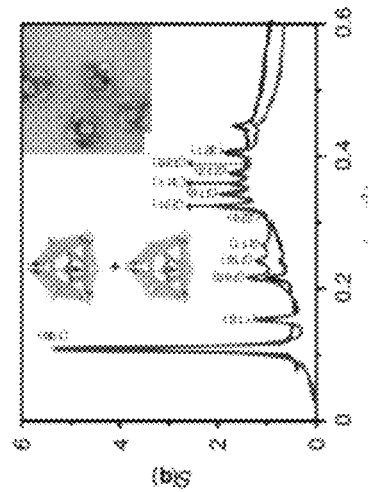
Figure 4F:
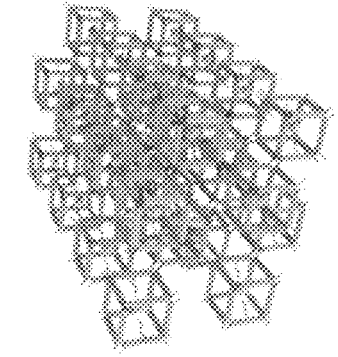
Figure 4G:
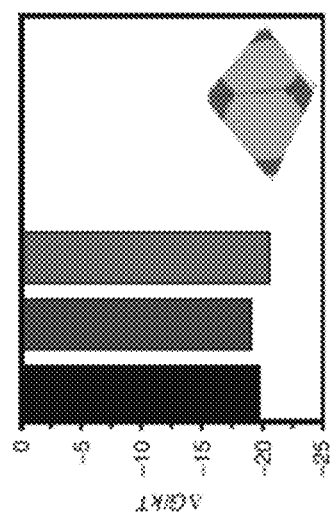
Figure 4H:
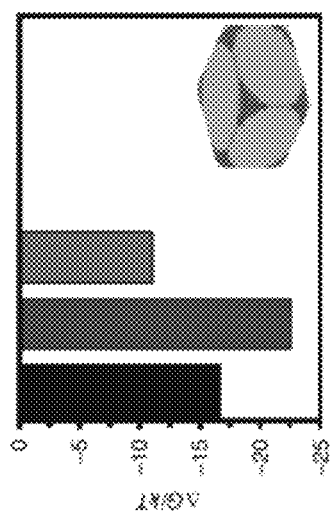
Figure 4I:
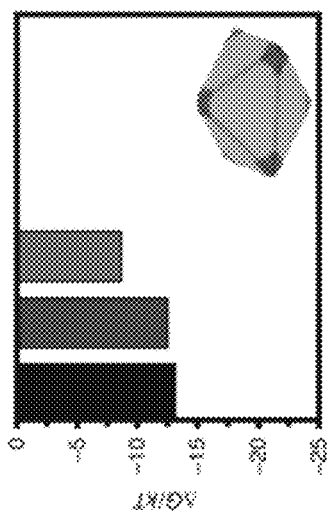
Figure 15:
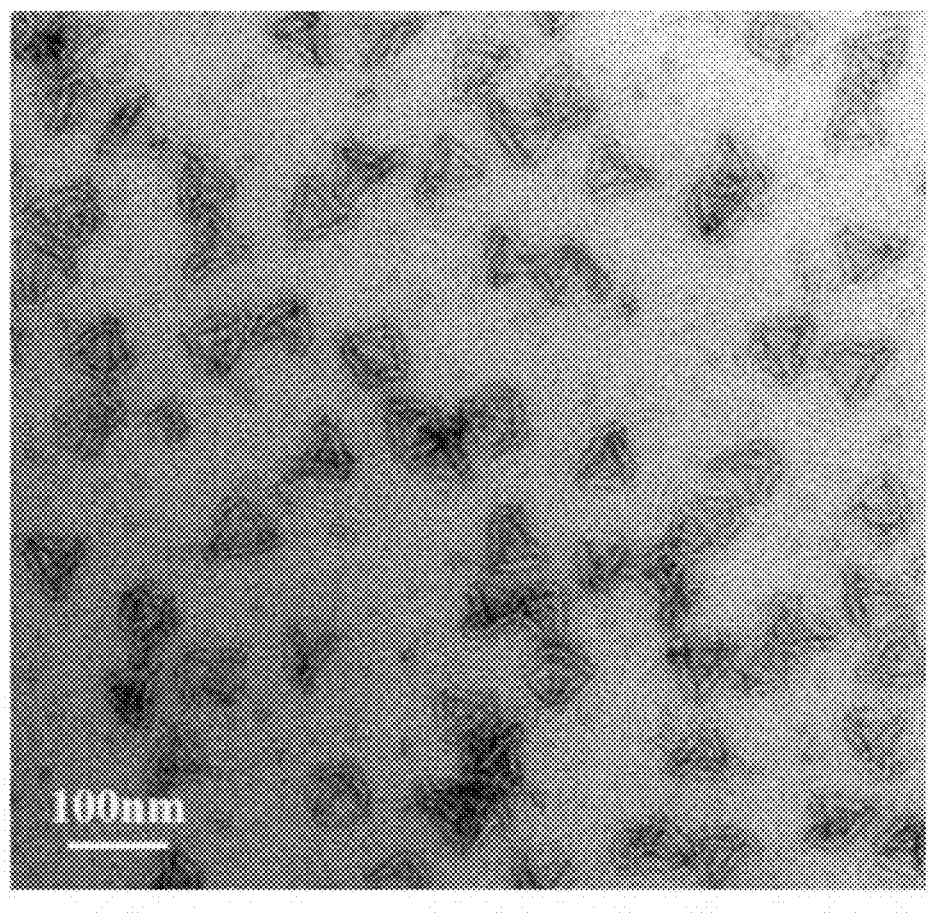
FIG. 15 provides negative stained TEM image of tetrahedral structures.

Next assembly of material voxels with v=4 using hybridization between vertices of tetrahedral DNA frames was tested for which each edge is composed of a 10HB with length ~36 nm (FIG. 15) and four internal DNA strands bind 10 nm AuNPs (FIG. 4C). Equal amounts of two kinds of tetrahedra possessing complementary sets of six sticky end sequences at their vertices (TR) and (TB) in FIG. 4E were mixed and annealed. SAXS (FIG. 4E) revealed a well-ordered diamond type lattice with ~15 observable scattering peaks (black and red curves). Each tetrahedron binds with four tetrahedra through its vertices (FIG. 4F). This organization is different from particles that were only arranged in the lattice under the restriction of the specific size ratio of a frame footprint to a particle. Here, formation of diamond lattice in respect to frames was detected, thus, any objects encaged in the frames can form a diamond lattice.

The correlation between the DNA frame valence and the resulting lattice was identified. Conventional theories for DNA-mediated self-assembly operate within the limit of high grafting densities and isotropic interaction site distribution. In the presently disclosed model, however, interaction sites are localized to small regions, resulting in 'patchy' interframe attractions. Wertheim's thermodynamic perturbation theory was modified for associating particles to properly account for this patchiness. The resulting free energies yield the most favorable ground state crystal structure for a particular frame. Cubic frames preferentially self-assemble into a BCC structure, whereas the octahedral frames pack into a SC lattice; diamond lattices are favored for tetrahedral frames. The preference for these morphologies can be explained by decomposing the ΔG into its enthalpic and entropic components, ΔG=ΔH−TΔS, where ΔG is the change in Gibbs free energy, ΔH the change in enthalpy and TΔS the change in entropy; enthalpy dominates were identified. Further, the size and interaction range of these patches depends on the degree of frame truncation; the degree of truncation can also be used to modulate the self-assembled morphologies. These results suggest that truncation tuning can provide an additional powerful handle for expanding this approach to wider ranges of crystal symmetries.

Figure 5C:
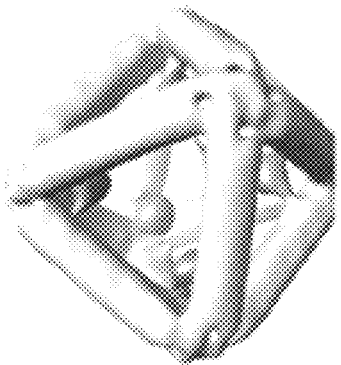
FIGS. 5A-5F provide graphs and images showing the structure and enzymatic activity of assembled 3D designed lattices (SC) of material voxels with proteins.
Figure 5F:
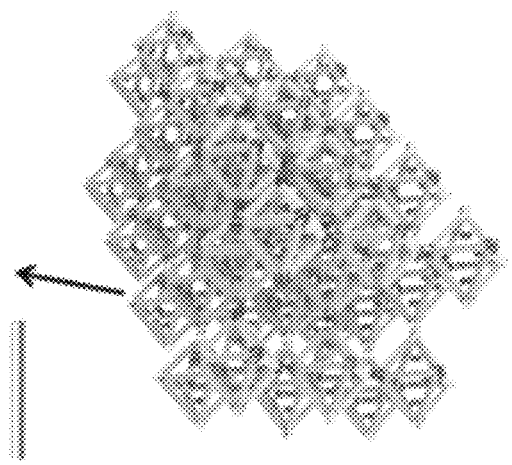
Figure 5A:
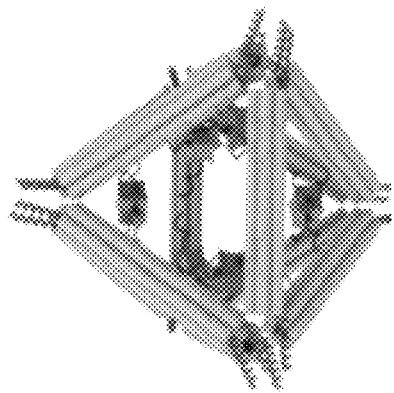
Figure 5D:
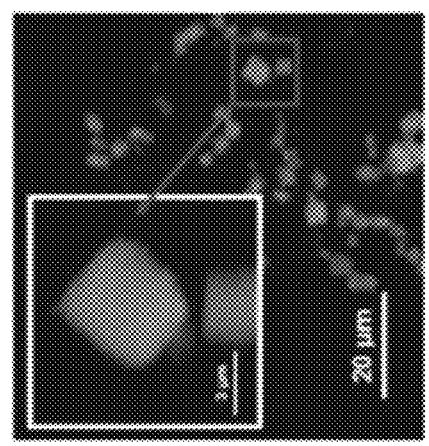
Figure 6A:
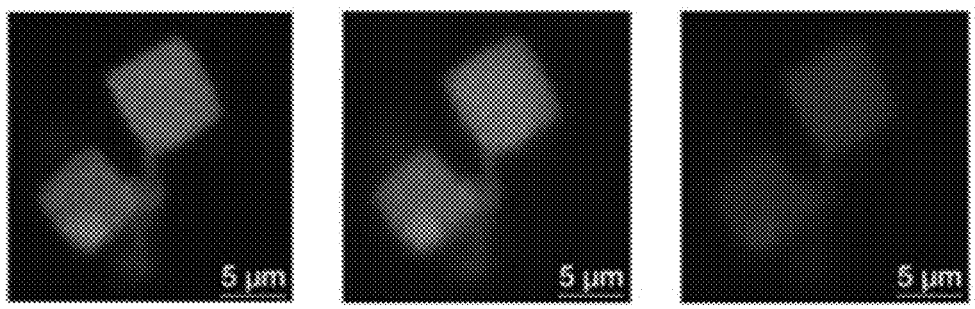
FIGS. 6A-6D provide images and graphs showing optical and enzymatic functions of a 3D lattices assembled respectively from DNA material voxels with quantum dots and enzymes.
Figure 6B:
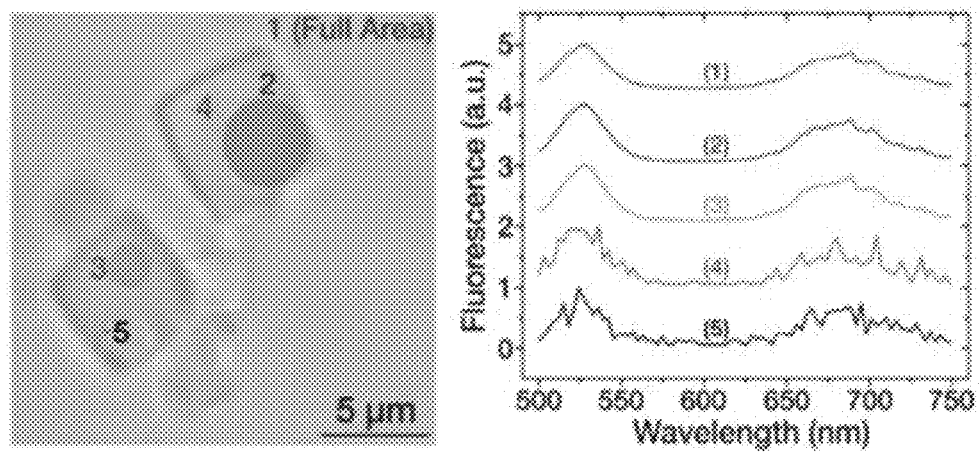
Figure 6C:
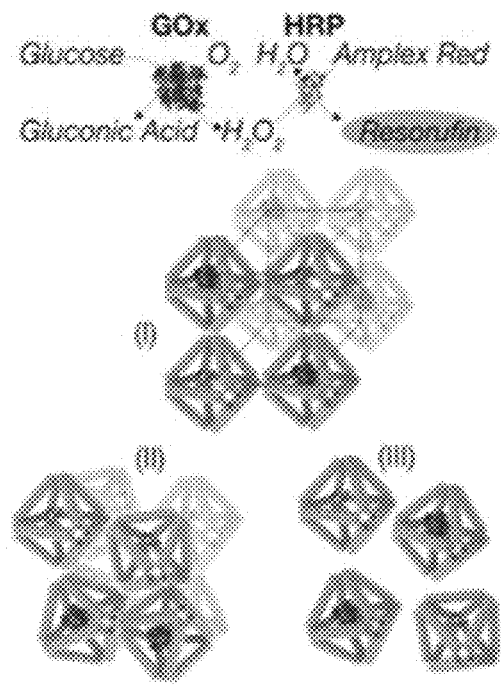
Figure 16A:
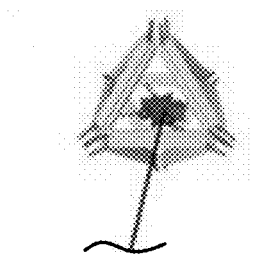
FIGS. 16A-16C provide octahedron with one streptavidin inside of the DNA cage.
Figure 16B:
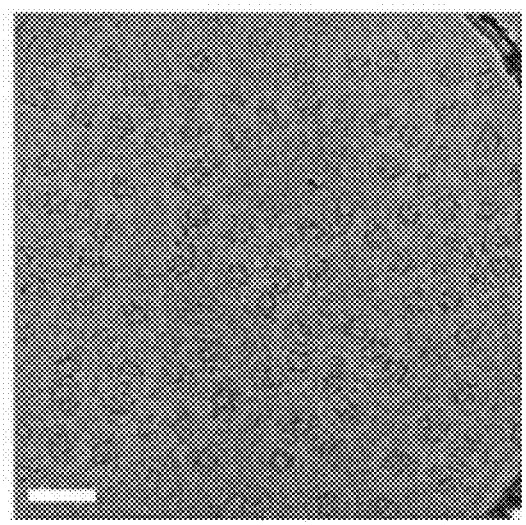
Figure 16C:
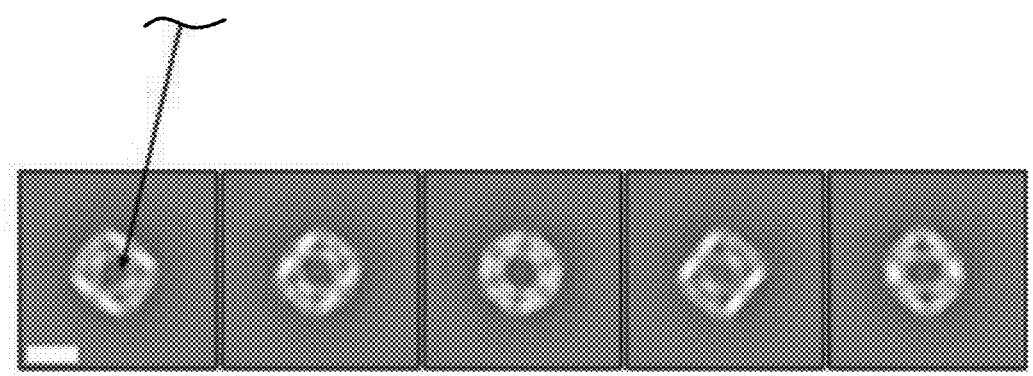
Figure 17A:
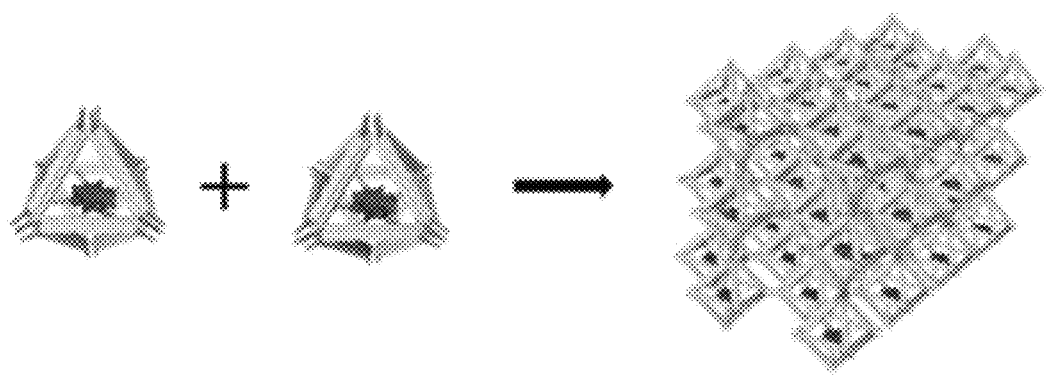
FIG. 17A provides an illustration of the assembly of one-streptavidin caged octahedra (OB and OR) into a 3D lattice.
Figure 17B:
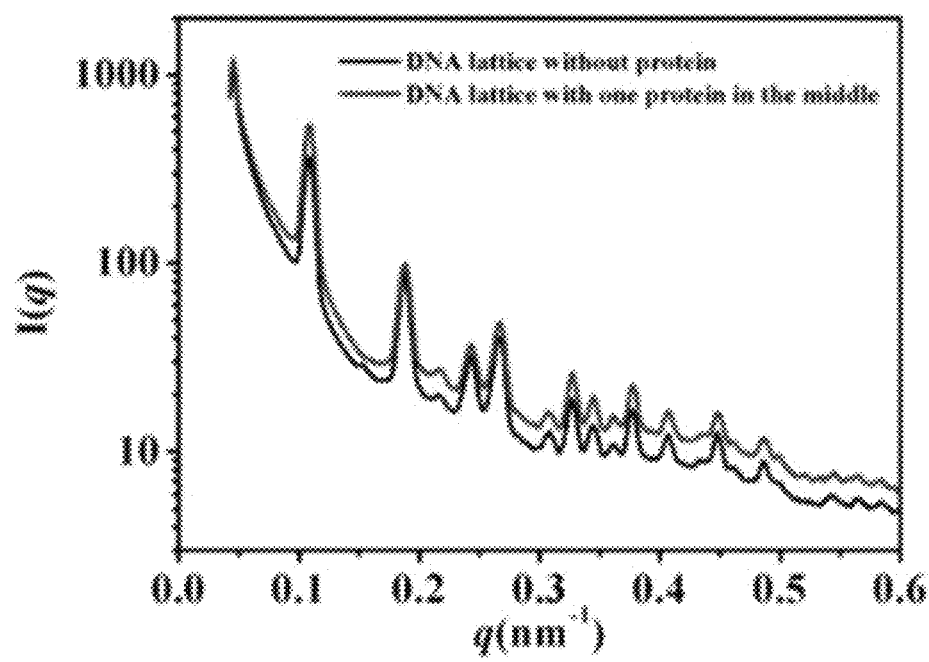
FIG. 17B provides a graph showing I(q) vs q curve for the DNA lattice with and without one protein in a cage.

While this theoretical understanding underscores the opportunities in a crystal lattice design, the DNA material voxel assembly strategy was expanded by moving beyond inorganic AuNPs and QDs as templated nano-objects to organic materials, by creating ordered 3D protein arrays. As an illustration, streptavidin, a protein containing four high-affinity sites for biotin binding, was used. Six hosting sites were designed for streptavidin, one at each vertex of an octahedral DNA frame (v=6), with each site containing four ssDNA attached to the four corresponding edges that form the vertex (FIG. 5A). Thus, each streptavidin can bind to biotinylated DNA that is complementary to the edge-attached strands. FIGS. 16 and 17 provide data for a second organization whereby DNA cages attach a single streptavidin. FIG. 16A shows a model of protein caged octahedron. Star shape is the streptavidin, while four balls represents four biotins. FIG. 16B shows a representative cryo-EM image for one streptavidin inserted octahedral particles. Circles are examples of particles selected for further analysis. Scale bar: 100 nm. FIG. 6C shows a reference-based 2D class average for one protein inserted octahedra as obtained from cryo-TEM single particle analysis. Arrow showed the density of protein inside the octahedron. Scale bar: 20 nm. FIG. 17A shows a diagram of assembly of one-streptavidin caged octahedra (OB and OR) into 3D lattice. FIG. 17B shows I(q) vs q for the DNA lattice with and without one protein in a cage.

Figure 5B:
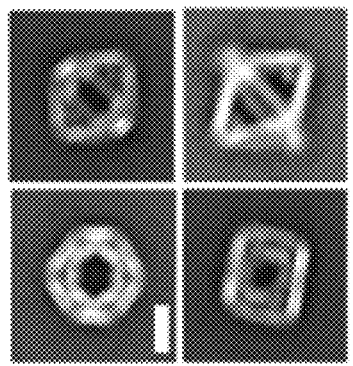

The protein-filled material voxels were characterized with cryo-EM using single particle analysis. 2D class averages of raw particle images are nearly identical to the corresponding reconstructed 3D density model, demonstrating the correct assembly of six proteins in the octahedral cage (FIG. 5B). The cryo-EM 3D map (resolution ~23 Å), allowing for the visualization of the precise protein positions (FIG. 5C), shows that the octahedral edge is ~30 nm long, in agreement with the disclosed design. The streptavidin lattice structure shows that the streptavidin proteins are well-docked into six globular densities located at the inner space of vertices. These measurements also indicate full protein occupancy inside cages and high stability of cage-streptavidin complexes.

Figure 18:
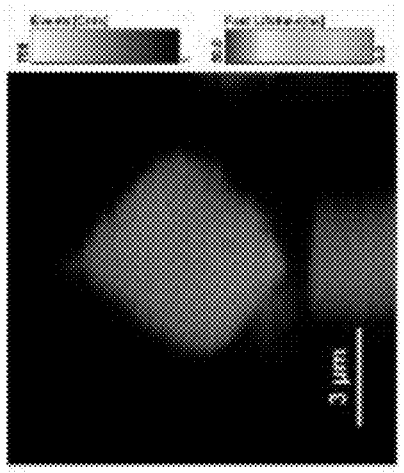
FIG. 18 provides confocal Fluorescent Microscopy images of 6 streptavidin, labeled with Cy3 dye, encaged by DNA octahedra, and assembled into a lattice.
Figure 18:
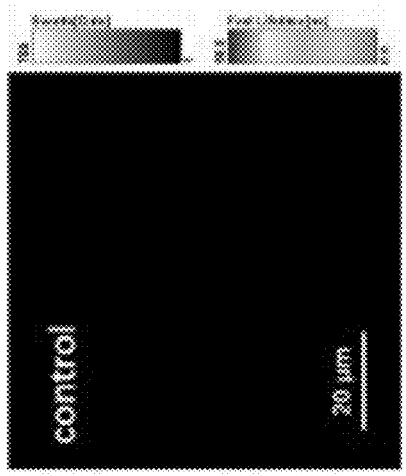
Figure 18:
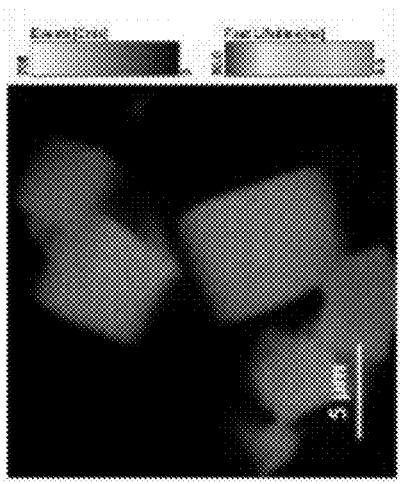
Figure 18:
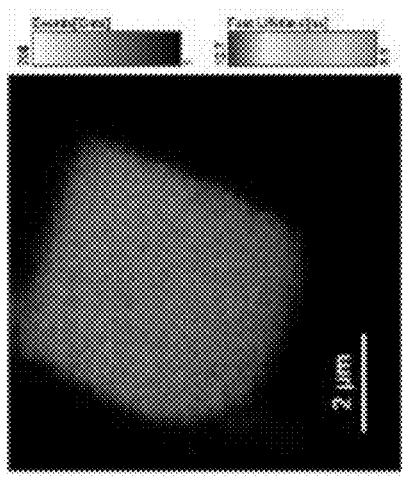
Figure 18:
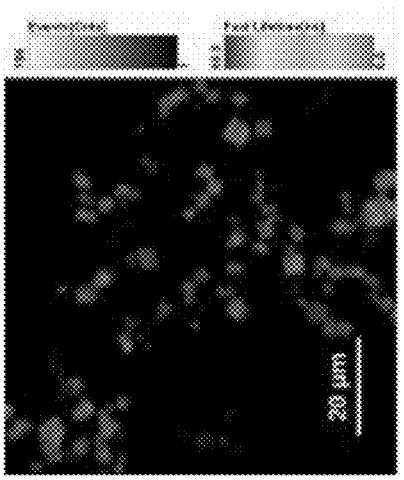
Figure 18:
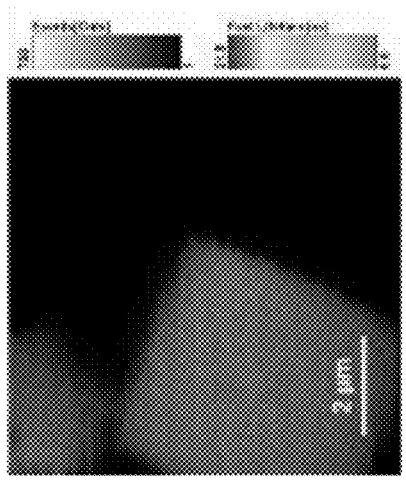
Figure 19A:
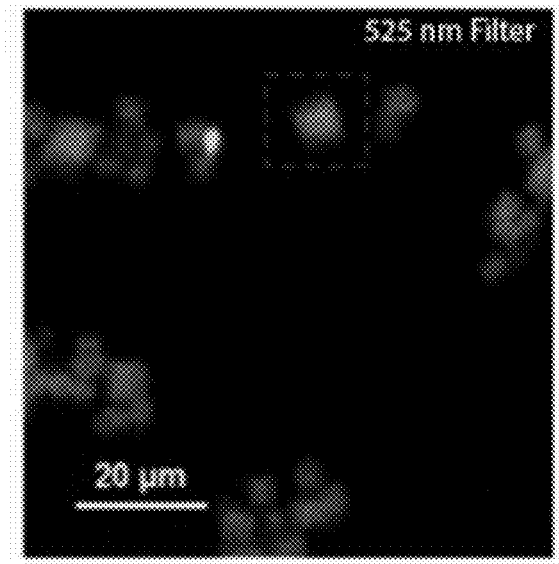
FIGS. 19A-19D provides images showing fluorescence microscopy of QD superlattices.
Figure 19B:
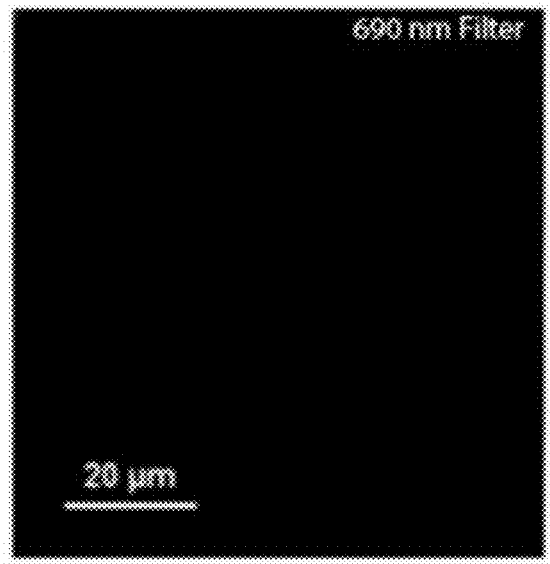
Figure 19C:
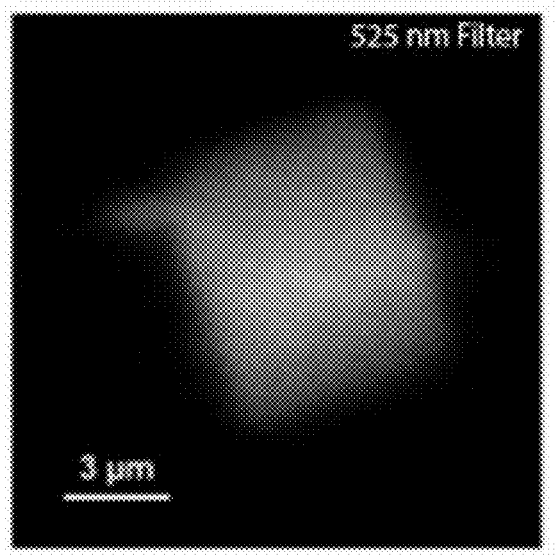
Figure 19D:
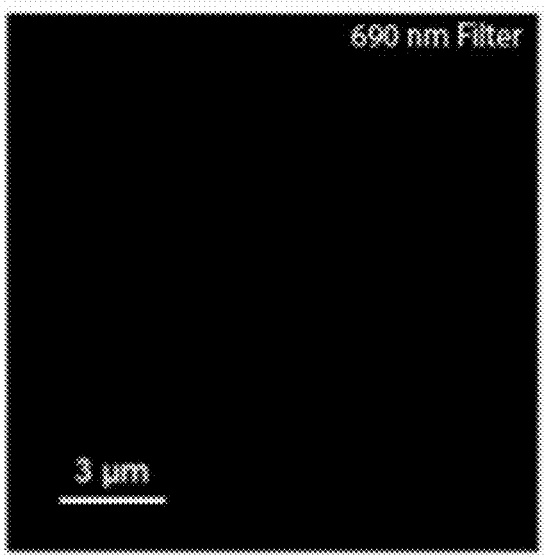
Figures 20A, 20B:
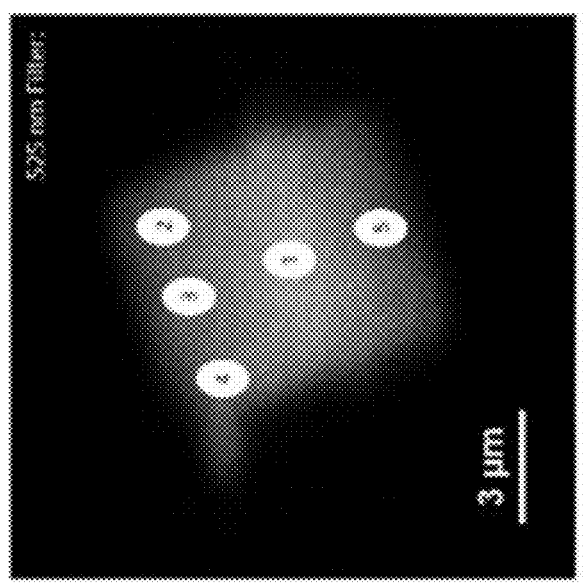
FIGS. 20A and 20B provide fluorescence lifetime point scan measurements of QD-525 superlattice.
Figure 21A:
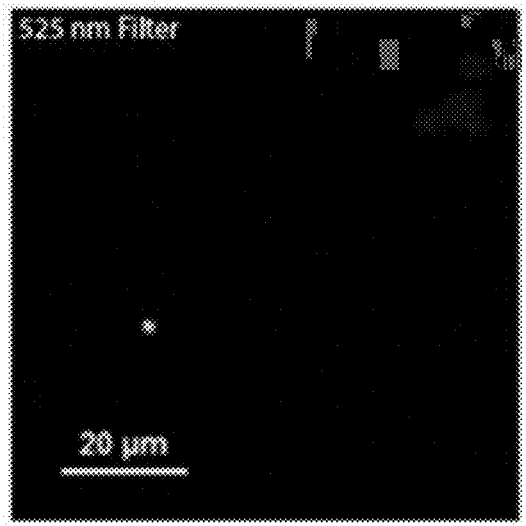
FIGS. 21A-21D provide fluorescence microscopy of QD superlattices.
Figure 21B:
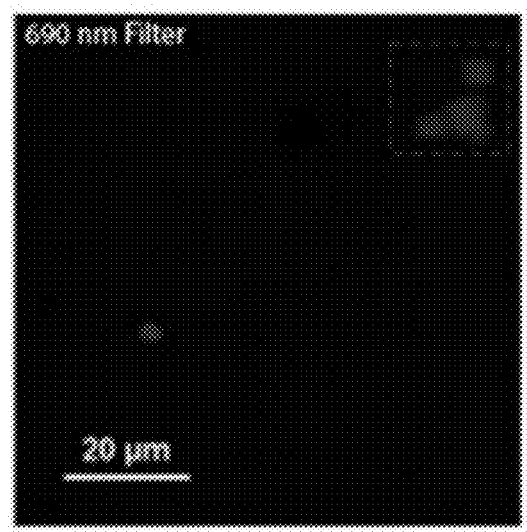
Figure 21C:
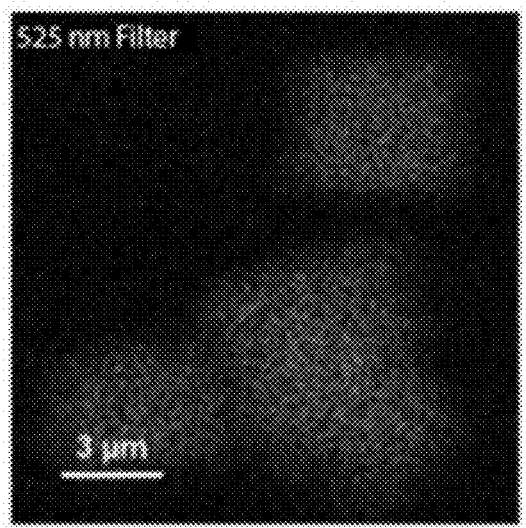
Figure 21D:
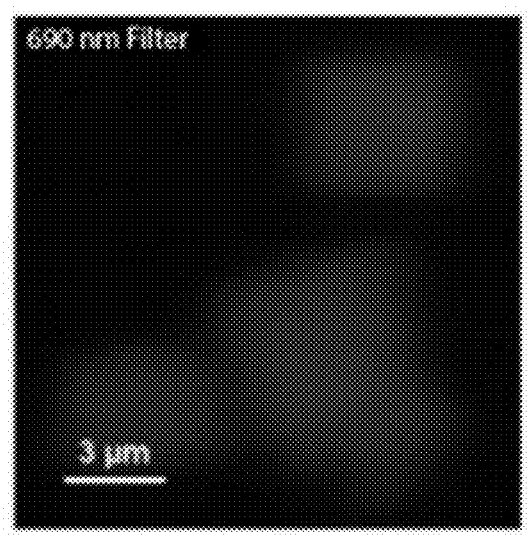
Figures 22A, 22B:
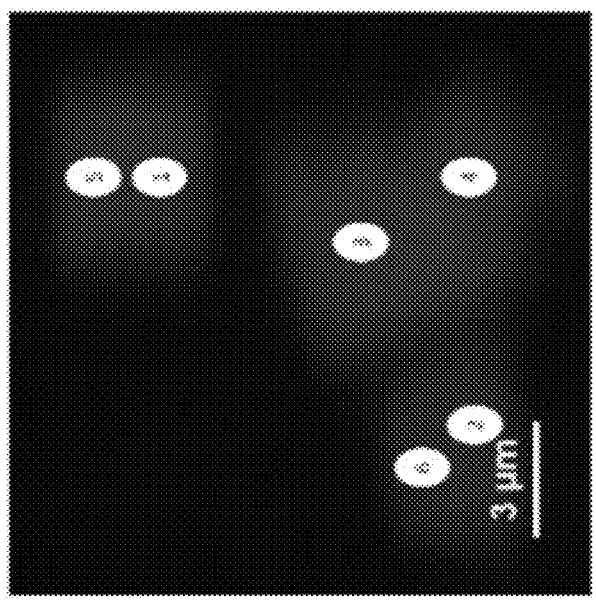
FIGS. 22A and 22B provide fluorescence lifetime point scan measurements of QD-705 superlattice.
Figure 23A:
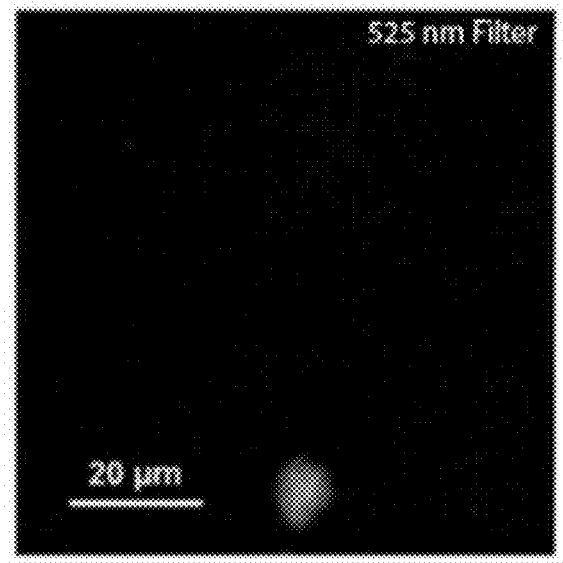
FIGS. 23A-23D provide fluorescence microscopy of QD superlattices.
Figure 23B:
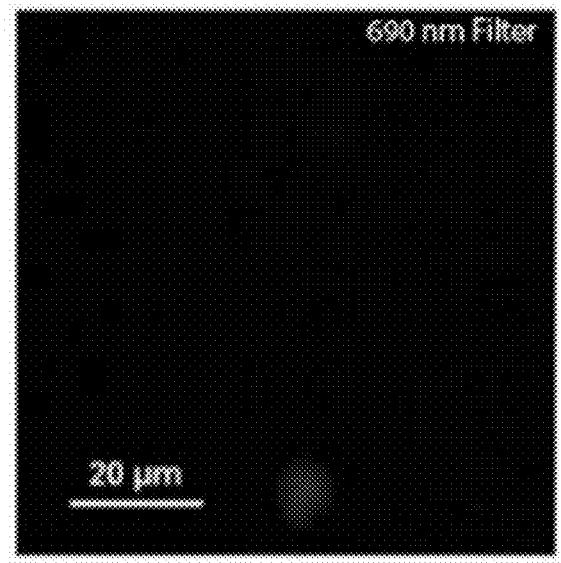
Figure 23C:
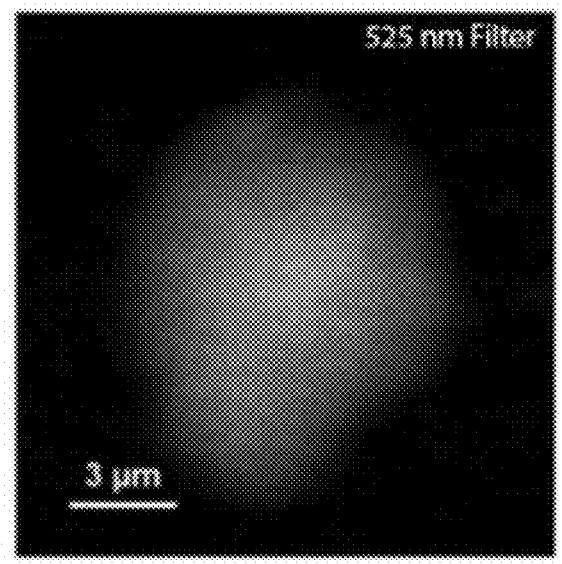
Figure 23D:
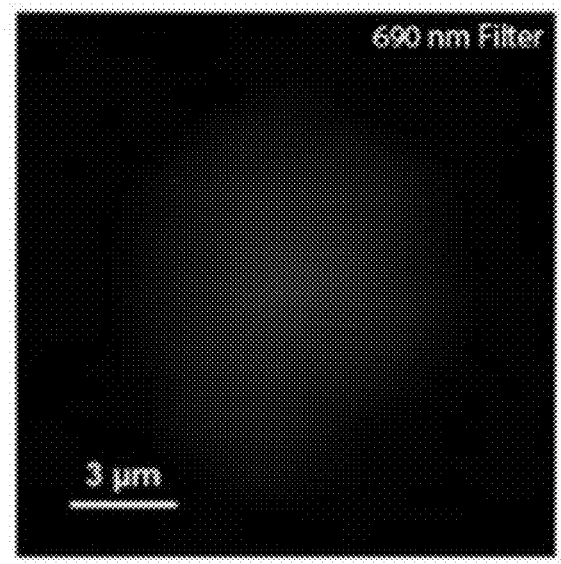

Subsequently, OB and OR frames were mixed with streptavidin and biotinylated DNA (labeled with Cyanine 3), followed by annealing. The assembled pink-colored aggregates were examined using Confocal Fluorescence Microscopy and found fluorescent ~3-5-am-sized square shapes (FIG. 4D and FIG. 18).

Control experiments mixing OB, OR and labeled streptavidin, but without biotinylated DNA, showed no fluorescent aggregates, confirming that protein incorporation into DNA frameworks requires specific binding.

Figure 5E:
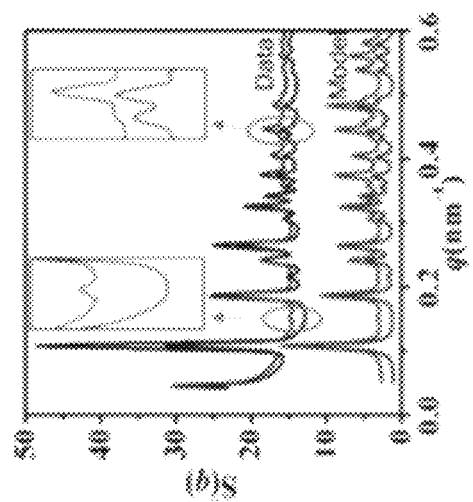

SAXS of the encaged streptavidin lattice (FIG. 5E) shows the same symmetry and peak positions as for the corresponding empty DNA cage lattice; moreover, the similar electron density of DNA bundles and streptavidin leads to roughly similar peak intensities for both structures. However, small differences were observed in two highlighted regions of S(q) (FIG. 5E). Detailed modeling, accounting for the geometry, locations and density of DNA cages and the six encaged streptavidin proteins (FIGS. 4C and 4F) matches the overall shape of the experimental S(q) for both empty and protein-filled ordered DNA frameworks and moreover, explains the observed differences in S(q). Clearly, protein arrays are templated by an ordered 3D array of octahedral DNA cages.

The confirmation and characterization of different 3D lattices, organizing both inorganic and organic materials, demonstrates the versatility and universality of this DNA material voxel assembly approach. This platform was used to synthesize two different material organizations with properties relevant to dramatically different applications-optical using a combination of QDs and catalytic using a cascaded enzyme network organized within a 3D lattice.

The exploitation of colloidal QD properties can lead to a rapidly growing market for QD-based devices and even more specifically, QD optoelectronics. The tunability of a cadmium selenide core shell QD emission has made them an ideal candidate for QD light-emitting diodes, which have characteristic high color purity over a color gamut that is far larger than has traditionally been incorporated into display technologies. Such devices are formed from layers or films of QDs, yet it has the photoluminescence quantum yield, ηPL that is reduced by one to two orders of magnitude in such formats in a field where higher display brightness is the desired device characteristic. The 3D organization of QDs with a controlled, larger separation distance can improve the ηPL by reducing energy transfer between QDs. Furthermore, precise control over the structural (unit cell, lattice parameters and so on) and material properties of 3D QD organizations can allow for the engineering of desired QD superlattice photo-optical responses.

Figures 24A, 24B:
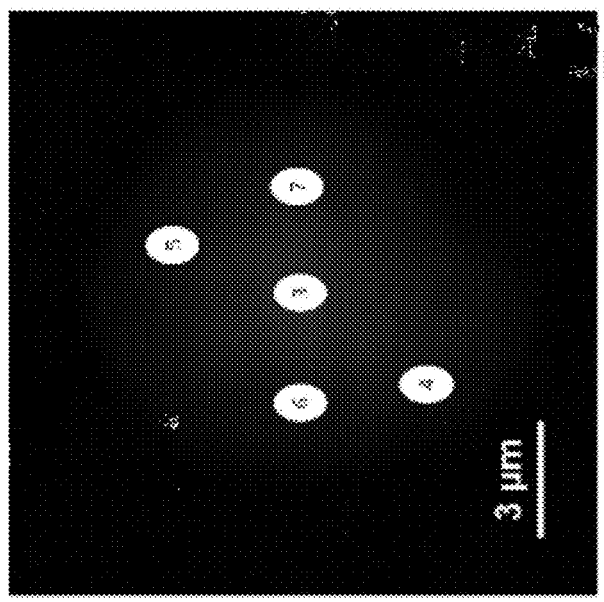
FIGS. 24A and 24B provide fluorescence lifetime point scan measurements of QD-525 and 705 superlattice.
Figure 25B:
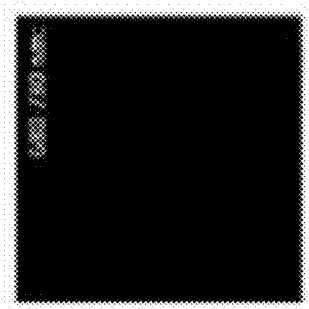
FIGS. 25A-25J provide fluorescence microscopy images of different area and corresponding spectra for QD-525 superlattice, using three band-pass filters; Detector 1: 500-550 nm (FIGS. 25A, 25D, and 25G), Detector 2: 555-675 nm, (FIGS. 25B, 25E, and 25H), Detector 3: 680-730 nm (FIGS. 25C, 25F, and 25I).
Figure 25E:
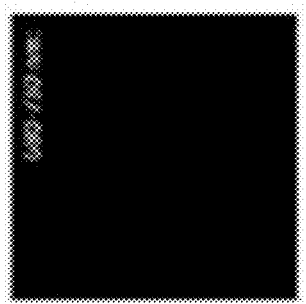
Figure 25H:
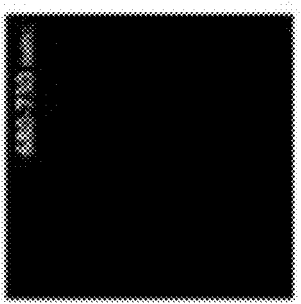
Figure 25C:
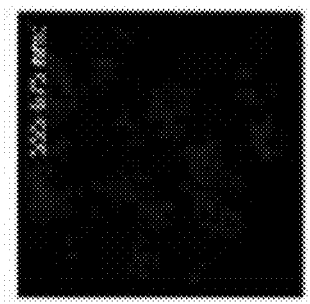
Figure 25F:
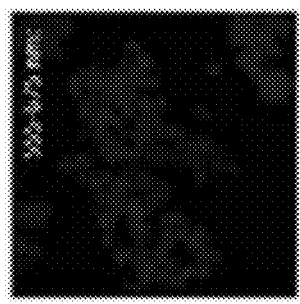
Figure 25I:
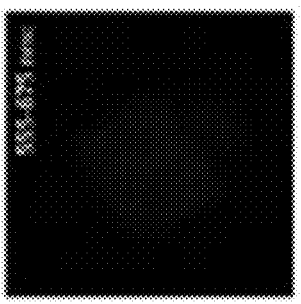
Figure 25A:
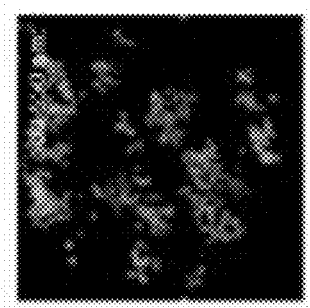
Figure 25D:
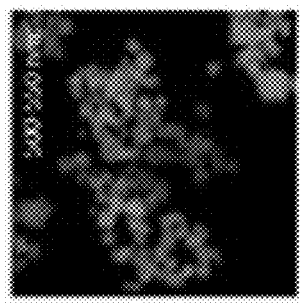
Figure 25G:
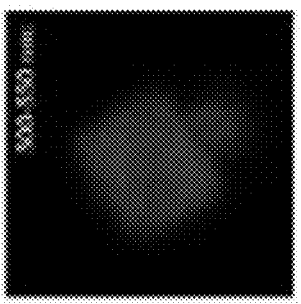
Figure 25J:
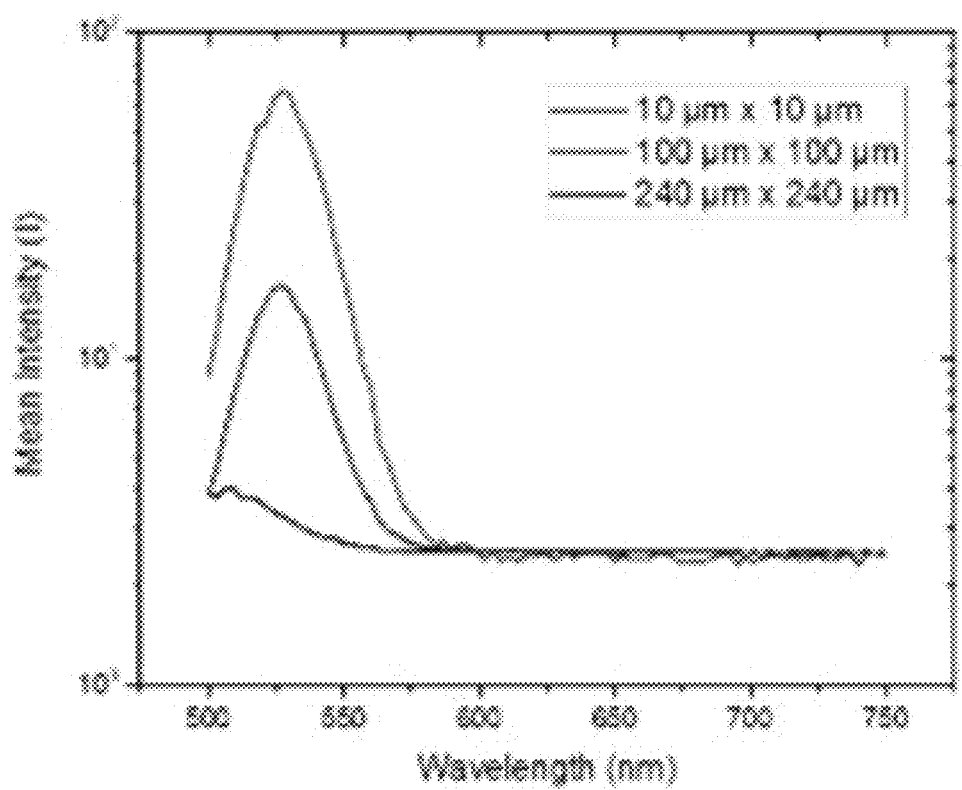
Figure 26C:
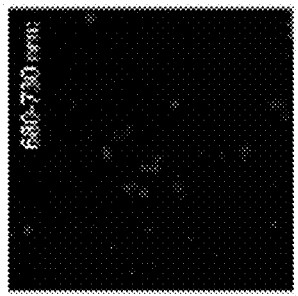
FIGS. 26A-26J provide fluorescence microscopy images of different area and corresponding spectra for QD-705 superlattice, using three band-pass filters; Detector 1: 500-550 nm (FIGS. 26A, 26D, and 26G), Detector 2: 555-675 nm, (FIGS. 26B, 26E, and 26H), Detector 3: 680-730 nm (FIGS. 26C, 26F, and 26I).
Figure 26F:
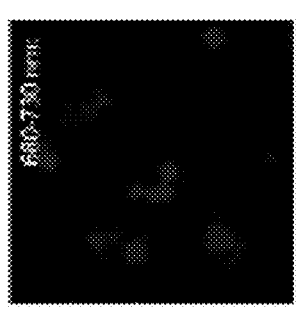
Figure 26I:
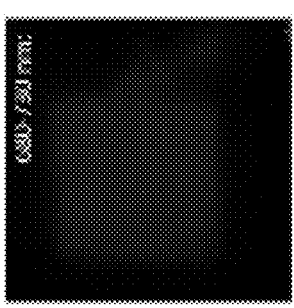
Figure 26B:
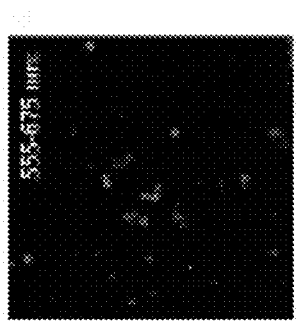
Figure 26E:
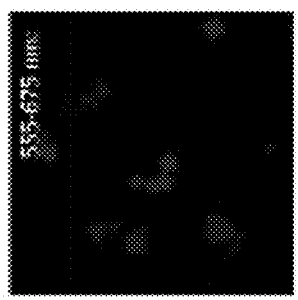
Figure 26H:
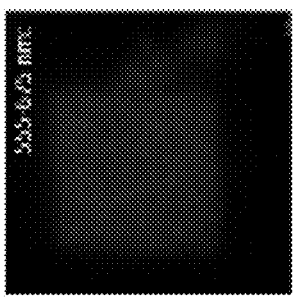
Figure 26A:
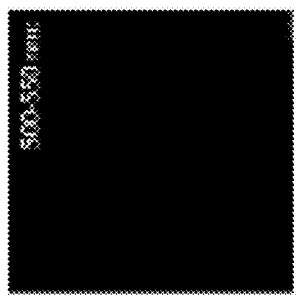
Figure 26D:
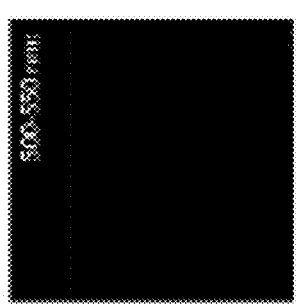
Figure 26G:
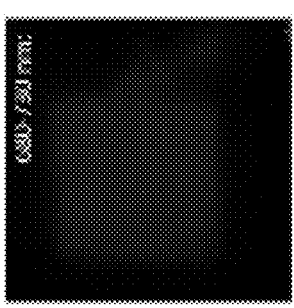
Figure 26J:
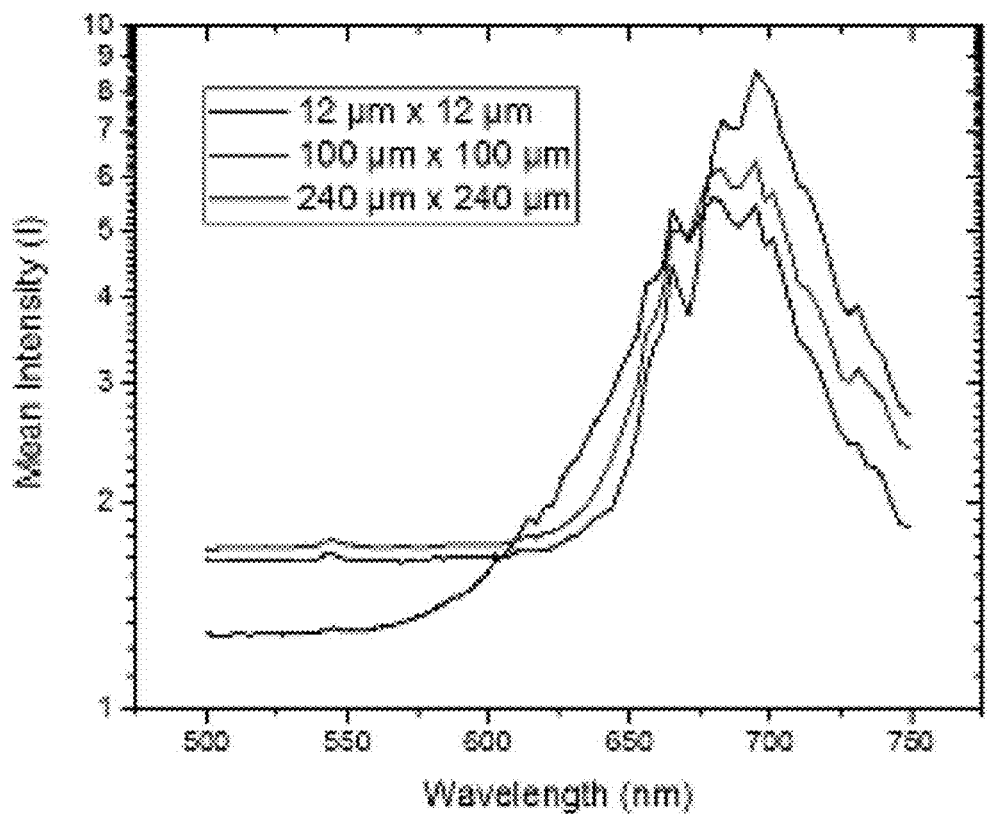
Figure 27J:
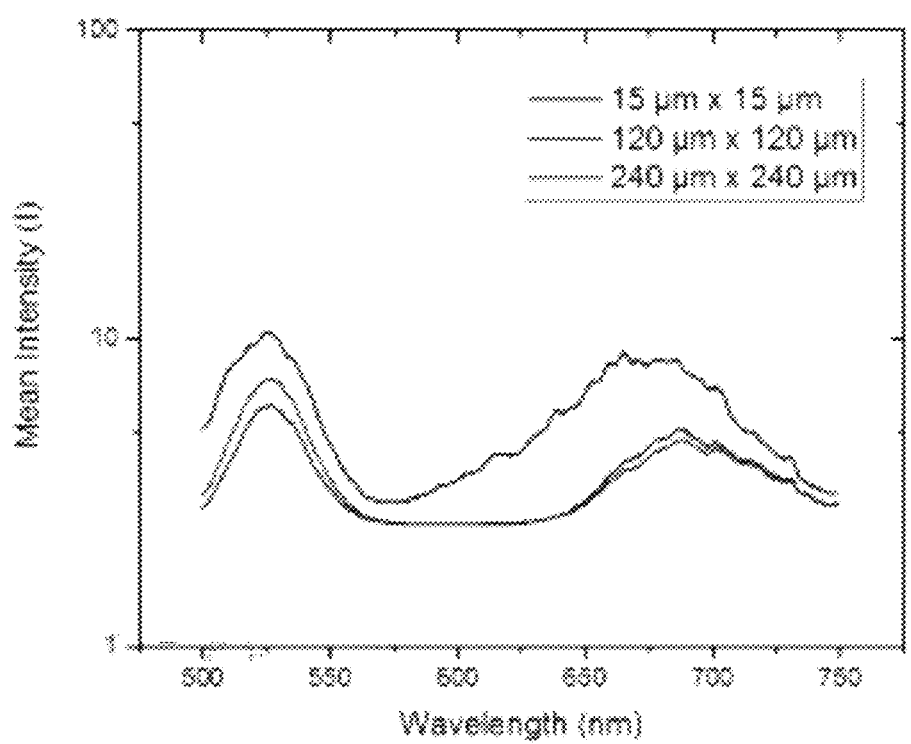

Eight distinct binding sites were programmed within the interior region of octahedron DNA origami through the use of orthogonal, interior ssDNA overhangs. The OB and OR octahedra were each encoded to host a specific cadmium selenide QD, possessing fluorescence emissions of either 525 or 705 nm, thus resulting in two optically distinctive types of DNA material voxels. ssDNA-modified QDs were then annealed into empty, fully assembled material voxel (v=6) lattices designed to either be half-filled by a single QD or fully-filled by two types of QDs at a 1:1 ratio (characterization in FIGS. 19-27). Fluorescence microscopy imaging and spectra measurements were performed on the QD superlattices, demonstrating a 'perfect mixing' of the two fluorescence emissions in superlattices encoded to bind both QDs in equal ratios (FIG. 6A). This 'perfect mixing' refers to the inability to identify an emission signal from a non-equal QD mixture over a wide range of scan areas down to minimal diffraction-limited scales, (FIG. 6B and FIGS. 27A-27J) and thus presents a 3D optical organization with subdiffraction spectral stability. Furthermore, the fluorescence lifetime (τ) of the mixed QD superlattices (FIGS. 24A-24B) was within 15% of superlattices of only one QD for both τ525 and τ705 (FIGS. 20A, 20B, 22A, and 22B), indicating a minimal energy transfer a vast improvement over directly layered, thin-film systems.

Next, the catalytic functionality of 3D biomolecular arrays were demonstrated. While the effects of enzyme colocalization in simple geometries and one-dimensional or 2D scaffolds were shown, this 3D format provides both significantly denser enzyme packing and a different spatial architecture. ssDNA-modified glucose oxidase (GOx) and horseradish peroxide (HRP), were bind, respectively, to a single interior hosting site within each OB and OR octahedra, forming two enzymatic types of material voxels (v=6), which are co-assembled in a lattice as discussed above. The GOx-HRP pair can be used as a model enzymatic cascade and tracked by the synthesis of fluorescent resorufin from the precursor Amplex Red upon glucose addition (reaction overview and sample layout shown in FIG. 6C). Equal amounts of origami and enzyme were utilized in each experimental setup to ensure accurate comparisons of activity.

Figure 6D:
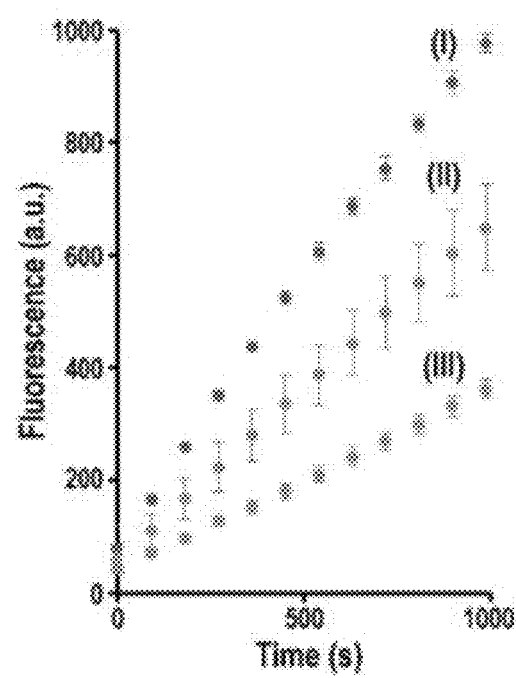
Figure 28:
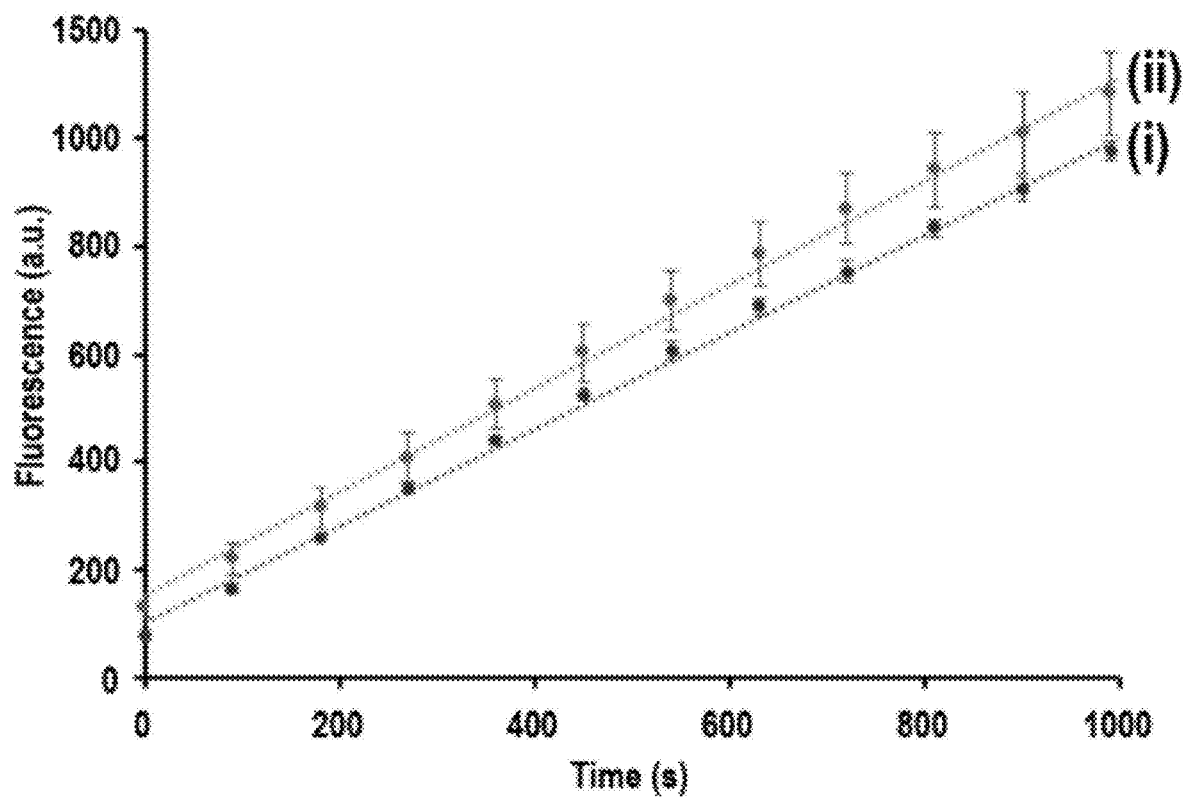
FIG. 28 provides a graph showing the initial reaction of DNA origami lattice containing GOx-HRP pair (Sample I), using (i) 150 mM glucose, and (ii) 300 mM glucose as initial substrate concentrations.
Figure 29D:
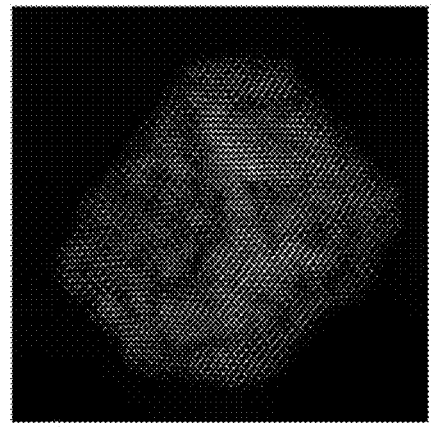
FIGS. 29A-29D provides images showing polycrystalline domains within single isolated self-assembly.
Figure 29A:
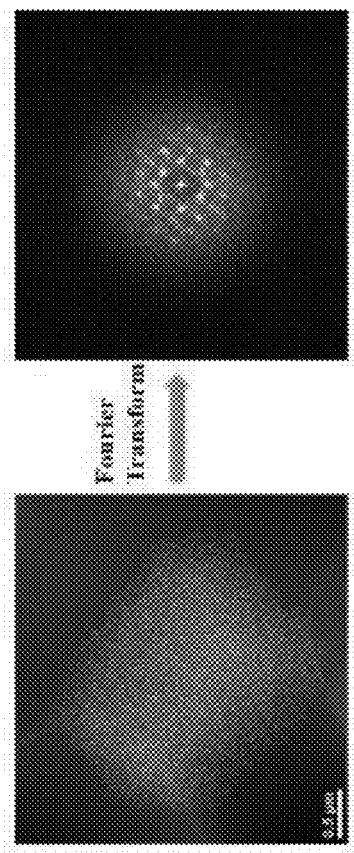
Figure 29B:
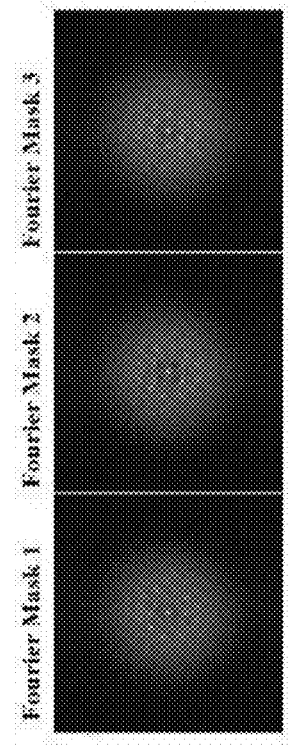
Figure 29C:
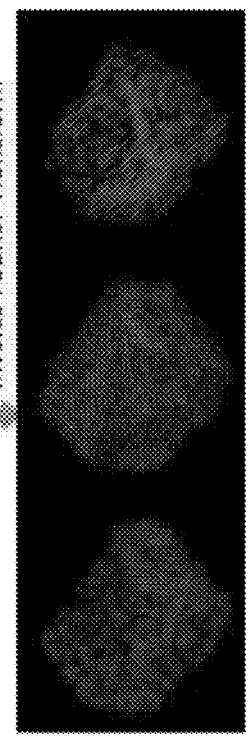

The 3D architecture (I) yields a nearly 300% increase in initial reaction velocities (V) over the solution format containing the same concentration of enzyme encaged in free octahedra (III), as shown in FIG. 6D. The reaction is undertaken at a concentration of glucose above that needed to achieve Vmax, as demonstrated by FIG. 28. In order to determine the role of DNA lattice organization itself versus a high local density of origami and enzymes, an associated origami aggregate was formed. This synthesis involved dissociating a lattice prior to enzyme incorporation by heating to 52° C., holding for 1 h and then immediately placing the tube on ice to induce the formation of an amorphous assembly. This formation procedure stands in contrast to the controlled, five-day anneal.

Sample II in FIG. 6D demonstrates that aggregate assembly induces higher activity than free origami, but not to the extent of an ordered lattice; furthermore, the significantly larger sample variability for amorphous aggregates reflects an intrinsic variability of the disordered states. These results indicate that the lattice architecture contributes to increased activity of the enzymatic cascade, rather than solely to aggregation into higher local concentrations. Multiple contributions can play a role in this higher activity, including high packing density, colocalization of catalytic components and local environment effects of the DNA framework. This work shows an ability to structure enzymes into active high-density 3D arrays using a material voxel strategy and the possibility of manipulating and enhancing cascade reactions using 3D packaging of enzymes.

In summary, the assembly platform was shown for creating 3D lattices from nanomaterials of different natures, both inorganic and bio-organic, as well as stand-alone DNA origami frames. The disclosed methods integrate DNA frames with a prescribed valence and material nano-objects into a material voxel. This allows the definition of a lattice symmetry and a lattice composition through the material voxel design and enables nanomaterials with novel optical and chemical properties. The presented strategy offers a powerful pathway for the rational assembly of 3D ordered nanomaterials from desired nano-objects for a broad range of applications.

Figure 7:
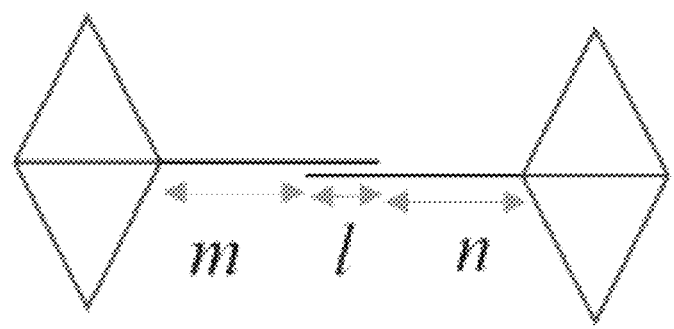
FIG. 7 provides a diagram showing an example structure of octahedral DNA frames including bases of a poly T part from the vertex (m, n) and complementary bases (1).
Figure 8:
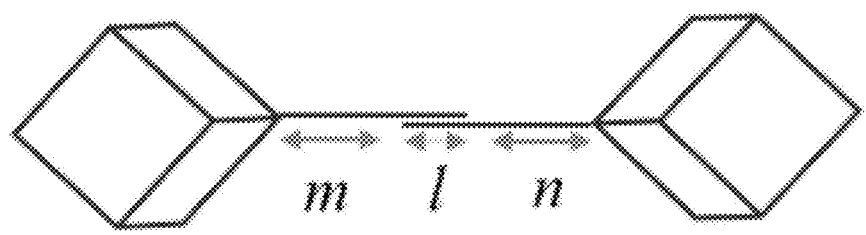
FIG. 8 provides a diagram showing an example structure of cubic DNA frames including bases of a poly T part from the vertex (m, n) and complementary bases (1).

Example 2: Characterization of DNA-Prescribed and Valence-Controlled Material Voxels Fabrication of empty DNA lattice and 'cargo'-inserted DNA lattices: For empty DNA lattices, OB and OR were mixed with a ratio of 1:1 (same method for other shapes). For single 'cargo' inserted DNA lattices, the ratio for OB, OR and 'cargo' complex were mixed with a ratio around 1:1:2 (same method for other shapes). For the system of 6 streptavidins, the ratio was around 1:1:15. The mixed solution was then carefully annealed by cooling from 50° C. to room temperature with a rate of 0.2° C./h to obtain the lattice. FIG. 7 provides a diagram showing an example structure of octahedral DNA frames. m bases is a poly T part from OB vertex, n bases is a poly T part from the OR vertex. Hybridization between these strands occurs with 1 complementary bases. FIG. 8 provides a diagram showing another example structure of cubic DNA frames including bases of a poly T part from the vertex (m, n) and complementary bases (1).

Figure 9:
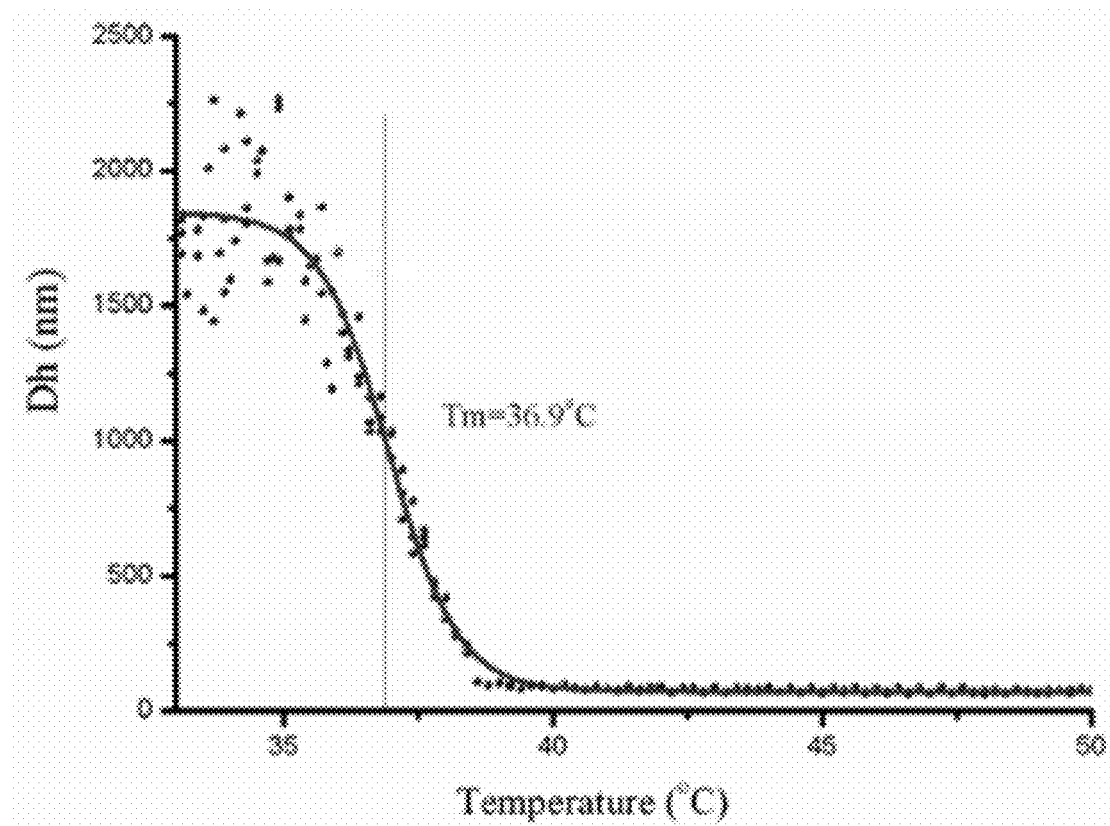
FIG. 9 provides a graph showing melting temperature measured by dynamic light scattering for octahedral DNA lattice.

Melting temperature determination: The melting temperature of the octahedral 3D DNA lattice was obtained by Dynamic Light Scattering (DLS). The mixed sample solution was cooled slowly in the sample chamber from 50° C. to room temperature and measured the in situ size of the assemblies to obtain the dependence of the size of aggregates versus temperature. FIG. 9 provides a graph showing example melting temperature measured by dynamic light scattering for octahedral DNA lattice.

Encaging quantum dots inside DNA lattice for mixed QD lattice: Two complimentary octahedron DNA origami are annealed, following the lattice annealing protocol described previously, without any guest particles. Assembled DNA origami crystals were then mixed with the functionalized QD's and undergo a short (~4 hour) secondary annealing protocol. In detail, the QD's were mixed with lattice at a 3× molar excess, for example (QDA:OB) was (3:1). The secondary annealing protocol included the following procedure: 25° C. for 10 sec, 35° C. for 10 sec, 40° C. for 1 min, 45° C. for 10 min, then a ramp of −5° C./hr was applied to the samples for the next 4 hours, bringing the final temperature to 25° C.

Fluorescence microscopy and measurements: Confocal imaging and micro-PL spectrum measurements were conducted on Leica SP5 TCS laser-scanning confocal imaging/hyperspectral imaging microscope mounted with a 63×, 1.2 NA water immersion objective. A CW argon laser (458 nm) was applied to excite the sandwiched sample, and three photomultiplier (PMT) channels were selected for simultaneous PL imaging of three different colors (500-550 nm, 555-576 nm, and 680-730 nm) accompanied by a transmitted light detector (TLD) for transmission imaging. Hyperspectral imaging was performed using a single PMT channel in the spectrum range of 500-749 nm (bandwidth 5 nm, detection step size 3 nm). The micro-PL spectra were extracted from hyperspectral images in various regions of interest (ROIs). The hyperspectral imaging can be slightly affected by the detection efficiency of the PMT channel due to the large wavelength range, but it is reasonable to compare spectra from various ROIs.

Time-resolved confocal fluorescence-lifetime imaging microscopy (FLIM) measurements were performed on a home-built inverted microscope (Olympus IX81) with raster scanning stage mounted with a 60×, 1.2 NA water immersion objective. The sample solutions (typically 0.8 μL) were sandwiched by hydrophobic coverslips and excited by a pulsed diode-pumped solid-state laser system (LHD-440 PicoQuant, wavelength 440 nm, full width at half maximum 90 ps) operated at 10 MHz repetition rate with an average power of 500 nW. The photoluminescence (PL) was collected in the epi-illumination scheme, spectrally separated from the excitation laser light by a dichroic mirror (Semrock, DiO-495) and spatially filtered by a 100 μm pinhole. Then the PL was split by another dichroic mirror (Semrock, DiO-605). The transmitted and reflected PL were filtered by 690/40 and 525/50 band-pass filters (Semrock), respectively, and imaged onto two single-photon-counting avalanche photodiodes (MPD PicoQuant) coupled to a time-analyzer (PicoHarp 300, PicoQuant). Data acquisition and data analysis were performed with the Symphotime 64 analysis software (PicoQuant).

DNA functionalization of enzymes: Glucose oxidase (GOx) was purchased from Sigma Aldrich. Horseradish peroxidase (HRP) was purchased from Thermo Fisher Scientific. Enzymes were first mixed with Sulfo-EMCS in ratio of 20:1 (Sulfo-EMCS:enzyme) in PBS buffer (pH 7.4) for 1.5 hours at room temperature, and then purified by a Amicon 30 k cutoff filter. Thiolated oligonucleotides (IDT), (i and ii, Table 3) were reduced by TCEP (1000:1) in PBS buffer. The excess TCEP was removed by size exclusion column (G-25, GE Healthcare). Next, sulfo-EMCS-treated enzymes were mixed with activated oligonucleotides with a ratio of 1:5 in PBS buffer and rotated at 4° C. overnight. The DNA-attached enzymes were then purified by Amicon cutoff filter (50 k for GOx, 30 k for HRP). The number of DNA attachment on enzymes was quantified by UV-Vis. Following is the method for calculating DNA attachment on enzyme (GOx):

$$A_{260}(\text{DNA-attached GOx}) = \varepsilon_{260}(\text{DNA})C(\text{DNA}) + \varepsilon_{260}(\text{GOx})C(\text{GOx}) \quad (1)$$

$$A_{452}(\text{DNA-attached GOx}) = \varepsilon_{452}(\text{GOx})C(\text{GOx}) \quad (2)$$

The DNA attachment ratios were calculated to be approximately 1.0 for GOx and 1.8 for HRP.

Encaging enzymes inside DNA lattice—experimental set-ups and methods: DNA-attached enzymes were mixed with octahedral DNA lattice (10 nM), octahedral DNA lattice melted for 1 hour at 52° C. and immediately placed on ice, free octahedra containing enzyme binding sites, and free octahedra with no enzyme binding sites in a ratio of 1:1 in TE buffer (pH 7.5) containing 12.5 mM $MgCl_2$. Due to contribution of TAE buffer from the DNA samples, the final pH was measured to be pH 8.0. The sample was gently shaken at room temperature for 24 hours. Glucose and Amplex Red were added at final concentrations of 150 mM and 200 µM, respectively, with additional $MgCl_2$ to ensure final concentration was maintained at 12.5 mM. 100 µL reactions were measured in a 96-well plate using a Tecan Infite plate reader, with four repeats performed for each sample.

Sample preparation: The carbon-coated grids were glow discharged in a 0.39 mbar air atmosphere for 1 min by using PELCO easiGlow (Ted Pella, Inc.). Before EM grid preparation, the sample was assessed for homogeneity by negative-stain electron microscopy. 3 µl of sample solution was applied to glow-discharged carbon-coated lacey grids, incubated for 2 min at 10° C. and 95% humidity, blotted for 3 s then plunged into liquid ethane using an FEI Vitrobot IV. The grids were loaded into a FEI Talos Arctica electron microscope operated at 200 kV high tension and collected images semi-automatically with EPU under low-dose mode at a magnification of ×92,000 and a pixel size of 1.55 Å. A Falcon III direct electron detector was used under linear mode for image recording with an under-focus range from 1.5 to 3.5 m. The dose rate was 20 electrons per $Å^2$ per second and total exposure time was 2 seconds. The total dose was divided into a 39-frame movie and each frame was exposed for 0.05 s.

Image processing and 3D reconstruction: For octahedral DNA, 2155 raw movie micrographs were collected. For octahedral DNA with one streptavidin in center 1122 raw movie micrographs were collected. For octahedral DNA with six streptavidins in corners, 615 raw movie micrographs were collected. The movie frames were first aligned and superimposed by the program Motioncorr 2.0. Contrast transfer function parameters of each aligned micrograph were calculated using the program CTFFIND4. Subsequent procedures, including particle auto picking, 2D classification, 3D classification, 3D refinement, and density map post-processing were performed using Relion-2.0[3]. Template for automatic picking was firstly generated from a 2D average of about ~1,000 particles from different views. Automatic particle selection was performed for the entire data set. Then the particles obtained from automatic picking were assessed and removed the bad particles. 2D classification of all good particles was performed and particles in unrecognizable classes by visual inspection were removed. Particles in good classes were used for further 3D classification, and the best model was chosen for further 3D refinement. The resolution of the final maps was estimated by the gold-standard Fourier shell correlation, at the correlation cutoff value of 0.143. The crystal structure of streptavidin (PDB code 4YVB) was docked as a single rigid body into the EM density in the Chimera program. Structural figures and movies were prepared in Chimera.

Cryo-samples for imaging under STEM were prepared similar to that described above but blotted for only 0.5s before plunging into the liquid nitrogen-cooled liquid ethane. The samples were then transferred to a cryogenic holder and imaged under a field-emission transmission electron microscope (TEM) (JEOL 2100F). The TEM was operated at 200 keV in the annular dark-field scanning TEM mode (ADF-STEM).

Analysis of polycrystalline domains: To identify polycrystalline domains, three Fourier masks that are related to three different crystalline domains that have different relative crystallographic orientations were used (FIGS. 29A-29D). The Fourier masks were found by windowed Fourier transfer. This process can be automated using independent component analysis/multivariate curve resolution; however, for simplicity, three domains that have distinctive Fourier space patterns were manually extracted. Inverse Fourier transform of the Fourier space masked results illustrates where the crystalline sub-domain is concentrated.

To identify the orientation of the subdomains, windowed FFT was used to find relatively pure phase and indexed the reflections and zone axes. The lattices have been sheared due to cryo sample prep: during sample prep, the water film is finite think and the surface can exert force on the embedded the structures. Using this method, a couple low index orientations was deconvolved. The most inner green set of reflections are the {100} reflections. The corresponding domains are projected along <001> orientations. The reflections in the "second shell" are the {110} reflections. The corresponding domains are projected along <111>. The set of reflections are the {111} reflections. The corresponding domains are projected along <110> orientations.

Small Angle X-ray Scattering (SAXS): The SAXS measurements were conducted at the Coherent Hard X-ray (CHX) and Complex Materials Scattering (CMS) beamlines. The 2D scattering data were collected on area detectors placed downstream of the sample. Information on the beamline setups is found in Table 3.

TABLE 3

The specific characteristics of the CMS and CHX beamlines.

| Beamline | CHX | CMS |
|---|---|---|
| Photon energy (keV) | 9.65 | 13.5 |
| Horizontal × Vertical Beam size (µm × µm) | 10 × 12 | 100 × 100 |

TABLE 3-continued

The specific characteristics of the CMS and CHX beamlines.

| Beamline | CHX | CMS |
|---|---|---|
| Approximate Flux (photons/s) | $10^{11}$ | $10^{11}$ |
| Sample-Detector Distance (m) | 5.00 | 5.038 |
| Detector Manufacturer | Dectris | Dectris |
| Detector Model | Eiger 4M | Pilatus 300k |
| Detector Pixel Size (μm) | 75 | 172 |

Area images were integrated into a one-dimensional (1D) I(q) scattering curve as a function of the scattering vector q, where $$q = 4\frac{\pi}{\lambda}\sin\left(\frac{\theta}{2}\right)$$

with λ and θ being the wavelength of the incident X-rays and the full scattering angle, respectively. The resultant 1D curves spanned roughly 0.04 nm$^{-1}$ to 1 nm$^{-1}$ with a resolution of 0.002 nm$^{-1}$. The structure factor S(q) was obtained by dividing I(q) by the corresponding particle form factor P(q).

In this work, modeling of the presented analysis was implemented using the ScatterSim software package, a python package that implements a scattering formalism for superlattices. This formalism can generically model the scattering from arbitrary anisotropic nano-objects within the unit cell of a regular superlattice. This library was extended to perform the modeling described below.

SAXS theory: The scattered intensity I(q) of any object in solution versus q is related to the Fourier transform of the arrangement of its electrons:

$$I(q) = C|F(q)|^2 \quad (3)$$

$$F(\vec{q}) = \int_V \rho' e^{i\vec{q}\cdot\vec{r}} d\vec{r} \quad (4)$$

where an overall scale factor dependent upon parameters specific to the experimental setup, such as solid angle (pixel size/detector distance), integration time, illuminated volume and beam flux is considered by the constant C. Here, ρ' refers to an effective electron density which is described later. Typically, this sum is broken up over its constituents, (objects). Nano-objects as solids with uniform density were modeled. The samples considered here are gold, CdSe, and protein spheres, as well as DNA duplex bundles which was modeled as cylinders. For some small volume that is representative of the density of the larger scale element (homogeneous), the effective electron density is defined as:

$$\rho' = \frac{1}{V}\sum_{k \, atoms}(f_k - |f_k'|). \quad (5)$$

At low angles, $f_k$ is equal to the number of electrons per atom and $f_k'$ is an energy dependent correction term arising from quantum mechanical effects of the binding energy the electrons bound to their atoms. the $\vec{q}$ dependence in $f_k$ was neglected, since this is pronounced only at atomistic length scales (wide-angle scattering), and not relevant to the nanoscale measurements (small-angle scattering) considered here.

These effective electron densities result in an overall scale factor for the scattered field of each object.

For the accuracies needed here, one can neglect dispersion effects and assume that the sample density is roughly the same as the mass density for simple elements of the periodic table (an average of 1 electron every 2 AMU). In this case, the electron density can be substituted with the mass density. This results in an overall scale factor for equation (2), which is a degree of freedom for the fits presented here. The latter are easier to determine. From here on, ρ' will refer to the sample density and not the electron density.

Scattering with a solvent: When a solvent is present in the sample, it has the effect of reducing the electron density contrast. The scattering of a sample and solvent can be rewritten as:

$$F(\vec{q}) = \int_{V_{sam}}\rho_{sam}'e^{i\vec{q}\cdot\vec{r}}d\vec{r} + \int_{V_{sol}}\rho_{sol}'e^{i\vec{q}\cdot\vec{r}}d\vec{r} \quad (6)$$

where $V_{sam}$ and $V_{sol}$ are the volume over the sample and solvent, respectively. Since the scattering of a uniform sample is zero except at q=0, the solvent integral to integrate over the full scattering volume $V_{total}$ was written:

$$F(\vec{q},q\neq 0) = \int_{V_{sol}}\rho_{sol}'e^{i\vec{q}\cdot\vec{r}}d\vec{r} = \int_{V_{total}}\rho_{sol}'e^{i\vec{q}\cdot\vec{r}}d\vec{r} - \int_{V_{sam}}\rho_{sol}'e^{i\vec{q}\cdot\vec{r}}d\vec{r} = -\int_{V_{sam}}\rho_{sol}'e^{i\vec{q}\cdot\vec{r}}d\vec{r} \quad (7)$$

and the sum of the scattering of sample and solution is then the difference of effective electron densities:

$$F(\vec{q}) = \int_{V_{sam}}(\rho_{sam}' - \rho_{sol}')e^{i\vec{q}\cdot\vec{r}}d\vec{r} \quad (8)$$

The effect of the solvent is to screen the scattering of the sample, by reducing the density contrast. Thus, the scattering strength of samples of varying electron densities in solution depends not on their absolute electron density, but effective electron density difference. For cases of one type of object of the same effective electron density in solution, this is simply an overall scale factor and will be ignored. For cases of multiple types of objects with different electron densities each, this can be taken into account.

Form factor of a sphere: The form factor of a sphere is well known and is:

$$F_{sphere}(\vec{q}; R, \rho') = \frac{4\pi}{3}r^3\rho'\frac{\sin(qR) - qR\cos(qR)}{(qR)^3} \quad (9)$$

Form Factor of a cylinder: The cylinder form factor for a cylinder of height h and radius r is defined as:

$$F_{cyl}(q) = 2\mathrm{sinc}(q_z h\pi/2)\frac{J_1(q_r r)}{q_r r} \quad (10)$$

$$q_r = \sqrt{q_x^2 + q_y^2} \quad (11)$$

where $J_i$ is the first order of the Bessel function of the first kind.

Form factor of composite objects: More complex non-overlapping objects can be modeled adding objects whose form factor is known, shifted by some $\Delta \vec{r}$ and rotated by rotation matrix R. Importantly, this can be done at the level of the scattering amplitudes (and not the intensity) so that interference between sub-components is correctly captured.

From (2), it is easily seen that a rotation and shift of an object amounts to a rotation and phase shift in its form factor amplitude:

$$F(\vec{q}, R, \Delta \vec{r}) = F(\vec{q} \cdot R^T) e^{i\vec{q} \cdot \Delta \vec{r}}. \quad (12)$$

Thus addition of objects to form composite object consists of the following sum:

$$F_{composite}(q) = \Sigma_{j \in objects} F_j(r_j \vec{q} \cdot R_j^T) e^{i\vec{q} \cdot \Delta \vec{r}_j} \quad (13)$$

where $\vec{r}_j$ and $R_j$ are the shift and rotation transformation of each object, respectively. This is taken into account by the ScatterSim library.

Polydispersity: Finally, object polydispersity can be introduced. Since any sample contains a probability distribution in its parameters, the form factor can be averaged over these parameters. The probability distribution chosen here is the Gaussian probability distribution. The form factor moments, dependent on some parameter $\epsilon$ with average value $\bar{\epsilon}$ and standard deviation $\sigma_\epsilon$:

$$\langle F(q) \rangle_\epsilon = \int P(\epsilon; \bar{\epsilon}, \sigma_\epsilon) F(q, \epsilon) dh \quad (14)$$

and $$\langle |F(q)|^2 \rangle_\epsilon = \int P(h) |F(q,h)|^2 dh \quad (15)$$

where $$P(\epsilon; \bar{\epsilon}, \sigma_\epsilon) = e^{\frac{-(\epsilon - \bar{\epsilon})^2}{2\sigma_\epsilon^2}} \quad (16)$$

is the Gaussian distribution. Note that this operation can be performed multiple times over multiple parameters $\epsilon_j$ (for example, cylinder radius, and orientation) so long as they are uncorrelated. In the ScatterSim library, this is computed by numerically integrating over a list of objects, or randomly creating objects whose parameters are sampled from their respective probability distributions and averaging their resultant form factor amplitudes $F(q)$ or form factor intensities $|F(q)|^2$. For notational brevity, the symbol E can signify an average over one or many of these uncorrelated parameters.

Form factor intensity: a collection of objects freely floating in solution will then yield an intensity:

$$I(q) \propto P(q) = \langle |F(q)|^2 \rangle_\epsilon \quad (17)$$

where $P(q)$ is known as the isotropic form factor intensity.

The scattered intensity was calculated by the ScatterSim library. The scattered intensity of a periodic lattice is modeled by:

$$I(q) = c Z_0(q) G(q) + P(q)(1 - \beta(q) G(q)) \quad (18)$$

where c is an overall scale factors, $P(q)$ is the form factor intensity of the composite object comprised of all objects in the lattice (assuming their relative positional order and orientation preserved), and $$Z_0(q) = \quad (19)$$

$$\frac{1}{q^2} \sum_{\{hkl\}}^{m_{hkl}} \left| \sum_{j=1}^{N} \langle F_j(\overrightarrow{q_{hkl}}) \rangle_\epsilon \exp[2\pi i(x_j h + y_j k + z_j l)] \right|^2 L(q - q_{hkl})$$

is known as the lattice factor, where $L(q - q_{hkl})$ is a peak shape function. The structure and symmetry of the lattice is taken into account by properly sampling over their corresponding Miller indices $q_{hkl}$. $G(q)$ is the Debye-Waller factor arising from thermal vibrations in the lattice, defined as:

$$G(q) = e^{-q^2 \sigma_{D,rms}^2}, \quad (20)$$

where a denotes the lattice size and $\sigma_{D,rms}$ the rms displacement of the elements in the lattice. For a simple cubic lattice of length a, it is convenient to re-write this as fractional displacement of the lattice length $$\sigma_{DW} = \frac{a}{\sigma_{D,rms}}.$$

Finally, $\beta(q)$ is defined as:

$$\beta(q) = \frac{|\langle F(q) \rangle_\epsilon|^2}{\langle |F(q)|^2 \rangle_\epsilon} \quad (21)$$

and arises from any polydispersity in parameters E. The effect of $G(q)$ for increasing thermal vibrations (or static positional disorder) is to reduce the ordered scattering from $Z_0(q)$ and increase the diffuse scattering from unordered elements. The effect of $\beta(q)$ is the same except that the decreasing trend is not an exponential decay, but rather a more complex trend that depends on the length scales of the parameters $\epsilon$. In the cases involved here, $\beta(q)$ is not considered.

Structure factor: The structure factor is defined as the ratio of the scattered intensity $I(q)$ from the lattice to the form factor of the underlying sub-element, as if it was dispersed in solution. Since for the most part the latter is not easily obtained, it is estimated as described in further sections. Both the structure factor for the respective data and calculated models are then normalized by this factor.

SAXS modeling results: The data was modeled using the ScatterSim library using the theory described above. This model has been validated, and successfully used to determine the structures of superlattices. This model accounts for the lattice symmetry and unit cell size, particle shape and various types of disorder such as vibrations, finite grain size and polydispersity. The unit cell size and shape define the peak positions, and the particle shape and disorder strongly affect the relative peak heights. For some of the systems modeled here, the particle shape is especially important as the particle anisotropy modulates the peak heights in a non-intuitive fashion. The ScatterSim library was extended[6] to allow an easier method to compound more complex nano objects that will be presented here.

Figure 30:
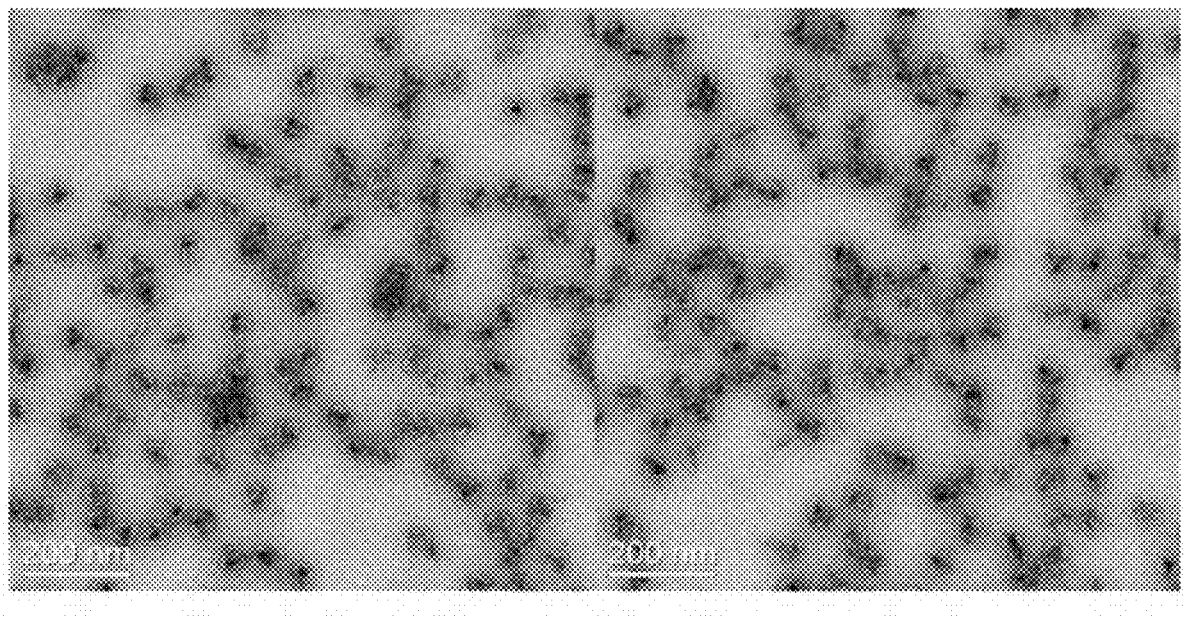
FIG. 30 provides a negative stained TEM image of octahedral DNA origami structures.
Figure 31:
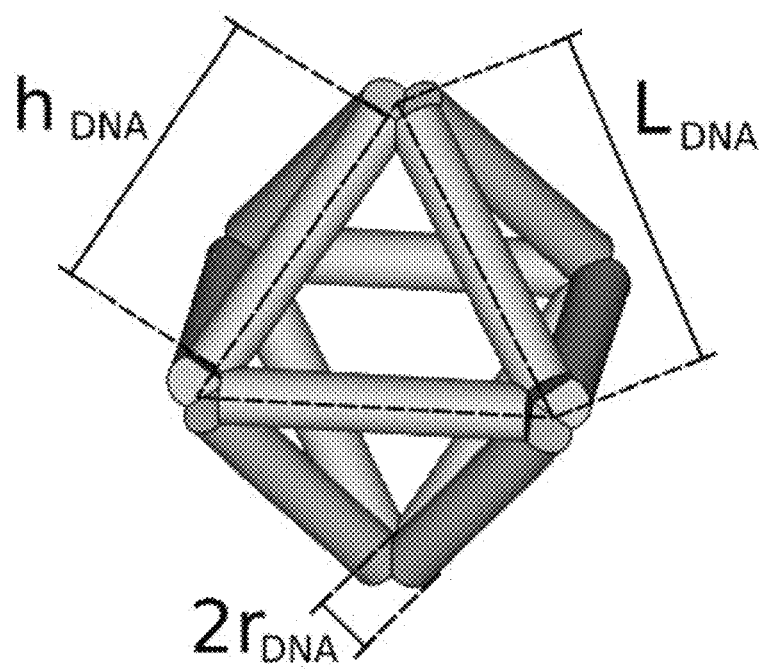
FIG. 31 provides a diagram of the DNA octahedron model.

Scattering of an octahedron: The DNA octahedron is the central scaffold used in the nano-engineered superlattices presented here. It is comprised of 12 bundles of 6 cylinders formed into an octahedron shape (FIG. 30). It was modeled by 12 cylinders representing each edge defined by the cylinder radius $r_{DNA}$, cylinder height $h_{DNA}$ and DNA octahedron edge length $L_{DNA}$ (FIG. 31). It was found that modeling a 6-cylinder bundle with 1 larger cylinder was sufficient, with no appreciable difference in computed models as compared to modeling each DNA duplex within the bundle as a distinct cylinder. This simplification was chosen to reduce computation times.

Figure 32:
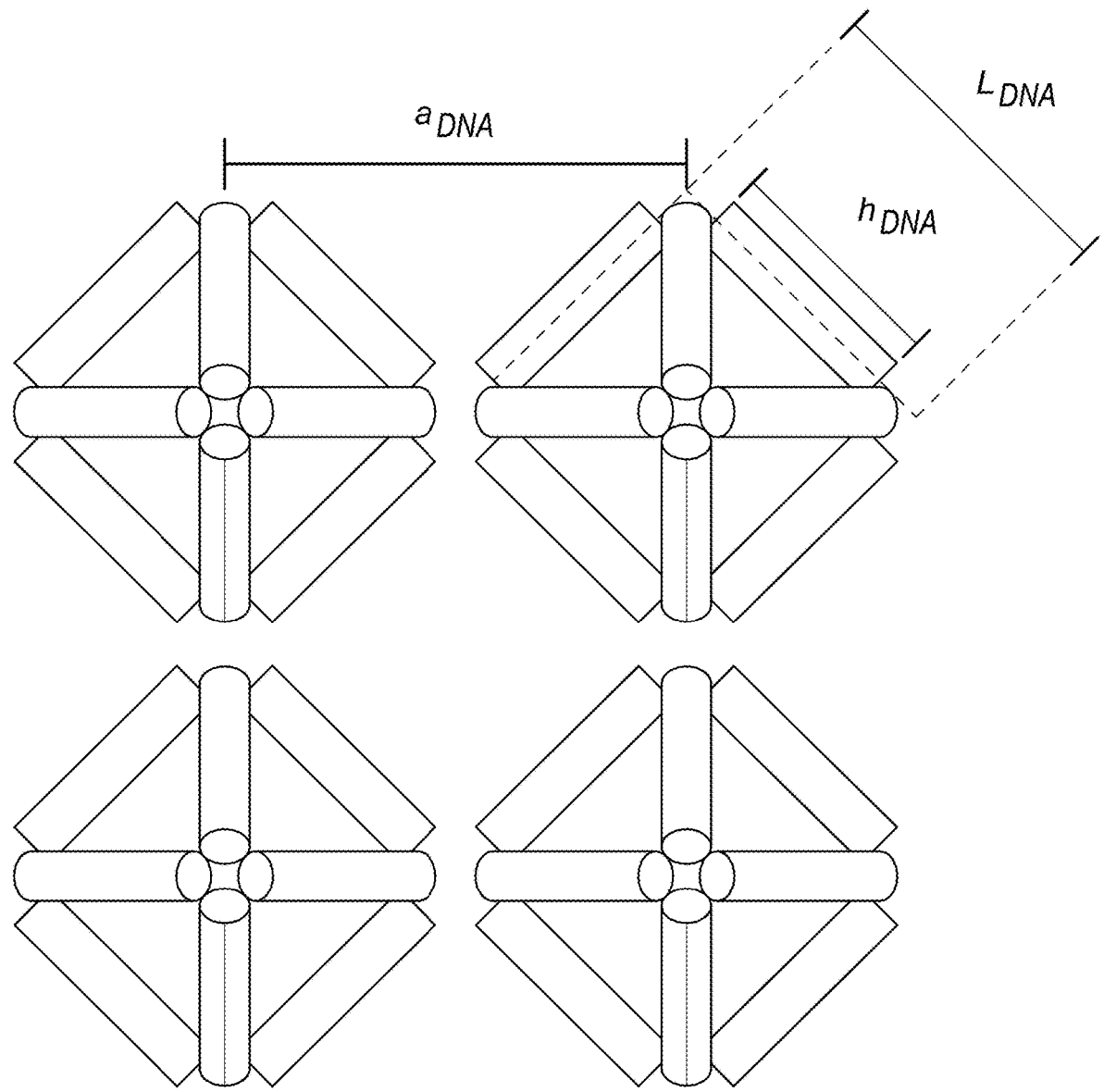
FIG. 32 provides a diagram showing the DNA octahedra arranged in a simple cubic lattice.

The DNA octahedron model: First, a superlattice of DNA octahedra was measured, assembled in a cubic lattice of lattice spacing $a_{DNA}$ (FIG. 32). The scattering contrast of DNA is approximately an order-of-magnitude weaker than gold and so the scattering is 100 times weaker. To put this in perspective, in order to obtain a measurable scattering signal at the CMS beamline, integration times of 100 s were necessary, as compared to only seconds being required for the superlattices containing gold nanoparticles. Both a suspension of freely floating un-aggregated DNA octahedra, and DNA octahedra assembled into a superlattice were measured to obtain P(q) and I(q), respectively. Due to the background scattering dominating the sample in the free-floating DNA octahedra case, a control measurement of the buffer solution without the sample was also measured, and subtracted from it. The results can be seen in FIG. 33. One can see that roughly the shape of the form factor P(q) aligns with the superlattice scattering I(q). This suggests that the DNA freely floating in solution retain the same shape as those bound in the superlattice.

The model for the DNA octahedra: As mentioned previously, the ScatterSim model was modified to allow for the computation of the scattering of more complex nano objects. The octahedron was made by combining cylinders together, as mentioned above (FIG. 32). The cylinder is assumed to be centered on each edge, so that the length of the ends of the cylinders to the vertices of the octahedron are all equal (FIG. 31). Ignoring a constant scale factor in absolute intensity, the DNA octahedron is then defined solely by four free parameters: the height of each cylinder $h_{DNA}$, their radius $r_{DNA}$ and the edge length of the DNA octahedron $L_{DNA}$ they combine into (FIG. 31). The parameters used for these models involving DNA octahedra were $r_{DNA}$=3.0 nm, $h_{DNA}$=31.6 nm and $L_{DNA}$=39.0 nm, with the best fit shown in FIG. 33. Polydispersity was then added by varying the DNA octahedron edge length $L_{DNA}$ by $\sigma_{L_{DNA}}$20% $L_{DNA}$ leading to the green curve in FIG. 33. Finally, the model is rescaled by a constant to account for the overall scale factor.

When combined in a superlattice, the DNA octahedra align in a cubic structure. The only defining parameter for such a lattice is the length of one of the basis vectors, $a_{DNA}$. The peak widths from the crystalline peak are modeled by Lorentzian curves, defined by their full width half maximum (FWHM), $\sigma_P$. Finally, disorder from positional disorder (and/or dynamic motion of objects) extinguishes higher-order peaks through the Debye-Waller factor $\sigma_{DW}$. Ignoring scaling factors, the scattering of the superlattice is thus defined by the free parameters: $h_{DNA}$, $r_{DNA}$ and $L_{DNA}$ for the octahedra, as well as $a_{DNA}$, $\sigma_P$ and $\sigma_{DW}$ for the lattice.

Figure 33:
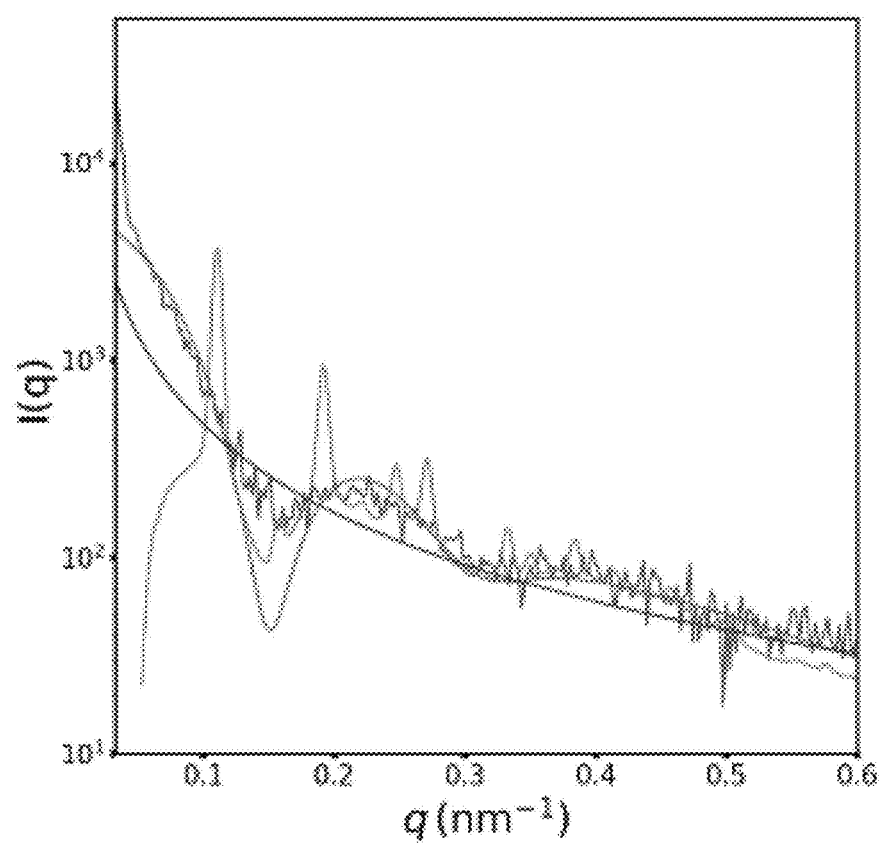
FIG. 33 provides a graph showing the measured scattering intensity of a suspension of un-aggregated free DNA octahedra, and objects assembled into a superlattice.

The structure factor S(q) and its model are found in the and FIG. 30. The structure factor here is taken by normalizing the data or simulated intensity by estimated form factor for freely dispersed octahedra. As this form factor is not measured confidently, it is estimated by an empirically determined power law fit of $q^{1.5}$ (FIG. 33).

Figure 34:
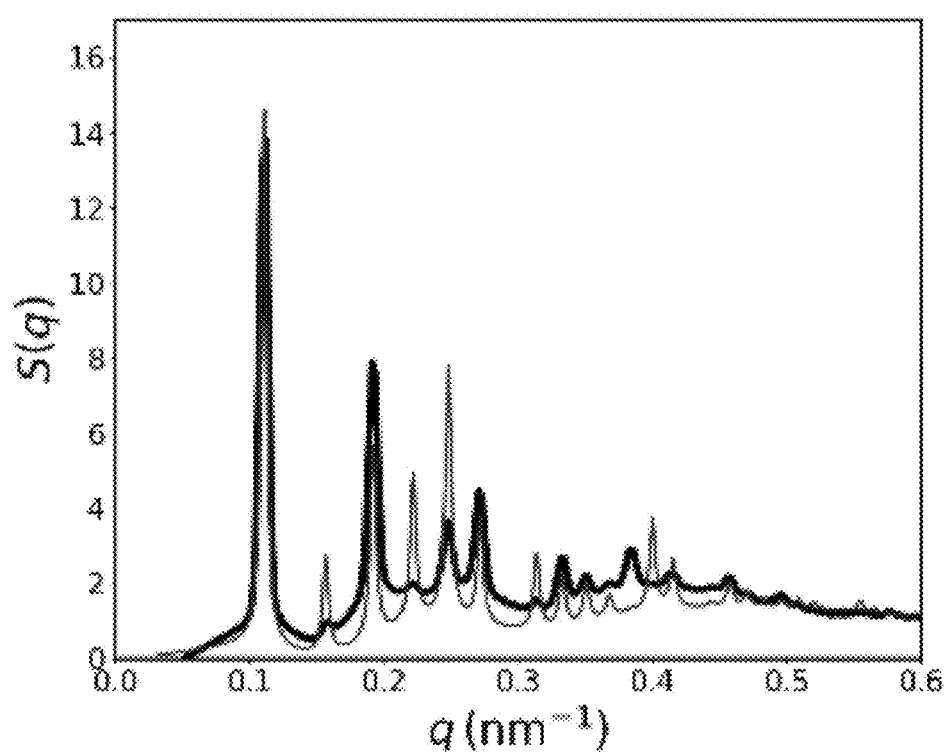
FIG. 34 provides a plot of the structure factor S(q) for experimental data and model for a cubic superlattice of DNA octahedra.
Figure 35:
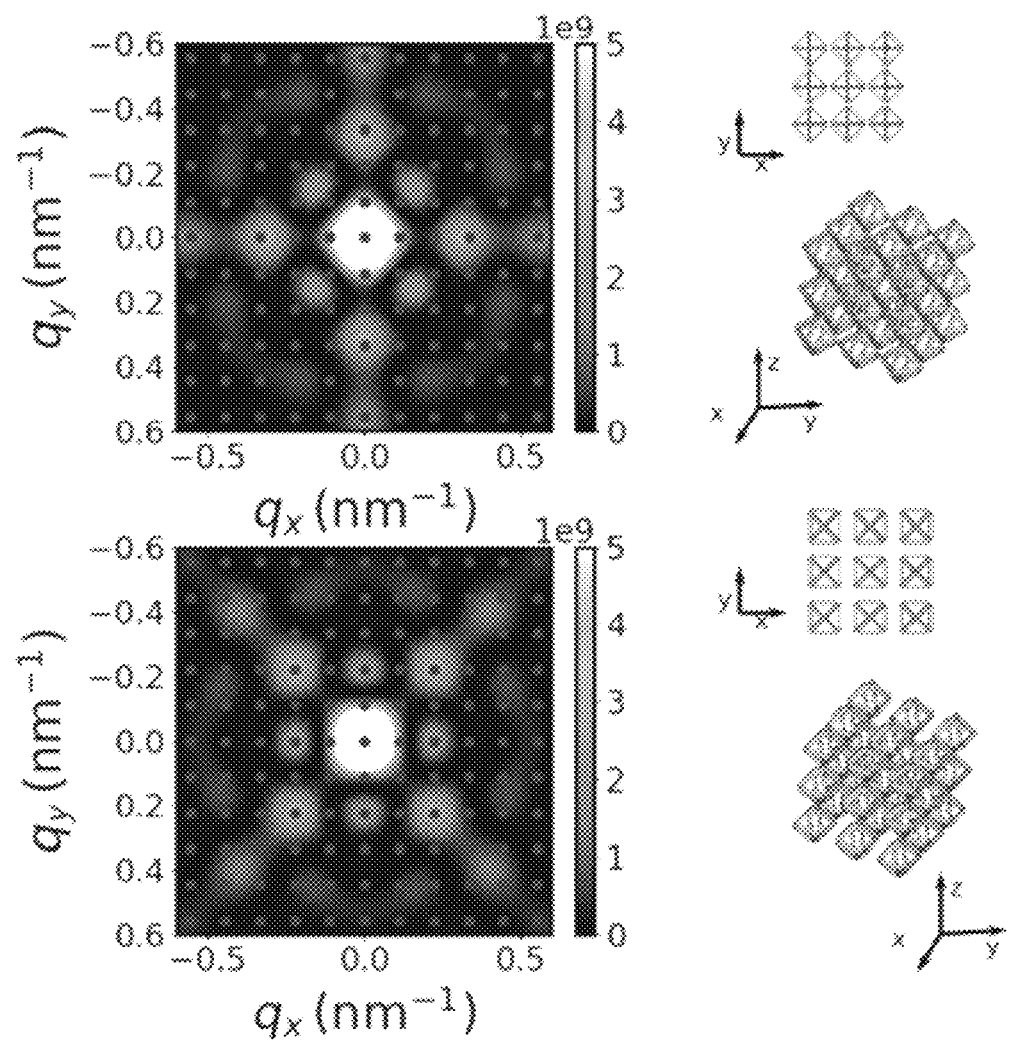
FIG. 35 provides diagrams showing the projected scattering of the DNA octahedra versus the DNA octahedra.

A range of possible models was assessed; the experimental data can only be explained using the proposed DNA octahedron model. FIG. 34 shows the structure factor of a model where the octahedra are rotated 45 degrees around one of the unit cell basis vectors. The same estimated form factor for freely dispersed DNA octahedra. There is a strong disagreement between the data and this model, demonstrating that octahedron orientation is important. The strong disagreement from a change in orientation can be understood by viewing a 2D cross section of the modeled scattered intensity in of the DNA octahedra in both cases (FIG. 35). When the DNA octahedra are assembled in a simple cubic lattice, this form factor is modulated by sharp peaks denoted by the dots in the figure. Changing the DNA octahedra orientation changes the modulation of the peaks and thus the modulation of the peaks in the resultant 1D curve.

Figure 36:
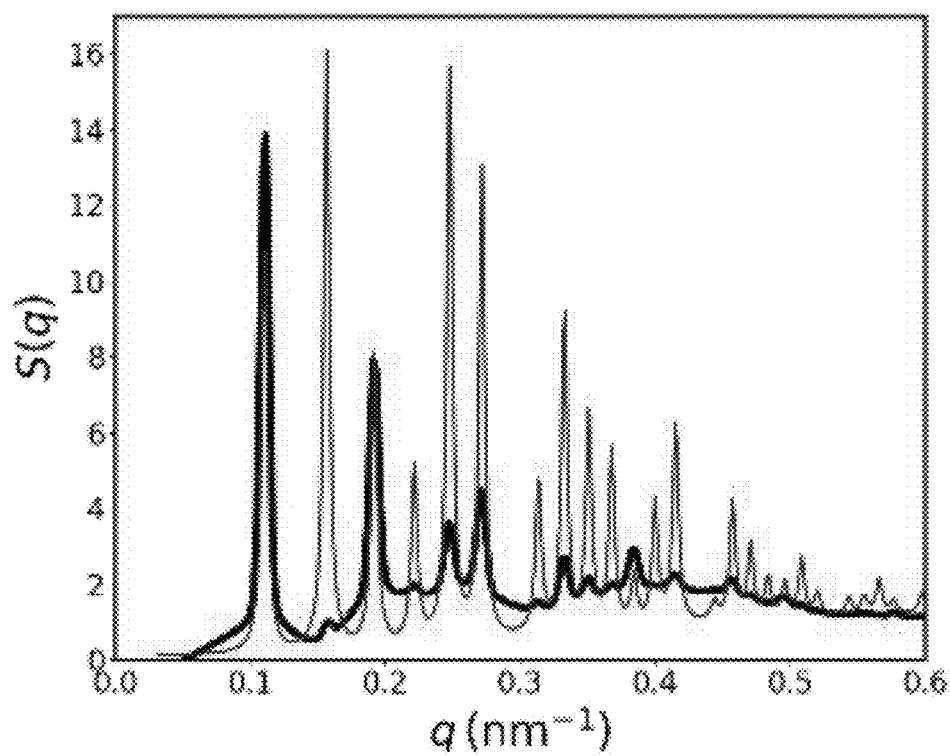
FIG. 36 provides a plot of the structure factor S(q) for experimental data and modeled result, compared with the simulated structure factor of the same DNA octahedra.

Finally, the shape of the octahedron is also crucial. This is demonstrated by comparing the measured structure factor to a case where the cylinders in the DNA octahedra (FIG. 31) are replaced by spheres of radius 3 nm. There is clear disagreement with the experimental data (FIG. 36). In this case, the same estimated form factor for freely dispersed DNA octahedra is used for ease of comparison. Other models including large spheres, spherical shells, filled octahedra, and hollow octahedra likewise did not yield agreement.

Figure 37:
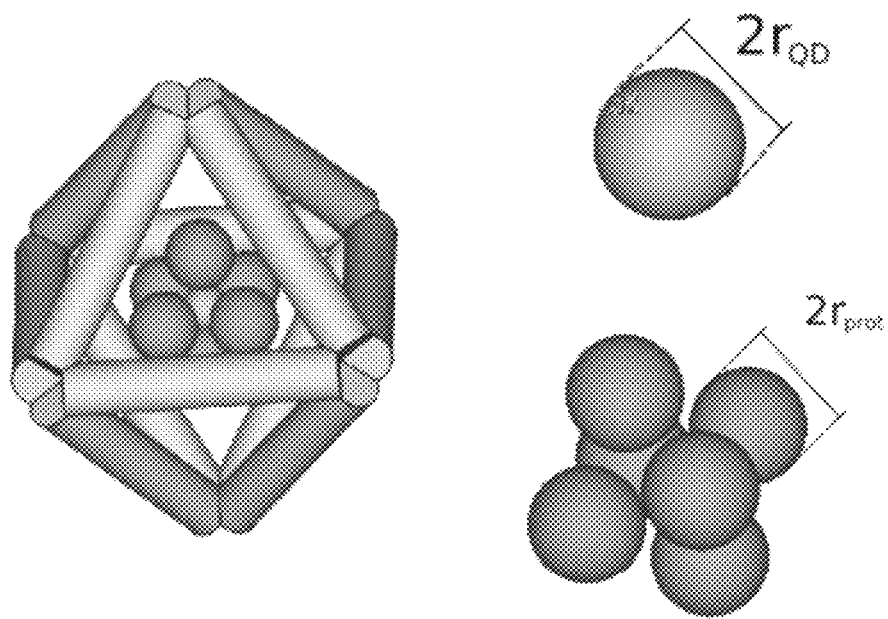
FIG. 37 provides a diagram showing a model representation of the DNA octahedra with the quantum dots and 6 streptavidin used for SAXS modeling.

DNA octahedra with quantum dots: A sample of DNA octahedra with quantum dots (QDs) in a superlattice was measured using SAXS. The same model of DNA octahedra was used as the previous section. A quantum dot was then added to the model, of radius $r_{QD}$=2.5 nm and surrounded by proteins of radius $r_{prot}$=2.5 nm (FIG. 37). The density of the quantum dot is approximately 5.8 g/cm$^3$ [11]. The streptavidin protein is assumed to have roughly the same density as DNA, near 1.7 g/cm$^3$ [12]. All samples were modeled as immersed in water of density 1 g/cm$^3$. Three models were computed: 1. DNA octahedra only, 2. QD and proteins only, 3. DNA octahedra with the QD and 6 proteins. The computed model structure factors are compared with the data and shown in FIG. 37. For the structure factors presented in FIG. 3 of the main text, the same power law as mentioned in section 3m was used for the model of freely dispersed DNA octahedra and its variants. Models 1 and 2 are the extreme cases, when either the scattering from the octahedra or the quantum dots dominate the scattering, respectively. It is found that neither of these scenarios can fit the data. However, when combining the two together, and adjusting the sizes of the protein and QD such that their scattering is comparable to the DNA octahedra, one obtains relatively good agreement between the modeled curve and the measured data. Since small changes in particle size or density changes the overall scattered intensity of the samples in question, an accurate measurement of the density is unnecessary in this case. Since the densities and particle sizes are all approximate, the conclusion of this result is not to confirm the particle sizes themselves, but that the presence both the DNA octahedra and QD with protein objects are necessary for the model to agree with the data.

Figure 38:
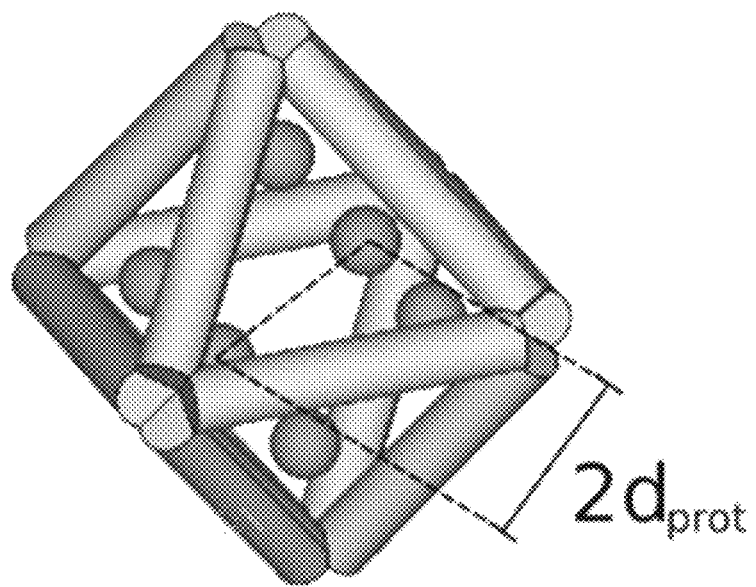
FIG. 38 provides a diagram showing an octahedron model with 6 proteins (streptavidin) encaged in shown position, used for SAXS modeling.
Figure 39:
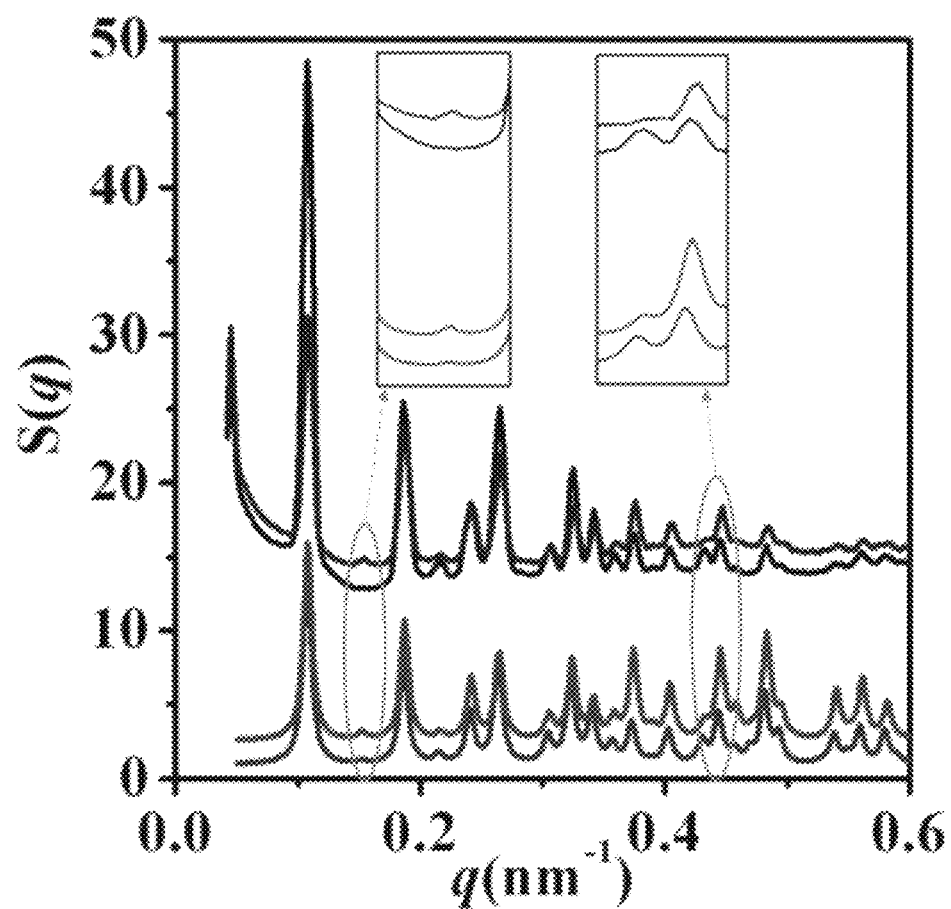
FIG. 39 provides a graph showing structure factors S(q) of an enlarged image of SAXS data for octahedral DNA lattice with and without 6 streptavidin inside the octahedral cages.

Adding proteins: the results for DNA octahedra containing 6 internally-coordinated proteins, located near the vertices, at $d_{prot}$=14.3 nm from the center of the octahedron are shown (FIG. 38). For the structure factors presented in FIG. 4, the same power law as mentioned in section 3m was used for the model of the freely dispersed DNA octahedra and its variants. The difference in the scattering curves is extremely subtle, owing to the small overall change in electron density that the introduction of the proteins engenders. Nevertheless, the computed model curve suggests differences in the scattering curves at the same q-values, supporting the hypothesis that the observed differences are a direct result of the protein inclusion. (FIG. 39). In the model, the mass of the protein was fixed to be roughly equal to the mass of one cylinder of DNA. The density was assumed to be the same as that of the DNA octahedra, and the radius was set to be 2.5 nm. At this radius, the form factor contribution of the protein is relatively flat, and variations in radii do not affect the results of the model. Since the density is rescaled such that the total mass of the protein remains the same, any variation in this parameter does not lead to an appreciable change.

Figure 40:
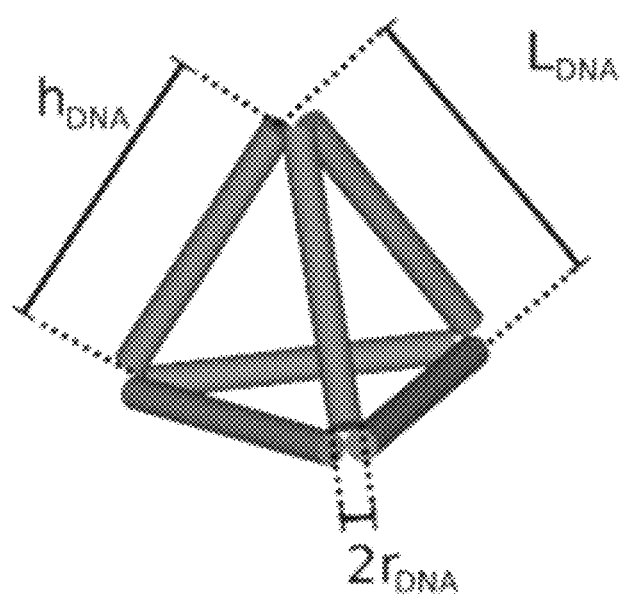
FIG. 40 provides a diagram of an example model of one tetrahedron.
Figure 41:
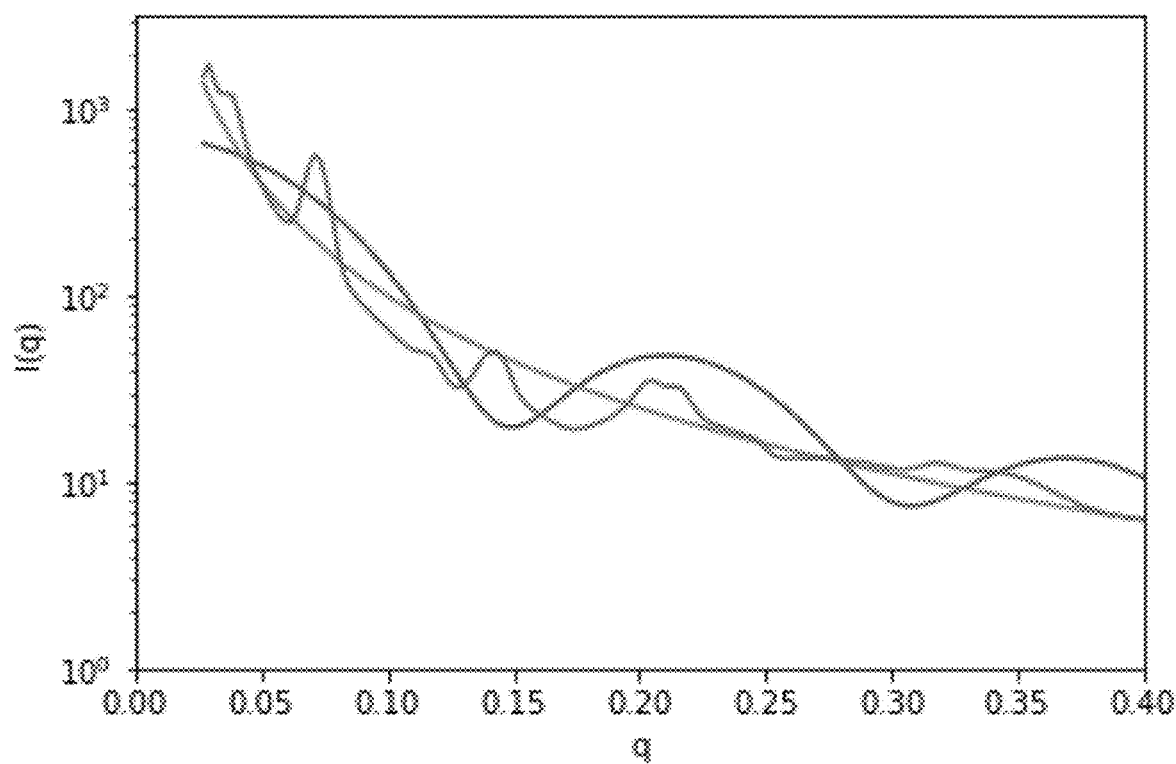
FIG. 41 provides a plot of the computed form factor for DNA tetrahedra, $q^2$ power law, and the scattering data obtained from a lattice of tetrahedra.

Model for DNA tetrahedron: A sample constructed of DNA tetrahedra was also measured using SAXS. The DNA tetrahedra model is shown in FIG. 40, and described using: $r_{DNA}$, $h_{DNA}$ and $L_{DNA}$. The scattering of free tetrahedra was experimentally unmeasurably weak. However, when combined into a superlattice, the DNA tetrahedra give rise to distinct structural peaks (FIG. 41). Since it is measured directly, the form factor for the tetrahedra is estimated empirically using a $q^2$ power law, as can be seen in FIG. 41. This estimates the overall trend of the expected form factor (the theoretical model for the form factor is shown in FIG. 41).

Figure 42:
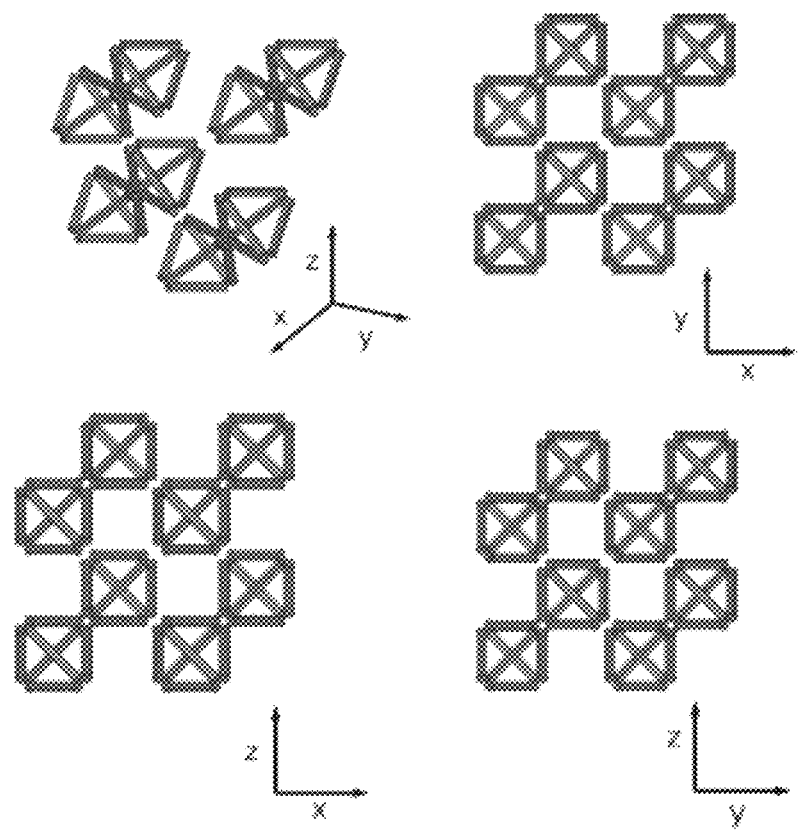
FIG. 42 provides a model for the cubic superlattice of DNA tetrahedra.
Figure 43:
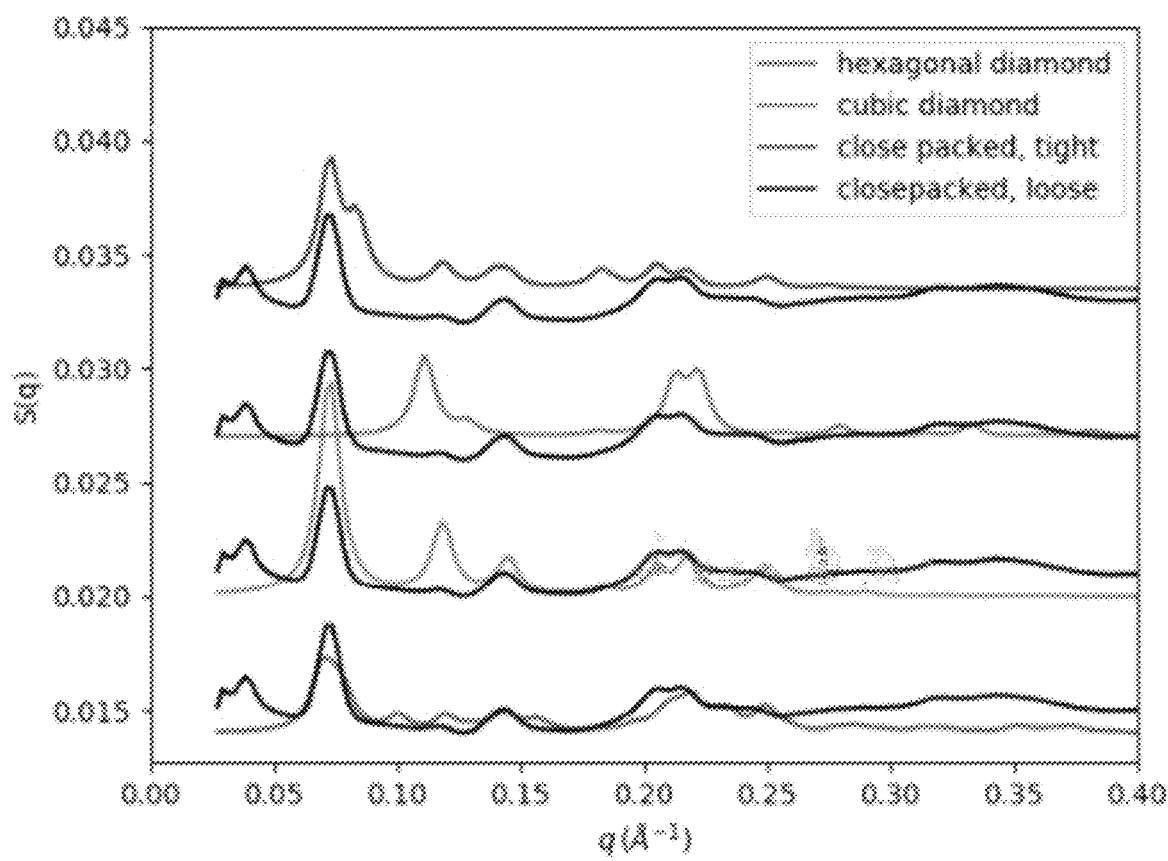
FIG. 43 provides a plot of the structure factor of the scattering obtained from DNA tetrahedra combined into a lattice compared with different models.
Figure 44:
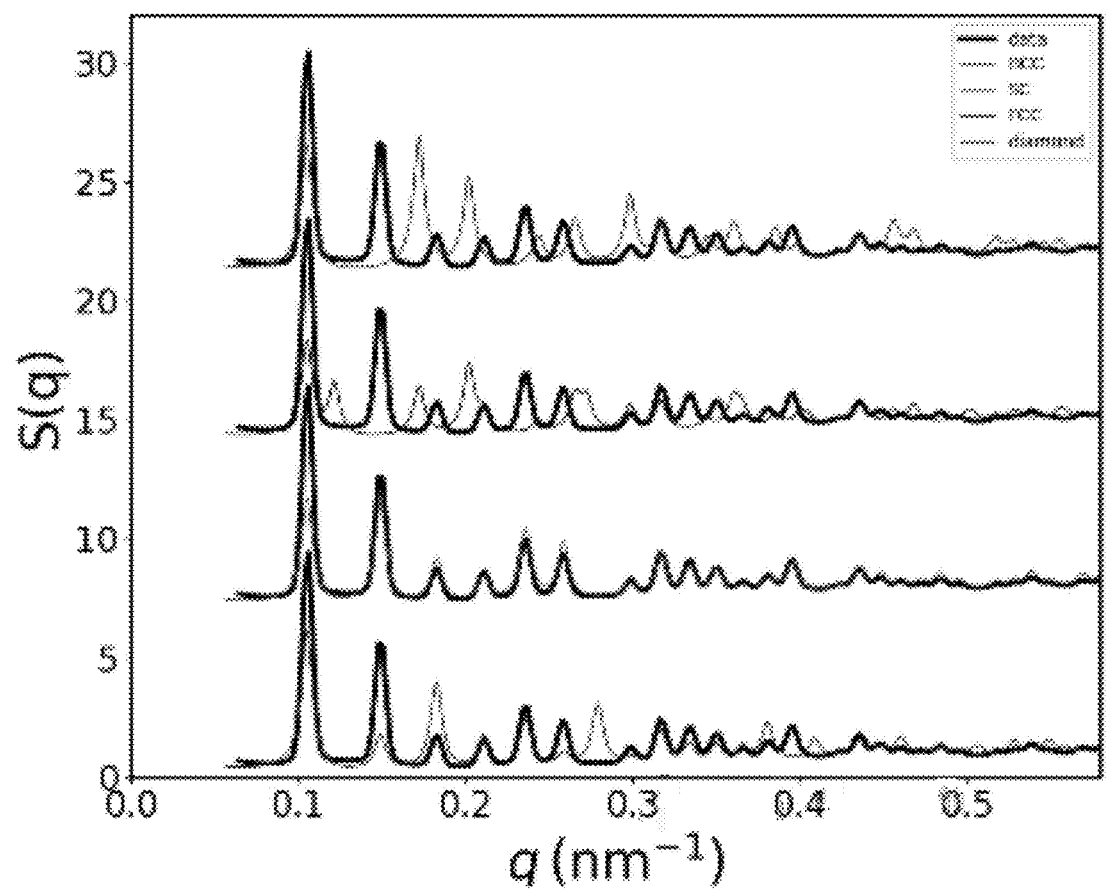
FIG. 44 provides a plot of the data and fits of gold spheres assembled in an SC lattice by octahedral system caged with nanoparticles.
Figure 45:
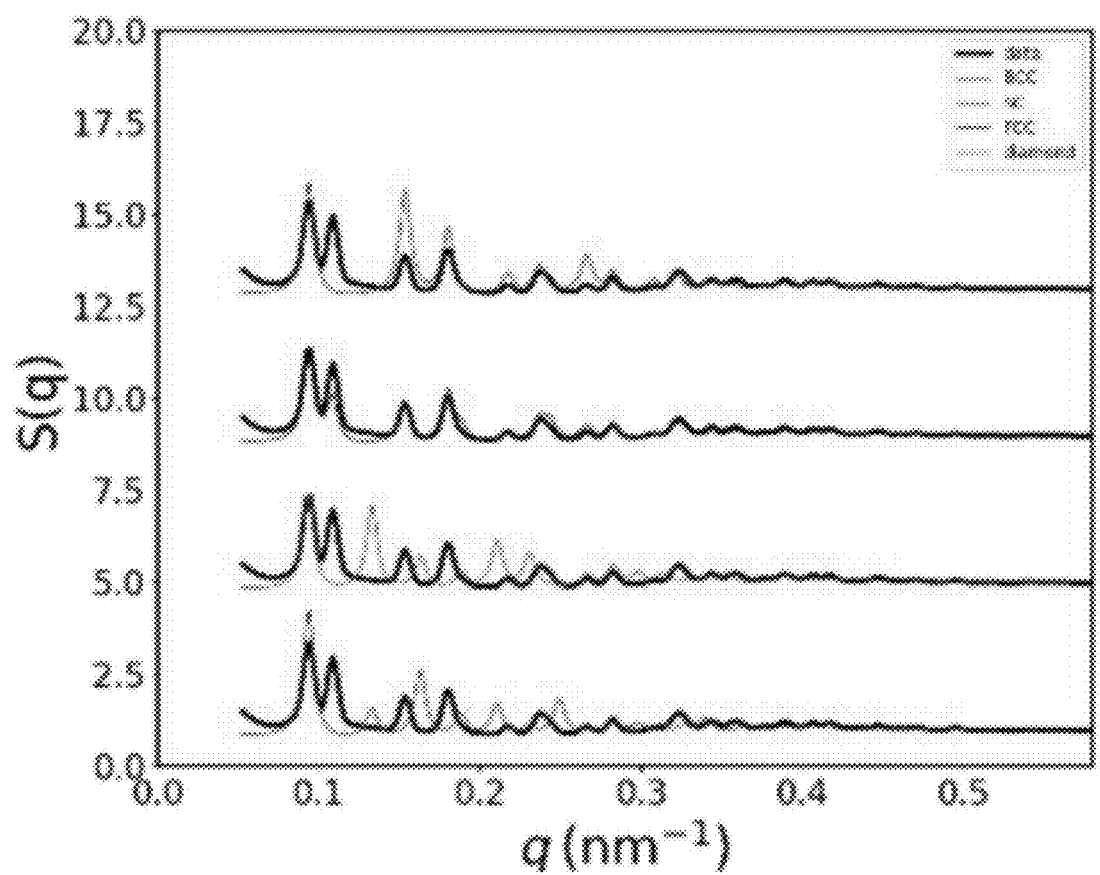
FIG. 45 provides a plot of the data and fits of gold spheres assembled in an FCC lattice by an octahedral system, while half of the octahedra were filled with nanoparticles.
Figure 46:
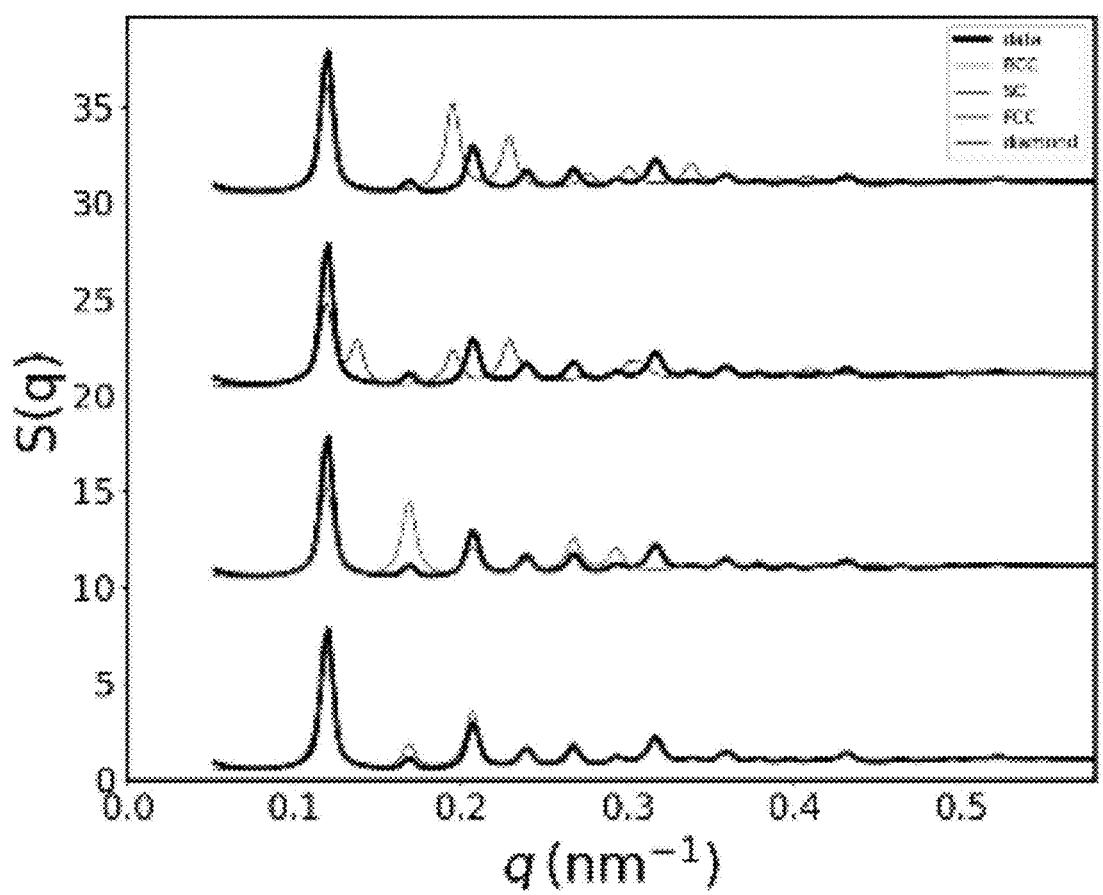
FIG. 46 provides a plot of the data and fits of gold spheres assembled in a BCC lattice by a cubic system.
Figure 47:
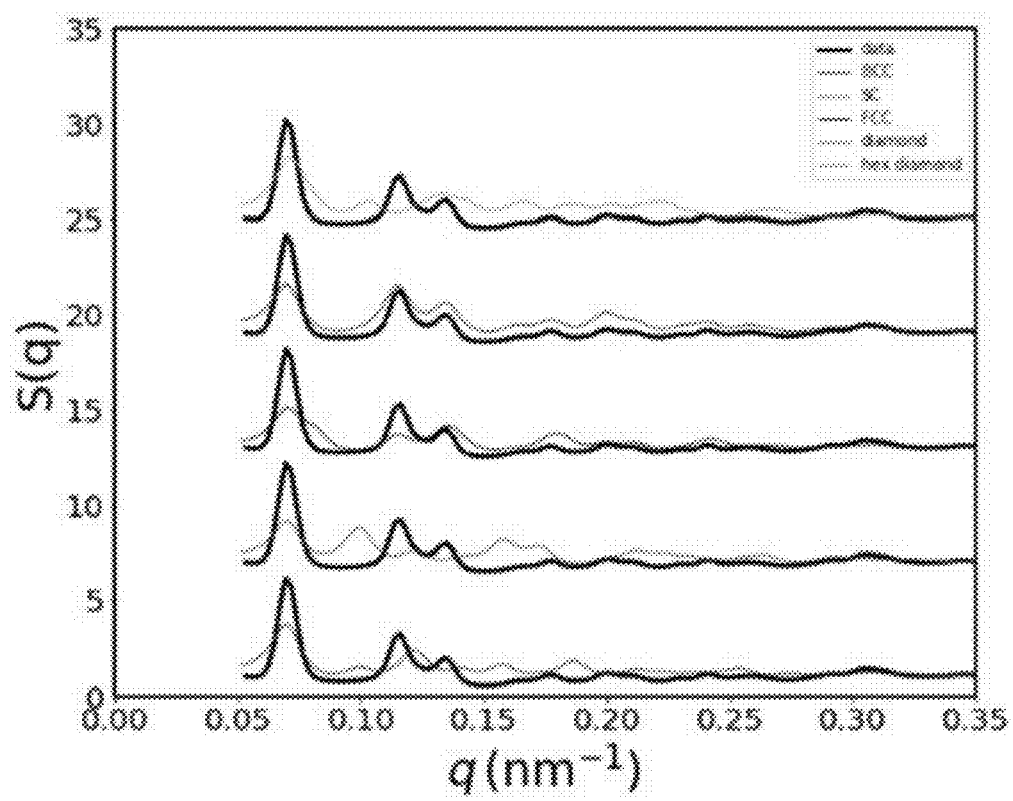
FIG. 47 provides a plot of the data and fits of gold spheres assembled in a diamond lattice.

Four candidate superlattice models were computed and compared to the data. The first model was a cubic arrangement of tetrahedra, which is seen in FIG. 42. The tetrahedra are rotated such that in this cubic arrangement, each tetrahedron vertex touches only one other tetrahedron. This is the expected configuration given the steric packing constraints for DNA tetrahedra vertices. The second model was a hexagonal diamond arrangement of tetrahedra. Each tetrahedron is oriented such that each vertex connects to exactly one vertex of another tetrahedron. The third model is a cubic close-packed arrangement of tetrahedra. In this lattice, the vertex of each tetrahedron connects to the three vertices of three other tetrahedra. Finally, the fourth model is this same model, but where the tetrahedra are placed further apart, so as to account for the observed scattering peak position. The models are compared to the data in FIG. 43.

The 'close-packed' cubic lattices configurations do not correctly match the experimental data, and are also unlikely on physical grounds. The cubic diamond and hexagonal diamond arrangement of tetrahedra appear to agree with the data, with cubic diamond more closely matching the experimental data. Given the high degree of structural similarity between cubic and hexagonal diamond arrangements, it is possible that the experimental system is a principally cubic diamond lattice with occasional hexagonal diamond defects. In any case, the scattering curve suggests that tetrahedra are arranging into a diamond-like configuration, where each tetrahedron is connected to four neighbors along its vertices.

Figure 48:
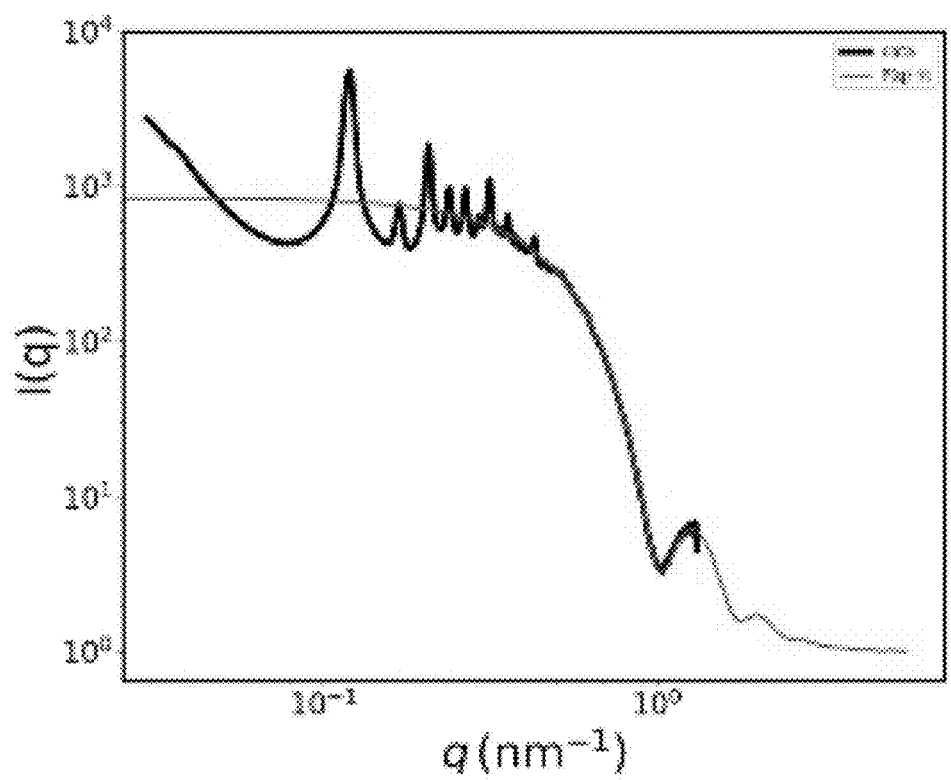
FIG. 48 provides a plot showing an example fit of the form factor of the BCC lattice by the cubic system.

SC, FCC, BCC and diamond lattices: The SC, FCC, BCC, and diamond of gold spheres in a DNA lattice are shown in FIG. 44, FIG. 45, FIG. 46, and FIG. 47, respectively. In each fit, a model of gold spheres was used. The DNA octahedra were not modeled due to the fact that the origami effective electron density is approximately one order-of-magnitude smaller than the effective electron density of gold. In each model, candidate fits for each BCC, FCC and simple cubic are plotted. For the case of diamond, the second case of cubic diamond is also plotted. The form factor used in the structure factor S(q) was obtained from fitting the high q term of the intensity to the known sphere form factor as in FIG. 48.

Theoretical Considerations.

Figure 49A:
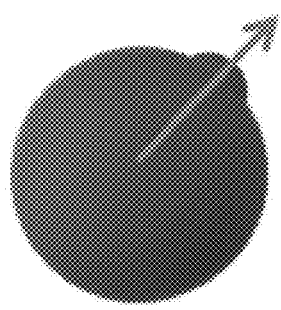
FIGS. 49A and 49B show diagrams of singlet patchy particles.
Figure 49B:
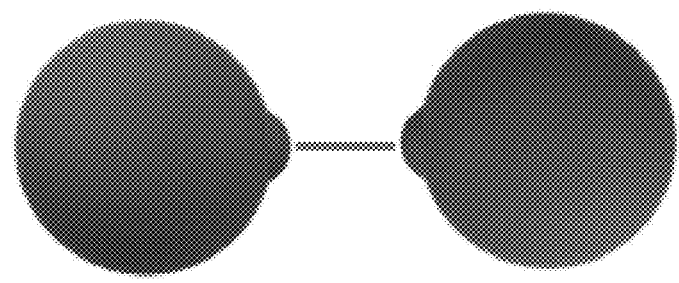

Wertheim's theory: In order to provide a starting point, a description of Wertheim's theory for associating liquids is provided. Briefly, an associating particle was defined as one that possess both short-range and highly directional interactions (FIGS. 49A-49B). By construction, the particles are only attractive within the patchy regions and repulsive everywhere else. Thus, the potential was decomposed into their attractive and repulsive components, $\phi_R(r)$ and $\phi_A(r)$, respectively.

$$\phi(r)=\phi_R(r)+\phi_A(r). \tag{22}$$

$$\phi_R(r) = \begin{cases} \infty & r \leq d \\ 0 & r > d \end{cases}. \tag{23}$$

$$\phi_A(r)=\Sigma_{\alpha \subset \Gamma}\Sigma_{\beta \subset \Gamma}\phi_{\alpha\beta}(r) \tag{24}$$

where d is the particle diameter, $\Gamma$ is the set containing all N patchy sites in the system, and $\alpha$ and $\beta$ define the subset of patchy sites associated with the particles whose potential is being evaluated. As a example, if an interacting particle has n patchy sites, then $\alpha$ is the subset of $\Gamma$ that identifies those patchy sites $\alpha=\{\Gamma_{N-b+1}, \Gamma_{N-b+2}, \ldots, \Gamma_{N-b+n}\}$ with b acting as a dummy indexing variable pointing to where subset $\alpha$ exists in $\Gamma$.

Through the introduction of Mayer-f functions, $f_M(r)=\exp[\phi(r)/kT]-1$, density expansions, graph theory, and cluster reductions, Wertheim showed that the exact Helmholtz free energy for an associating fluid can be written as, $$\frac{A}{kT} = \int \left[\rho(1)\ln\left[\frac{\rho_0(1)}{\Lambda}\right] - \rho(1) + \sum_{\alpha \subset \Gamma}\sigma_{\Gamma-\alpha}(1)c_\alpha(1)\right]d(1) - c^{(o)} \tag{25}$$

where $\rho(1)$ is the single molecule density integrated over all coordinates (1), $\rho_o(1)$ is the subset of $\rho(1)$ that consist of only monomers ("unbonded" particles), $\Lambda$ is the standard de Broglie wavelength, $\sigma_{\Gamma-\alpha}$ is a density operator representing the density sums of subsets of a sites, and $c^{(o)}$ is an graph set that describe a sum from singlet to n-body interactions within the system.

$$\sigma_\gamma=\Sigma_{\alpha \cup \eta}\beta_\alpha(1) \tag{26}$$

$$c^{(o)} = \sum_{k=0}^{\infty} c_k^{(0)} \tag{27}$$

the subscript k indicates the cluster size associated with k-particle interaction. The value of $c^{(o)}$ cannot be rigorously determined. However, in the limit of only one patch per particle (shown in FIG. 1), a single bonding condition was imposed. This results in the cancellation of all k>2 terms, resulting in;

$$c^{(o)} = c_{ref}^{(o)} + \frac{1}{2}\int \rho_o(1)f_{AA}(12)g_2(12)\rho_o(2)d(1)d(2) \tag{28}$$

where $g_2(12)$ is the two body hard-sphere radial distribution function. Excess free energy of association of the form is defined:

$$\frac{A - A^{ref}}{kT} = \int \rho(1)\left[\ln X_o(1) - \frac{1}{2}X_o(1) + \frac{1}{2}\right]d(1) \tag{29}$$

with $X_o(1)$ as the equilibrium monomer fraction $$X_o(1) = \frac{\rho_0(1)}{\rho(1)} = \frac{-1+\sqrt{1+4\Delta}}{2\Delta} \tag{30}$$

In the context of two free patchy sites coming together to form a pair of associated particles, the process can be a "reaction" where two "unbonded" sites come together to form a "bond." Within this framework, A represents the equilibrium constant of the system:

$$K_f=\Delta=2\int f_A(r)g_2(r)d\vec{r} \tag{31}$$

The above result for a singlet patch particle can be generalize to particles with multiple patches. Briefly, the densities $\rho_o(1)$ and $\rho_o(2)$ in the single patch bonding approximation can be substituted out for the density operators $\sigma_{\Gamma-\alpha}$ and $\sigma_{\tau-\beta}$ and interactions are summed over all sites associated with particles $\alpha$ and $\beta$. This approximation gives a generalized excess Helmholtz free energy for a homogeneous multipatch particle system of the form:

$$\frac{A - A^{ref}}{kT} = \sum_{\alpha \subset \Gamma} \int \rho(1) \left[ \ln X_\alpha(1) - \frac{X_\alpha(1)}{2} + \frac{1}{2} \right] d(1) \quad (32)$$

$$X_\alpha(1) = \frac{\sigma_{\Gamma-\alpha}(1)}{\rho(1)} = \frac{-1 + \sqrt{1 + 4n\rho\Delta}}{2n\rho\Delta} \quad (33)$$

Therefore, for a particle with n patches, the equilibrium constant becomes, $$K_I = n \int f_A(r) g_2(r) d\vec{r} \quad (34)$$

Eq. 31-33 represent the major results determined by Wertheim for a homogeneous associating fluid with multiple bonding sites per particle.

Crystal Reference Derivation.

While the results provided by Wertheim provide an accurate description for associating fluids, utilizing the hard-sphere fluid as the reference state for a perturbation analysis of crystalline structure will fail for lattice predictions as the crystalline morphology deviates too far from that of a bulk fluid to be properly captured by a first order approximation. Here, the reference state to that of any crystalline structure of interest was casted.

Similar to the two approximations made for singlet and multiplet patchy particles, an approximate form for $c^{(o)}$ that accurately reflects the crystalline state was defined. In the limit of a perfect crystalline structure, all particles are connected into a single cluster, thus k=1. This singlet cluster sum incorporates an infinite number of interactions as all particles feel the effect of other particles $$c^{(o)} = c_{k_1}^{(o)} = c_{I,k_1}^{(o)} + c_{II,k_1}^{(o)} + c_{II,k_1}^{(o)} + c_{II,k_1}^{(o)} + c_{IV,k_1}^{(o)} + \ldots \quad (35)$$

where the subscripts I, II, III etc indicate single-body, two-body, three-body etc interactions, respectively. While this reduces the analysis to only systems containing a single cluster, the infinite sum over all possible n-body interactions was not performed. To address this summation problem, the short attraction constraint for the system was imposed. Within this limit, only adjacent lattice points have a non-vanishing contribution. As a result, the term that remains corresponds to an s-body interaction where s represents the crystal coordination number associated with a given lattice. $c^{(o)}$ now reduces to a reference term and the corresponding s-body interaction term:

$$c^{(o)} = c_{ref}^{(o)} + \frac{1}{s!} \sum_{\alpha \subset \Gamma} \sum_{\beta \subset \Gamma} \quad (36)$$

$$\int \prod_{i=1}^{s} \sigma_{\Gamma-i}(i) f_{AA}^s(12) g_{cr}(1, 2, \ldots, s+1) d(1) d(2) \ldots d(n+1)$$

if a homogeneous system, $c^{(o)}$ simplifies to $$c^{(o)} = c_{ref}^{(o)} + \frac{\rho_o^{n+1}}{(s+1)!} \int f_{AA}^s(r) g_{cr}(r) d\vec{r} \quad (37)$$

where the subscipt $\Gamma-i$ indicate the density of particle i. This equation can employ a small perturbation about a reference crystal lattice (defined by the radial distribution function $g_{cr}(r)$). While subtle, it is worth noting the key difference between the two approximations. The free energy change due to local perturbations about a homogeneous solution that results from patchy associations is shown in certain questions. On the other hand, certain equations probe how turning on association between particles already occupying lattice sites further stabilizes the reference crystal structure. It can be shown that the resulting equilibrium constant takes the form:

$$K_c = \frac{\rho_o^{n-1}}{n!} \int f_{AA}^{\phi(m,n)} g_{cr}(r) d(r) \quad (38)$$

where $\phi(m, n)$ is a coordination saturation parameter that depends on n, the number of patches, and m, the crystal coordination number associated with the reference structure. $\phi(m, n)$ acting on $f_A(r)$ accounts for association of a reference particle to its neighbors within the crystal lattice. In the limit where m≥n, the reference particle possesses an excess number of patches than required by the crystal coordination number. Here, all attractions that stabilize the lattice are satisfied and $\phi(m, n)=n$, indicating that there are n bonds formed per particle within the lattice.

In the opposite limit where m<n, the reference crystal has a coordination number greater than that of the number of patchy sites available on the particle. In those situations, the energetic contribution from association is limit to the number of patches on the particle, thus $\phi(m, n)=m$. The prefactor $\rho_o^{n-1}/n!$ accounts for both the indistinguishably and probability of finding n-1 particles within the cutoff interaction distance. The free energy of lattice formation can then be calculated via the relation $\Delta G_c = -kT \ln K_c$.

Free energy decomposition: From standard thermodynamics, the free energy of lattice formation can be decomposed into an enthalpic and entropic component $\Delta G = \Delta H - T\Delta S$. To assign a functional form to both $\Delta H$ and $\Delta S$, the expression for $K_c$ was simplified by introducing a binomial expansion of the Mayer-f function to give:

$$\ln K_c = \ln\left[\frac{\rho_o^{n-1}}{n!}\right] + \quad (39)$$

$$\ln\left[\int \sum_{l=1}^{\phi} \binom{\phi}{l} \exp\left[-\frac{U(r)}{kT}\right]^l (-1)^{\phi-l} g_{cr}(r) d\vec{r}\right] + \ln\left[\int (-1)^\phi g_{cr}(r) d\vec{r}\right]$$

The first and last terms has no energetic term and thus correspond to the entropic contribution and whereas the middle term containing the Boltzmann weight of the interparticle potential represents the enthalpic contribution to $\Delta G$, giving:

$$\frac{\Delta H}{kT} = -\ln\left[\int \sum_{l=1}^{\phi} \binom{\phi}{l} \exp\left[-\frac{U(r)}{kT}\right]^l (-1)^{\phi-l} g_{cr}(r) d\vec{r}\right] \quad (40)$$

$$\frac{\Delta S}{k} = \ln\left[\frac{\rho_o^{n-1}}{n!}\right] + \ln\left[\int (-1)^\phi g_{cr}(r) d\vec{r}\right] \quad (41)$$

As a simplifying assumption, this can be a limiting case where the only dominating interaction exist at the the position related to the first coordination shell in the crystal lattice—$r_s$. Doing so allows us to define a approximation for the crystal pair correlation function as $g_{cr}(r)=m\delta(r-r_s)$, where is indicates the crystal coordination number. Plugging this approximation into the relations for $\Delta H$ and $\Delta S$, assuming that the highest ordered term in the free energy expansion dominates, and normalizing by the number of patches per patchy particle result in, $$\frac{\Delta H}{kT} = \frac{m}{n}\phi(m,n)u_o \quad (42)$$

$$\frac{\Delta S}{k} = \ln\left[\frac{m\rho_o^{n-1}}{n!}\right] \quad (43)$$

where $U(r_s)=u_o$. These results indicate that the enthalpic contribution stems from patchy association between particles occupying each lattice site whereas the entropic component comes from counting the number of ways the reference particles can find an associating particle within the lattice. By inspection, $\Delta H$ dominates over $\Delta S$, emphasizing that patch-patch association drives lattice stabilization and governs the morphological transition between the various structures.

Figure 50A:
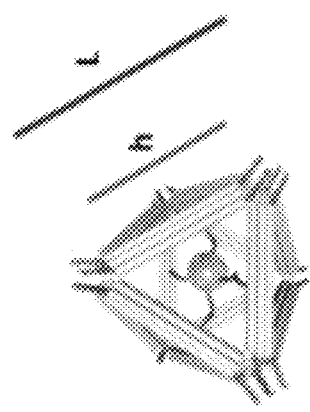
FIGS. 50A-50C provide diagrams of patchy particle designs.
Figure 50B:
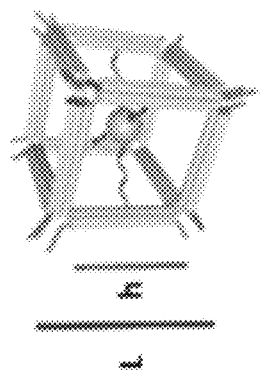
Figure 50C:
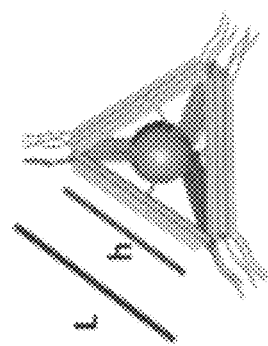

Design of patchy particle model: the cubic, octahedral and tetrahedral nanocages have a degree of truncation at their vertices to provide room for DNA linker placement and facilitate hybridization interactions. To properly model the patchy interactions, a relationship between the degree of truncation and design parameters were derived (FIGS. 50A-50C).

For the both cases, a parameter $\delta$ is defined as the ratio between the shortened vertex length h and the full length L. A degree of truncation term $\eta$ is defined as the ratio of the center to truncated vertex to center to full vertex lengths. By simple geometrical arguments, the degree of truncation $\eta$ is defined as a function of the ratio $\delta$.

$$\eta = \begin{cases} \dfrac{1-\delta}{2} & \text{Octahedron, Tetrahedron} \\ \dfrac{1}{2}\dfrac{1-\delta^2}{1+\delta+\delta^2} & \text{Cube} \end{cases} \quad (44)$$

Experimentally, $\delta$ is set as 0.75 and 0.84 for the octahedron and cube, respectively. This gives in $\eta=0.06$ for the cube and $\eta=0.12$ for the octahedron.

Octahedral DNA staple strands (SEQ ID NOs: 1-120 respectively top to bottom):

| | |
|---|---|
| OC-staple-1 | TCAAAGCGAACCAGACCGTTTTATATAGTC |
| OC-staple-2 | GCTTTGAGGACTAAAGAGCAACGGGGAGTT |
| OC-staple-3 | GTAAATCGTCGCTATTGAATAACTCAAGAA |
| OC-staple-4 | AAGCCTTAAATCAAGACTTGCGGAGCAAAT |
| OC-staple-5 | ATTTTAAGAACTGGCTTGAATTATCAGTGA |
| OC-staple-6 | GTTAAAATTCGCATTATAAACGTAAACTAG |
| OC-staple-7 | AGCACCATTACCATTACAGCAAATGACGGA |
| OC-staple-8 | ATTGCGTAGATTTTCAAAACAGATTGTTTG |
| OC-staple-9 | TAACCTGTTTAGCTATTTTCGCATTCATTC |
| OC-staple-10 | GTCAGAGGGTAATTGAGAACACCAAAATAG |
| OC-staple-11 | CTCCAGCCAGCTTTCCCCTCAGGACGTTGG |
| OC-staple-12 | GTCCACTATTAAAGAACCAGTTTTGGTTCC |
| OC-staple-13 | TAAAGGTGGCAACATAGTAGAAAATAATAA |
| OC-staple-14 | GATAAGTCCTGAACAACTGTTTAAAGAGAA |
| OC-staple-15 | GGTAATAGTAAAATGTAAGTTTTACACTAT |
| OC-staple-16 | TCAGAACCGCCACCCTCTCAGAGTATTAGC |
| OC-staple-17 | AAGGGAACCGAACTGAGCAGACGGTATCAT |
| OC-staple-18 | GTAAAGATTCAAAAGGCCTGAGTTGACCCT |
| OC-staple-19 | AGGCGTTAAATAAGAAGACCGTGTCGCAAG |
| OC-staple-20 | CAGGTCGACTCTAGAGCAAGCTTCAAGGCG |
| OC-staple-21 | CAGAGCCACCACCCTCTCAGAACTCGAGAG |
| OC-staple-22 | TTCACGTTGAAAATCTTGCGAATGGGATTT |
| OC-staple-23 | AAGTTTTAACGGGTCGGAGTGTAGAATGG |
| OC-staple-24 | TTGCGTATTGGGCGCCCGCGGGGTGCGCTC |

| Octahedral DNA staple strands (SEQ ID NOs: 1-120 respectively top to bottom): | |
|---|---|
| OC-staple-25 | GTCACCAGAGCCATGGTGAATTATCACCAATCAGAAAAGCCT |
| OC-staple-26 | GGACAGAGTTACTTTGTCGAAATCCGCGTGTATCACCGTACG |
| OC-staple-27 | CAACATGATTTACGAGCATGGAATAAGTAAGACGACAATAAA |
| OC-staple-28 | AACCAGACGCTACGTTAATAAAACGAACATACCACATTCAGG |
| OC-staple-29 | TGACCTACTAGAAAAAGCCCCAGGCAAAGCAATTTCATCTTC |
| OC-staple-30 | TGCCGGAAGGGGACTCGTAACCGTGCATTATATTTTAGTTCT |
| OC-staple-31 | AGAACCCCAAATCACCATCTGCGGAATCGAATAAAAATTTTT |
| OC-staple-32 | GCTCCATTGTGTACCGTAACACTGAGTTAGTTAGCGTAACCT |
| OC-staple-33 | AGTACCGAATAGGAACCCAAACGGTGTAACCTCAGGAGGTTT |
| OC-staple-34 | CAGTTTGAATGTTTAGTATCATATGCGTAGAATCGCCATAGC |
| OC-staple-35 | AAGATTGTTTTTTAACCAAGAAACCATCGACCCAAAAACAGG |
| OC-staple-36 | TCAGAGCGCCACCACATAATCAAAATCAGAACGAGTAGTATG |
| OC-staple-37 | GATGGTTGGGAAGAAAAATCCACCAGAAATAATTGGGCTTGA |
| OC-staple-38 | CTCCTTAACGTAGAAACCAATCAATAATTCATCGAGAACAGA |
| OC-staple-39 | AGACACCTTACGCAGAACTGGCATGATTTTCTGTCCAGACAA |
| OC-staple-40 | GCCAGCTAGGCGATAGCTTAGATTAAGACCTTTTTAACCTGT |
| OC-staple-41 | CCGACTTATTAGGAACGCCATCAAAAATGAGTAACAACCCCA |
| OC-staple-42 | GTCCAATAGCGAGAACCAGACGACGATATTCAACGCAAGGGA |
| OC-staple-43 | CCAAAATACAATATGATATTCAACCGTTAGGCTATCAGGTAA |
| OC-staple-44 | AACAGTACTTGAAAACATATGAGACGGGTCTTTTTTAATGGA |
| OC-staple-45 | TTTCACCGCATTAAAGTCGGGAAACCTGATTTGAATTACCCA |
| OC-staple-46 | GAGAATAGAGCCTTACCGTCTATCAAATGGAGCGGAATTAGA |
| OC-staple-47 | ATAATTAAATTTAAAAAACTTTTTCAAACTTTTAACAACGCC |
| OC-staple-48 | GCACCCAGCGTTTTTTATCCGGTATTCTAGGCGAATTATTCA |
| OC-staple-49 | GGAAGCGCCCACAAACAGTTAATGCCCCGACTCCTCAAGATA |
| OC-staple-50 | GTTTGCCTATTCACAGGCAGGTCAGACGCCACCACACCACCC |
| OC-staple-51 | CGCGAGCTTAGTTTTTCCCAATTCTGCGCAAGTGTAAAGCCT |
| OC-staple-52 | AGAAGCAACCAAGCCAAAAGAATACACTAATGCCAAAACTCC |
| OC-staple-53 | ATTAAGTATAAAGCGGCAAGGCAAAGAAACTAATAGGGTACC |
| OC-staple-54 | CAGTGCCTACATGGGAATTTACCGTTCCACAAGTAAGCAGAT |
| OC-staple-55 | ATAAGGCGCCAAAAGTTGAGATTTAGGATAACGGACCAGTCA |
| OC-staple-56 | TGCTAAACAGATGAAGAAACCACCAGAATTTAAAAAAAGGCT |
| OC-staple-57 | CAGCCTTGGTTTTGTATTAAGAGGCTGACTGCCTATATCAGA |
| OC-staple-58 | CGGAATAATTCAACCCAGCGCCAAAGACTTATTTTAACGCAA |
| OC-staple-59 | CGCCTGAATTACCCTAATCTTGACAAGACAGACCATGAAAGA |
| OC-staple-60 | ACGCGAGGCTACAACAGTACCTTTTACAAATCGCGCAGAGAA |
| OC-staple-61 | CAGCGAACATTAAAAGAGAGTACCTTTACTGAATATAATGAA |
| OC-staple-62 | GGACGTTTAATTTCGACGAGAAACACCACCACTAATGCAGAT |
| OC-staple-63 | AAAGCGCCAAAGTTTATCTTACCGAAGCCCAATAATGAGTAA |

-continued

| Octahedral DNA staple strands (SEQ ID NOs: 1-120 respectively top to bottom): | |
|---|---|
| OC-staple-64 | GAGCTCGTTGTAAACGCCAGGGTTTTCCAAAGCAATAAAGCC |
| OC-staple-65 | AATTATTGTTTTCATGCCTTTAGCGTCAGATAGCACGGAAAC |
| OC-staple-66 | AAGTTTCAGACAGCCGGGATCGTCACCCTTCTGTAGCTCAAC |
| OC-staple-67 | ACAAAGAAATTTAGGTAGGGCTTAATTGTATACAACGGAATC |
| OC-staple-68 | AACAAAAATAACTAGGTCTGAGAGACTACGCTGAGTTTCCCT |
| OC-staple-69 | CATAACCTAAATCAACAGTTCAGAAAACGTCATAAGGATAGC |
| OC-staple-70 | CACGACGAATTCGTGTGGCATCAATTCTTTAGCAAAATTACG |
| OC-staple-71 | CCTACCAACAGTAATTTTATCCTGAATCAAACAGCCATATGA |
| OC-staple-72 | GATTATAAAGAAACGCCAGTTACAAAATTTACCAACGTCAGA |
| OC-staple-73 | AGTAGATTGAAAAGAATCATGGTCATAGCCGGAAGCATAAGT |
| OC-staple-74 | TAGAATCCATAAATCATTTAACAATTTCTCCCGGCTTAGGTT |
| OC-staple-75 | AAAGGCCAAATATGTTAGAGCTTAATTGATTGCTCCATGAGG |
| OC-staple-76 | CCAAAAGGAAAGGACAACAGTTTCAGCGAATCATCATATTCC |
| OC-staple-77 | GAAATCGATAACCGGATACCGATAGTTGTATCAGCTCCAACG |
| OC-staple-78 | TGAATATTATCAAAATAATGGAAGGGTTAATATTTATCCCAA |
| OC-staple-79 | GAGGAAGCAGGATTCGGGTAAAATACGTAAAACACCCCCCAG |
| OC-staple-80 | GGTTGATTTTCCAGCAGACAGCCCTCATTCGTCACGGGATAG |
| OC-staple-81 | CAAGCCCCCACCCTTAGCCCGGAATAGGACGATCTAAAGTTT |
| OC-staple-82 | TGTAGATATTACGCGGCGATCGGTGCGGGCGCCATCTTCTGG |
| OC-staple-83 | CATCCTATTCAGCTAAAAGGTAAAGTAAAAAGCAAGCCGTTT |
| OC-staple-84 | CAGCTCATATAAGCGTACCCCGGTTGATGTGTCGGATTCTCC |
| OC-staple-85 | CATGTCACAAACGGCATTAAATGTGAGCAATTCGCGTTAAAT |
| OC-staple-86 | AGCGTCACGTATAAGAATTGAGTTAAGCCCTTTTTAAGAAAG |
| OC-staple-87 | TATAAAGCATCGTAACCAAGTACCGCACCGGCTGTAATATCC |
| OC-staple-88 | ATAGCCCGCGAAAATAATTGTATCGGTTCGCCGACAATGAGT |
| OC-staple-89 | AGACAGTTCATATAGGAGAAGCCTTTATAACATTGCCTGAGA |
| OC-staple-90 | AACAGGTCCCGAAATTGCATCAAAAAGATCTTTGATCATCAG |
| OC-staple-91 | ACTGCCCTTGCCCCGTTGCAGCAAGCGGCAACAGCTTTTTCT |
| OC-staple-92 | TCAAAGGGAGATAGCCCTTATAAATCAAGACAACAACCATCG |
| OC-staple-93 | GTAATACGCAAACATGAGAGATCTACAACTAGCTGAGGCCGG |
| OC-staple-94 | GAGATAACATTAGAAGAATAACATAAAAAGGAAGGATTAGGA |
| OC-staple-95 | CAGATATTACCTGAATACCAAGTTACAATCGGGAGCTATTTT |
| OC-staple-96 | CATATAACTAATGAACACAACATACGAGCTGTTTCTTTGGGG |
| OC-staple-97 | ATGTTTTGCTTTTGATCGGAACGAGGGTACTTTTTCTTTTGATAAGAGGTCATT |
| OC-staple-98 | GGGGTGCCAGTTGAGACCATTAGATACAATTTTCACTGTGTGAAATTGTTATCC |
| OC-staple-99 | CTTCGCTGGGCGCAGACGACAGTATCGGGGCACCGTCGCCATTCAGGCTGCGCA |
| OC-staple-100 | TCAGAGCTGGGTAAACGACGGCCAGTGCGATCCCCGTAGTAGCATTAACATCCA |
| OC-staple-101 | TTAGCGGTACAGAGCGGGAGAATTAACTGCGCTAATTTCGGAACCTATTATTCT |

| Octahedral DNA staple strands (SEQ ID NOs: 1-120 respectively top to bottom): | |
|---|---|
| OC-staple-102 | GATATTCTAAATTGAGCCGGAACGAGGCCCAACTTGGCGCATAGGCTGGCTGAC |
| OC-staple-103 | TGTCGTCATAAGTACAGAACCGCCACCCATTTTCACAGTACAAACTACAACGCC |
| OC-staple-104 | CGATTATAAGCGGAGACTTCAAATATCGCGGAAGCCTACGAAGGCACCAACCTA |
| OC-staple-105 | AACATGTACGCGAGTGGTTTGAAATACCTAAACACATTCTTACCAGTATAAAGC |
| OC-staple-106 | GTCTGGATTTTGCGTTTTAAATGCAATGGTGAGAAATAAATTAATGCCGGAGAG |
| OC-staple-107 | GCCTTGAATCTTTTCCGGAACCGCCTCCCAGAGCCCAGAGCCGCCGCCAGCATT |
| OC-staple-108 | CGCTGGTGCTTTCCTGAATCGGCCAACGAGGGTGGTGATTGCCCTTCACCGCCT |
| OC-staple-109 | TGATTATCAACTTTACAACTAAAGGAATCCAAAAGTTTGAGTAACATTATCAT |
| OC-staple-110 | ACATAACTTGCCCTAACTTTAATCATTGCATTATAACAACATTATTACAGGTAG |
| OC-staple-111 | GTAGCGCCATTAAATTGGGAATTAGAGCGCAAGGCGCACCGTAATCAGTAGCGA |
| OC-staple-112 | TTATTTTTACCGACAATGCAGAACGCGCGAAAAATCTTTCCTTATCATTCCAAG |
| OC-staple-113 | TTTCAATAGAAGGCAGCGAACCTCCCGATTAGTTGAAACAATAACGGATTCGCC |
| OC-staple-114 | GGGCGACCCCAAAAGTATGTTAGCAAACTAAAAGAGTCACAATCAATAGAAAAT |
| OC-staple-115 | AGCCGAAAGTCTCTCTTTTGATGATACAAGTGCCTTAAGAGCAAGAAACAATGA |
| OC-staple-116 | GTGGGAAATCATATAAATATTTAAATTGAATTTTTGTCTGGCCTTCCTGTAGCC |
| OC-staple-117 | CCCACGCGCAAAATGGTTGAGTGTTGTTCGTGGACTTGCTTTCGAGGTGAATTT |
| OC-staple-118 | ATGACCACTCGTTTGGCTTTTGCAAAAGTTAGACTATATTCATTGAATCCCCCT |
| OC-staple-119 | TCCAAATCTTCTGAATTATTTGCACGTAGGTTTAACGCTAACGAGCGTCTTTCC |
| OC-staple-120 | GGGTTATTTAATTACAATATATGTGAGTAATTAATAAGAGTCAATAGTGAATTT |

In order to attach one gold nanoparticle or quantum dot (525, 605) inside the octahedral DNA frame, add (SEQ ID NO: 121)
'ATCCATCACTTCATACTCTACGTTGTTGTTGTTGTT' in front of certain sequences (e.g., OC-staple-98, 100, 101, 109, 111, 115, 116, and 117). In order to attach quantum dot (705) inside the octahedral DNA frame, add (SEQ ID NO: 122)
'CTACCATCATACCTACTCTACGTTGTTGTTGTTGTT' in front of certain sequences (e.g., OC-staple-98, 100, 101, 109, 111, 115, 116, and 117). In order to attach 6 streptavidins inside the cage, add (SEQ ID NO: 123)
'ATCCATCACTTCTTT' in front of certain sequences (e.g., OC-staple-50, 52, 53, 55, 56, 57, 58, 59, 63, 65, 67, 68, 69, 72, 75, 77, 80, 82, 85, 87, 91, 93, 95, and 96). In order to attach 1 internal GOx enzyme, add (SEQ ID NO: 124)
'TTCTTCTTCATCCATACTACCATCTAC' in back of certain sequences (OC-staple-78); In order to attach 1 internal HRP enzyme, add (SEQ ID NO: 125)
'CTTCTTCTTATACTTCACTACCTAATC' in back of certain sequences (OC-staple-78). These staple strands, when used for interior binding in structural characterization were ordered as PAGE-purified, while those used in functional systems (QD and enzyme) were ordered as standard desalted. Both showed high levels of material incorporation.

DNA sticky ends for octahedron (OR, m = 22, l = 8, n = 22) (SEQ ID NOs: 126-149. respectively, top to bottom):

TTTGCGGATGGCCAACTAAAGTACGGGCTTGCAGCTACAGAGTTTTTTTTTTTTTTTTTTTTTTATCCGTTA

CTTCATCAAGAGAAATCAACGTAACAGAGATTTGTCAATCATTTTTTTTTTTTTTTTTTTTTTTATCCGTTA

AAAGATTCATCAGGAATTACGAGGCATGCTCATCCTTATGCGTTTTTTTTTTTTTTTTTTTTTTATCCGTTA

-continued

```
ATAAATCATACATAAATCGGTTGTACTGTGCTGGCATGCCTGTTTTTTTTTTTTTTTTTTTATCCGTTA

GGTAGCTATTTTAGAGAATCGATGAAAACATTAAATGTGTAGTTTTTTTTTTTTTTTTTTTTATCCGTTA

CAAATGCTTTAAAAAATCAGGTCTTTAAGAGCAGCCAGAGGGTTTTTTTTTTTTTTTTTTTTATCCGTTA

TCATATGGTTTACGATTGAGGGAGGGAAACGCAATACATACATTTTTTTTTTTTTTTTTTTTATCCGTTA

CAACGCTCAACAGCAGAGGCATTTTCAATCCAATGATAAATATTTTTTTTTTTTTTTTTTTTATCCGTTA

AATAGCAATAGCACCAGAAGGAAACCTAAAGCCACTGGTAATTTTTTTTTTTTTTTTTTTTTATCCGTTA

GACAGGAGGTTGAAACAAATAAATCCGCCCCCTCCGCCACCCTTTTTTTTTTTTTTTTTTTTATCCGTTA

AGCTTTCATCAACGGATTGACCGTAAAATCGTATAATATTTTTTTTTTTTTTTTTTTTTTATCCGTTA

AGAGCCTAATTTGATTTTTGTTTAAATCCTGAAATAAAGAATTTTTTTTTTTTTTTTTTTTATCCGTTA

GCTCACAATTCCGTGAGCTAACTCACTGGAAGTAATGGTCAATTTTTTTTTTTTTTTTTTTATCCGTTA

CTTAAACAGCTTATATATTCGGTCGCTTGATGGGAACAAGATTTTTTTTTTTTTTTTTTTTATCCGTTA

AAACGAAAGAGGGCGAAACAAAGTACTGACTATATTCGAGCTTTTTTTTTTTTTTTTTTTTATCCGTTA

ACTGTTGGGAAGCAGCTGGCGAAAGGATAGGTCAAGATCGCATTTTTTTTTTTTTTTTTTTTATCCGTTA

GGCCCTGAGAGAAGCAGGCGAAAATCATTGCGTAGAGGCGGTTTTTTTTTTTTTTTTTTTTATCCGTTA

AACGGGTATTAAGGAATCATTACCGCCAGTAATTCAACAATATTTTTTTTTTTTTTTTTTTATCCGTTA

CAGAATCAAGTTTCGGCATTTTCGGTTAAATATATCACCAGTTTTTTTTTTTTTTTTTTTTATCCGTTA

GAAACATGAAAGCTCAGTACCAGGCGAAAAATGCTGAACAAATTTTTTTTTTTTTTTTTTTTATCCGTTA

ATCAAAATCATATATGTAAATGCTGAACAAACACTTGCTTCTTTTTTTTTTTTTTTTTTTTATCCGTTA

TGATTGCTTTGAGCAAAAGAAGATGAAATAGCAGAGGTTTTGTTTTTTTTTTTTTTTTTTTATCCGTTA

TTTGCGGAACAATGGCAATTCATCAATCTGTATAATAATTTTTTTT[TTTTTTTTTTTTTTTATCCGTTA

TGTAGCATTCCAACGTTAGTAAATGAAGTGCCGCGCCACCCTTTTTTTTTTTTTTTTTTTTATCCGTTA
```

DNA sticky end for octahedron (OB, m = 22, l = 8, n = 22) (SEQ ID NOs: 150-173, respectively, top to bottom):

```
TTTGCGGATGGCCAACTAAAGTACGGGCTTGCAGCTACAGAGTTTTTTTTTTTTTTTTTTTTAACGGAT

CTTCATCAAGAGAAATCAACGTAACAGAGATTTGTCAATCATTTTTTTTTTTTTTTTTTTTAACGGAT

AAAGATTCATCAGGAATTACGAGGCATGCTCATCCTTATGCGTTTTTTTTTTTTTTTTTTTTAACGGAT

ATAAATCATACATAAATCGGTTGTACTGTGCTGGCATGCCTGTTTTTTTTTTTTTTTTTTTTAACGGAT

GGTAGCTATTTTAGAGAATCGATGAAAACATTAAATGTGTAGTTTTTTTTTTTTTTTTTTTTAACGGAT

CAAATGCTTTAAAAAATCAGGTCTTTAAGAGCAGCCAGAGGGTTTTTTTTTTTTTTTTTTTTAACGGAT

TCATATGGTTTACGATTGAGGGAGGGAAACGCAATACATACATTTTTTTTTTTTTTTTTTTTAACGGAT

CAACGCTCAACAGCAGAGGCATTTTCAATCCAATGATAAATATTTTTTTTTTTTTTTTTTTTAACGGAT

AATAGCAATAGCACCAGAAGGAAACCTAAAGCCACTGGTAATTTTTTTTTTTTTTTTTTTTTAACGGAT

GACAGGAGGTTGAAACAAATAAATCCGCCCCCTCCGCCACCCTTTTTTTTTTTTTTTTTTTTAACGGAT

AGCTTTCATCAACGGATTGACCGTAAAATCGTATAATATTTTTTTTTTTTTTTTTTTTTTAACGGAT

AGAGCCTAATTTGATTTTTGTTTAAATCCTGAAATAAAGAATTTTTTTTTTTTTTTTTTTTAACGGAT

GCTCACAATTCCGTGAGCTAACTCACTGGAAGTAATGGTCAATTTTTTTTTTTTTTTTTTTAACGGAT

CTTAAACAGCTTATATATTCGGTCGCTTGATGGGAACAAGATTTTTTTTTTTTTTTTTTTTAACGGAT

AAACGAAAGAGGGCGAAACAAAGTACTGACTATATTCGAGCTTTTTTTTTTTTTTTTTTTTAACGGAT

ACTGTTGGGAAGCAGCTGGCGAAAGGATAGGTCAAGATCGCATTTTTTTTTTTTTTTTTTTTAACGGAT

GGCCCTGAGAGAAGCAGGCGAAAATCATTGCGTAGAGGCGGTTTTTTTTTTTTTTTTTTTTTAACGGAT
```

-continued

```
AACGGGTATTAAGGAATCATTACCGCCAGTAATTCAACAATATTTTTTTTTTTTTTTTTTTTAACGGAT

CAGAATCAAGTTTCGGCATTTTCGGTTAAATATATCACCAGTTTTTTTTTTTTTTTTTTTTTAACGGAT

GAAACATGAAAGCTCAGTACCAGGCGAAAAATGCTGAACAAATTTTTTTTTTTTTTTTTTTTTAACGGAT

ATCAAAATCATATATGTAAATGCTGAACAAACACTTGCTTCTTTTTTTTTTTTTTTTTTTTTTAACGGAT

TGATTGCTTTGAGCAAAAGAAGATGAAATAGCAGAGGTTTTGTTTTTTTTTTTTTTTTTTTTTAACGGAT

TTTGCGGAACAATGGCAATTCATCAATCTGTATAATAATTTTTTTTTTTTTTTTTTTTTTTTTAACGGAT

TGTAGCATTCCAACGTTAGTAAATGAAGTGCCGCGCCACCCTTTTTTTTTTTTTTTTTTTTTTAACGGAT
```

Cubic staple sequence (SEQ ID NOs: 174-293, respectively, top to bottom):

| | |
|---|---|
| Cub-staple-1 | TAAATATTGACGGAAAATTGAGGTTGTCAC |
| Cub-staple-2 | CCGAACAAAGTTACCAAAAAGTATAAGCCC |
| Cub-staple-3 | TGAATCGGCCAACGCGGTGCCAGAATGAGT |
| Cub-staple-4 | AATCGTAAAACTAGCAAGAATCGGGGTAGC |
| Cub-staple-5 | AGAAGCCTTTATTTCAGTAATACGCAAAAT |
| Cub-staple-6 | ATTGTGAATTACCTTAAATTTCATCAGTGA |
| Cub-staple-7 | ATAGAAAGGAACAACTTTTCAGCTAGCGTA |
| Cub-staple-8 | CATGTAATTTAGGCAGTATTTAATGCGTTA |
| Cub-staple-9 | ACGTTGTAAAACGACGGGTTTTCAAGGGCG |
| Cub-staple-10 | GACTTCAAATATCGCGAAGAGGAAATCAAA |
| Cub-staple-11 | CAAATAAGAAACGATTATTATTTGAATCTT |
| Cub-staple-12 | GAGTGAATAACCTTGCATAAATCTCAAGAA |
| Cub-staple-13 | ATTGCGTAGATTTTCAAAACAGATTGTTTG |
| Cub-staple-14 | GTCCACTATTAAAGAACCAGTTTTGGTTCC |
| Cub-staple-15 | CCCAATTCTGCGAACGCATATAAAATATAA |
| Cub-staple-16 | ATTTACCGTTCCAGTAAAAGCGCTTGAGGC |
| Cub-staple-17 | GGCTTTTGCAAAAGAAAACCAAACAAAAGG |
| Cub-staple-18 | AACTTTTTCAAATATAACAAAGATTTTAAC |
| Cub-staple-19 | CGTACTCAGGAGGTTTGGAATAGTCCTCAA |
| Cub-staple-20 | CCGTAATGGGATAGGTACAAACGAAAATAA |
| Cub-staple-21 | TAATCAAAATCACCGGGTTTGCCGTTTGCC |
| Cub-staple-22 | AGCCGTTTTTATTTTCTCATCGACCTAATT |
| Cub-staple-23 | AGCCGGAACGAGGCGCCTGCTCCCAAGCGC |
| Cub-staple-24 | ATCGGAACGAGGGTAGAGCAGCGAACCGAT |
| Cub-staple-25 | AAAAATGAGTTACAGCGTCTTTCCAGAGAATCATCATATTCC |
| Cub-staple-26 | GAATTACATTCTAGAGGATCCCCGGGTAATCCGCTCACAATT |
| Cub-staple-27 | AAGCAAAGACATCTGCCAGTTTGAGGGGCCGCTTCTGGTGAG |
| Cub-staple-28 | ACCCCGGTGAGAGTCTACAAAGGCTATCTCGCAAGCGGTCCA |
| Cub-staple-29 | GAGAAGGGCCTGTACCATGTACCGTAACCCACCCTCCACCCT |
| Cub-staple-30 | TGAATATTATCAAAATAATGGAAGGGTTGCGCCTGTTTATCA |
| Cub-staple-31 | CCTACCAACAGTAATATAAAGTACCGACAATGCAGAACGCTC |
| Cub-staple-32 | GATTATAATAAGTCCAACATGTTCAGCTAAAAGGTCGTCAGA |

-continued

| | |
|---|---|
| Cub-staple-33 | CCTGATACCGAACTCACCGACTTGAGCCGGCCGGAAACGTCG |
| Cub-staple-34 | AAACGCACTTACCGGAAACAATGAAATATACACCATCAATAT |
| Cub-staple-35 | TACCGCGGTATTAAAACCAATCAATAATTCGCCTTAAATCAA |
| Cub-staple-36 | TAATAATTTGCTAATGTCGTCTTTCCAGATGCTTGATACCGA |
| Cub-staple-37 | GAAACAAAGCAGCAATTACCATTAGCAAATTTGGGCAATCAT |
| Cub-staple-38 | AGGTCAGAAACACTTACGAAGGCACCAAGGAAGTTTACATGG |
| Cub-staple-39 | CATTGCCTTGATAACCAGGGTGGTTTTTGAGAGAGTTGCAAC |
| Cub-staple-40 | TAAGCAAGAAACGCTAGCAAACGTAGAAGAACTGGGATAAAA |
| Cub-staple-41 | ATATTCGTCTGAAACCGTATAAACAGTTATAAGTTTACAGAG |
| Cub-staple-42 | TAAAGTAAGATACACAGTCAGGACGTTGGTAGAAAGATTCAC |
| Cub-staple-43 | AGAACGGCCCAATAGCAAGCCTCCCTCACACTTATCATTCCA |
| Cub-staple-44 | TGCTGTATACCACACAACATTATTACAGGGAAGAATTAGTTT |
| Cub-staple-45 | CAGAACCGGGTTGATTAGCGGGGTTTTGTACACCAGTACAAA |
| Cub-staple-46 | GAAATCGAATATCAAATTAACTGAACACAGAATAATCCAACG |
| Cub-staple-47 | CAGTAATGGGCTTAAGTATAAAGCCAACAGGCGAATTATTCA |
| Cub-staple-48 | ATCTTCTTGATGCAGGGTTATATAACTACTCAGTACCAGGCC |
| Cub-staple-49 | ATAAGGCCCAATAACTGAAAAGGTGGCAAATAACCTTAAGAA |
| Cub-staple-50 | AAGGGAAAATTGTGCGGAGATTTGTATCAGCACCAATGAAAC |
| Cub-staple-51 | TGGGATTTTTTCACGTTGAAAATGTTTCCGAATTTTCTGTA |
| Cub-staple-52 | GAGTAGTATTATACTTTCGCAAATGGTCTCAATTCTACTAAC |
| Cub-staple-53 | TCAAAGCGCGGATTCCTGACTATTATAGTTCATCAACATTTA |
| Cub-staple-54 | GAGCTAAAGCTCATAACGTTAATATTTTAAAACAGAGGCGGT |
| Cub-staple-55 | TTCGCGTCCATTCGCCAGCTTTCCGGCAACGACGAGTGTAGA |
| Cub-staple-56 | AACAGTAAAGAGAACAGTACCTTTTACAAATCGCGCAGAGAA |
| Cub-staple-57 | CCGGAACGGTCATAGTAGCGCGTTTTCACGGCTGTCTTTCCC |
| Cub-staple-58 | GCTATTACTTTTTTCATTTAACAATTTCCAGCTGGCGAAAAA |
| Cub-staple-59 | TAACCCTGTAAAATCTCCAAAAAAAAGGATTTCTTAAACACA |
| Cub-staple-60 | CTGGCTCAAATTGGGACGAGAAACACCACAATAGTAGTAGCA |
| Cub-staple-61 | TCGGTTGGAACCCTCGGAATACCCAAAAAATACATACATAAA |
| Cub-staple-62 | CTTTTGATCCTCATGCCTTGATATTCACTTGAGGCAAAAGAA |
| Cub-staple-63 | TAGCTATATAATAACATATATTTTAAATAGACAGTCAAATAA |
| Cub-staple-64 | TAAATGCGAACCGCCACCCTCAGAGCCAACTGAGTTTCGTTG |
| Cub-staple-65 | ACCAACGCAGATGAAGAAACCACCAGAATTTAAAATAACGTC |
| Cub-staple-66 | CCAAAGATCACCGTGACCAACTTTGAAACAAGAGTAATCTCG |
| Cub-staple-67 | TACGAGCTGCTATTCCTCCCGACTTGCGTTATCCGGAATCAT |
| Cub-staple-68 | CATTTTCCGCAAATCAGATATAGAAGGCGGAGGTTTTGAAGG |
| Cub-staple-69 | ATCGGTGCGGAAGCTGTGTGAAATTGTTCCGAGCTCCAAGCT |
| Cub-staple-70 | GGTAATACGTTTACGTAAGAGCAACACTACGTTAGTAAATCT |
| Cub-staple-71 | ATTTGCCAAAATAGACCGTCTATCAAATGGAGCGGAATTAGA |

| | |
|---|---|
| Cub-staple-72 | TTTAGCGCCACCAGACCCTCAGAGCCGCGAGCCGCGCCACCA |
| Cub-staple-73 | TATTTTTTTGCCCCCACCGCCTGGCCCTCTTTTCACATATGT |
| Cub-staple-74 | ATTTTTATACCAAATCAGAGCATAAAGCGCAAGGTGGCAACA |
| Cub-staple-75 | ACGATCTGCCGACATGCTTTCGAGGTGACTCCAAATTGCGAA |
| Cub-staple-76 | AATCAATATTACCCTGGCTGACCTTCATGAGGACATTAAAGG |
| Cub-staple-77 | AATAATAAACCGTTGTGAGAAAGGCCGGGCAATGCACCGAGG |
| Cub-staple-78 | TGGGCGCCCCGTCGTCCTGTAGCCAGCTTCCCGGAAACCAGG |
| Cub-staple-79 | AACAAAATTTATCAGACGCTGAGAAGAGCTTAGAAAATCGTC |
| Cub-staple-80 | TCAAAGGGAGATAGCCCTTATAAATCAACCCAGAGGGTAATT |
| Cub-staple-81 | TACAAATTACCTGAATACCAAGTTACAATCGGGAGTTCGAGC |
| Cub-staple-82 | AGGCCGCGGACTAAGGAGTGTACTGGTAAATGCCCCCTGCAC |
| Cub-staple-83 | AATTACGTTTAAACTATTCATTGAATCCAGACTGGCAGAGGG |
| Cub-staple-84 | GCAAGGCCTGCAGGTCGACTAATTTTCCTCGGGGATGTGCT |
| Cub-staple-85 | GCTTTGATTTTGCGAGGCTTGCAGGGAGAACTATTTCGGAAC |
| Cub-staple-86 | GTCGAGAGCCACCCTCAGACCTAAATTTCACGGATAAGTGCC |
| Cub-staple-87 | TTGCGTATTTCCAGTAATTGCGTTGCGCAGATTAAATTTTTG |
| Cub-staple-88 | GTAACAAATCGTAACCGTGACCAGACCGGAAAATGTGAGCGA |
| Cub-staple-89 | AATCAGGATTTTGTAATTGCTCCTTTTGAAGCAATCGAGCT |
| Cub-staple-90 | TGAATTACAAAAGGTCATATGGTTTACCATTGACAAGAACCG |
| Cub-staple-91 | CTCCGGCTAATTACTAAATAAGAATAAAAATGGTTTAATTTC |
| Cub-staple-92 | GACCATTCGGTGTCATGTTTTAAATATGGAATCAGTTGAGAT |
| Cub-staple-93 | AAATAAATGATACAAGACTTTTTCATGACCTAAAACGAAAAA |
| Cub-staple-94 | ATAGCCCGCGAAAACAGCCTTTACAGAGCCTGAACAAAGTTA |
| Cub-staple-95 | TGCCCGCTTGGGCGTCAGAAAAGCCCCAGTTAAAATTCGCGT |
| Cub-staple-96 | TGCATGCGATTAAGCTTCGCTATTACGCATTTCCACACAACA |
| Cub-staple-97 | ACAATAGCTTCTGAATTATTTGCACGTAGGTTTAAAAAGTAATTCTGTCCAGAC |
| Cub-staple-98 | TAGTGAATTAATTAAATGGAAACAGTACTTCTGTATCCTTGAAAACATAGCGAT |
| Cub-staple-99 | AGAACCATCAGACTGCCCCCTTATTAGCAACCAGACACCCTCAGAACCGCCACC |
| Cub-staple-100 | AGAGGTCTCTTTACGCATCAAAAAGATTTTTTAATACTCCAACAGGTCAGGATT |
| Cub-staple-101 | TAGTTGCAAAGTTTACAACTTTCAACAGAAAGGAAAGGAGCCTTTAATTGTATC |
| Cub-staple-102 | GATATTCAGAGCAAAAGCCCTTTTTAAGGAAGGAACTGAGTAATGTGTAGGTAA |
| Cub-staple-103 | TGATTATCTAACGAAAATAAACAGCCATTTTGTTGTTTGAGTAACATTATCAT |
| Cub-staple-104 | CAAATGCAGGCATACAGACGACGATAAAGTTTTGCATAGCGTCCAATACTGCGG |
| Cub-staple-105 | TTAAATCCTCACATTCGGGAAACCTGTCCGGGGAGGAAGATTGTATAAGCAAAT |
| Cub-staple-106 | TTAGGAAGCTCAACTGGAAGTTTCATTCAGTAGATAAATCTACGTTAATAAAAC |
| Cub-staple-107 | CTATTATGTCGCTGGGATCGTCACCCTCCAACGGCTTAACGGGGTCAGTGCCTT |
| Cub-staple-108 | CATCGATAGTACAATCGAAATCCGCGACAGACGGTAATTAGAGCCAGCAAAATC |
| Cub-staple-109 | GATATTCAGAAAATGCGACATTCAACCGTTATTCAGATGAACGGTGTACAGACC |
| Cub-staple-110 | TTAACATTTGCCCTGCTTGAGATGGTTTTGCGATTTGTTTAGCTATATTTTCAT |
| Cub-staple-111 | TTTCAATTCTTACCATTGAGAATCGCCAAGGCATTAAACAATAACGGATTCGCC |

| | |
|---|---|
| Cub-staple-112 | CAAAGCGCTGGCCTGATTCTCCGTGGGACACGTTGCAGTATCGGCCTCAGGAAG |
| Cub-staple-113 | GAGCGCTGCAAAATGGTTGAGTGTTGTTCGTGGACCATAAAAACAGGGAAGCGC |
| Cub-staple-114 | GGAATCATTAGGTTAATCCAATCGCAAGTTTTAGTTGAAATACCGACCGTGTGA |
| Cub-staple-115 | TATAAAATAAAGCCAACATTATGACCCTACGCAAGCATGATTAAGACTCCTTAT |
| Cub-staple-116 | CTACAACATTAGGATATAAGTATAGCCCAGTACCGCATTTTCAGGGATAGCAAG |
| Cub-staple-117 | GATTAGTATGTAGAACCAAGTACCGCACATCGTAGGTATTCTAAGAACGCGAGG |
| Cub-staple-118 | TACACTAACGATTGTAAAGCCAGAATGGAGCGTCATCCATTAAACGGGTAAAAT |
| Cub-staple-119 | TACGAGCCGGGCCTTTGGGTAACGCCAGGCCAGTGCGAATTCGTAATCATGGTC |
| Cub-staple-120 | CGCTGGTGAGAGATCTGGAGCAAACAAGTGTCAATCCAGTGAGACGGGCAACAG |

In order to attach one gold nanoparticle inside the cubic DNA frame, add (SEQ ID NO: 294)
'TCACTTCATACTCTACGTTGTTGTTGTTGTTGTTGTTGTTGTT' in front of the certain sequences (e.g., Cub-staple-97, 105, 106, 107, 110, 111, 118, and 120) with PAGE purification.

DNA sticky end for cube-1 (CR, m = 12, l = 8, n = 12) (SEQ ID NOs: 295-318, respectively, top to bottom):

ACCAGTAGCACCCCGTAATCAGTAGCATTATACATGTTACTTTTTTTTTTTTATCCGTTA

ATTAGACGGGAGGAGAGATAACCCACTTGATGGGGAACAAGATTTTTTTTTTTTATCCGTTA

AGGCGCATAGGCAAATCAACGTAACAGTTTATTGAGGGAAGGTTTTTTTTTTTTATCCGTTA

CCCAATAGGAACGCATTCCACAGACACTGAGACGTGTATCACTTTTTTTTTTTTATCCGTTA

AGCTTAGATTAAAAATCATAGGTCTGACAAACAAATATATGTTTTTTTTTTTTATCCGTTA

ACGTAATGCCACCATCTTTGACCCCCCAGGAGGAGTCTCTGATTTTTTTTTTTTATCCGTTA

CTCAGAGCCACCAGCCGCCGCCAGCAGAATCAAATCTTTTCATTTTTTTTTTTTATCCGTTA

ATAGCTGTTTCCATAAAGTGTAAAGCTGTTGGGCCAGTCACGTTTTTTTTTTTTATCCGTTA

GAGTAACAGTGCCATGAAAGTATTAACACGCATAAAGACAGCTTTTTTTTTTTTATCCGTTA

AGATTCAAAAGGCTAGCTGATAAATTATTGAGTAGCAGATAGTTTTTTTTTTTTATCCGTTA

GAACTAACGGAATTCAACTAATGCAGATTGCTGCAGTTGATTTTTTTTTTTTTATCCGTTA

TTTGCGGAACAATGGCAATTCATCAATTATCCTATCCCAATCTTTTTTTTTTTTATCCGTTA

TACGCAGTATGTAAAGACACCACGGAAGAATTATTTTGCGGGTTTTTTTTTTTTATCCGTTA

TGATTGCTTTGAGCAAAAGAAGATGATATCATACAACGCCAATTTTTTTTTTTTATCCGTTA

TTGGGGCGCGAGATCATACAGGCAAGTGCTCATACTTTAATCTTTTTTTTTTTTATCCGTTA

CTGATTGCCCTTAGCAGGCGAAAATCCCGGAGAATGAACGGTTTTTTTTTTTTATCCGTTA

ATCGCACTCCAGCCATTCAGGCTGCGGCCATCAGCGGATTGATTTTTTTTTTTTATCCGTTA

AATCGTCATAAAAGTTCAGAAAACGAATAACGCATAGCGAGATTTTTTTTTTTTATCCGTTA

CGTTTTAGCGAATTGCACCCAGCTACATCCCATGAACAAGCATTTTTTTTTTTTATCCGTTA

GACGACAATAAACTGAACAAGAAAAAATCCTGAAATAAAGAATTTTTTTTTTTTATCCGTTA

TAAATAAGGCGTTAGAAAAAGCCTGTACTACCTACGCGAGAATTTTTTTTTTTTATCCGTTA

GGTTTATCAGCTATGACAACAACCATTCATAGTGGAGTGAGATTTTTTTTTTTTATCCGTTA

```
ATTTAAATTGTATTTTTAACCAATAGGGTGCCTCTGCATTAATTTTTTTTTTTTATCCGTTA

AGAGAGTACCTTCGGATGGCTTAGAGGACCATAAGCCCGAAATTTTTTTTTTTTATCCGTTA
```

DNA sticky end for cube-2 (CB, m = 12, l = 8, n = 12) (SEQ ID NOs: 319-342, respectively, top to bottom):

```
ACCAGTAGCACCCCGTAATCAGTAGCATTATACATGTTACTTTTTTTTTTTTTTAACGGAT

ATTAGACGGGAGGAGAGATAACCCACTTGATGGGAACAAGATTTTTTTTTTTTTAACGGAT

AGGCGCATAGGCAAATCAACGTAACAGTTTATTGAGGGAAGGTTTTTTTTTTTTTAACGGAT

CCCAATAGGAACGCATTCCACAGACACTGAGACGTGTATCACTTTTTTTTTTTTTAACGGAT

AGCTTAGATTAAAAATCATAGGTCTGACAAACAAATATATGTTTTTTTTTTTTTAACGGAT

ACGTAATGCCACCATCTTTGACCCCCCAGGAGGAGTCTCTGATTTTTTTTTTTTTAACGGAT

CTCAGAGCCACCAGCCGCCGCCAGCAGAATCAAATCTTTTCATTTTTTTTTTTTTAACGGAT

ATAGCTGTTTCCATAAAGTGTAAAGCTGTTGGGCCAGTCACGTTTTTTTTTTTTTAACGGAT

GAGTAACAGTGCCATGAAAGTATTAACACGCATAAAGACAGCTTTTTTTTTTTTTAACGGAT

AGATTCAAAAGGCTAGCTGATAAATTATTGAGTAGCAGATAGTTTTTTTTTTTTTAACGGAT

GAACTAACGGAATTCAACTAATGCAGATTGCTGCAGTTGATTTTTTTTTTTTTTAACGGAT

TTTGCGGAACAATGGCAATTCATCAATTATCCTATCCCAATCTTTTTTTTTTTTTAACGGAT

TACGCAGTATGTAAAGACACCACGGAAGAATTATTTTGCGGGTTTTTTTTTTTTTAACGGAT

TGATTGCTTTGAGCAAAAGAAGATGATATCATACAACGCCAATTTTTTTTTTTTTAACGGAT

TTGGGGCGCGAGATCATACAGGCAAGTGCTCATACTTTAATCTTTTTTTTTTTTTAACGGAT

CTGATTGCCCTTAGCAGGCGAAAATCCCGGAGAATGAACGGTTTTTTTTTTTTTTAACGGAT

ATCGCACTCCAGCCATTCAGGCTGCGGCCATCAGCGGATTGATTTTTTTTTTTTTAACGGAT

AATCGTCATAAAAGTTCAGAAAACGAATAACGCATAGCGAGATTTTTTTTTTTTTAACGGAT

CGTTTTAGCGAATTGCACCCAGCTACATCCCATGAACAAGCATTTTTTTTTTTTTAACGGAT

GACGACAATAAACTGAACAAGAAAAAATCCTGAAATAAGAATTTTTTTTTTTTTAACGGAT

TAAATAAGGCGTTAGAAAAAGCCTGTACTACCTACGCGAGAATTTTTTTTTTTTTAACGGAT

GGTTTATCAGCTATGACAACAACCATTCATAGTGGAGTGAGATTTTTTTTTTTTTAACGGAT

ATTTAAATTGTATTTTTAACCAATAGGGTGCCTCTGCATTAATTTTTTTTTTTTTAACGGAT

AGAGAGTACCTTCGGATGGCTTAGAGGACCATAAGCCCGAAATTTTTTTTTTTTTAACGGAT
```

Tetrahedral DNA staple strands (SEQ ID NOs: 343-502, respectively, top to bottom):

| | |
|---|---|
| tet-staple-1 | ATTGTGTAGCCGTCCCCGAACATACCGAACGAACCCAGC |
| tet-staple-2 | ATTTGTATTGAGGACAACTCGGAAGATA |
| tet-staple-3 | AGGACAGATCTTGAGAATAACATAAAAAAACACCCGAAT |
| tet-staple-4 | ACGTAGCCGGAACGAGGCCCACAATGAACAATTTAATG |
| tet-staple-5 | CAGGCGCATACCGCGACCTGCTCCACCAATAAGGGAGAACCTAAAA |
| tet-staple-6 | CTCATCTAAAATACAAAGAAACCACCAGAAGGAGCGGAATT |
| tet-staple-7 | GCTGACGCGCATTAGAAAAGTTTGAGTCAACCTAAAAGGCTG |
| tet-staple-8 | AGGAAGTTTCCATTAAACGGGTTTGACCCAACGGAG |
| tet-staple-9 | AAAATGAAAATAGCAGCCTTTGGGTAATTGAGC |
| tet-staple-10 | GGAACTTCATCAAGAGTAATGA |

| | |
|---|---|
| tet-staple-11 | CATTTTTCCTTTGAATAGATTAAAATATCTTTAGTGAACCTTGAAAAA |
| tet-staple-12 | AACGTAATGCCACTACGAATACACCTGATAA |
| tet-staple-13 | TTTACAAACAATTCGATTTAGAAGTATTAGAC |
| tet-staple-14 | GCTAATATCAGACGAAGCCCTTTTTAAGAAA |
| tet-staple-15 | TGAAAATAGCAATAGCTCCAGAAGAAGACTC |
| tet-staple-16 | GATTAGCGAAATCGAAAGAGGCAAAAGAAGGCACAACATTAT |
| tet-staple-17 | ATGGTTAAGCTGTTACTGTGTACAGAC |
| tet-staple-18 | ATAACGTCACCTTGCGAGCACTAACAAAGAGCAAGAGCAATA |
| tet-staple-19 | TCAACGCTGAGAGCCAGACCAGCATATTAAAGCGG |
| tet-staple-20 | CTTATTAATTAGTCAGTCAGAACAGAGACAAGAACCGGATATTCATTACCCAA |
| tet-staple-21 | TCTAAAGATTAAAAGTTATTAATTTTACTACTAATA |
| tet-staple-22 | AAACAAATATCAAACCCGGTTATCAATACATTCATCGCTAAAACA |
| tet-staple-23 | GACAATATTTTTGAATGGCTCGCAGTATGTTAGCAAACG |
| tet-staple-24 | CGCGAACCATGATTGAAACCGAGGAAACAACA |
| tet-staple-25 | AAACAGACAGTGCCATATCTGGTCAGTTGGCAA |
| tet-staple-26 | TAATTTGATTTACGACTCATCCGCCGCCAGCATTGGAAA |
| tet-staple-27 | AACGAGCAATCAATGGGTATTGTTGAGG |
| tet-staple-28 | TCAACGTAACAAAGCTGCACGATTTTTTGTTTAACGT |
| tet-staple-29 | GTGAATAGGTTTAATTATACCAGTCAGGGAACTAACCAC |
| tet-staple-30 | TTGTTATCCCAATCCAAAGGAATACGGAACAAGCCACC |
| tet-staple-31 | TTAGTTGTCTAAGAGCGCCCAATAGCAAGCAAATCAGATA |
| tet-staple-32 | GCACCCAGCTACAATTTTTTTCGCTGAGGCTTGCAGGGAGTCATCGCCCACGCATAACCGATTTTTTTATCCTGAATCTTAC |
| tet-staple-33 | TAGTAAGAAGAAAAAGCCGTTTTTATTCTCCCGACTAACGAG |
| tet-staple-34 | TTGGATTGGGCTTGAGATAGGC |
| tet-staple-35 | AGGAATGTACCGCAGCATGTAGATAAGTCCTGAAAAGCGTCCAGTCTC |
| tet-staple-36 | ACCACGCGAGGCGTTTTGCCTTAACAGAGCC |
| tet-staple-37 | TTATCATTCCAAGAACAATCGGCTGTCTTTCC |
| tet-staple-38 | GATTCATCAGTTACACTATCATAACCCTCGTT |
| tet-staple-39 | ATTTTACGAGGCATAGTATAGCCCACCACCG |
| tet-staple-40 | ATCCTACCAGTTACGGGAGGTTTTGAAAGCGAACTTCATCGT |
| tet-staple-41 | TGTTCAGCTAATGCAGAACGCGCCTGTTTATATGA |
| tet-staple-42 | GCGTTTTCATCGGCATTTTCGGTCAAGAGCAGAGATTTATAAGAATCATTCA |
| tet-staple-43 | TTTTCACGTTCCAGTCAAGAAAAATAAATAACGCCAGCCATC |
| tet-staple-44 | TACTTAAAGCCAGAATGACAGGAGAAACCAACATT |
| tet-staple-45 | GAACCGCCCCTCAGACATTATTGGCTCATTTCAACTTTAATCATTGTGAATTAC |
| tet-staple-46 | TGAATTTCCAGAGCGAGAACAAGCAATCACTATCCC |
| tet-staple-47 | GCGATACATGGCTTTTGCAACAATAGAAACCGTCTTTCATCAAGA |
| tet-staple-48 | ACCCTCACAGAGCCCCTTATTAGCGTTTAAAG |
| tet-staple-49 | ACCACCAACTAATCAAAATCACCGGAACGAGCCGCATAAAACACG |
| tet-staple-50 | CAGGTCAATCCTCAAGGAGTGTACTGGTAATAAGTTT |

```
tet-staple-51  GAATGACATCACCGAACGTCATCTGGCCAACAGAGAAAC
tet-staple-52  TTTAAACCATTTGGATTACCACCTTCTG
tet-staple-53  ACTTCAAAACAGGTGGATGGCTTAGAGCTGTTTTATTCC
tet-staple-54  CGCGACTATTATAGTCACAGTTGAAATATGCTGGCAGA
tet-staple-55  GAGCTTCAAGGCAAAAATCAGGTCTAACGAGTGCTGTAGGACCAGT
tet-staple-56  GCGTCCAATAGCGATCAAGTTTGCCTTTAGCGTCAGACTGT
tet-staple-57  AGAGTACCTTTAATTGCTTTTGAATCGCCATATTTAACAACGGCCAA
tet-staple-58  CCAGACCTGAATATATCGATAGCAGCATTGCCAGAGAGCGAA
tet-staple-59  CAGACGACGATAAAAACCAAAATACTGCCAAATGC
tet-staple-60  ATTGCGGAAGCAAACTCCATAT
tet-staple-61  AGTAGCGGCCGGATCACCGAGGTAAATATTGACGTGTCACAAAGACAC
tet-staple-62  GAAGAGGCTTTTGCAAAGTTTAGAAAAACGA
tet-staple-63  AATCACCAGTAGCACCGAATTAGAGCCAGCAA
tet-staple-64  GAAGTTTCATTCAATAACCTGTTTAGCTATA
tet-staple-65  CAAAGATACATTTCGCAGGTGGCAGCAAAGA
tet-staple-66  TGAATTCATAAATGGTAATAGTAAAATAGAAGTTCCGTAATC
tet-staple-67  ATTTTCTGCGTTACCCTGTTTTAATTC
tet-staple-68  AGCATTAGTTTATTTGAAATTATTCATATTTAGTTTAGTAGT
tet-staple-69  TGGGCAACATATAAAAGATAGAACTTAGCAAGACA
tet-staple-70  ATTAGCATTTACATAACTAAATTTTTGCCAGGATTAG
tet-staple-71  CACGGAAGGGACATCCAATGAAACCAATAGTAAAGG
tet-staple-72  GCAATCAATAGAAAATTGAGGGAACTTGAGCAGTTCAGCTGGATA
tet-staple-73  AGAAAATACATACATAGCGTAAGAATACGTGGCA
tet-staple-74  CAATCGTCTGAAATGGATTAAAATTAAGCAATAAAGCCT
tet-staple-75  TTCACCAAGGCAAGTCAATTCTACTAATGACC
tet-staple-76  ACCTGAAAAAGGTGTTTACCAGCGCCAAAGACA
tet-staple-77  CACGACGTTACATCTTTCAATCGGAACGAGGGTAGCAAT
tet-staple-78  TAACGCCCGGATTCCGCGCAGTACAGAG
tet-staple-79  GTCATAGCCGGAAGGCCCTCATAGTTAGACGTTAGGGAG
tet-staple-80  TTCGCATGCCTGCAGGTTTTCAGCTAAATGACGCTTTT
tet-staple-81  TTGTTATCCTTACGACGGCCAGTGCAAGGAACTGTCGTCCTCAGCA
tet-staple-82  GCTATTAAGGCAAAATTAATTACATTTAACAATTTCATTTGAATT
tet-staple-83  AATTCCATCTAAAGTAGAAGATGATGAGCGCAACTGGCTCAC
tet-staple-84  ACCGCTTCTGGTGCCGGAAACCCGCCAGCAGTTGGG
tet-staple-85  ACTACAACGCCTGTAGCATTCCGTATGGGATTTT
tet-staple-86  ACGACACAACATACGAGCTGT
tet-staple-87  TCAAGATTATTCAGGGAGAAAGGTTTAACGTCAGTGAATAAATCCTGA
tet-staple-88  AAAGCGCCATTCGCCATGTGCGGGTCCCAGT
tet-staple-89  TACCAAGTTACAAAATGCCTGATTGCTTTGAA
```

| | |
|---|---|
| tet-staple-90 | GCTAAACAACTTAATCTCCAAAAAAAAGGCT |
| tet-staple-91 | TGATAATAATTTTTTCATTTATCAACAATGA |
| tet-staple-92 | TACCTTTTGTAAAGGGAAGGGCGATCGTCAGGCTAACAAACA |
| tet-staple-93 | GAAGAATAGACAAGCTTCTGTGTGAAA |
| tet-staple-94 | TCTTAATTATACTTCATGAATATACAGCTAAAGGAATGAATT |
| tet-staple-95 | CCATGATGGCAATTCATCAACGGCAGGCGAAAAAC |
| tet-staple-96 | CAACAACTAAAGGCATTTTCTACAGACACATAAAGTGTAAAGCCTGGGGTGCC |
| tet-staple-97 | TTGTTTGACAGCATTACCTGAGCAAATTAATAACAG |
| tet-staple-98 | ATATGGAAGGGTTAGAAGATTTTCACAATAAAGGGTTTCCTCTTC |
| tet-staple-99 | ATCATATTCCTGATGGACTAAAGACTTTTTC |
| tet-staple-100 | GCGGGATTGCGCCGGCTTGCTTTCGAGGTTGC |
| tet-staple-101 | GCTTTGATATCAGATATCAAAATTATTTGCACG |
| tet-staple-102 | ACAGCTGATAGCCCCTCAGAGATAAAGTACCGACAAACA |
| tet-staple-103 | TTTTCACACCGTACGCCACCCAAGTAAT |
| tet-staple-104 | GTTCCGAGTTGTTCTCAAAATCATAGGTGTTGGGTCGAG |
| tet-staple-105 | GGCAGTTGCAGCAAGCGAAGAACGTATATAAGTAATTT |
| tet-staple-106 | ATAAATCAAAATTCACCGCCTGGCCCAAATATAACCTCCTCGAGCC |
| tet-staple-107 | GGCCAACAATTGCGGTACCGTAACACTGAGTTTCGTCACCAGTAC |
| tet-staple-108 | AGCCCGACTACCTTTTTTTCAGGGATACAGTCGGGAAAGAAT |
| tet-staple-109 | AATGAGTGAGCTAACTCACATTGCGCGGGGTTTTC |
| tet-staple-110 | GACGCTGAGAAGAGTCAATAGTTAAATGCTGATG |
| tet-staple-111 | GAGAGATAGGGTTGAGTAATC |
| tet-staple-112 | AATAGGCGCCACCGGAATAGCCAGGCGGATAAGTTATTATTAATGCCC |
| tet-staple-113 | CATTTGCGCTCACTGCCTGCATTAACGGGCA |
| tet-staple-114 | CGCCACCCTCAGAACCTCAGGAGGTTTAGTAC |
| tet-staple-115 | CAAATCCAATCGTTGAAATACCGACCGTGTG |
| tet-staple-116 | AAATTCTGACCTAAATTACACCGGCTTACCA |
| tet-staple-117 | ATAAGTATTGCCCCCTGTCGTGCCAGCCGCTTTCGCAAGCCC |
| tet-staple-118 | ATCACTTTTTCTGAGAGAAAATCCCTT |
| tet-staple-119 | GCCTGTTTCGGAACCGCCGTCGAGAGGTTTAGTTAAGAAAAA |
| tet-staple-120 | AAGACAGTGCCCGTATAAAAGGTATCAGAACAACC |
| tet-staple-121 | CGCTCAACAGTAGGGCAATTTCCTTTTGATAAGAGGTCAGTACGGTGTCTG |
| tet-staple-122 | GTATAAACCAACATCTATATGGAATTTACAGTTTGGAACAAGAGTCCACTATT |
| tet-staple-123 | CCTGCCTAGAGAATCCACCACCCTCATTATGTTGAT |
| tet-staple-124 | GTTCTGAAACATGAAAGCTCAGTAGTGTATCCAGTGAGATGAATC |
| tet-staple-125 | AACGGGGTCAGTGCCAGACGACGACAATAAACAA |
| tet-staple-126 | AGGCAGAACAAATTAATCATAATTACTATTTC |
| tet-staple-127 | TCTGTCCTTGAGTAAGGCTGAGACTCCTCAAGA |
| tet-staple-128 | ACCTTGCGCATTAAGCCAGCTAATCACCATCAATACAGG |
| tet-staple-129 | ATCAATAAGCTCATTTCGCGTCAACCGT |

```
tet-staple-130  CTTTTTTAATGGAAACAGCAGCCAGCTTTCCGG tet-staple-131  AAGAACGTGGACTCCAACCATAGCGATAGCTTAGATT tet-staple-132  GGCGAAAGATTTTACACCGAGTAAAAGAAATACTTCCTT tet-staple-133  GTCTTCCCTTAGAATCCCTATCGGCTTTGATTAGGTAA tet-staple-134  GGAAGATGGTGTAGCGTGGGAACAAACGGCGGATTGACCG tet-staple-135  AACAGGCATCACGCAAAATGTGAGCGAATCTGCCAGGAGCTA tet-staple-136  TGTCAGGCCGATTAAAGGAACC tet-staple-137  CCGTCGTCCTGTAATTTTTGATATTTAAATTGTAGAGAATCTTGCCTG tet-staple-138  CTCATGGGCGCATCGTACAGTATCGTGAATA tet-staple-139  ACGCCATCAAAAATAATTTTTAACCAATAGGA tet-staple-140  CTGAGTAGAAGATGGAAATACCTACATTTTGACG tet-staple-141  GCTTTGCAACAGGAAAACCAAAAAATAAAAA tet-staple-142  AAATTCTTCTGTATGAGGGGACGACGAACCGTGCGTAACAAC tet-staple-143  AGAGCATAAAGCTAAATCGGTTGTAACGCTCAACTCAAATTGAAAAGTCAAAG tet-staple-144  TTTGCGAGCAAACAAAACGTTAATATTATATTACCGAATACT tet-staple-145  AACTCTACAAAGGCTATTGATATTCTGGCCTGATT tet-staple-146  TCATATGTACCCCGGGGTTAACACCGCCTGCAAGGTGAGGCGGTCAGTGGCAGAAAAGCCCCAAAAACAGGAAGATTGTAGTAA tet-staple-147  TTTTTAGTAATGTGTAGTAATGTGAGGCGACAGGAACGGTACGCCAGAATCCTG tet-staple-148  AGAGTCTACAGTCATTCATCAACATTAACATTGTTA tet-staple-149  TCAGATGAACGGTAATCTAAGCAATTAAATCTATGTGAGGCCTCA tet-staple-150  AGATTCACGCAAGGCATTATGACCCTGTCCAG tet-staple-151  GCCGGAGGGGGAGAAGCCTTTATTTCAAAAAGGGTTTGTAGCGTC tet-staple-152  TCTAGCTTGAGAGATAGCATGTCAA tet-staple-153  AAACACCAGTGCAAAATAAACAGCCTGCAGATTACGTTACACCAGA tet-staple-154  GAACAACTAAATATTATCCCTGACGAG tet-staple-155  AGAGCGGTTAATCGTCGCTATTATCCAGAATTAACCGGAGAAAG tet-staple-156  CCAGGTAATAATTAATTTATCATAGAATC tet-staple-157  CGTAATGAACTCAATATTTTCATCGCCCAGAATACCCAAAAGAACTGGTGATAGCTTAACTGCAG tet-staple-158  CGTAATGAACTCAATATTTTAATAAAATAAACATCCAATAAATCATACGTCACACCTCAACATTA tet-staple-159  CGTAATGAACTCAATATTTTGCGAAAGGAACAGCTTGATACCGATAGTCGTCACCTTTCCAGCGTA tet-staple-160  CGTAATGAACTCAATATTTTAGTAATAATTTAGTATCATATGCGTTATGGCATTTGGCTTAGCTGA
Staple sequences from 157 to 160 (PAGE purified) are the ones to bind with 10 nm
AuNP inside.

DNA sticky ends for tetrahedron (TR, m = 22, l = 8, n = 22, PAGE purified) (SEQ ID
                       NOs: 503-526, respectively, top to bottom):

AGGAAGAGTTTTTTTTTTTTTTTTTTTTGCGCGAAACAAAGTACCCAGCGATTATACCAA

AGGAAGAGTTTTTTTTTTTTTTTTTTTTTTACCGAACTGACCAACTGGTCAATCATAAGGGA

AGGAAGAGTTTTTTTTTTTTTTTTTTTTTTATCAACAGTTGAAAGGAATTGAGGAATCAA

AGGAAGAGTTTTTTTTTTTTTTTTTTTTTTAGTAAGCAGATAGCCGAACAAAGTTAATCTTACGAGATAACGCAGACTTGAAAG

AGGAAGAGTTTTTTTTTTTTTTTTTTTTTTAGAAGGCTTATCCGGTATCTATTTTCAACGCT

AGGAAGAGTTTTTTTTTTTTTTTTTTTTCTTATGCGATTTTAAGAACTACAGGTAGAAA
```

```
AGGAAGAGTTTTTTTTTTTTTTTTTTTATTCACAAACAAATAAGACGATTGGCCTTGAT

AGGAAGAGTTTTTTTTTTTTTTTTTTTTACCCTCAGAACCGCCACTCCCTCAGAGCCGCC

AGGAAGAGTTTTTTTTTTTTTTTTTTTTTCATTGAATCCCCCTGGAATCGTCATAAATA

AGGAAGAGTTTTTTTTTTTTTTTTTTTTTAAGATTAAGAGGAAGCAGCGGATTGCATCAAA

AGGAAGAGTTTTTTTTTTTTTTTTTTTTTAAAGGGCGACATTCAACCGATTGAGGCATA

AGGAAGAGTTTTTTTTTTTTTTTTTTTTTCATTTGGGGCGCGAGCTGAAAAAATGGTCCATATAAGAAGCAACCGAAAG

AGGAAGAGTTTTTTTTTTTTTTTTTTTTGCTGCAAGGCGATTATGGCGAAAGGGGATG

AGGAAGAGTTTTTTTTTTTTTTTTTTTTTCCGAGCTCGAATTCGTAGAGGATCCCCGGGTA

AGGAAGAGTTTTTTTTTTTTTTTTTTTTTAAAACAGAAATAAAGAAATTGCGTACCTA

AGGAAGAGTTTTTTTTTTTTTTTTTTTCCAAAAGGAGCCTTTAATTGTATCGGCGTTGAATCAACAGCGACTCTAATCATG

AGGAAGAGTTTTTTTTTTTTTTTTTTTTATTGGGCGCCAGGGTGGAGAGGCGGTTTGCGT

AGGAAGAGTTTTTTTTTTTTTTTTTTTTGGCGAAAATCCTGTTTCTGGTTTGCCCCAGCA

AGGAAGAGTTTTTTTTTTTTTTTTTTTTGAAGGATTAGGATTAGCGGGGTTTTGTATT

AGGAAGAGTTTTTTTTTTTTTTTTTTTATAAATAAGGCGTTAAATAAGAATAATAATGGTCAAGACAGTCCACGGATGGTG

AGGAAGAGTTTTTTTTTTTTTTTTTTTTTAATGGGATAGGTCACGTTCGCACTCTACATAA

AGGAAGAGTTTTTTTTTTTTTTTTTTTAGAAGTGTTTTATAATCAAACATCACTTGC

AGGAAGAGTTTTTTTTTTTTTTTTTTTAGAGGGTAGCTATTTTGATAAATTAATGCCGG

AGGAAGAGTTTTTTTTTTTTTTTTTTTTTAAATGCAATGCCTGAGAACCCTCATATATTTT
```

DNA sticky end for tetrahedron (TB, m = 22, l = 8, n = 22, PAGE purified) (SEQ ID NOs: 527-550, respectively, top to bottom):

```
CTCTTCCTTTTTTTTTTTTTTTTTTTTTGCGCGAAACAAAGTACCCAGCGATTATACCAA

CTCTTCCTTTTTTTTTTTTTTTTTTTTTTACCGAACTGACCAACTGGTCAATCATAAGGGA

CTCTTCCTTTTTTTTTTTTTTTTTTTTTTATCAACAGTTGAAAGGAATTGAGGAATCAA

CTCTTCCTTTTTTTTTTTTTTTTTTTTTAGTAAGCAGATAGCCGAACAAAGTTAATCTTACGAGATAACGCAGACTTGAAAG

CTCTTCCTTTTTTTTTTTTTTTTTTTTTTAGAAGGCTTATCCGGTATCTATTTTCAACGCT

CTCTTCCTTTTTTTTTTTTTTTTTTTTCTTATGCGATTTTAAGAACTACAGGTAGAAA

CTCTTCCTTTTTTTTTTTTTTTTTTTTATTCACAAACAAATAAGACGATTGGCCTTGAT

CTCTTCCTTTTTTTTTTTTTTTTTTTTTACCCTCAGAACCGCCACTCCCTCAGAGCCGCC

CTCTTCCTTTTTTTTTTTTTTTTTTTTTCATTGAATCCCCCTGGAATCGTCATAAATA

CTCTTCCTTTTTTTTTTTTTTTTTTTTTAAGATTAAGAGGAAGCAGCGGATTGCATCAAA

CTCTTCCTTTTTTTTTTTTTTTTTTTTTAAAGGGCGACATTCAACCGATTGAGGCATA

CTCTTCCTTTTTTTTTTTTTTTTTTTTTTCATTTGGGGCGCGAGCTGAAAAAATGGTCCATATAAGAAGCAACCGAAAG

CTCTTCCTTTTTTTTTTTTTTTTTTTTGCTGCAAGGCGATTATGGCGAAAGGGGATG

CTCTTCCTTTTTTTTTTTTTTTTTTTTTCCGAGCTCGAATTCGTAGAGGATCCCCGGGTA

CTCTTCCTTTTTTTTTTTTTTTTTTTTTAAAACAGAAATAAAGAAATTGCGTACCTA

CTCTTCCTTTTTTTTTTTTTTTTTTTCCAAAAGGAGCCTTTAATTGTATCGGCGTTGAATCAACAGCGACTCTAATCATG

CTCTTCCTTTTTTTTTTTTTTTTTTTTATTGGGCGCCAGGGTGGAGAGGCGGTTTGCGT

CTCTTCCTTTTTTTTTTTTTTTTTTTTGGCGAAAATCCTGTTTCTGGTTTGCCCCAGCA

CTCTTCCTTTTTTTTTTTTTTTTTTTTGAAGGATTAGGATTAGCGGGGTTTTGTATT

CTCTTCCTTTTTTTTTTTTTTTTTTTATAAATAAGGCGTTAAATAAGAATAATAATGGTCAAGACAGTCCACGGATGGTG
```

```
CTCTTCCTTTTTTTTTTTTTTTTTTTTTTTTTAATGGGATAGGTCACGTTCGCACTCTACATAA

CTCTTCCTTTTTTTTTTTTTTTTTTTTTAGAAGTGTTTTTATAATCAAACATCACTTGC

CTCTTCCTTTTTTTTTTTTTTTTTTTTTAGAGGGTAGCTATTTTGATAAATTAATGCCGG

CTCTTCCTTTTTTTTTTTTTTTTTTTTTTAAATGCAATGCCTGAGAACCCTCATATATTTT
```

Modified DNA sequence attached on QDs (525, 605) and streptavidin for octahedral system
(HPLC purified) (SEQ ID NO: 551):
TATGAAGTGATGGATGAT-Biotin Modified DNA sequence attached on QDs (705) for octahedral system (HPLC purified) (SEQ
ID NO: 552):
TAGGTATGATGGTAGTAG-Biotin Modified DNA sequence attached on gold nanoparticle for octahedral system (HPLC
purified) (SEQ ID NO: 553):
TATGAAGTGATGGATGAT-SH Modified DNA sequence attached on gold nanoparticle for cubic system (HPLC purified)
(SEQ ID NO: 554):
GTAGAGTATGAAGTGATGGATGATGATGATGAT-SH Modified DNA sequence attached on gold nanoparticle for tetrahedral system (HPLC
purified) (SEQ ID NO: 555):
TATTGAGTTCATTACGTTTTTTTTTTTTTTTTTTTT-SH Modified DNA sequence attached on glucose oxidase for enzyme lattice (standard desalting)
SEQ ID NO: 556);
SH-TTTTTGTAGATGGTAGTATGGAT Modified DNA sequence attached on horseradish peroxidase for enzyme lattice (standard
desalting) (SEQ ID NO: 557):
SH-TTTTTGATTAGGTAGTGAAGTAT

Example 3: Valence-Programmable Nanoparticle Architectures

The disclosed subject matter provides a sphere-like DNA mesh structure (FIG. 51A) as symmetric frames, which can be programmed to exhibit different prescribed valence modes, and consequently, used to coordinate nanoparticles into pre-defined architectures. Moreover, specific positions and types of bonds can be fully prescribed. This approach can offer designability over different valence modes using the same underlying high-symmetry frame, including various subset symmetries, arbitrarily prescribed helix-like valence, and valence with different types of affinities. Accordingly, a variety of cluster architectures with single-type and multi-type nanoparticles can be rationally formed. Furthermore, using planar and spatial imaging and in situ scattering methods, such programmable frames can coordinate nanoparticles into a variety of corresponding cluster architectures possessing symmetric, helical, and site-specific nanoparticle organizations.

Self-assembly of DNA meshframe: The sequences of staple strands were designed by vHelix28. Staple strands (Integrated DNA Technologies) and M13mp18 scaffold (Bayou Biolabs) were mixed in 0.5×TE buffer (5 mM Tris, 1 mM EDTA, pH 8.0, supplemented with 10 mM MgCl$_2$). The solution was annealed from 80° C. to 60° C. at a cooling rate of 1 min/° C. and from 60° C. to 20° C. at a rate of 23 min/° C.

DNA modification of gold nanoparticles: The thiolated DNA strands (HPLC, Integrated DNA Technologies) were first reduced by tris(2-carboxyethyl) phosphine (TCEP) solution (Sigma-Aldrich) with a molar ratio of 1:100 in the water at 20° C. After the incubation for 1.5 h, the thiolated DNA strands were purified by removing small molecules with MicroSpin G-25 columns (GE Healthcare). Then the purified thiolated DNA strands were mixed with aqueous spherical gold nanoparticle (AuNP) solution (Ted Pella) with a ratio of 300:1 for 10 nm AuNPs, 700:1 for 15 nm AuNPs, 1000:1 for 20 nm AuNPs, and 2100:1 for 30 nm AuNPs. After 2 h of incubation at 20° C., 10× phosphate-buffered saline (PBS) (100 mM, pH 7.4) was added to bring the final solution to be 1×PBS (10 mM, pH 7.4). For 15 nm, 20 nm, and 30 nm AuNPs, 10% SDS was added to bring the final concentration to 0.01% SDS. After another 2 h of incubation, stepwise addition of salting buffer (1×PBS buffer with 2 M sodium chloride) increased the concentration of the sodium chloride to 0.3 M. The solution was aged for 12 h. To remove excess thiolated DNA strands, DNA-AuNP conjugates were washed four times by centrifuge. The supernatant was removed, and the fresh washing buffer (1×PBS buffer with 100 mM sodium chloride) was used to rinse and disperse the DNA-AuNP conjugates. The purified DNA-AuNP conjugates were quantified by measuring the absorbance at 520 nm on PerkinElmer Lambda 25 spectrophotometer.

Assembly and purification of AuNP clusters: DNA meshframe was mixed with AuNPs with the ratio of 3 N:1 (N is the valency number) in 0.5×TE (supplemented with 10 mM MgCl$_2$) and annealed from 50° C. to 20° C. for 12 h. The annealed samples and 1 kb DNA molecular weight marker (New England Biolabs) were loaded to a native 1.5% agarose gel with 0.5×SYBR Gold (running buffer: 0.5×TBE buffer, containing 44.5 mM Tris, 44.5 mM boric acid, and 1 mM EDTA, supplemented with 11 mM MgCl$_2$) and gel electrophoresis was performed at 60 volts for 3 h in an ice bath. Target bands were excised and cut into small pieces. The gel pieces were placed into Freeze 'N Squeeze columns (Bio-Rad Laboratories) and centrifuged at 3000×g for 5 min to obtain purified AuNP clusters. For spherical helix clusters, DNA mesh frame was first purified with agarose gel electrophoresis as described above and quantified by measuring the absorbance at 260 nm on PerkinElmer Lambda 35 spectrophotometer. Then, the purified DNA mesh-frame was mixed with AuNPs with a ratio of 3 N:1 and annealed from 37° C. to 20° C. for 12 h. Finally, the annealed sample was purified with agarose gel electrophoresis.

Negative-stained TEM: Three microliters of samples were loaded on the glow-discharged, carbon-coated grid (300 mesh, Ted Pella) for 1 min, and the excess sample was removed by a piece of filter paper. Next, the grid was incubated in 2% uranyl acetate aqueous solution for 30 s, followed by using a piece of filter paper to dry it. TEM imaging was performed on a JEOL 1400 at 120 kV.

Cryogenic electron tomography: Copper mesh grids (Carbon Film 300 mesh, Copper, Ted Pella) were held for 10 s and glow discharged for 20 s. The cryogenic sample was then prepared using the FEI Vitrobot with typical parameters of 3 µL sample, the temperature at 4° C., force at 0, humidity at 100%, wait time 4 s, and blot time 5 s. The as-prepared sample was transferred to a liquid nitrogen tank to be stored for later use. A single tilt cryogenic tomography holder (Gatan 626) was cooled down to below 90 K under liquid nitrogen before the sample was loaded. The holder was then inserted into the JEOL 1400 microscope to collect tomography image series under 120 keV from around −60 degrees to 60 degrees at 10 degree intervals. The original images were first converted into a stack image using the ImageJ software. Contrast inversion, image alignment, and tilt axis refinement were carried out in Tomviz manually. The refined image stack was further reconstructed into 3D volumes using the Simultaneous Iterative Reconstructive Technique (SIRT) algorithm embedded in Tomviz. The reconstructed 3D volumes were then filtered and segmented in Avizo software to get the 3D center positions.

Small-angle X-ray scattering (SAXS): SAXS measurements were performed at BNL National Synchrotron Light Source II (NSLS-II) Complex Material Scattering (CMS) beamline. The purified samples were injected into glass capillary tubes for X-ray scattering experiments, which were performed under room temperature. Structure factors S(q), where q is the wavevector, were obtained by the radial integration of 2D patterns and were divided by a nanoparticle form factor obtained from the scattering of solution-dispersed nanoparticles.

Measurements of circular dichroism and optical absorption for spherical helix clusters: Purified spherical helix cluster was mixed with the Gold Enhancement reagent (Nanoprobes) with a volume ratio of 1:0.3 and incubated at room temperature for ~30 min·43 The circular dichroism and optical absorption of helical clusters were measured by a Jasco J-815 CD spectrometer.

Design of valence-programmable nanoparticle clusters: The disclosed subject matter provides methods for programing the desired nanoparticle (NP) cluster architecture using a DNA scaffold. It is advantageous to program the underlying scaffold to be capable of exhibiting the desired valence. Moreover, such valence does not have to be limited to symmetry modes found in atomic systems, but it can address a wider space due to the ability to fully prescribe bond locations and types. Although, in general, DNA-binding sites can be placed in desired locations on the DNA scaffold, the specific design and geometrical limitations of the scaffold become restricting factors quickly. Indeed, the overall shape of the DNA construct can have a major impact on the nanoparticle-cluster architecture. In order to minimize any effect arising from DNA-scaffold shape anisotropy, such a scaffold can possess the symmetry.

In other words, it can be designed to be as close as possible to a sphere. At the same time, it can provide binding sites for nanoparticles around this topology. Such objects can have the capability for bond programming in order to afford different types of valence modes through the 3D placement of specific binding sites on this object. Unlike atomic systems, different sites can be distinguished through orthogonal DNA-encoding, and this so-called polychromatic valence offers distinctive bonds for DNA-encoded NP bindings. Such a desired programmable DNA object can address the challenge of creating a designed cluster (FIG. 51A).

Figure 51A:
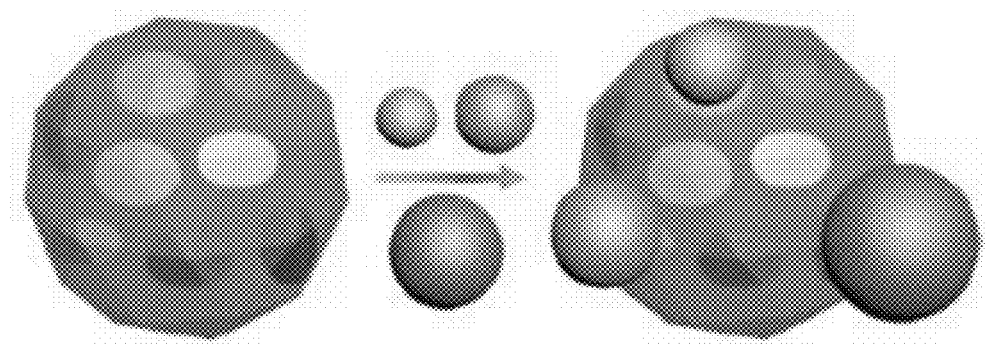
FIGS. 51A and 51B provide diagrams of nanoparticle cluster self-assembly directed by the valence-programmable DNA mesh frame.
Figure 51B:
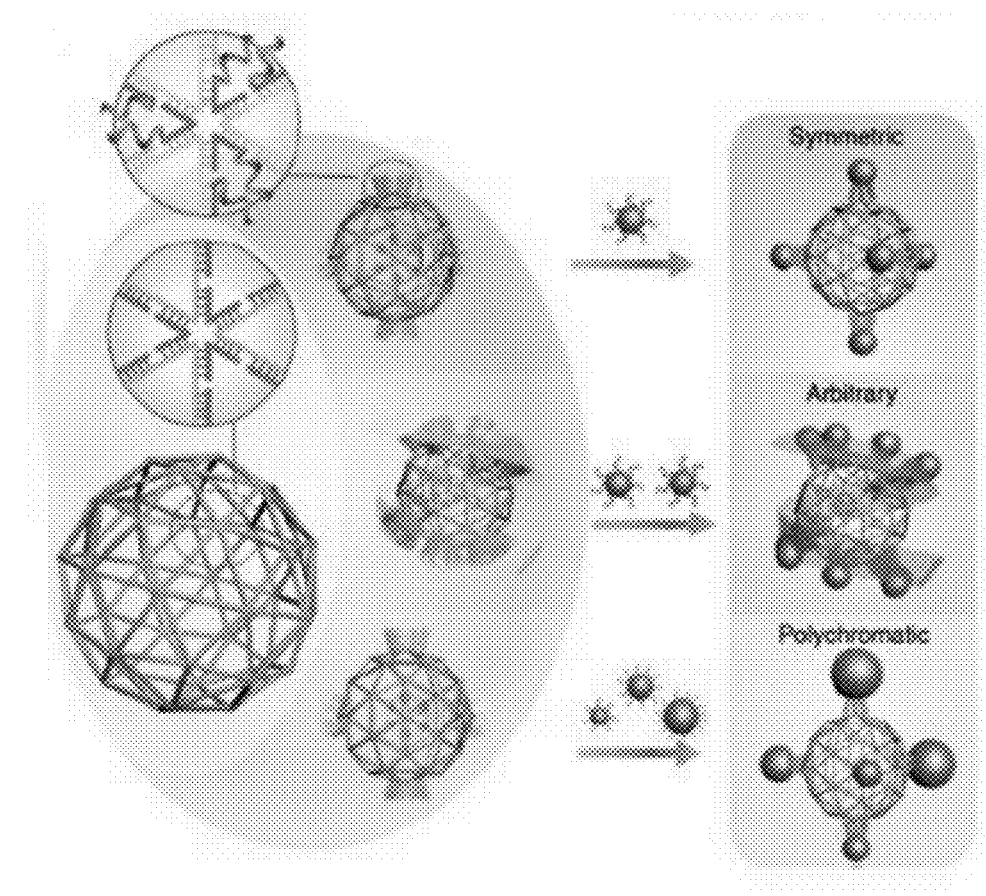

DNA origami was used to fabricate a sphere-like mesh construct 28, which has a pentakis icosidodecahedron shape (FIG. 51B). Icosahedral symmetry (Ih) is a common symmetry for polyhedrons approximating a sphere. This structure can contain vertices, with each vertex being a junction of either five or six edges. 90% of the edges (108 of 120) contain one DNA double helix and the other 10% contain two DNA double helices, with an average length of −15.7 nm (−47 base pairs (bp), assuming 3.5 nm/10.5 bp for DNA double helix). For this highly symmetrical object, the desired vertex, surrounded either by six or eight helices, can be used as a binding site for NPs by encoding six identical single-stranded DNA (ssDNA) around it, i.e., incorporating so-called "sticky ends" for NP binding. Such sticky ends were designed with a 2-base inner spacer region and 11-base outer recognition region. By choosing and encoding desired subgroups of vertices on a sphere-like meshframe, a desired valence mode was designed while maintaining the shape of the underlying DNA scaffold. Subsequently, DNA-capped NPs can bind to those designated sites and form designed cluster architectures. Furthermore, polychromatic valence can be generated by encoding the meshframe with different types, or sequence specificities, of sticky ends to recognize different correspondingly encoded NPs. Using this method, NP assemblies with symmetric valence, such as a five-fold cluster, nanoclusters with arbitrary valence, such as a spherical helix cluster, and multitype nanoclusters, such as a three-component chiral cluster, were achieved as demonstrated in FIG. 51B.

FIGS. 51A and 51B show a nanoparticle-cluster self-assembly directed by the valence-programmable DNA meshframe. FIG. 51A: Conceptual illustration of a nanoparticle (NP) cluster coordinated by sphere-like frame structure with arbitrarily prescribed valence modes and different types of binding affinities (shown as colors). Designated vertices provide binding affinities to corresponding DNA-encoded NPs (shown with matched colors). FIG. 51B: Designed DNA meshframe origami, pentakis icosidodecahedron (gray skeleton), for programming designed NP cluster architectures. Zoomed-in vertex shows that it is formed by six edges, with each edge consisting of one double helix. Dark gray lines indicate staple strands and light gray lines indicate a templating DNA. The DNA meshframe can be encoded by introducing ssDNA around the vertex. An encoded vertex is zoomed-in to show that six identical sticky ends (green curves) protrude from a designated vertex. Sticky ends anchored on designated vertices form valence modes of triangular bipyramid and helix (top and middle). Distinctive sets of sticky ends (strands with different colors) can be anchored at designated vertices (middle and bottom). NPs (red balls), capped with complementary DNA shells, are assembled into designed clusters through their coordination around the meshframe corresponding with the programmed vertices, for example (from top to bottom): symmetric nanocluster, arbitrarily prescribed nanocluster with chiral helical valence mode, and multitype NP cluster.

Figure 52A:
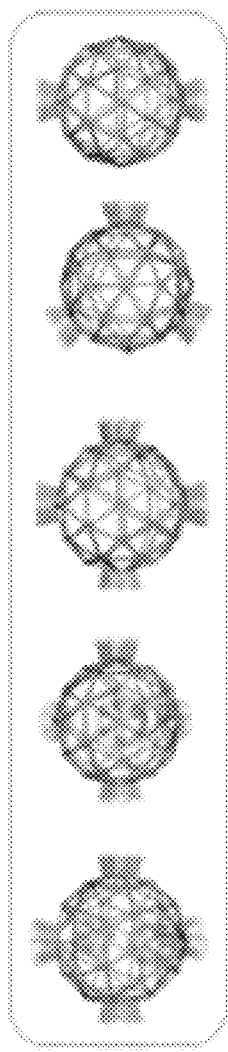
FIGS. 52A-52F provide diagrams and graphs showing structures of nanoparticle (NP) cluster architectures assembled by programmed mesh frame.
Figure 52B:
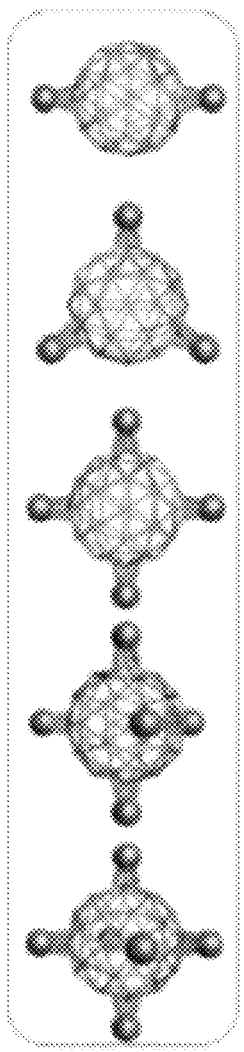

Symmetric architectures: First, to explore the valence-programmability of the DNA sphere-like meshframe, a class of frames with various symmetric valence modes was designed, from two to six, corresponding to the geometries of dumbbell, triangle, square, triangular bipyramid (TBP), and octahedra, respectively (FIG. 52A). NPs functionalized with DNA can bind through hybridization to complementary-encoded sites, resulting in the assembly of matching clusters with designed architectures (FIG. 52B).

Figure 52C:
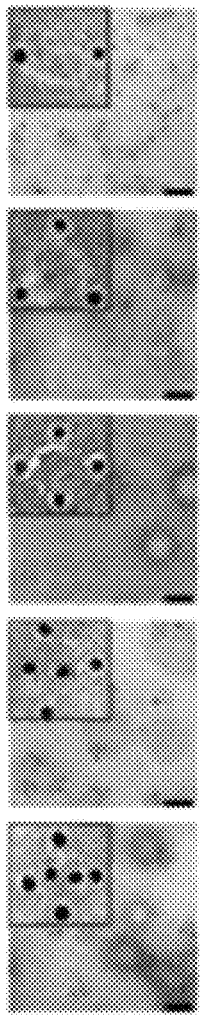
Figure 52D:
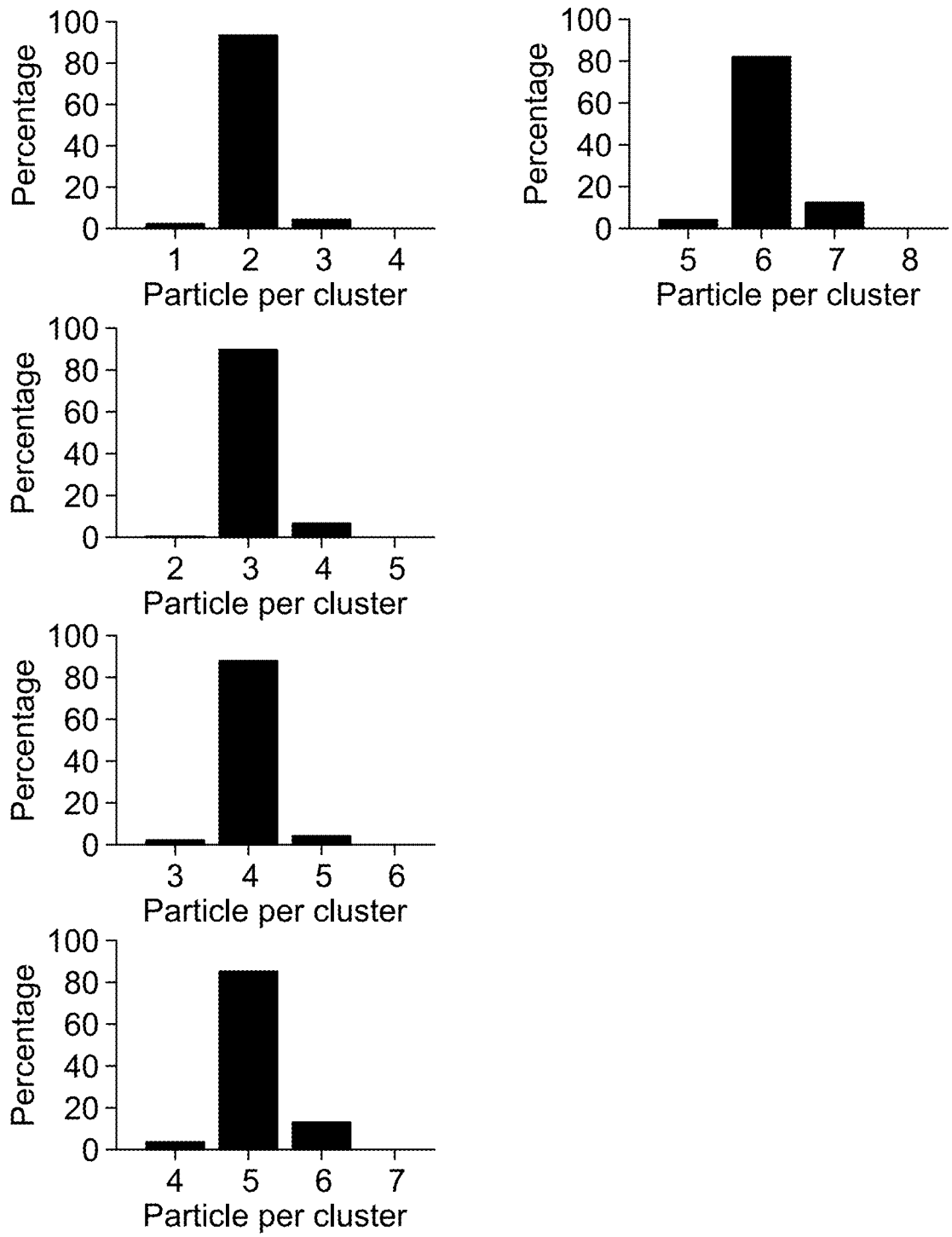

To fabricate the programmable meshframes, M13mp18 scaffold was annealed with a specific set of staple strands. Then, the preassembled frames were mixed and annealed with gold NPs (AuNPs, 10 nm core diameter) to construct NP clusters, followed by purification with agarose gel electrophoresis. Representative TEM images demonstrate the projections of five types of nanoclusters, consistent with corresponding designs (FIG. 52C). In comparison with AuNPs, stained meshframe edges formed by only one or two duplexes, have a weak contrast. Different projections of these clusters were observed, with some clusters being deformed on a TEM grid due to the limited rigidity of meshframe that did not withstand drying process during a TEM sample preparation. Statistical analysis shows a high yield for all assembled types of the cluster architectures: ~90% of dumbbell, triangular and square nanoclusters show the correct number and positions of NPs (of ~500 for each type of cluster), and >80% for TBP and octahedral nanoclusters exhibit expected morphology (of ~400 for each type of cluster) (FIG. 52D). TEM statistics also shows that ~99% of binding sites on the meshframe are occupied by NPs. A high NP attachment yield per binding site owes to the rational design of sticky-end distribution and binding strength. Among the occupied sites, 98% are specifically bound by individual particles as designed, and 2% are shared by two particles. The double occupancy phenomenon results from non-equilibrium hybridization, where a second NP binds before all sticky ends at a given site can connect with the first NP. This effect of double occupancy is reduced for larger NPs. For example, clusters assembled with 20 nm AuNPs show 99% meshframe site occupancy by individual NPs and that only 1% of sites are shared by two NPs.

Figure 52E:
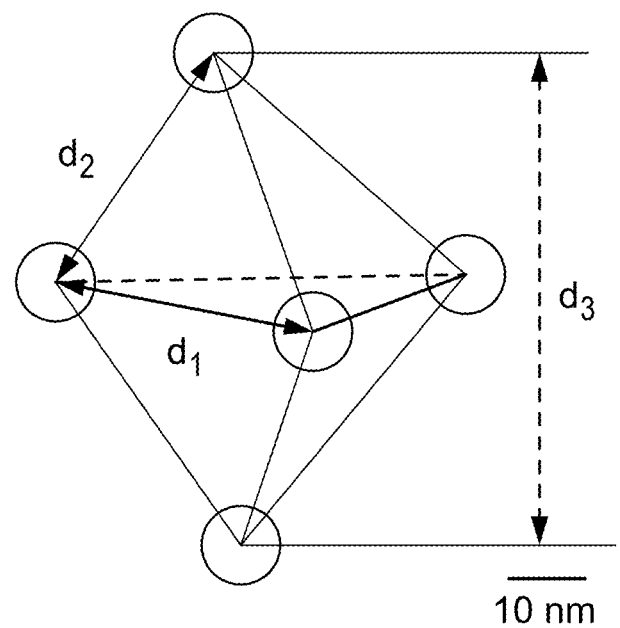
Figure 52E:
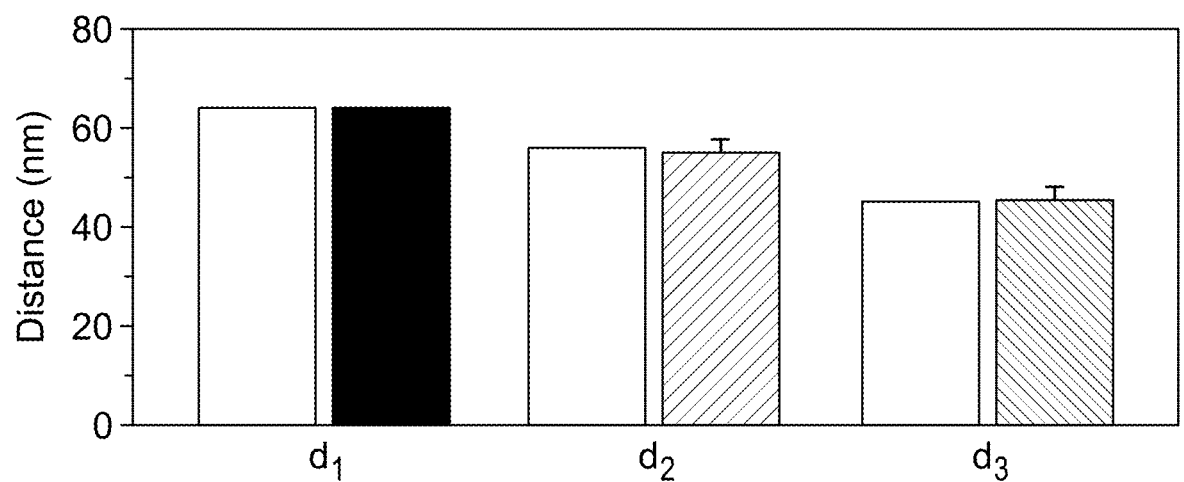
Figure 52F:
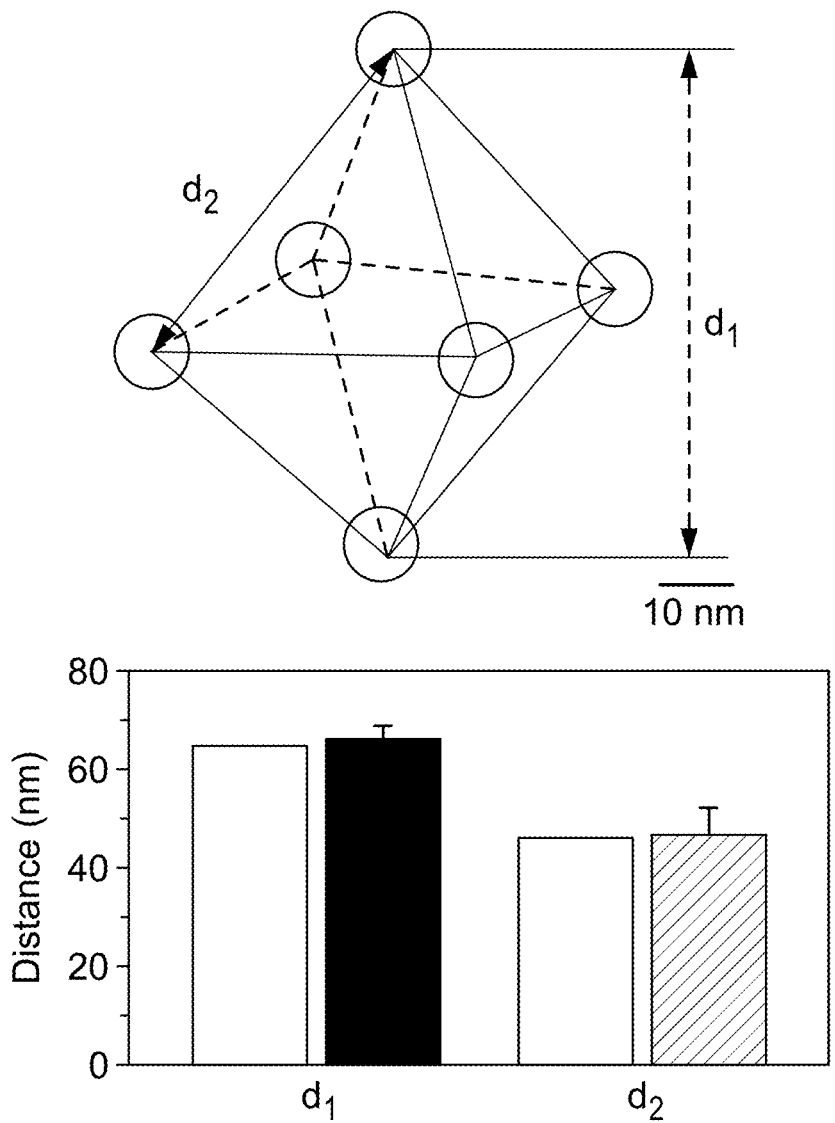

To reveal the spatial arrangement of NPs in the assembled 3D nanoclusters, such as TBP and octahedra arrangement, cryo-EM based tomography was employed. FIG. 52E shows that the five NPs of the reconstructed TBP cluster are arranged in a designed manner. To quantify TBP cluster structural parameters, distances between NPs on the diagonal (one d1) were measured, on the horizonal triangular plane (three d2) and on the lateral plane (six d3). The distances agree well with designed values, indicating the precise, successful arrangement of NPs on the sphere as shown in FIG. 52E, bottom. Similarly, tomographic measurement, and reconstruction were carried out for an octahedral nanocluster, and the results also demonstrate (FIG. 52F) an excellent correspondence between the targeted and realized architectures of the interparticle distances (three d1, twelve d3).

FIG. 52 shows structures of NP cluster architectures assembled by programmed meshframe and revealed by TEM and cryo-TEM tomography. FIG. 52A (From top to bottom) shows designed DNA meshframes with different valence numbers: two, three, four, five, and six, corresponding to the geometry of dumbbell, triangle, square, TBP and octahedra, respectively. FIG. 52B shows NPs decorated with DNA are assembled into clusters, whose architecture is determined by the meshframe valence mode. FIG. 52C shows representative negative-stained TEM images of assembled NP clusters based on meshframes with different valence modes; scale bar, 100 nm (insets: zoomed-in images; side length, 70 nm). FIG. 52D shows NP cluster population histograms. FIG. 52E shows a reconstructed 3D structure of TBP cluster from cryo-TEM based tomography (top). Designed center-to-center distances between NPs (bottom, shadow columns): d1=64.8 nm, d2=56.1 nm, and d3=45.8 nm. Measured distances between NPs of one reconstructed cluster (bottom, solid columns): d1=64.6 nm, d2=55.8±2.7 nm, and d3=46.1±2.1 nm. FIG. 52 F shows reconstructed 3D structure of octahedral cluster by cryo-TEM tomography (top). Designed NP distances (bottom, shadow columns): d1=64.8 nm and d3=45.8 nm, and measured cryo-TEM tomography distances averaged over two independently reconstructed clusters (bottom, solid columns): d1=66.3±2.0 nm and d3=46.9±3.8 nm. Error bars indicate standard deviation of experimental data.

Figure 53B:
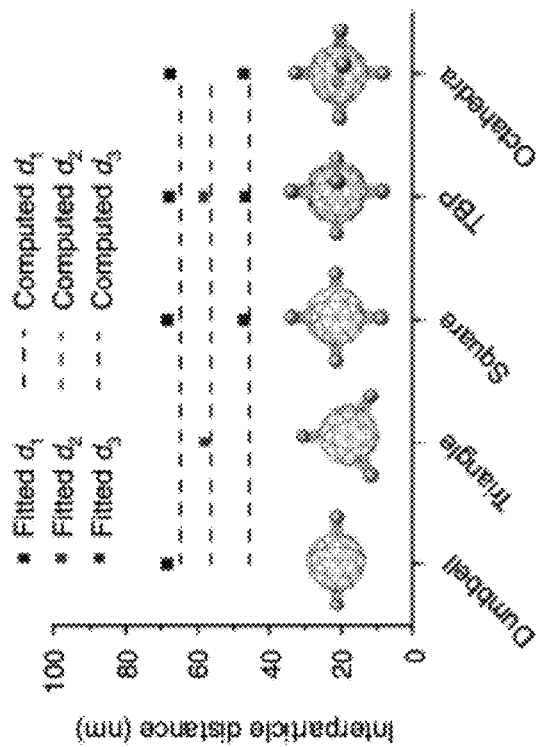
FIGS. 53A and 53B provide graphs showing in-liquid structures of NP cluster architectures revealed by in situ SAXS.
Figure 53A:
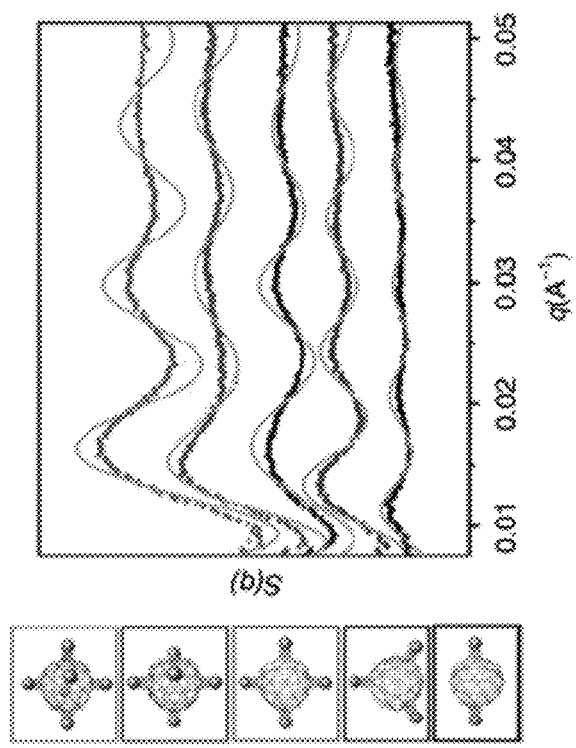

To probe the structures of formed clusters in the actual buffer conditions in which the clusters were assembled, in situ synchrotron-based small-angle X-ray scattering (SAXS) was employed. Purified nanoclusters, dispersed in solution, were placed in a quartz capillary, and then probed at room temperature by a collimated X-ray beam ($\lambda$=0.92 Å) at the Complex Materials Scattering (CMS) beamline of National Synchrotron Light Source II (NSLS-II) at Brookhaven National Laboratory. The scattering pattern was collected with a Dectris Pilatus3×2 M pixel-array detector and converted to 1D scattering intensity versus wavevector transfer, q. Structure factor, S(q), for each nanocluster was extracted from the 1D scattering intensity by subtracting background and dividing the intensity by the form factor of AuNPs41,42 (FIG. 53A), which was measured for dispersed AuNPs. Interparticle center-to-center distances are derived by fitting S(q) with the function below:

$$S(q) = 1 + \frac{2}{N}\sum_{\substack{j=1 \\ k>j}}^{N} \frac{\sin(qd_{jk})}{qd_{jk}} \qquad (45)$$

N is the NP number in a specific designed cluster, and $d_{jk}$ is the center-to-center distance for each pair of NPs in a cluster. For dumbbell and triangular nanoclusters, only one type of interparticle distance exists, which is d1 between diagonal nanoparticles in the dumbbell nanocluster and d2 between nanoparticles on the triangular plane in the triangular nanocluster. For the square nanocluster, two types of interparticle distances, d1 between diagonal nanoparticles and d3 between adjacent nanoparticles, exist. The average interparticle distances for five-cluster architectures are d1=68.1±0.3 nm, d2=58.1±0.1 nm, and d3=47.2±0.3 nm, respectively, which are close to the expected values based on the design: d1=64.8 nm, d2=56.1 nm, and d3=45.8 nm.

FIG. 54 shows In-liquid structures of NP cluster architectures revealed by in situ SAXS. FIG. 54A shows an extracted structure factor S(q) from in situ SAXS for designed clusters with the following meshframe valence numbers (from bottom to top): two, three, four, five, and six, respectively. Fitted S(q) are shown. FIG. 54B shows interparticle distances derived from SAXS (squares) for NP clusters: d1=68.4 nm for dumbbell cluster, d2=58.0 nm for triangular cluster, d1=68.3 nm and d3=47.4 nm for square cluster, d1=67.9 nm, d2=58.2 nm and d3=46.8 nm for TBP cluster, d1=67.6 nm and d3=47.3 nm for octahedral cluster. Interparticle distances computed for the designed architectures (dash lines): d1=64.8 nm, d2=56.1 nm, and d3=45.8 nm.

Figure 54A:
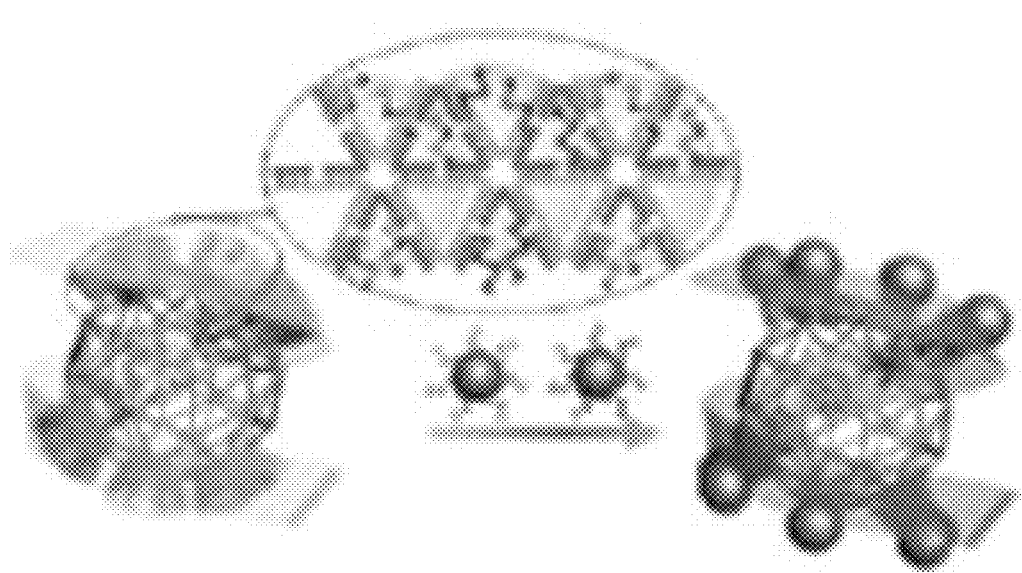
FIGS. 54A-54G provide diagrams and graphs showing the design and structural and optical characterization of the spherical helix NP cluster.
Figure 54B:
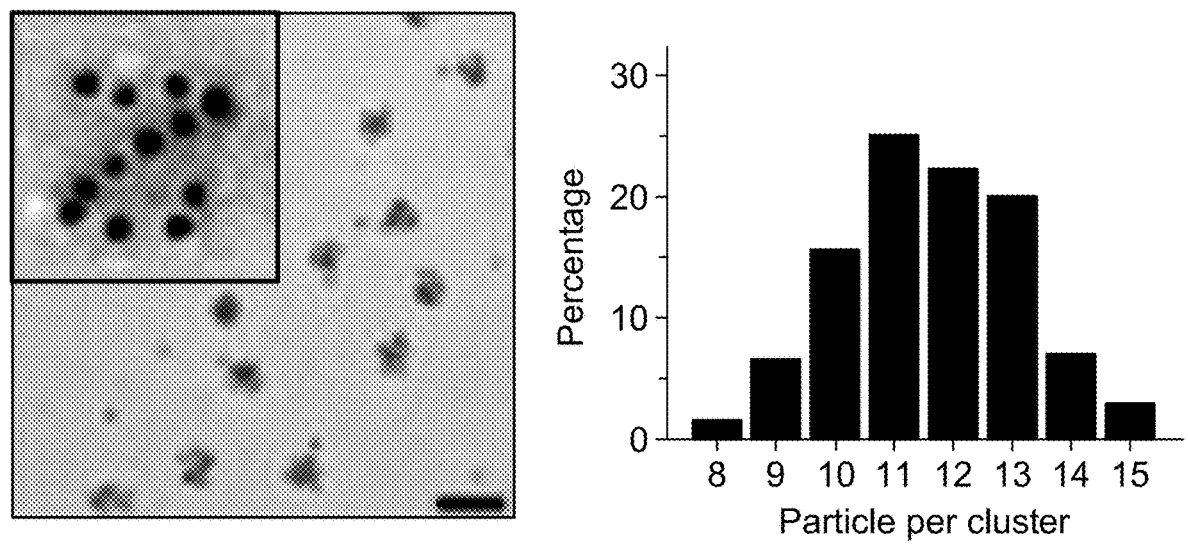

Arbitrarily designed cluster: spherical helix architecture: To demonstrate the versatility and flexibility of this assembly strategy for creating complex and arbitrarily designed clusters, an architecture in which NPs are located in a helical pattern on the surface of sphere-like DNA object (FIG. 54) was implemented. DNA meshframe was programed to have 13 binding sites at designated vertices, encoding a left-handed spherical helix cluster formed by 13 NPs (FIG. 54A). Two different sets of sticky ends, placed in alternating order between the sites, with five identical sequences per site are used. By alternating these two distinctive sets of sticky ends, site competition was reduced between neighboring NPs and thus increase the accuracy of NP localization on the designated vertices. Accordingly, two types of 10 nm AuNPs decorated with different DNA shells are used to bind with the helically positioned binding sites. For this high valence DNA scaffold, an excess of DNA staple strands used in scaffold formation can be removed before mixing with NPs, in order to minimize inter-cluster crosslinking. The mixtures of purified meshframes and AuNPs were annealed from 37° C. to 20° C. for 12 h, followed by purification with agarose gel electrophoresis and analysis with negative-stained TEM. Representative TEM images show that the NP cluster matches the designed helical morphology (FIG. 54B left), with 88.4% of binding sites occupied by NPs (FIG. 54B, right), as measured from 611 clusters. This yield is lower than that of symmetric clusters discussed above (~99%), due to more complex NP arrangements in a helical pattern and stronger steric interactions between adjacent DNA-capped AuNPs.

Figure 54C:
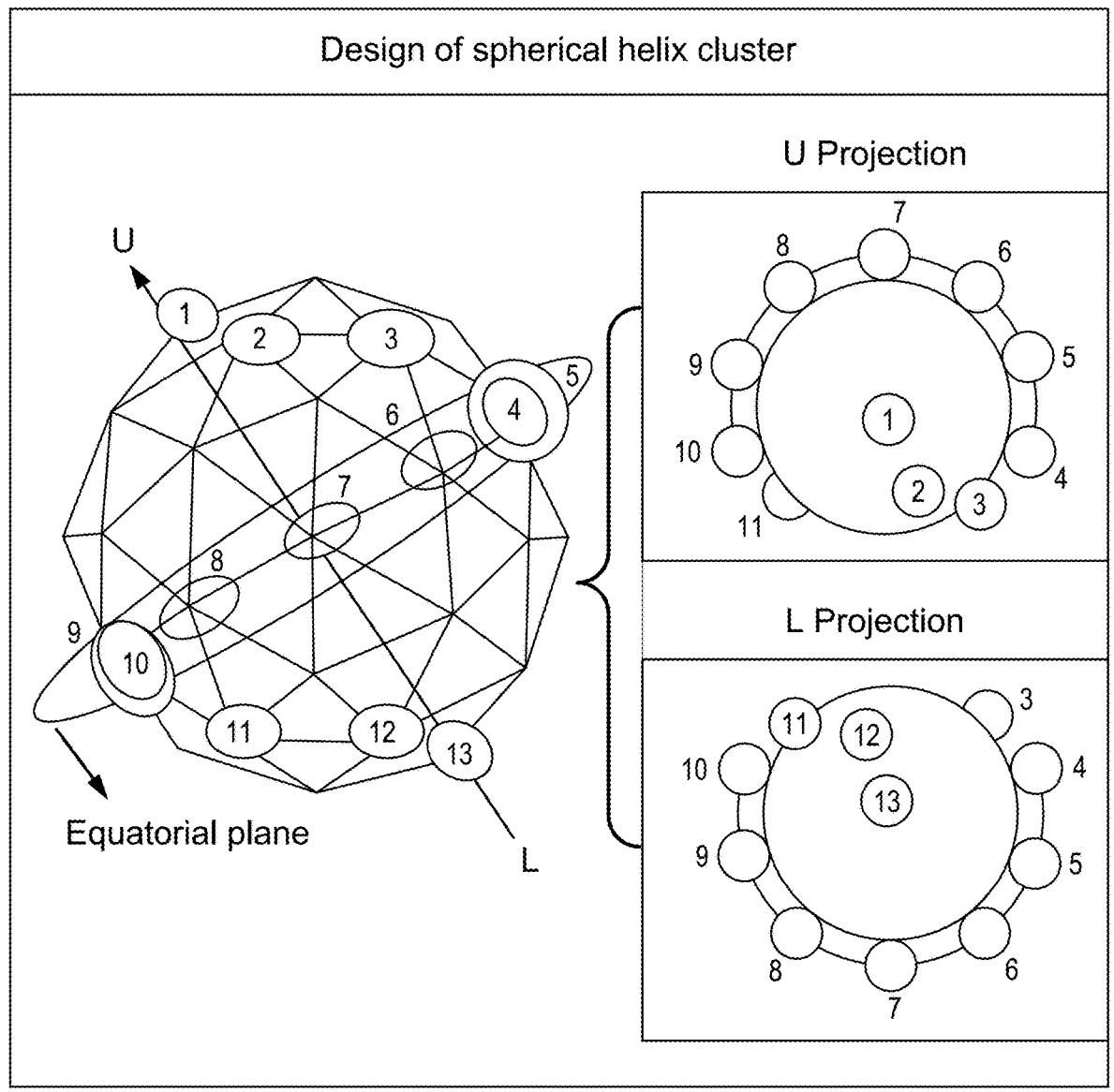

To unravel information regarding particle organization for the spherical helix valence mode on the meshframe, cryo-TEM-based tomography was used to characterize the 3D structure of individual clusters. To establish a comparison with a prescribed helical valence arrangement, the particle sites on the sphere-like meshframe were numbered from 1 to 13 (FIG. 54C, left). Seven particles (Particle 4-10) are located on the equatorial plane of the sphere. Particle 1 and Particle 13 are located on the summits of Upper (U) and Lower (L) hemispheres, respectively. The structure was projected from both the U and L summits. For visual guidance, in the center of the cluster, a gray sphere was added, whose radius is equal to the distance between the meshframe center and NP surface. Both projections show a uniform NP arrangement on the equatorial plane and NP positions on the upper and lower hemispheres (FIG. 54C, right).

Figure 54D:
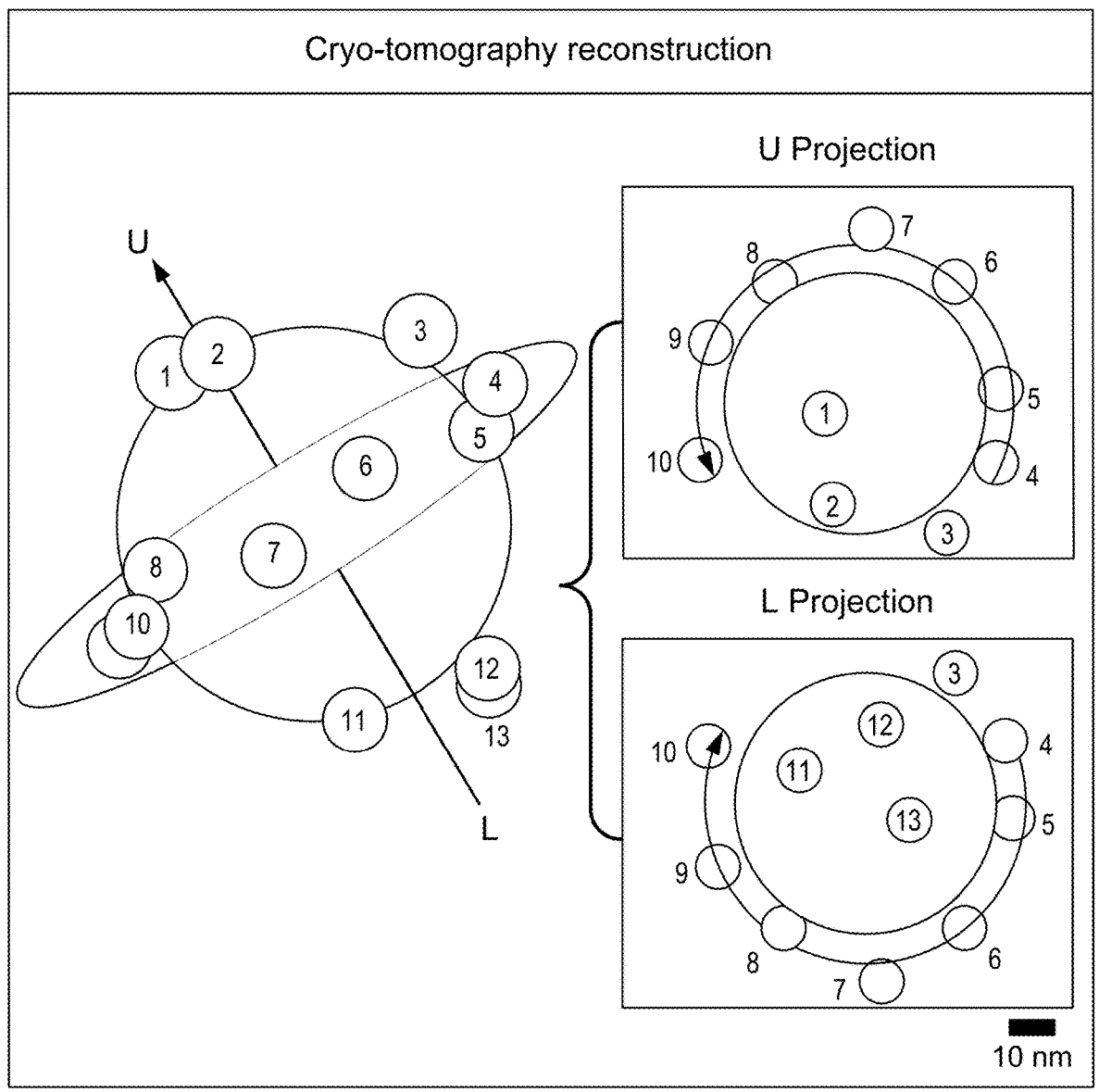
Figure 54E:
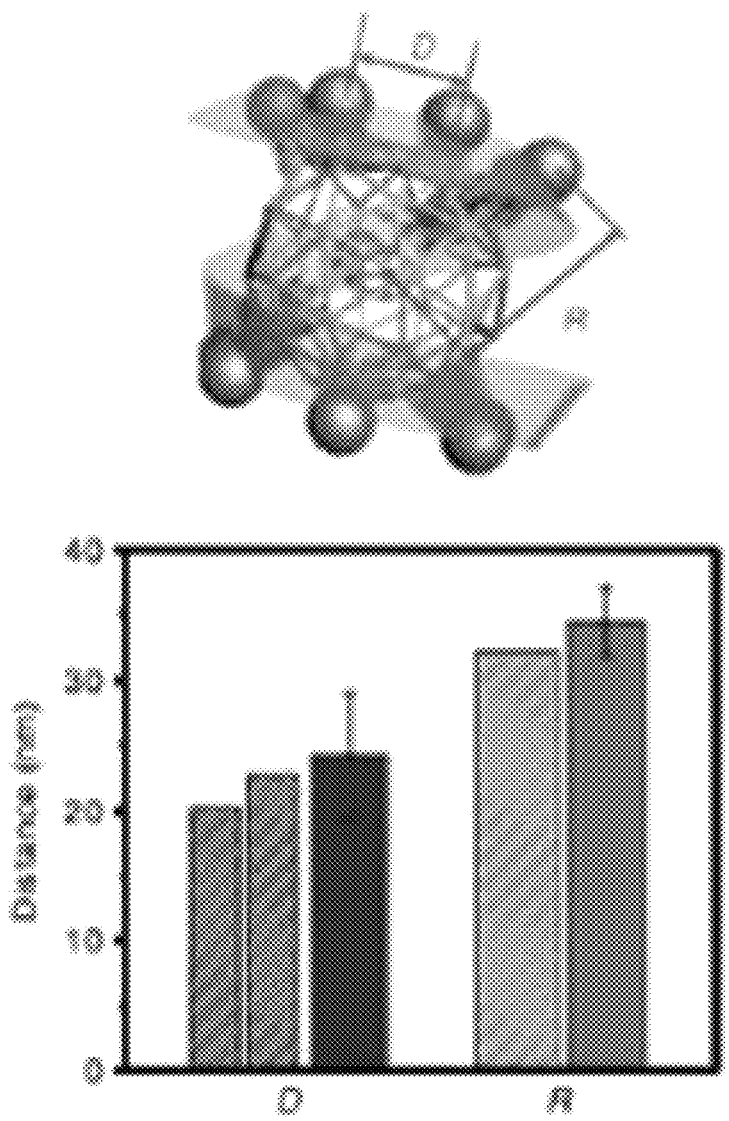
Figure 54F:
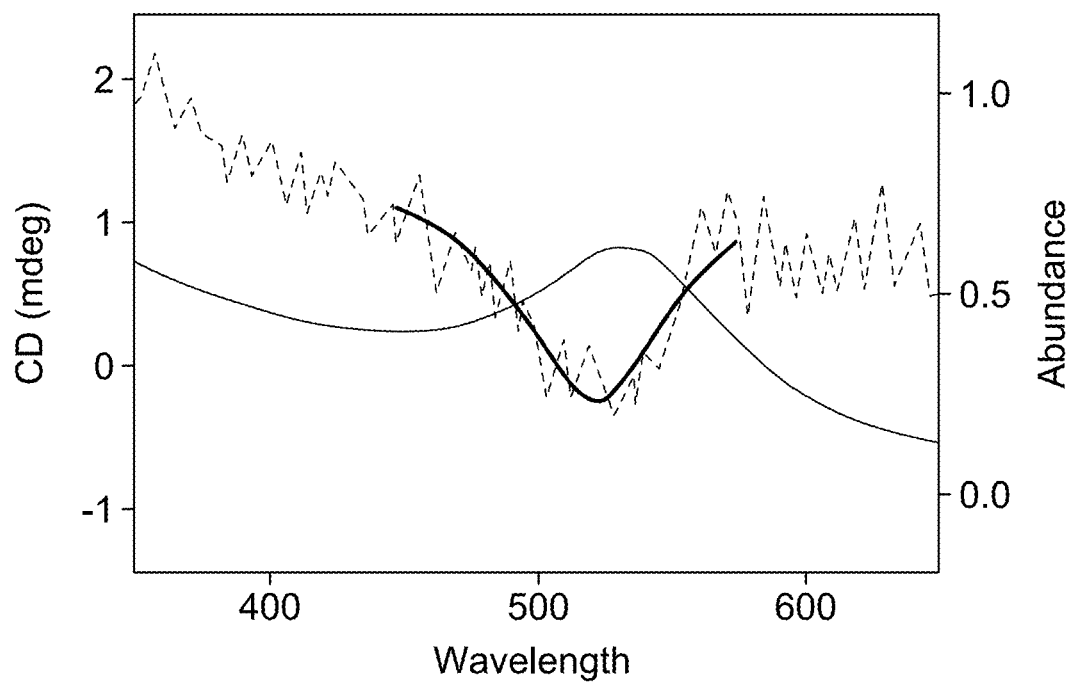
Figure 54G:
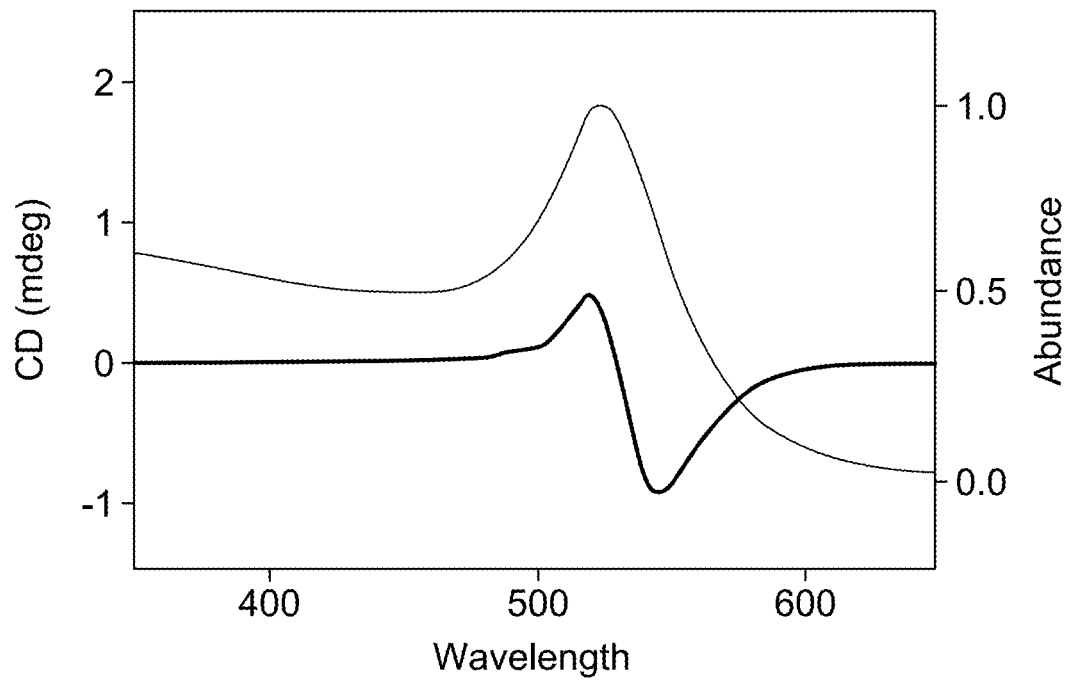

The reconstructed nanocluster is presented in both 3D view and 2D projections in FIG. 54D, where a gray sphere provides visual guidance as FIG. 54C. The coordinate of sphere center and sphere radius are fitted using the obtained 3D coordinates of all NPs (numbered 1-13) in the reconstructed cluster. The tomography results (FIG. 54D, left) show that seven NPs (Particles 4-10) are on the equatorial plane, three NPs (Particle 1-3) on the upper sphere, and three (Particles 11-13) on the lower sphere. The visualized 3D spherical helix pattern of NPs matches well with the designed helical cluster architecture. The U and L projections (FIG. 54D, right) demonstrate that Particles 4-10 are arranged relatively uniformly on the equatorial plane. The locations of Particles 1-3 and Particles 11-13 indicate that their placement pattern corresponds to a left-handed chirality, which agrees with the prescribed valence mode. Small NP shifts (~5 nm) from expected positions are observed in the recon-structed structure, which can result from interparticle repulsion and sample preparation for imaging. Since each binding site has multiple sticky ends, NPs can hybridize at slightly different configurations at the same site, which affects the precision of a NP placement. Although there are twelve values of interparticle center-to-center distances (D) for clusters with thirteen NPs (FIG. 54E), there are only two different D in our designed locations of NPs due to two types of edge lengths of the meshframe: ten D values are of 20.2 nm and the other two of 22.8 nm. Since the diameter of 10 nm AuNPs with DNA shells is ~20 nm (21 nucleotide (nt) for the DNA shell), which is close to the designed D value, steric repulsion can result in some displacement of NPs. Tomograph measurements show a small increase of D (24.0±4.9 nm) over its two design values, as averaged from three independently reconstructed clusters. Such an increase of D is consistent with the SAXS measurements, which show a corresponding shift of the primary scattering peak that arises from nearest neighbor interparticle distances. Another obtained value is the distance between the center of meshframe and the center of individual AuNP in the nanocluster (FIG. 54E), R=34.5±3.8 nm, which matched well the expected value (d1/2=32.4 nm) and SAXS measurements (68.1/2=34.0 nm). The SAXS measurements for spherical helical clusters provide coarse information about internal cluster organization due to the sensitivity of a structure factor to an interparticle distance distribution of interparticle distances in comparison to the symmetrical cluster.

In solution, the optical absorption spectrum of spherical helix clusters, with characteristic absorption peak at 520 nm, closely resembled the surface plasmon resonance (SPR) mode of individual AuNPs, which indicates a weak coupling between NPs. Due to the chiral nature of the helical cluster of plasmonic NPs, a different absorption for incident light of left and right circular polarization can lead to a circular dichroism (CD) signature near the SPR. To enhance the plasmonic resonance through interparticle coupling, NP size increases to ~13 nm using gold enhancement reagent; this also decreases interparticle distances accordingly. A corresponding plasmonic redshift from 520 nm to 532 nm (FIG. 54F) was observed. A positive CD signal was detected at wavelength shorter than 500 nm, with a negative dip around the SPR peak. This observation is consistent with our numerical simulation of the absorption and CD spectra of AuNP spherical helix clusters (FIG. 54G), using discrete dipole approximation (DDA). This type of cluster combines a helical arrangement of NPs with overall spherical shape, and that compact and symmetric design is distinct from previously reported bar-like clusters with a spiral NP arrangement.

FIG. 54 shows design and structural and optical characterization of the spherical helix NP cluster. FIG. 54A shows a schematic of the spherical helix NP cluster. The spherical helix valence mode is realized for the meshframe by programming two alternating sets of sticky ends (green and purple, with five strands) at desired vertices. Two types of AuNPs with identical 10 nm core size but distinct DNA shells are directed through the hybridization to binding sites and assembled into a spherical helix cluster. FIG. 54B shows (Left) representative negative-stained TEM image of spherical helix clusters; scale bar, 200 nm (inset: zoomed-in image of a spherical helix cluster; side length, 150 nm) and (Right) population analysis of assembled spherical helix clusters (from 611 measured clusters). FIG. 54C shows designed NP positions of the spherical helix cluster (numbered from 1 to 13) on a sphere-like meshframe (left). Seven particles (Particles 4-10) are on the equatorial plane of the sphere-like structure. Particle 1 and Particle 13 denote the summits of Upper and Lower hemispheres, respectively. Projections of designed spherical helix cluster from the Upper (upper right) and Lower (lower right) summits. The grey sphere provides visual guidance. The line with arrow defines particles on the equatorial plane (Particles 4-10). FIG. 54D shows a spherical helix cluster reconstructed from cryo-TEM tomography. 3D view of the reconstructed structure (left) and projections from the Upper (upper right) and Lower (lower right) summits. FIG. 54E shows a center-to-center distance between adjacent NPs, D, and center-to-center distance between sphere-like meshframe and NPs, R, were measured. Designed distances (bottom histogram, shadow columns): D=20.2 nm and 22.8 nm, and R=32.4 nm. Average distances obtained from three independently reconstructed clusters (bottom histogram, solid columns): D=24.0±4.9 nm and R=34.5±3.8 nm. Error bars indicate standard deviation of experimental data. FIG. 54 F shows a computed CD spectrum and absorption spectrum for spherical helix clusters. FIG. 54G shows an experimental CD spectrum, Lorentzian fit, and absorption spectrum for spherical helix clusters.

Multitype nanoparticles clusters: The addressability of the sphere-like DNA meshframe not only allows prescribing directional valence through the location of binding sites, but also encoding each site independently such that it provides affinity only to the NP with matching encoding, as determined by the complementarity between sticky ends at the vertex and ssDNA in a given NP shell. This encoded, so-called polychromatic valence can open opportunities for assembly of multitype NP cluster architectures (FIG. 55). As a demonstration of this capability, a meshframe was programed with two- (FIG. 55A, I-II) and three-color valence modes (FIG. 55A, III-V) for assembly of different multitype NP clusters based on the same five-fold directional valence (FIG. 55B) discussed previously. Specifically, the binding sites of a TBP linking frame (labelled 1-5, FIG. 55A) are encoded independently with two and three sets of sticky ends. AuNPs with diameters of 10 nm (P1), 15 nm (P2), 20 nm (P3), and 30 nm (P4) were coated with specific DNA shells that are complementary to respective sticky ends on the meshframe. Guided by this polychromatic valence, different types of AuNPs were anchored to prescribed sites.

Figure 55A:
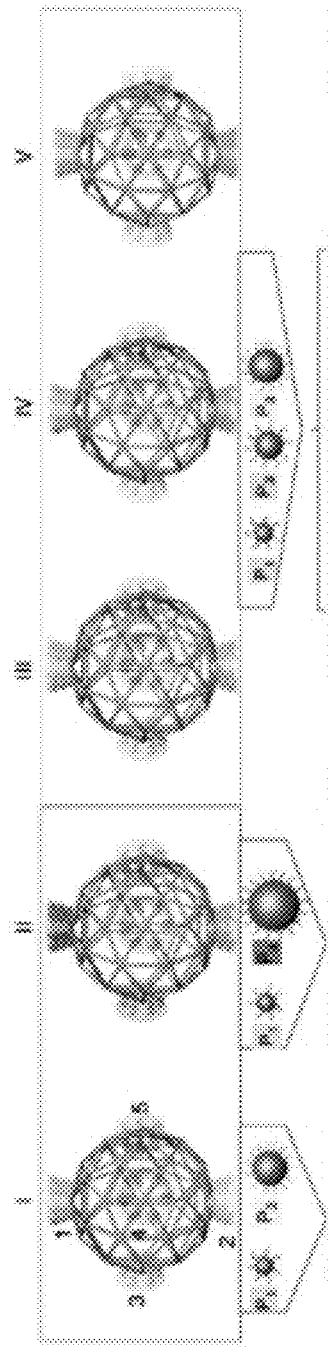
FIGS. 55A-55E provide diagrams and graphs showing designs and characterization of multitype NPs clusters assembled with a mesh frame of directional and polychromatic valence modes.
Figure 55B:
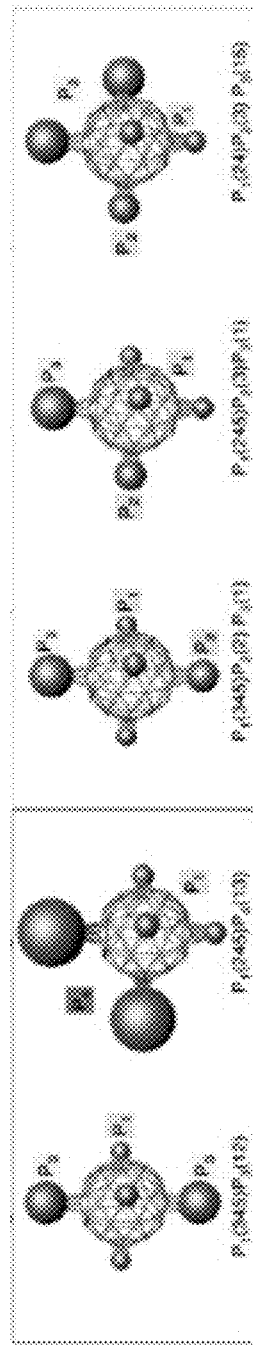
Figure 55C:
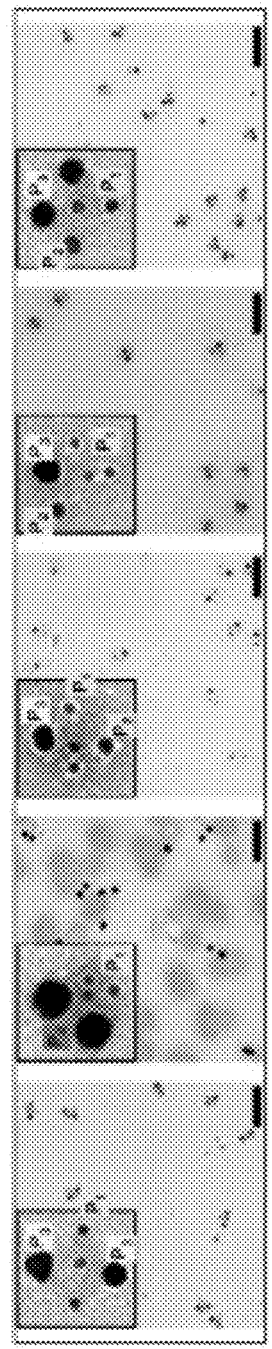
Figure 55D:
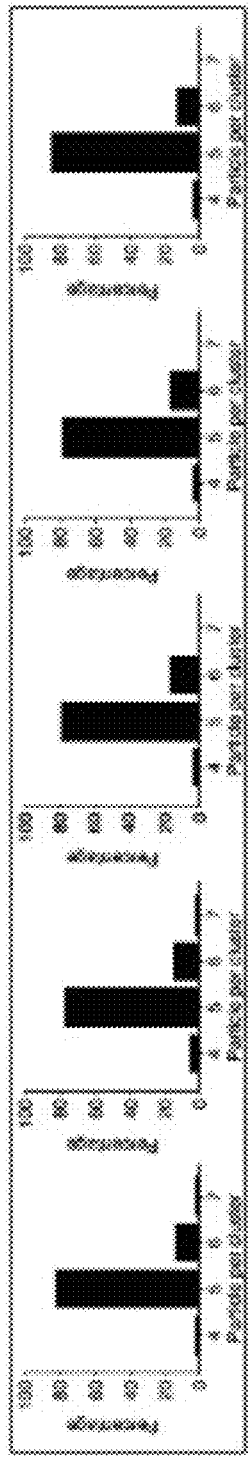

FIG. 5b (I) shows a two-component nanocluster with three-fold symmetry, with two P3 particles located at sites 1 and 2 and three P1 particles at sites 3, 4, and 5, providing a label of P1(345)P3(12). Similarly, a nonsymmetric two-component nanocluster P1(245)P4(13) was designed and assembled (FIG. 55B (II)). Then, a three-color valence meshframe was used to form symmetric and nonsymmetric nanoclusters: P1(345)P2(2)P3(1) with three-fold symmetry (FIG. 55B (III)), nonsymmetric achiral P1(245)P2(3)P3(1) (FIG. 55B (IV)) and nonsymmetric chiral P1(24)P2(3)P3 (15) (FIG. 55B (V)). Representative TEM images show that the NP arrangements for all five hetero-clusters based on the sphere-like meshframe with polychromatic valence agree well with our design (FIG. 55C). The statistical analysis indicates that this hetero-cluster assembly process can be realized with relatively high yield, with ~80% of correct NP composition (out of ~420 clusters for each cluster type) (FIG. 55D).

Figure 55E:
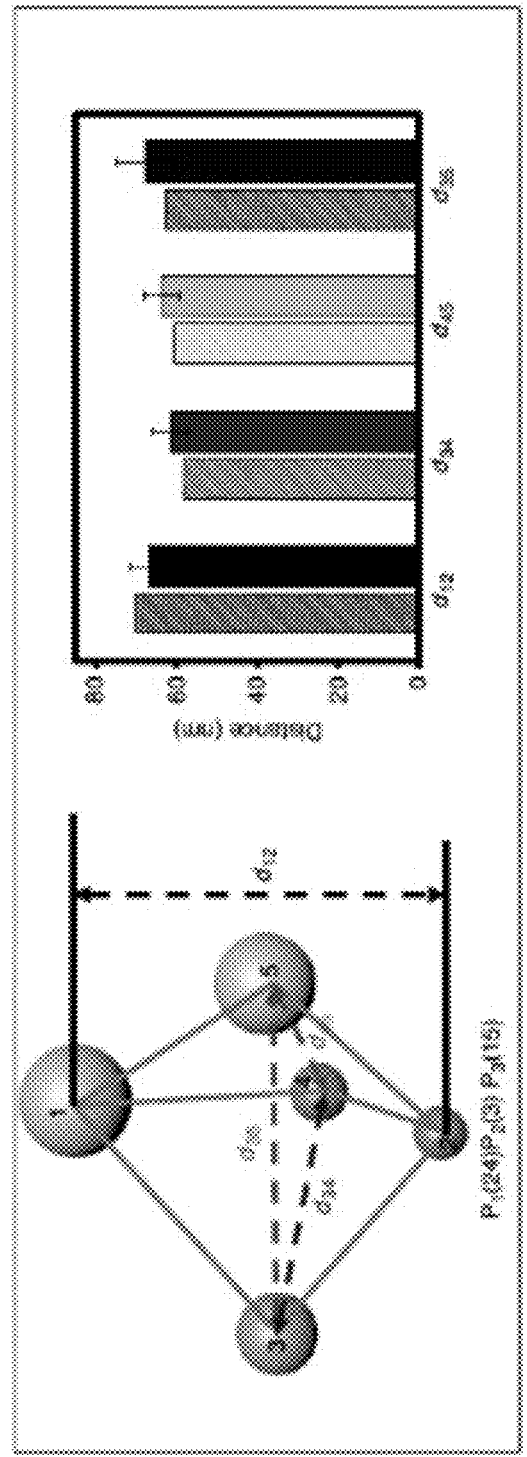

To obtain information about the spatial arrangement of NPs in multitype NP clusters, nonsymmetric chiral cluster (P1(24)P2(3)P3(15)) was evaluated using cryo-TEM tomography. As shown in FIG. 55E, the reconstruction confirms that three types of AuNPs are arranged in the designed manner, with two P3 particles at vertices 1 and 5, one P2 particle at vertex 3 and two P1 particles at vertices 2 and 4. The interparticle distances were obtained from eight reconstructed nanoclusters. The center-to-center distances between diagonal NPs (d12) and between NPs on the horizonal triangular plane (d34, d45, and d35) are in excellent agreement with the designed values (FIG. 55E, right).

FIG. 55 shows the design and characterization of multitype NPs clusters assembled with a meshframe of directional and polychromatic valence modes. FIG. 55A shows meshframe programmed with a valence of TBP geometry and encoded sites at selected vertices, labelled from 1 to 5, results in polychromatic valence. (I-II) two-color valence. (III-V) three-color valence. FIG. 55B shows multitype NP clusters. (I) P1(345)P3(12) with three P1 (10 nm AuNP) at sites 3-4-5 and two P3 (20 nm AuNP) on sites 1-2; (II) P1(245)P4(13) with three P1 at sites 2-4-5 and two P4 (30 nm AuNP) at sites 1-3; (III) P1(345) P2(2)P3(1) with three P1 at sites 3-4-5, one P2 (15 nm AuNP) at site 2 and one P3 at site 1; (IV) P1(245) P2(3)P3(1) with three P1 at sites 2-4-5, one P2 at site 3 and one P3 at site 1; (V) P1(24) P2(3)P3(15) with two P1 at sites 2-4, one P2 at site 3 and two P3 at sites 1-5. FIG. 55C shows representative negative-stained TEM images of NP hetero-clusters; scale bar, 200 nm (insets: zoomed-in images; side length, 100 nm). FIG. 55D shows population histograms for corresponding multitype NP clusters. FIG. 55E shows a cryo-TEM tomography reconstructed P1(24)P2(3)P3(15) cluster (left). Designed interparticle distances (right, shadow columns): $d_{12}$=69.8 nm, $d_{34}$=58.3 nm, d45=60.5 nm, and $d_{35}$=62.6 nm. Measured distances, as averaged over eight independently reconstructed P1(24)P2(3)P3(15) clusters (right, solid columns): d12=66.8±4.3 nm, d34=61.4±4.6 nm, d45=63.8±4.4 nm, and d35=67.8±7.2 nm. Error bars indicate standard deviation of experimental data.

The disclosed subject matter provides methods for assembly of designed nanoparticles clusters using valence-programmable DNA mesh-frame with 3D control of NP positions and incorporation of different types of NPs. Spatially and type-defined (polychromatic) valence modes can be rationally designed and programmed using a highly symmetric, sphere-like frame that serves as a universal 3D scaffold for coordinating NPs in designed 3D patterns. Nanoclusters with symmetric and arbitrary valence modes can be created with high yield and high structural fidelity, including different prescribed symmetries and helical organizations. The polychromatic valence can permit assembly of multitype NP clusters. The quantitative agreement between the designed and assembled structures was demonstrated using a combination of TEM, tomography and X-ray scattering methods. A demonstrated, broadly applicable valence-programmable assembly strategy opens new routes for the rational fabrication of NP architectures via self-assembly, with customized architectures, compositions, and function.

Figure 56:
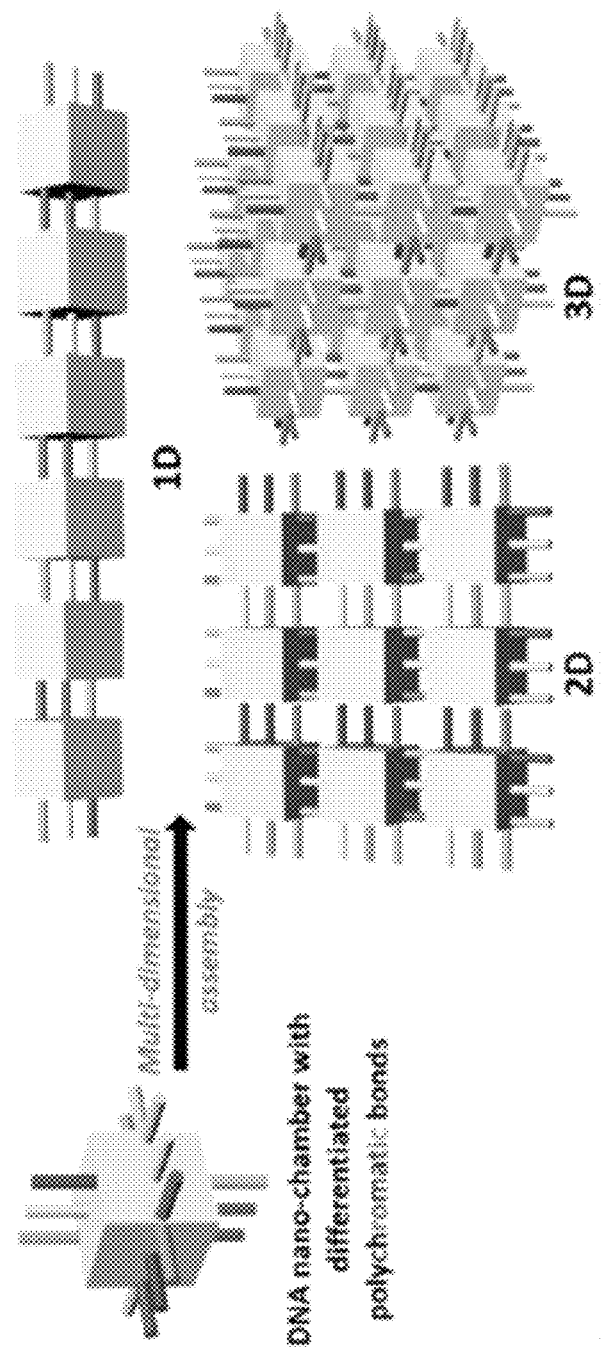
FIG. 56 shows multi-dimensional assembly (1D, 2D, and 3D) including a DNA nano-chamber with differentiated polychromatic bonds.
Figure 57A:
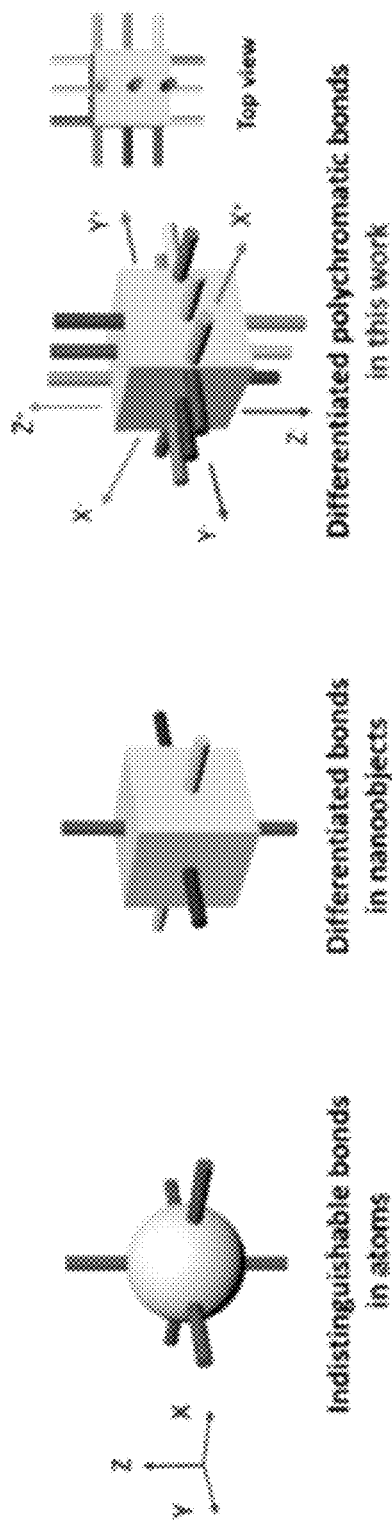
FIGS. 57A and 57B provide a diagram showing multi-dimensional assemblies and their building blocks.
Figure 57B:
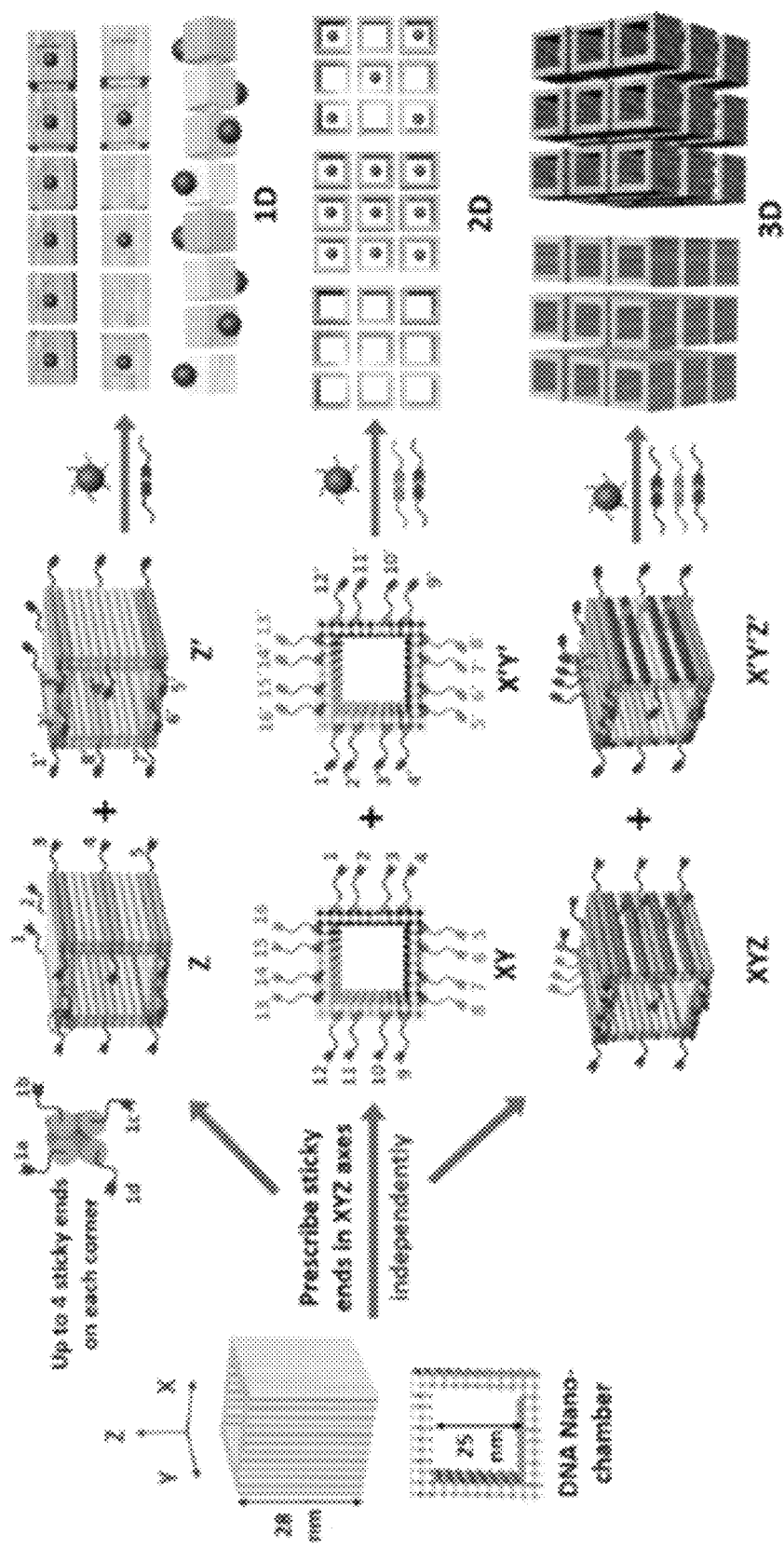

Example 4: Engineering Organization of DNA Nano-Chambers Through Dimensionally Controlled and Multi-Sequence Encoded Differentiated Bonds The disclosed subject matter provides a nanoscale system that possesses the following features (FIGS. 56 and 57A): (i) a rigid 3D semiclosed cuboid geometry that can carry nanocargo; (ii) differentiated bonds, through DNA-encoding, for prescribing interobject connectivity in three orthogonal directions and their local alignments; (iii) multisequence encoding of bonds (polychromatic bonds) within each axis that have a robust prescription of interactions along with control over a relative orientation of objects. As the fundamental building block, a DNA nano-chamber (DNC), a hollow DNA cuboid, was used. Such an object has an intrinsically relatively low symmetry, which well supports the designability of complex architectures, has well-defined internal arrangement of duplexes, and possesses an internal compartment that allows it to host a nanoparticle or a molecule or a biomolecular complex. Two openings of the DNC also permit the ease of inserting and release of nanocargo. Thus, the DNC combines a simple yet relevant geometrical shape with a potential utility for exploring assembly using differentiated bonds. A facile approach to regulate the programmable assembly of these blocks into multidimensional ordered arrays with different degrees of complexity through control of differentiated polychromatic bonds (FIG. 57B). Using electron microscopy and in situ X-ray scattering methods, engaging bonds along one (Z), two (X,Y) and three (X, Y, Z) axes that results in the formation of 1D, 2D, and 3D ordered arrays, respectively were observed, while the strength of the bonds and their differences have effect on the assembled structures. The disclosed subject matter also provides the resultant arrays that can serve as versatile platforms to coordinate the organization of gold nanoparticles (AuNPs).

Design of DNA Nanochamber and Establishment of Differentiated Polychromatic Bonds: The disclosed subject matter provides building blocks (DNCs) with bonds that are fully differentiated in the X, Y, and Z directions and within each axis (FIG. 57A). DNC binding properties can be determined by 6 unique types of bonds: X−, X+, Y−, Y+, Z−, and Z+. They are referred as X, Y, and Z bonds. Moreover, each bond was encoded via multisequence strands, so-called "sticky ends", that offer a high degree of uniqueness for encoding, orthogonality of interactions, orientation, and positioning control. Since each sticky end is encoded with a distinct DNA sequence, it is referred to as color, and this differentiation allow us to establish polychromatic X, Y, and Z bonds. The bonds are located at the well-defined positions along the surface of the DNC. The assembly of DNC monomers into a larger-scale organization is dictated by these polychromatic bonds, while the specific details of bonds can influence the assembly process. The disclosed subject matter offers the designability of anisotropic and differentiated bonds for engineering ordered arrays using the same basis nanoobject, the DNA nanochamber.

DNC can include a total of 80 DNA duplex cylinders was designed by caDNAno. The DNC has an open cavity of size ~25×25×28 nm$^3$, which is fenced by a double layer of DNA duplexes. Binding strands for inter-chamber connections can be independently tuned and are located in the middle of the DNC walls for XY directions and at the edges of the DNC opening for Z direction. Each binding strand consists of an 8-base recognition sequence (sticky ends) and a 22-base poly-T DNA spacer. The poly-T spacers endow the flexibility of linkages and mediate steric effects, both of which are beneficial for DNC-DNC recognition during assembly. In addition to differentiated bonds along orthogonal X$^-$, X$^+$, Y$^-$, Y$^+$, Z$^-$, and Z$^+$ axes, all of the 8-base sticky ends within each axis are entirely distinct as denoted by different numbers (e. g., 1-16 in XY). Not only do these polychromatic bonds enable the connected DNCs to align correctly and prevent uncontrolled shifting, but, more importantly, they also endow orientational control of monomers within ordered arrays. These design principles of programmable polychromatic bonds are applied to 1D, 2D, and 3D assemblies.

DNA Nanochamber Construction and Nanoparticles Encapsulation: DNC was formed by folding an M13mp18 single-stranded (ss) scaffold with 224 short staple oligonucleo-tides (FIG. 58A), through slowly cooling from 80° C. to room temperature. The successful formation of DNC was first analyzed by agarose gel electrophoresis (FIG. 58B). The gel-purified products were then examined by negative-staining transmission electron microscopy (TEM). Hollow DNA frames with a height of 28 nm were observed (FIG. 58C), which unambiguously confirmed the formation of the designed construct. Cryo-TEM was utilized to further verify the DNC structure. As shown in FIG. 58D, hollow cuboid architectures with a central cavity of 25 nm and wall thickness of ~5 nm can be visualized directly, in good agreement with double layer packing of DNA helix. The binding strands for inter chamber ligation can be readily incorporated through introducing selected staple strands containing extension sequences of sticky ends during the DNA origami folding protocol (see DNC with bonds in FIG. 58A).

DNCs can be encoded with internal and external anchoring strands for carrying nanocargo, in this case AuNPs, within the cavity or outside of the sidewall (FIG. 58E), respectively. The integration of DNCs and AuNPs was achieved by annealing the DNCs encoded with anchoring strands and AuNPs functionalized with complementary ssDNA strands. The AuNPs and DNCs (e.g., 60 μL of 10 nM) were mixed in a stoichiometric ratio of 2.5:1, and subjected to an overnight annealing procedure. As illustrative examples, AuNPs with core diameters of 10 nm (18-base DNA shell) and 20 nm (18-base DNA shell) were employed to coordinate with the DNCs, respectively. TEM imaging after gel purification confirms a successful encapsulation of 10 nm AuNPs in the DNCs with a yield of 93% (FIG. 58F), and a binding of 20 nm AuNPs onto the sidewall with a yield of 81% (FIG. 58G). It is worth noting that each cavity (25 nm) and sidewall (28 nm) can accommodate only one DNA-coated AuNP, which is essential for controlling the arrangement of AuNPs within ordered arrays.

1D Assembly of DNA Nanochambers: By utilizing DNCs with fully prescribed binding characteristics as underlying building blocks, the disclosed subject matter provides the assembly of 1D linear arrays, which can represent a nanoscale polymer analog. The use of differentiated bonds and type-encoded DNCs allows constructing of a variety of nanoparticle architectures including homopolymers, sequence-prescribed heteropolymers, and helical polymers. To assemble the chain-like 1D arrays, sticky ends are placed as extensions of selected staples at the end of the DNA duplex along the Z-axis. Two types of DNCs (e.g., Z and Z') containing sticky ends complementary to each other were designed, giving rise to two kinds of bifunctional monomers. For each monomer, up to 32 binding strands can be attached at the predefined locations of DNC edges (FIG. 57B), where their 8-base sticky end sequences are completely different from each other. This multisequence encoding along the Z-axis allows for a high degree of specificity of DNC-DNC bindings and for controlling their relative orientation along Z direction. 8-base sticky ends were selected because their melting temperatures are within a favorable experimental annealing temperature window (20-50° C.). 6-base or 10-base sticky ends were tested using identical annealing protocol. Unconnected or aggregated structures were observed. Therefore, 8-base sticky ends design was used.

Analogous to classic step-growth polymerization, the ligation of DNCs was induced by slowly cooling mixtures containing equal amount of two monomers (typically, 100 μL of 10 nM). To enable a proper antiparallel directionality for the hybridization of sticky ends, Z' monomer was specifically designed to rotate 900 clockwise relative to Z monomer in the direction of polymerization.

Figure 59A:
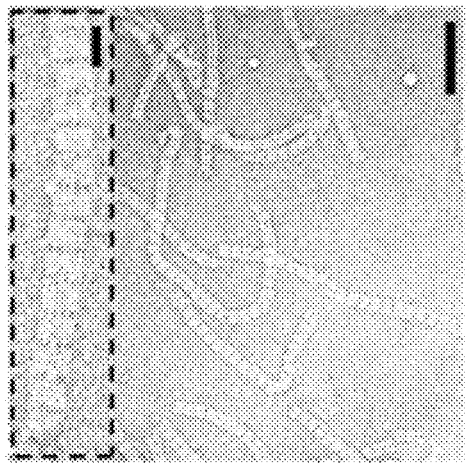
FIGS. 59A-59F show images and diagrams showing 1D assembly of DNA nanochambers.

The disclosed DNC system with Z bonds can have a similarity with a classic step-growth polymerization, for which the prerequisite of synthesizing long polymer chains is highly reactive monomers. In order to identify the high "reactivity" for 1D growth, the chain formation was evaluated by varying the number of sticky ends on each side of DNC (from 8, 16, 24 to 32). When 8 sticky ends were used, oligomers with an average of 4 monomers long were observed. By increasing the number of sticky ends to 16, both oligomers and polymers were yielded with an average of 8 monomers per chain. Further increase of sticky end number (24 and 32) results in longer nanopolymer chains. Notably, using 32 sticky ends, discrete chains with micrometer lengths containing on average 30 monomers were obtained (FIG. 59A). The formation of chains without which disordered aggregates was observed. Annealing involves a slow cooling of the sample from 50 to 20° C. During this process, there is a temperature window within which quasi-equilibrium assembly occurs with reversible bindings of individual sticky ends. For an assembly regime within this favorable temperature window (FTW), the growth rate can depend on the inter-DNC interaction strength and binding probabilities, which for the given sticky end motifs are determined by the number of sticky ends. Since all systems follow the same annealing protocol, the same amount of time was spent in the FTW. This results in the assembly of the longest chains for the 32 sticky ends design, which has the largest attraction interaction among the discussed systems.

Figure 59B:
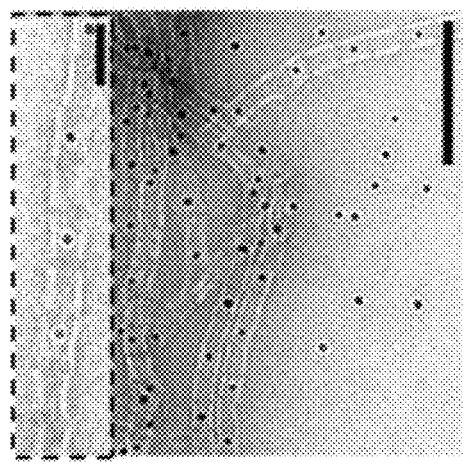
Figure 59C:
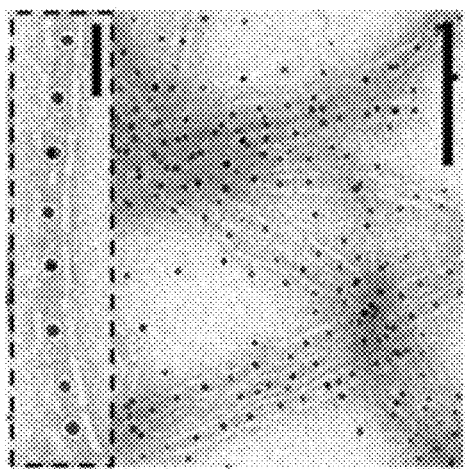

On the basis of the design of 32 sticky ends, different types of linear AuNPs chains were fabricated via a "one-pot" assembly process, where DNA-coated AuNPs, Z, and Z' DNCs encoded with internal anchoring strands were simply mixed and annealed to grow 1D nanoparticles arrays. This process is referred as a "one-pot" because AuNPs loading and DNC polymerization occur concurrently in one annealing protocol. To ensure satisfactory loading efficiency of AuNPs, the following features were implemented: (i) stronger bonds, based on 12-base internal anchoring strands, for AuNPs encapsulation, in comparison with 8-base sticky ends for polymerization and (ii) the excess of AuNPs (molar ratio AuNPs/DNC=2/1). This one-pot approach is also applied to the 2D and 3D assembly. The alternating/homo-chains that are alternatively/fully filled with 10 nm AuNPs were produced by encoding single (Z or Z')/both (Z and Z') DNC monomers with internal anchoring strands. The desired nanostructures were directly visualized from TEM images in FIGS. 59B and 59C, with a success rate of 83% and 89% for filling alternating chains and homochains with AuNPs, respectively.

Figure 59D:
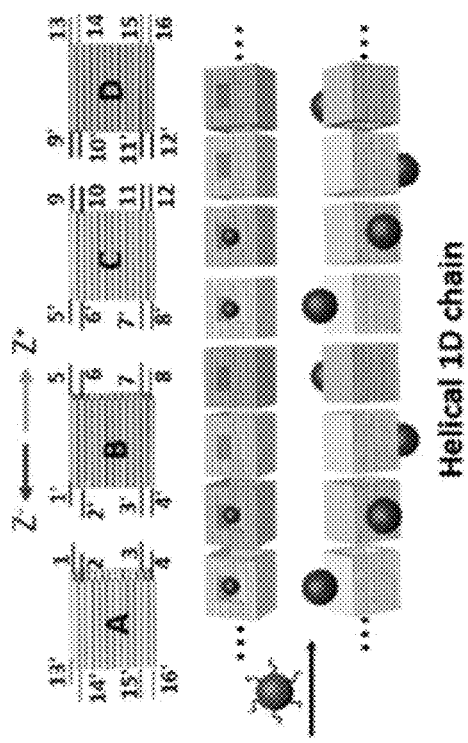
Figure 59E:
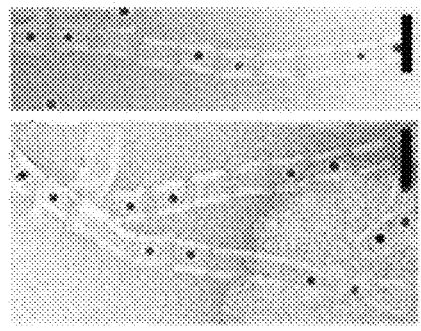

Given a full prescription of bonds and DNCs encoding for both external and internal connections, the presented approach for constructing polymer-like chains is both robust and versatile. It can be adapted to build chains with increasing complexity and arbitrary order of different monomers. To demonstrate this versatility, four different kinds of DNCs were specifically designed (e. g., A, B, C, and D), whose complementary sticky ends allow for connecting with each other sequentially (FIG. 59D). Upon annealing in a rigorous equal molar ratio, the desired nanoscale heteropolymer with a definitive sequence of ABCD was produced. Notably, the sequence-controlled chains offer a platform for controlled nanoparticle arrangement in a complex linear array. For example, the disclosed subject matter provides a nanoarchitecture in which two filled and two empty DNCs are alternatively arranged (FIG. 59E). Within this nano-architecture, monomers A and B are designed with internal anchoring strands to capture 10 nm AuNPs, while monomers C and D do not have these strands.

Figure 59F:
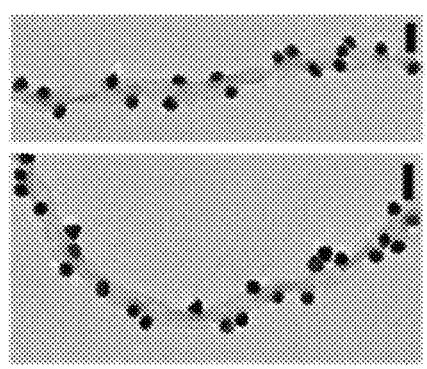

To stress the significance of monomer orientation control through multisequence bonds, a helical organization was created within the 1D array by placing 20 nm AuNPs on the specifically designated sidewall of four types (A, B, C, and D) of DNCs. This assembly requires the specific orientation of monomers relative to their adjacent neighbors, and the discussed multisequence scheme permits for such a realization (FIG. 59D). The defined 1D arrays with helical nanoparticle organization were successfully fabricated and verified by TEM imaging (FIG. 59F). While certain studies used a single DNA origami construct as a template for the fabrication of AuNPs helices, the disclosed helical organization is derived from the assembly of multiple types of DNC monomers. As each monomer can be independently programmed, this can provide new opportunities to tailor chiral organizations in terms of their length, composition, and architecture, and potentially allow for dynamic regulation of the formed structures.

2D Assembly of DNA Nanochambers: Four-fold symmetry of DNC in the lateral direction (XY, FIG. 57B) permits for the manipulation of 2D square arrays by encoding bonds on four sidewalls of adjacent, complementary DNCs (e. g., XY and X'Y'). Up to four distinct, sticky ends with a defined order were used to prescribe a recognition zone on each DNC face along the center-line in the XY plane of each sidewall. This encoding provides positioning restrictions ensuring the ligation of two neighboring DNCs in the same plane, whereas the implementation of distinct sequences for face-to-face bonds prevents any undesired lateral shifting.

Figure 60A:
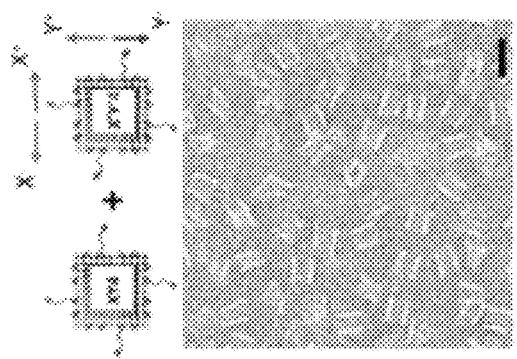
FIGS. 60A-60L provide images and graphs showing 2D assemblies of DNA nanochambers.
Figure 60B:
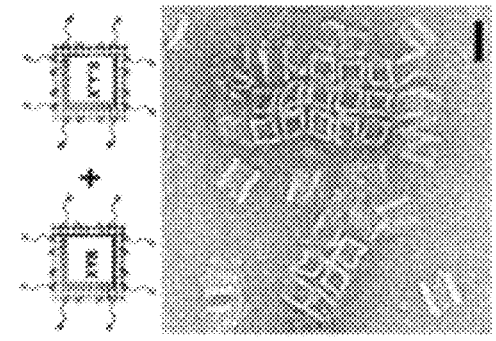
Figure 60C:
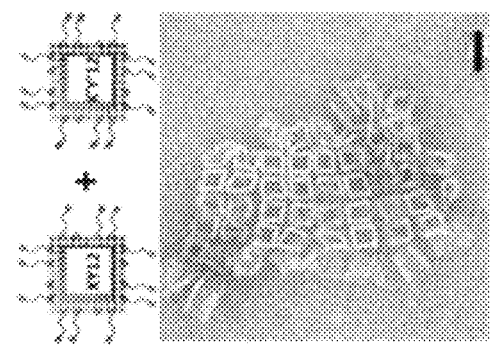
Figure 60D:
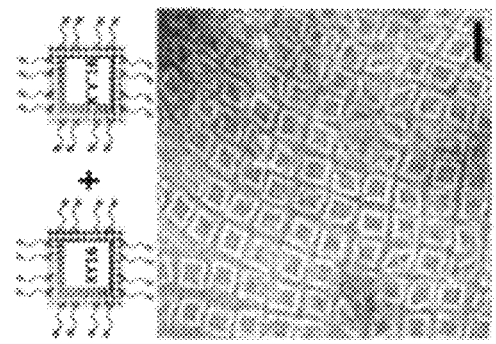
Figure 60E:
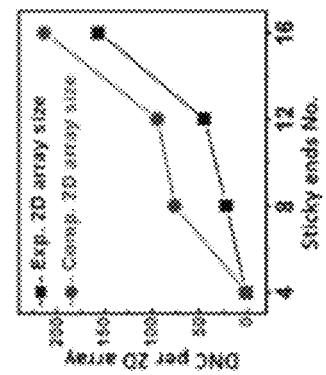
Figure 60F:
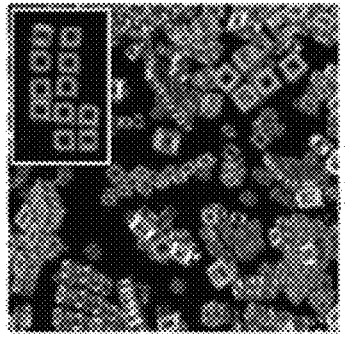
Figure 60G:
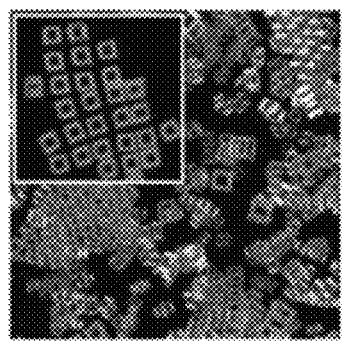
Figure 60H:
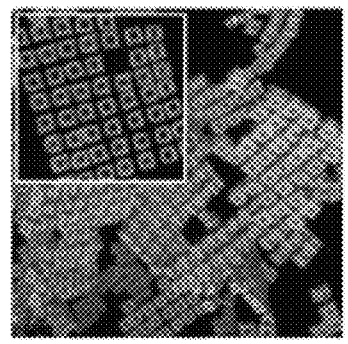

To induce 2D array formation, equal amounts of two complementary DNC mixtures were subjected to a 48 h annealing process (cooling from 50 to 20° C.). FIGS. 60A-60D demonstrate the successful assembly of 2D arrays for the different number of sticky ends in the XY-plane (total per DNC: 4, 8, 12, and 16, or per DNC's face: 1, 2, 3, and 4). For 4 sticky ends, the binding strength is too weak to bridge neighboring DNCs (FIG. 60A). As the number of sticky ends increases from 8 to 12, and finally to 16, the average domain size of 2D arrays increases dramatically from 22 to 45 to 156 DNCs per array (FIGS. 60B-60E), respectively. This positive correlation between the number of sticky ends and the size of the 2D array to the increased inter-DNC hybridization energy and binding probability was observed. The process of lattice formation occurs during annealing in the FTW, similar to the 1D case. The same mechanism (as discussed for 1D case) is realized for 2D system: the growth rate within FTW influences the size of the crystalline domain, and that rate is higher for the larger number of the sticky ends. With 16 sticky ends, the formation of the prescribed large-domains of DNC 2D lattice was observed (FIG. 60D). Small angle X-ray scattering (SAXS) characterization reveals a scattering profile for 2D square lattices. The scattering peaks corresponding to Bragg reflection planes and their positions agree well with the modeled scattering. The center-to-center distance of two adjacent DNCs is 44.2 nm based on the first-order peak and is consistent with that measured from TEM observations.

These results validate that the formation of 2D ordered arrangements of DNCs within the XY-plane occurs in bulk.

To further understand the results on the assembly of the 2D DNC arrays, molecular dynamics simulations were performed. A cubic hard object was used as a proxy for the designed DNC and the Kern-Frenkel potential to mimic inter-DNC bonds. In order to reflect the specificity of bonds in the experimental system, different types ("colors") of bonds were designed for each sticky end strand on the cube, wherein only the same color of bonds can bind to each other. Using Monte Carlo simulation of hard polyhedral (HOOMD-blue package), the systems were cooled with 4, 8, 12, and 16 bonds down from high temperature and calculated the average assembled cluster sizes (FIGS. 60E-60H). Similar to the experimental findings, the average cluster size becomes larger as the number of bonds increase from 4 to 16. This effect is due to a higher growth rate of ordered domains for a larger number of sticky ends. The simulation indicates that the crystallization rate can significantly affect the final size of the clusters, and the binding probability enhances as the number of bonds increases, leading to larger sizes of clusters within the same simulation time scale.

Figure 60L:
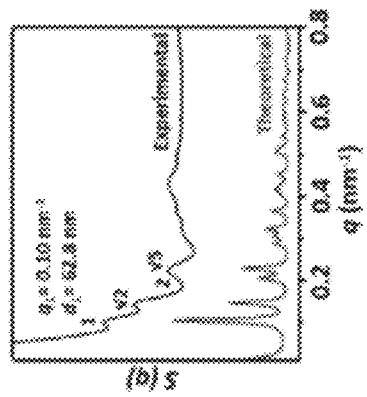

Next, DNCs that were encoded with internal anchoring strands to form 2D lattices of AuNPs were used. With the design of 16 bonds per DNC, 2D lattices of AuNPs were produced via a one-pot protocol where AuNPs were annealed with DNCs (molar ratio: AuNPs/DNC=2/1). TEM observation and well-defined SAXS pattern validate the formation of the intended 2D AuNP lattices (FIGS. 60I and 60J). Compared with the SAXS pattern of vacant DNC arrays, the SAXS scattering profile in FIG. 60J is much sharper and fully reflecting the AuNPs arrangement due to high X-ray contrast of AuNPs relative to DNA. The normalized peak positions in the SAXS pattern show a qn/q1 ratio of $1:\sqrt{2}:2:\sqrt{5}$ . . . (q1=0.143 nm-1), unambiguously identifying a conventional 2D-square lattice. The close correspondence with the model peak positions (FIG. 60J) indicates a formation of well-defined square lattice. Moreover, the center-to-center distance of two neighboring AuNPs obtaining from SAXS (d1=43.9 nm) is in good agreement with that from TEM image (~44 nm), further suggesting a high degree of order for assembled AuNP lattices.

Figure 60K:
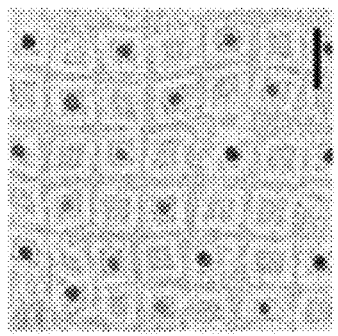
Figure 60J:
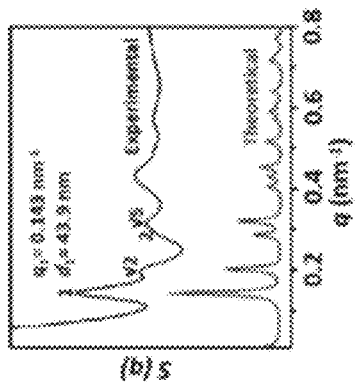
Figure 60I:
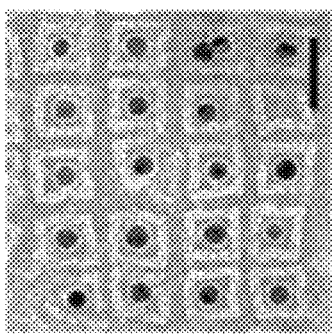

To emphasize the versatility of this approach for engineering particle arrangements, a chessboard-like 2D lattice was designed with alternative loading of AuNP in DNCs (FIG. 60K). The chess-board-like 2D lattices were also characterized by SAXS, where the experimental scattering peaks are consistent with the model (FIG. 60L). The resulting lattice with well-defined order has a $\sqrt{2}$-fold increase in the center-to-center nanoparticle distance (d1=62.8 nm) in comparison with the previous design for a flat square lattice shown in FIG. 60J.

Figure 61A:
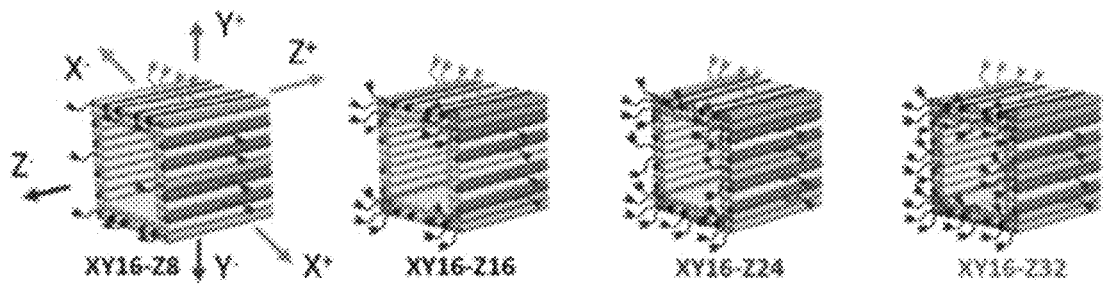
FIGS. 61A-61H provide images and diagram showing 3D assemblies of DNA nanochambers.

3D Assembly of DNA Nanochambers: The presented techniques were used to create DNCs with differentiated bonds in all three orthogonal directions and to explore their assembly behaviors. The complementary sticky ends were anchored along the three axes of DNC to construct the 3D assembly, combining approaches for the formation of the aforementioned 1D and 2D arrays. This seemingly simple addition of Z and XY interactions induces a quite nontrivial assembly behavior in 3D due to the competition between this longitudinal (Z) and lateral (XY) binding modes. Compared with 1D or 2D arrays, the growth of 3D structures within the XY-plane versus along the Z-axis resembles a tug-of-war, and this interplay has significant impacts on the assembly kinetics and the structures formed. In an effort to control the assembly process for DNCs with XYZ bonds, the 3D design was used with 16 sticky ends within the XY-plane that can afford well-defined 2D arrays, and varied the number of sticky ends along the Z-axis from 8, 16, 24, to 32 (FIG. 61A). For simplicity, they are referred as XYm-Zn, where m and n denote the number of sticky ends prescribed in the XY-plane and along the Z-axis, respectively. Sequences of these (m+n) sticky ends attached to a single DNC are entirely distinct from each other, and bonds for each axis (X, Y, and Z) are differentiated from each other.

Figure 61B:
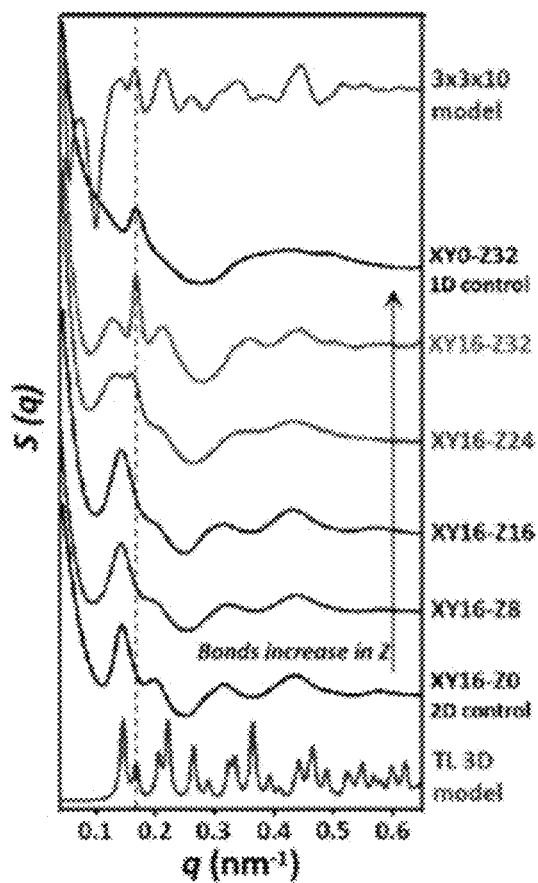

Following 3D assembly of these DNCs, SAXS measurements were performed to explore the structures of the resultant assemblies. FIG. 61B illustrates both experimental and modeled SAXS patterns of assembled structures for the relevant designs (m=16 and n=8, 16, 24-32). To enhance the X-ray scattering signal, the DNCs for all designs were filled with 10 nm AuNPs. Two additional experimental scattering patterns are shown as controls for the 3D assembly. The first control is the XY0-Z32 (interparticle distance c=37.8 nm) that assembles into 1D chains, due to the absence of a lateral binding mode, and the other one is the XY16-Z0 (lattice constant a=b=43.9 nm) that assembles into 2D arrays (adapted from FIG. 60J), due to the absence of the longitudinal binding mode. On the basis of the symmetry of DNC and these controls, one can expect that assembled 3D DNC arrays can correspond to that of a lattice with a primitive tetragonal unit cell whose lattice parameters are a=b=43.9 nm, c=37.8 nm, $\alpha=\beta=\gamma=90°$.

A modeled scattering pattern for this tetragonal lattice (TL) was thus generated and was displayed on the same plot. However, the comparison of the generated scattering pattern of a tetragonal lattice to the experimentally obtained patterns for the XY16-Z8 and XY16-Z16 systems revealed significant differences. The structure factors (S(q)) of XY16-Z8 and XY16-Z16 instead resemble that of XY16-Z0 (2D arrays), implying that the lateral growth dominates the assembly process. Similar to 1D and 2D systems discussed above, the growth of the 3D system within FTW of annealing can depend on the relative interaction strength of XYZ bonds. This can result in anisotropic growth or limited growth along the XY and Z direction. Since the growth rate in the XY and Z direction can be different for bond designs, the assembled structure is likely to be anisotropic, reflecting differences in growth rates. To further elucidate the structure of the assemblies, detailed electron microscopy was conducted.

Figure 61C:
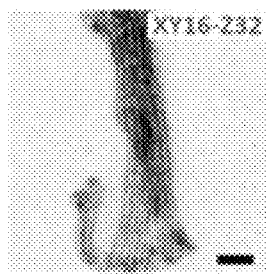
Figure 61F:
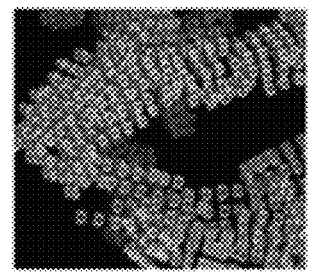
Figure 61D:
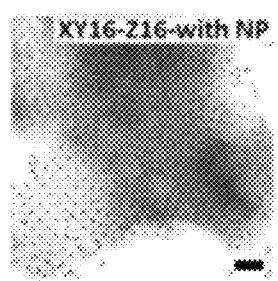
Figure 61G:
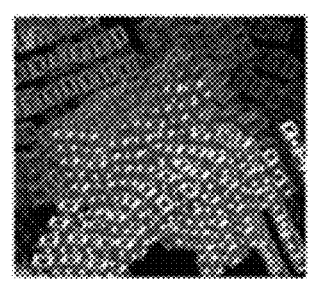
Figure 61E:
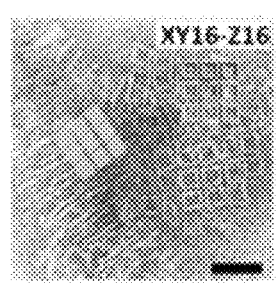

In FIGS. 61D and 61E, the TEM images of XY16-Z16 with and without encaging AuNPs, were shown, respectively. Large domains consisting of 2D AuNP lattices can be clearly visualized in FIG. 61D. Considering the 2D projection feature of TEM imaging, it is challenging to directly identify 3D architectures from TEM observation. However, the disclosed subject matter provides methods to capture two different kinds of DNC packing patterns within a single domain, which are parallel alignment of short 1D chains along the Z-axis and a 2D array pattern within the XY-plane (FIG. 61E), respectively. These two observed scenarios result from two projection views that are perpendicular to and parallel with Z direction of the 3D structures (FIG. 61E). Taken together, these results support that the growth of structures dominates within the XY-plane, leading to the formation of 3D structures with a limited number of layers along the Z-axis for XY16-Z8 and XY16-Z16.

The scattering profiles evolve with increasing bond strength (the number of sticky ends) along the Z-axis. For XY16-Z24 and XY16-Z32, the structure factors exhibit significant deviation from that of the 2D control (XY16-Z0), but these patterns still do not resemble that of the expected tetragonal lattice. In the case of a strong longitudinal binding mode, XY16-Z32, the scattering profile exhibits a peak at q=0.166 nm-1 (guided by the dash line) that corresponds to the center-to-center distance of two adjacent DNCs in 1D chains, as seen in the SAXS data of the 1D control sample (XY0-Z32). Note that this peak is not present in XY16-Z8 and XY16-Z16 scattering patterns. This suggests that the packing of DNCs along the Z-axis becomes a key structural feature of this system. Such a feature is directly confirmed by TEM imaging of XY16-Z32 (FIG. 61C) in which a high aspect ratio bundle of DNCs is observed.

To further analyze the above observation for the XY16-Z32 system, SAXS analysis was performed to understand both an internal order of assembly and the morphology of assembled structure. A finite 3D array was formed containing 3 (X)×3 (Y)×10 (Z) AuNPs-filled DNCs within which DNCs are arranged in a tetragonal unit cell, as an example of a Z-elongated assembled structure. This finite model captures the feature of fiber-like 3D structures, as observed in FIG. 61C. The scattering profile of this 3×3×10 model demonstrates an excellent match with the structure factor of the XY16-Z32 system, which further verify the feature of stacking along the Z-axis. This scattering model does not uniquely identify that the structure formed can be 3×3×10, but it rather indicates that the 3D assemblies formed have tetragonal internal organization and a high aspect ratio, which signifies a different growth rate along the XY and Z directions. Taken together, the XY16-Z8 and XY16-Z16 systems exhibit 2D-dominated morphology due to the relatively weak longitudinal binding. In contrast, for XY16-Z24 and XY16-Z32 systems with a strong longitudinal binding, a growth of 3D structure along Z-axis becomes dominant, leading to the formation of 3D structures with aspect ratio emphasized in the Z-direction. Within these both layer-like and fiber-like mesoscale 3D assemblies, a tetragonal organization of DNCs is still maintained due to their well-defined structure and prescribed binding modes.

Figure 61H:
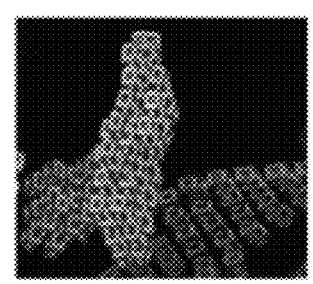

To understand the effects of relative binding energies along the Z-axis versus in the XY-plane on the crystallization process, molecular simulations of assembled 3D structures were performed. The design principles and multi-sequence features of the bonds are similar to the 2D case, but one bond was added on each corner of the cube along the Z-axis. The simulations was performed by keeping the number of bonds constant in the XY-plane, and the binding energy of each bond fixed ($\epsilon/K_bT=3.0$). The binding energy of each bond in Z direction can be varied ($3.0<E_z/K_bT<5.0$). The shape of clusters changes from the pancake-like 2D-dominated structures for $\epsilon_z/K_bT=3.0$ (FIG. 61H) to cubic-like structures for $\epsilon_z/K_bT=4.0$ (FIG. 61G), and fiber-like 1D-dominated structures for $\epsilon_z/K_bT=5.0$ (FIG. 61F). The relative shape anisotropy ($\kappa2=(3/2(\lambda_1^{\wedge 4}+\lambda_2^{\wedge 4}+\lambda_3^{\wedge 4}))/((\lambda_1^{\wedge 2}+\lambda_2^{\wedge 2}+\lambda_3^{\wedge 2})^{\wedge 2})-1/2$) was used to quantify the shape of these resultant crystallites, where $\lambda i^{\wedge}2$ are the eigenvalues of the gyration tensor of the clusters. The $\kappa2$ for the largest clusters in the system was calculated, and obtained $\kappa2=0.24$, 0.06, and 0.75, for pancake-like, cubic-like, and fiber-like crystallites, respectively. These values correspond to ideal disk-like ($\kappa2=0.25$), cubic-like ($\kappa2=0$), and rod-like ($\kappa2=1$) geometry, respectively, which further confirm the formation of 2D-dominated, cubic, and 1D-dominated crystallites in the molecular simulation.

The 2D-layer dominated (FIG. 61H) and 1D-fiber dominated 3D structures (FIG. 61F) predicted by simulation are qualitatively consistent with the disclosed observations. Simulations predict the formation of assemblies with cubic morphology (FIG. 61G). The cubic-like morphologies can occur in certain ranges of relative binding energy ($\epsilon z/\epsilon xy$) along the Z-axis versus in the XY-plane. In simulation, the disclosed techniques allow to systematically tune the value of $\epsilon z/\epsilon xy$ to catch a cubic 3D lattice. The changes of $\epsilon z/\epsilon xy$ can be discrete in certain designs. As illustrated in FIG. 61A, the binding energy along the Z-axis changes in a step of 8 bonds (8, 16, 24, and 32). A location of sticky ends for the XY (along the center of face) and Z (at edges) bonds can play a significant role due to the entropic effects and connectivity properties of individual sticky ends.

The disclosed subject matter provides a versatile strategy for creating nanoscale objects, DNA nanochambers (DNCs), with differentiated and dimensionally controlled bonds. Such objects offer polychromatic bonds, where each bond provides individual encoding with orientation and position control of inter-DNC binding, and the ability to carry nanocargoes. The ability to prescribe binding modes allows for the programmable assembly of DNCs into 1D, 2D, and 3D arrays. These structural variations are rationally achieved through fully prescribed bonds encoded along the X, Y, and Z orthogonal axes of DNCs. The disclosed subject matter explores the engineering of different architectures using this novel object. The disclosed subject matter can provide the followings: (i) Z encoded DNCs create homopolymers and heteropolymers with the ability to control the sequences of monomers and relative orientation, thus, generating helical polymers; (ii) XY encoded DNCs form 2D ordered square arrays with regulated chamber-filling patterns wherein the sizes of the 2D ordered arrays depend on the bonds strength; and (iii) three axes encoded DNCs assemble into mesoscale-sized 3D tetragonal arrays whose morphology is a result of competing Z- and XY-bonds. Both experimental and computational studies reveal that the design of binding modes is a crucial factor in the formation of the desired structures. These results provide a new insight into the governing principles of programmable assembly and offer a versatile approach, using bond encoding, for building complex organizations from functional nano-objects that can be readily integrated with nanochambers.

All patents, patent applications, publications, product descriptions, and protocols, cited in this specification are hereby incorporated by reference in their entireties. In case of a conflict in terminology, the present disclosure controls.

While it will become apparent that the subject matter herein described is well calculated to achieve the benefits and advantages set forth above, the presently disclosed subject matter is not to be limited in scope by the specific embodiments described herein. It will be appreciated that the disclosed subject matter is susceptible to modification, variation, and change without departing from the spirit thereof. Those skilled in the art will recognize or be able to ascertain using no more than routine experimentation, many equivalents to the specific embodiments described herein. Such equivalents are intended to be encompassed by the following claims.

What is claimed is:

1. A voxel, comprising
a plurality of frames including at least one single stranded (ss) DNA motif with at least one free base, wherein the at least one ssDNA motif hybridizes with a complementary strand fragment of other frames through vertex-to-vertex hybridization; and
at least one object, wherein the at least one object is located within the voxel.

2. The voxel of claim 1, wherein the plurality of frames comprises stand-alone DNA frames, polyhedral frames, or a combination thereof.

3. The voxel of claim 1, wherein the plurality of frames forms a tetrahedra framework, an octahedra framework, a cubic framework, or a combination thereof.

4. The voxel of claim 1, wherein the at least one object comprises a gold nano particle, a streptavidin, a protein, a quantum dot (QD), an enzyme, or a combination thereof.

5. The voxel of claim 4, wherein the object is a functionalized object.

6. The voxel of claim 1, wherein the voxel forms a three-dimensional (3D) origami lattice.

7. The voxel of claim 6, wherein the 3D origami lattice is a body-centered-cubic (BCC) lattice, a simple cubic (SC) lattice, or a cubic diamond lattice.

8. The voxel of claim 1, wherein the voxel is a DNA-prescribed voxel.

9. The voxel of claim 1, wherein the voxel is a valence-controlled voxel.

10. The voxel of claim 1, wherein the at least one object comprises a metallic particle, a semiconductor particle, a protein superlattice, or combinations thereof.

* * * * *

SEQUENCE LISTING

<160> NUMBER OF SEQ ID NOS: 557

<210> SEQ ID NO 1
<211> LENGTH: 30
<212> TYPE: DNA
<213> ORGANISM: Artificial sequence
<220> FEATURE:
<223> OTHER INFORMATION: Description: Octahedral DNA staple strand,
      name: OC-staple-1

<400> SEQUENCE: 1
tcaaagcgaa ccagaccgtt ttatatagtc                                  30

<210> SEQ ID NO 2
<211> LENGTH: 30
<212> TYPE: DNA
<213> ORGANISM: Artificial sequence
<220> FEATURE:
<223> OTHER INFORMATION: Description: Octahedral DNA staple strand,
      name: OC-staple-2

<400> SEQUENCE: 2
gctttgagga ctaaagagca acggggagtt                                  30

<210> SEQ ID NO 3
<211> LENGTH: 30
<212> TYPE: DNA
<213> ORGANISM: Artificial sequence
<220> FEATURE:
<223> OTHER INFORMATION: Description: Octahedral DNA staple strand,
      name: OC-staple-3

<400> SEQUENCE: 3
gtaaatcgtc gctattgaat aactcaagaa                                  30

<210> SEQ ID NO 4
<211> LENGTH: 30
<212> TYPE: DNA
<213> ORGANISM: Artificial sequence
<220> FEATURE:
<223> OTHER INFORMATION: Description: Octahedral DNA staple strand,
      name: OC-staple-4

<400> SEQUENCE: 4
aagccttaaa tcaagacttg cggagcaaat                                  30

<210> SEQ ID NO 5
<211> LENGTH: 30
<212> TYPE: DNA
<213> ORGANISM: Artificial sequence
<220> FEATURE:
<223> OTHER INFORMATION: Description: Octahedral DNA staple strand,
      name: OC-staple-5

<400> SEQUENCE: 5
attttaagaa ctggcttgaa ttatcagtga                                  30

<210> SEQ ID NO 6
<211> LENGTH: 30
<212> TYPE: DNA
<213> ORGANISM: Artificial sequence
<220> FEATURE:
<223> OTHER INFORMATION: Description: Octahedral DNA staple strand,
      name: OC-staple-6

<400> SEQUENCE: 6
gttaaaattc gcattataaa cgtaaactag                                  30

```
<210> SEQ ID NO 7
<211> LENGTH: 30
<212> TYPE: DNA
<213> ORGANISM: Artificial sequence
<220> FEATURE:
<223> OTHER INFORMATION: Description: Octahedral DNA staple strand,
      name: OC-staple-7

<400> SEQUENCE: 7
agcaccatta ccattacagc aaatgacgga                                   30

<210> SEQ ID NO 8
<211> LENGTH: 30
<212> TYPE: DNA
<213> ORGANISM: Artificial sequence
<220> FEATURE:
<223> OTHER INFORMATION: Description: Octahedral DNA staple strand,
      name: OC-staple-8

<400> SEQUENCE: 8
attgcgtaga ttttcaaaac agattgtttg                                   30

<210> SEQ ID NO 9
<211> LENGTH: 30
<212> TYPE: DNA
<213> ORGANISM: Artificial sequence
<220> FEATURE:
<223> OTHER INFORMATION: Description: Octahedral DNA staple strand,
      name: OC-staple-9

<400> SEQUENCE: 9
taacctgttt agctattttc gcattcattc                                   30

<210> SEQ ID NO 10
<211> LENGTH: 30
<212> TYPE: DNA
<213> ORGANISM: Artificial sequence
<220> FEATURE:
<223> OTHER INFORMATION: Description: Octahedral DNA staple strand,
      name: OC-staple-10

<400> SEQUENCE: 10
gtcagagggt aattgagaac accaaaatag                                   30

<210> SEQ ID NO 11
<211> LENGTH: 30
<212> TYPE: DNA
<213> ORGANISM: Artificial sequence
<220> FEATURE:
<223> OTHER INFORMATION: Description: Octahedral DNA staple strand,
      name: OC-staple-11

<400> SEQUENCE: 11
ctccagccag ctttcccctc aggacgttgg                                   30

<210> SEQ ID NO 12
<211> LENGTH: 30
<212> TYPE: DNA
<213> ORGANISM: Artificial sequence
<220> FEATURE:
<223> OTHER INFORMATION: Description: Octahedral DNA staple strand,
      name: OC-staple-12

<400> SEQUENCE: 12
gtccactatt aaagaaccag ttttggttcc                                   30
```

```
<210> SEQ ID NO 13
<211> LENGTH: 30
<212> TYPE: DNA
<213> ORGANISM: Artificial sequence
<220> FEATURE:
<223> OTHER INFORMATION: Description: Octahedral DNA staple strand,
      name: OC-staple-13

<400> SEQUENCE: 13
taaaggtggc aacatagtag aaaataataa                                          30

<210> SEQ ID NO 14
<211> LENGTH: 30
<212> TYPE: DNA
<213> ORGANISM: Artificial sequence
<220> FEATURE:
<223> OTHER INFORMATION: Description: Octahedral DNA staple strand,
      name: OC-staple-14

<400> SEQUENCE: 14
gataagtcct gaacaactgt ttaaagagaa                                          30

<210> SEQ ID NO 15
<211> LENGTH: 30
<212> TYPE: DNA
<213> ORGANISM: Artificial sequence
<220> FEATURE:
<223> OTHER INFORMATION: Description: Octahedral DNA staple strand,
      name: OC-staple-15

<400> SEQUENCE: 15
ggtaatagta aaatgtaagt tttacactat                                          30

<210> SEQ ID NO 16
<211> LENGTH: 30
<212> TYPE: DNA
<213> ORGANISM: Artificial sequence
<220> FEATURE:
<223> OTHER INFORMATION: Description: Octahedral DNA staple strand,
      name: OC-staple-16

<400> SEQUENCE: 16
tcagaaccgc caccctctca gagtattagc                                          30

<210> SEQ ID NO 17
<211> LENGTH: 30
<212> TYPE: DNA
<213> ORGANISM: Artificial sequence
<220> FEATURE:
<223> OTHER INFORMATION: Description: Octahedral DNA staple strand,
      name: OC-staple-17

<400> SEQUENCE: 17
aagggaaccg aactgagcag acggtatcat                                          30

<210> SEQ ID NO 18
<211> LENGTH: 30
<212> TYPE: DNA
<213> ORGANISM: Artificial sequence
<220> FEATURE:
<223> OTHER INFORMATION: Description: Octahedral DNA staple strand,
      name: OC-staple-18

<400> SEQUENCE: 18
gtaaagattc aaaaggcctg agttgaccct                                          30
```

```
<210> SEQ ID NO 19
<211> LENGTH: 30
<212> TYPE: DNA
<213> ORGANISM: Artificial sequence
<220> FEATURE:
<223> OTHER INFORMATION: Description: Octahedral DNA staple strand,
      name: OC-staple-19

<400> SEQUENCE: 19
aggcgttaaa taagaagacc gtgtcgcaag                                      30

<210> SEQ ID NO 20
<211> LENGTH: 30
<212> TYPE: DNA
<213> ORGANISM: Artificial sequence
<220> FEATURE:
<223> OTHER INFORMATION: Description: Octahedral DNA staple strand,
      name: OC-staple-20

<400> SEQUENCE: 20
caggtcgact ctagagcaag cttcaaggcg                                      30

<210> SEQ ID NO 21
<211> LENGTH: 30
<212> TYPE: DNA
<213> ORGANISM: Artificial sequence
<220> FEATURE:
<223> OTHER INFORMATION: Description: Octahedral DNA staple strand,
      name: OC-staple-21

<400> SEQUENCE: 21
cagagccacc accctctcag aactcgagag                                      30

<210> SEQ ID NO 22
<211> LENGTH: 30
<212> TYPE: DNA
<213> ORGANISM: Artificial sequence
<220> FEATURE:
<223> OTHER INFORMATION: Description: Octahedral DNA staple strand,
      name: OC-staple-22

<400> SEQUENCE: 22
ttcacgttga aaatcttgcg aatgggattt                                      30

<210> SEQ ID NO 23
<211> LENGTH: 30
<212> TYPE: DNA
<213> ORGANISM: Artificial sequence
<220> FEATURE:
<223> OTHER INFORMATION: Description: Octahedral DNA staple strand,
      name: OC-staple-23

<400> SEQUENCE: 23
aagttttaac ggggtcggag tgtagaatgg                                      30

<210> SEQ ID NO 24
<211> LENGTH: 30
<212> TYPE: DNA
<213> ORGANISM: Artificial sequence
<220> FEATURE:
<223> OTHER INFORMATION: Description: Octahedral DNA staple strand,
      name: OC-staple-24

<400> SEQUENCE: 24
ttgcgtattg ggcgcccgcg gggtgcgctc                                      30

<210> SEQ ID NO 25
```

```
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-25

<400> SEQUENCE: 25
gtcaccagag ccatggtgaa ttatcaccaa tcagaaaagc ct                              42

<210> SEQ ID NO 26
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-26

<400> SEQUENCE: 26
ggacagagtt actttgtcga aatccgcgtg tatcaccgta cg                              42

<210> SEQ ID NO 27
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-27

<400> SEQUENCE: 27
caacatgatt tacgagcatg gaataagtaa gacgacaata aa                              42

<210> SEQ ID NO 28
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-28

<400> SEQUENCE: 28
aaccagacgc tacgttaata aaacgaacat accacattca gg                              42

<210> SEQ ID NO 29
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-29

<400> SEQUENCE: 29
tgacctacta gaaaaagccc caggcaaagc aatttcatct tc                              42

<210> SEQ ID NO 30
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-30

<400> SEQUENCE: 30
tgccggaagg ggactcgtaa ccgtgcatta tattttagtt ct                              42

<210> SEQ ID NO 31
<211> LENGTH: 42
```

<212> TYPE: DNA
<213> ORGANISM: Artificial sequence
<220> FEATURE:
<223> OTHER INFORMATION: Description: Octahedral DNA staple strand,
      name: OC-staple-31

<400> SEQUENCE: 31
agaaccccaa atcaccatct gcggaatcga ataaaaattt tt        42

<210> SEQ ID NO 32
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-32

<400> SEQUENCE: 32
gctccattgt gtaccgtaac actgagttag ttagcgtaac ct        42

<210> SEQ ID NO 33
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-33

<400> SEQUENCE: 33
agtaccgaat aggaacccaa acggtgtaac ctcaggaggt tt        42

<210> SEQ ID NO 34
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-34

<400> SEQUENCE: 34
cagtttgaat gtttagtatc atatgcgtag aatcgccata gc        42

<210> SEQ ID NO 35
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-35

<400> SEQUENCE: 35
aagattgttt tttaaccaag aaaccatcga cccaaaaaca gg        42

<210> SEQ ID NO 36
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-36

<400> SEQUENCE: 36
tcagagcgcc accacataat caaaatcaga acgagtagta tg        42

<210> SEQ ID NO 37
<211> LENGTH: 42
<212> TYPE: DNA

```
<213> ORGANISM: Artificial sequence
<220> FEATURE:
<223> OTHER INFORMATION: Description: Octahedral DNA staple strand,
      name: OC-staple-37

<400> SEQUENCE: 37
gatggttggg aagaaaaatc caccagaaat aattgggctt ga                    42

<210> SEQ ID NO 38
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-38

<400> SEQUENCE: 38
ctccttaacg tagaaaccaa tcaataattc atcgagaaca ga                    42

<210> SEQ ID NO 39
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-39

<400> SEQUENCE: 39
agacacctta cgcagaactg gcatgatttt ctgtccagac aa                    42

<210> SEQ ID NO 40
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-40

<400> SEQUENCE: 40
gccagctagg cgatagctta gattaagacc tttttaacct gt                    42

<210> SEQ ID NO 41
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-41

<400> SEQUENCE: 41
ccgacttatt aggaacgcca tcaaaaatga gtaacaaccc ca                    42

<210> SEQ ID NO 42
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-42

<400> SEQUENCE: 42
gtccaatagc gagaaccaga cgacgatatt caacgcaagg ga                    42

<210> SEQ ID NO 43
<211> LENGTH: 42
<212> TYPE: DNA
<213> ORGANISM: Artificial sequence
```

```
<220> FEATURE:
<223> OTHER INFORMATION: Description: Octahedral DNA staple strand,
      name: OC-staple-43

<400> SEQUENCE: 43
ccaaaataca atatgatatt caaccgttag gctatcaggt aa                          42

<210> SEQ ID NO 44
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-44

<400> SEQUENCE: 44
aacagtactt gaaaacatat gagacgggtc tttttaatg ga                           42

<210> SEQ ID NO 45
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-45

<400> SEQUENCE: 45
tttcaccgca ttaaagtcgg gaaacctgat ttgaattacc ca                          42

<210> SEQ ID NO 46
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-46

<400> SEQUENCE: 46
gagaatagag ccttaccgtc tatcaaatgg agcggaatta ga                          42

<210> SEQ ID NO 47
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-47

<400> SEQUENCE: 47
ataattaaat ttaaaaaact ttttcaaact tttaacaacg cc                          42

<210> SEQ ID NO 48
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-48

<400> SEQUENCE: 48
gcacccagcg ttttttatcc ggtattctag gcgaattatt ca                          42

<210> SEQ ID NO 49
<211> LENGTH: 42
<212> TYPE: DNA
<213> ORGANISM: Artificial sequence
<220> FEATURE:
```

```
<223> OTHER INFORMATION: Description: Octahedral DNA staple strand,
      name: OC-staple-49

<400> SEQUENCE: 49
ggaagcgccc acaaacagtt aatgccccga ctcctcaaga ta                          42

<210> SEQ ID NO 50
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-50

<400> SEQUENCE: 50
gtttgcctat tcacaggcag gtcagacgcc accacaccac cc                          42

<210> SEQ ID NO 51
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-51

<400> SEQUENCE: 51
cgcgagctta gttttccca attctgcgca agtgtaaagc ct                           42

<210> SEQ ID NO 52
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-52

<400> SEQUENCE: 52
agaagcaacc aagccaaaag aatacactaa tgccaaaact cc                          42

<210> SEQ ID NO 53
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-53

<400> SEQUENCE: 53
attaagtata aagcggcaag gcaaagaaac taatagggta cc                          42

<210> SEQ ID NO 54
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-54

<400> SEQUENCE: 54
cagtgcctac atgggaattt accgttccac aagtaagcag at                          42

<210> SEQ ID NO 55
<211> LENGTH: 42
<212> TYPE: DNA
<213> ORGANISM: Artificial sequence
<220> FEATURE:
<223> OTHER INFORMATION: Description: Octahedral DNA staple strand,
``` name: OC-staple-55

<400> SEQUENCE: 55
ataaggcgcc aaaagttgag atttaggata acggaccagt ca             42

<210> SEQ ID NO 56
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-56

<400> SEQUENCE: 56
tgctaaacag atgaagaaac caccagaatt taaaaaaagg ct             42

<210> SEQ ID NO 57
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-57

<400> SEQUENCE: 57
cagccttggt tttgtattaa gaggctgact gcctatatca ga             42

<210> SEQ ID NO 58
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-58

<400> SEQUENCE: 58
cggaataatt caacccagcg ccaaagactt attttaacgc aa             42

<210> SEQ ID NO 59
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-59

<400> SEQUENCE: 59
cgcctgaatt accctaatct tgacaagaca gaccatgaaa ga             42

<210> SEQ ID NO 60
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-60

<400> SEQUENCE: 60
acgcgaggct acaacagtac cttttacaaa tcgcgcagag aa             42

<210> SEQ ID NO 61
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-61

```
<400> SEQUENCE: 61
cagcgaacat taaaagagag tacctttact gaatataatg aa              42

<210> SEQ ID NO 62
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-62

<400> SEQUENCE: 62
ggacgtttaa tttcgacgag aaacaccacc actaatgcag at              42

<210> SEQ ID NO 63
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-63

<400> SEQUENCE: 63
aaagcgccaa agtttatctt accgaagccc aataatgagt aa              42

<210> SEQ ID NO 64
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-64

<400> SEQUENCE: 64
gagctcgttg taaacgccag ggttttccaa agcaataaag cc              42

<210> SEQ ID NO 65
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-65

<400> SEQUENCE: 65
aattattgtt ttcatgcctt tagcgtcaga tagcacggaa ac              42

<210> SEQ ID NO 66
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-66

<400> SEQUENCE: 66
aagtttcaga cagccgggat cgtcaccctt ctgtagctca ac              42

<210> SEQ ID NO 67
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-67
```

<400> SEQUENCE: 67
acaaagaaat ttaggtaggg cttaattgta tacaacggaa tc					42

<210> SEQ ID NO 68
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-68

<400> SEQUENCE: 68
aacaaaaata actaggtctg agagactacg ctgagtttcc ct					42

<210> SEQ ID NO 69
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-69

<400> SEQUENCE: 69
cataacctaa atcaacagtt cagaaaacgt cataaggata gc					42

<210> SEQ ID NO 70
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-70

<400> SEQUENCE: 70
cacgacgaat tcgtgtggca tcaattcttt agcaaaatta cg					42

<210> SEQ ID NO 71
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-71

<400> SEQUENCE: 71
cctaccaaca gtaattttat cctgaatcaa acagccatat ga					42

<210> SEQ ID NO 72
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-72

<400> SEQUENCE: 72
gattataaag aaacgccagt tacaaaattt accaacgtca ga					42

<210> SEQ ID NO 73
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-73

<400> SEQUENCE: 73
agtagattga aaagaatcat ggtcatagcc ggaagcataa gt                    42

<210> SEQ ID NO 74
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-74

<400> SEQUENCE: 74
tagaatccat aaatcattta acaatttctc ccggcttagg tt                    42

<210> SEQ ID NO 75
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-75

<400> SEQUENCE: 75
aaaggccaaa tatgttagag cttaattgat tgctccatga gg                    42

<210> SEQ ID NO 76
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-76

<400> SEQUENCE: 76
ccaaaaggaa aggacaacag tttcagcgaa tcatcatatt cc                    42

<210> SEQ ID NO 77
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-77

<400> SEQUENCE: 77
gaaatcgata accggatacc gatagttgta tcagctccaa cg                    42

<210> SEQ ID NO 78
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-78

<400> SEQUENCE: 78
tgaatattat caaaataatg gaagggttaa tatttatccc aa                    42

<210> SEQ ID NO 79
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-79

<400> SEQUENCE: 79
gaggaagcag gattcgggta aaatacgtaa aacacccccc ag         42

<210> SEQ ID NO 80
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-80

<400> SEQUENCE: 80
ggttgatttt ccagcagaca gccctcattc gtcacgggat ag         42

<210> SEQ ID NO 81
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-81

<400> SEQUENCE: 81
caagccccca cccttagccc ggaataggac gatctaaagt tt         42

<210> SEQ ID NO 82
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-82

<400> SEQUENCE: 82
tgtagatatt acgcggcgat cggtgcgggc gccatcttct gg         42

<210> SEQ ID NO 83
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-83

<400> SEQUENCE: 83
catcctattc agctaaaagg taaagtaaaa agcaagccgt tt         42

<210> SEQ ID NO 84
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-84

<400> SEQUENCE: 84
cagctcatat aagcgtaccc cggttgatgt gtcggattct cc         42

<210> SEQ ID NO 85
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-85

<400> SEQUENCE: 85
catgtcacaa acggcattaa atgtgagcaa ttcgcgttaa at         42

<210> SEQ ID NO 86
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-86

<400> SEQUENCE: 86
agcgtcacgt ataagaattg agttaagccc tttttaagaa ag                42

<210> SEQ ID NO 87
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-87

<400> SEQUENCE: 87
tataaagcat cgtaaccaag taccgcaccg gctgtaatat cc                42

<210> SEQ ID NO 88
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-88

<400> SEQUENCE: 88
atagcccgcg aaaataattg tatcggttcg ccgacaatga gt                42

<210> SEQ ID NO 89
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-89

<400> SEQUENCE: 89
agacagttca tataggagaa gcctttataa cattgcctga ga                42

<210> SEQ ID NO 90
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-90

<400> SEQUENCE: 90
aacaggtccc gaaattgcat caaaaagatc tttgatcatc ag                42

<210> SEQ ID NO 91
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-91

<400> SEQUENCE: 91
actgcccttg ccccgttgca gcaagcggca acagcttttt ct                42

<210> SEQ ID NO 92
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-92

<400> SEQUENCE: 92
tcaaagggag atagcccta taaatcaaga caacaaccat cg         42

<210> SEQ ID NO 93
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-93

<400> SEQUENCE: 93
gtaatacgca aacatgagag atctacaact agctgaggcc gg         42

<210> SEQ ID NO 94
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-94

<400> SEQUENCE: 94
gagataacat tagaagaata acataaaaag gaaggattag ga         42

<210> SEQ ID NO 95
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-95

<400> SEQUENCE: 95
cagatattac ctgaatacca agttacaatc gggagctatt tt         42

<210> SEQ ID NO 96
<211> LENGTH: 42
<212> TYPE: DNA
<213> ORGANISM: Artificial sequence
<220> FEATURE:
<223> OTHER INFORMATION: Description: Octahedral DNA staple strand,
      name: OC-staple-96

<400> SEQUENCE: 96
catataacta atgaacacaa catacgagct gtttctttgg gg         42

<210> SEQ ID NO 97
<211> LENGTH: 54
<212> TYPE: DNA
<213> ORGANISM: Artificial sequence
<220> FEATURE:
<223> OTHER INFORMATION: Description: Octahedral DNA staple strand,
      name: OC-staple-97

<400> SEQUENCE: 97
atgttttgct tttgatcgga acgagggtac tttttctttt gataagaggt catt         54

```
<210> SEQ ID NO 98
<211> LENGTH: 54
<212> TYPE: DNA
<213> ORGANISM: Artificial sequence
<220> FEATURE:
<223> OTHER INFORMATION: Description: Octahedral DNA staple strand,
      name: OC-staple-98

<400> SEQUENCE: 98
ggggtgccag ttgagaccat tagatacaat tttcactgtg tgaaattgtt atcc        54

<210> SEQ ID NO 99
<211> LENGTH: 54
<212> TYPE: DNA
<213> ORGANISM: Artificial sequence
<220> FEATURE:
<223> OTHER INFORMATION: Description: Octahedral DNA staple strand,
      name: OC-staple-99

<400> SEQUENCE: 99
cttcgctggg cgcagacgac agtatcgggg caccgtcgcc attcaggctg cgca        54

<210> SEQ ID NO 100
<211> LENGTH: 54
<212> TYPE: DNA
<213> ORGANISM: Artificial sequence
<220> FEATURE:
<223> OTHER INFORMATION: Description: Octahedral DNA staple strand,
      name: OC-staple-100

<400> SEQUENCE: 100
tcagagctgg gtaaacgacg gccagtgcga tccccgtagt agcattaaca tcca        54

<210> SEQ ID NO 101
<211> LENGTH: 54
<212> TYPE: DNA
<213> ORGANISM: Artificial sequence
<220> FEATURE:
<223> OTHER INFORMATION: Description: Octahedral DNA staple strand,
      name: OC-staple-101

<400> SEQUENCE: 101
ttagcggtac agagcgggag aattaactgc gctaatttcg gaacctatta ttct        54

<210> SEQ ID NO 102
<211> LENGTH: 54
<212> TYPE: DNA
<213> ORGANISM: Artificial sequence
<220> FEATURE:
<223> OTHER INFORMATION: Description: Octahedral DNA staple strand,
      name: OC-staple-102

<400> SEQUENCE: 102
gatattctaa attgagccgg aacgaggccc aacttggcgc ataggctggc tgac        54

<210> SEQ ID NO 103
<211> LENGTH: 54
<212> TYPE: DNA
<213> ORGANISM: Artificial sequence
<220> FEATURE:
<223> OTHER INFORMATION: Description: Octahedral DNA staple strand,
      name: OC-staple-103

<400> SEQUENCE: 103
tgtcgtcata agtacagaac cgccacccat tttcacagta caaactacaa cgcc        54

<210> SEQ ID NO 104
```

```
<211> LENGTH: 54
<212> TYPE: DNA
<213> ORGANISM: Artificial sequence
<220> FEATURE:
<223> OTHER INFORMATION: Description: Octahedral DNA staple strand,
      name: OC-staple-104

<400> SEQUENCE: 104
cgattataag cggagacttc aaatatcgcg gaagcctacg aaggcaccaa ccta        54

<210> SEQ ID NO 105
<211> LENGTH: 54
<212> TYPE: DNA
<213> ORGANISM: Artificial sequence
<220> FEATURE:
<223> OTHER INFORMATION: Description: Octahedral DNA staple strand,
      name: OC-staple-105

<400> SEQUENCE: 105
aacatgtacg cgagtggttt gaaataccta aacacattct taccagtata aagc        54

<210> SEQ ID NO 106
<211> LENGTH: 54
<212> TYPE: DNA
<213> ORGANISM: Artificial sequence
<220> FEATURE:
<223> OTHER INFORMATION: Description: Octahedral DNA staple strand,
      name: OC-staple-106

<400> SEQUENCE: 106
gtctggattt tgcgttttaa atgcaatggt gagaaataaa ttaatgccgg agag        54

<210> SEQ ID NO 107
<211> LENGTH: 54
<212> TYPE: DNA
<213> ORGANISM: Artificial sequence
<220> FEATURE:
<223> OTHER INFORMATION: Description: Octahedral DNA staple strand,
      name: OC-staple-107

<400> SEQUENCE: 107
gccttgaatc ttttccggaa ccgcctccca gagcccagag ccgccgccag catt        54

<210> SEQ ID NO 108
<211> LENGTH: 54
<212> TYPE: DNA
<213> ORGANISM: Artificial sequence
<220> FEATURE:
<223> OTHER INFORMATION: Description: Octahedral DNA staple strand,
      name: OC-staple-108

<400> SEQUENCE: 108
cgctggtgct ttcctgaatc ggccaacgag ggtggtgatt gcccttcacc gcct        54

<210> SEQ ID NO 109
<211> LENGTH: 54
<212> TYPE: DNA
<213> ORGANISM: Artificial sequence
<220> FEATURE:
<223> OTHER INFORMATION: Description: Octahedral DNA staple strand,
      name: OC-staple-109

<400> SEQUENCE: 109
tgattatcaa ctttacaact aaaggaatcc aaaaagtttg agtaacatta tcat        54

<210> SEQ ID NO 110
<211> LENGTH: 54
```

```
<212> TYPE: DNA
<213> ORGANISM: Artificial sequence
<220> FEATURE:
<223> OTHER INFORMATION: Description: Octahedral DNA staple strand,
      name: OC-staple-110

<400> SEQUENCE: 110
acataacttg ccctaacttt aatcattgca ttataacaac attattacag gtag          54

<210> SEQ ID NO 111
<211> LENGTH: 54
<212> TYPE: DNA
<213> ORGANISM: Artificial sequence
<220> FEATURE:
<223> OTHER INFORMATION: Description: Octahedral DNA staple strand,
      name: OC-staple-111

<400> SEQUENCE: 111
gtagcgccat taaattggga attagagcgc aaggcgcacc gtaatcagta gcga          54

<210> SEQ ID NO 112
<211> LENGTH: 54
<212> TYPE: DNA
<213> ORGANISM: Artificial sequence
<220> FEATURE:
<223> OTHER INFORMATION: Description: Octahedral DNA staple strand,
      name: OC-staple-112

<400> SEQUENCE: 112
ttatttttac cgacaatgca gaacgcgcga aaaatctttc cttatcattc caag          54

<210> SEQ ID NO 113
<211> LENGTH: 54
<212> TYPE: DNA
<213> ORGANISM: Artificial sequence
<220> FEATURE:
<223> OTHER INFORMATION: Description: Octahedral DNA staple strand,
      name: OC-staple-113

<400> SEQUENCE: 113
tttcaataga aggcagcgaa cctcccgatt agttgaaaca ataacggatt cgcc          54

<210> SEQ ID NO 114
<211> LENGTH: 54
<212> TYPE: DNA
<213> ORGANISM: Artificial sequence
<220> FEATURE:
<223> OTHER INFORMATION: Description: Octahedral DNA staple strand,
      name: OC-staple-114

<400> SEQUENCE: 114
gggcgacccc aaaagtatgt tagcaaacta aaagagtcac aatcaataga aaat          54

<210> SEQ ID NO 115
<211> LENGTH: 54
<212> TYPE: DNA
<213> ORGANISM: Artificial sequence
<220> FEATURE:
<223> OTHER INFORMATION: Description: Octahedral DNA staple strand,
      name: OC-staple-115

<400> SEQUENCE: 115
agccgaaagt ctctcttttg atgatacaag tgccttaaga gcaagaaaca atga          54

<210> SEQ ID NO 116
<211> LENGTH: 54
<212> TYPE: DNA
```

```
<213> ORGANISM: Artificial sequence
<220> FEATURE:
<223> OTHER INFORMATION: Description: Octahedral DNA staple strand,
      name: OC-staple-116

<400> SEQUENCE: 116
gtgggaaatc atataaatat ttaaattgaa tttttgtctg gccttcctgt agcc         54

<210> SEQ ID NO 117
<211> LENGTH: 54
<212> TYPE: DNA
<213> ORGANISM: Artificial sequence
<220> FEATURE:
<223> OTHER INFORMATION: Description: Octahedral DNA staple strand,
      name: OC-staple-117

<400> SEQUENCE: 117
cccacgcgca aaatggttga gtgttgttcg tggacttgct ttcgaggtga attt         54

<210> SEQ ID NO 118
<211> LENGTH: 54
<212> TYPE: DNA
<213> ORGANISM: Artificial sequence
<220> FEATURE:
<223> OTHER INFORMATION: Description: Octahedral DNA staple strand,
      name: OC-staple-118

<400> SEQUENCE: 118
atgaccactc gtttggcttt tgcaaaagtt agactatatt cattgaatcc ccct         54

<210> SEQ ID NO 119
<211> LENGTH: 54
<212> TYPE: DNA
<213> ORGANISM: Artificial sequence
<220> FEATURE:
<223> OTHER INFORMATION: Description: Octahedral DNA staple strand,
      name: OC-staple-119

<400> SEQUENCE: 119
tccaaatctt ctgaattatt tgcacgtagg tttaacgcta acgagcgtct ttcc         54

<210> SEQ ID NO 120
<211> LENGTH: 54
<212> TYPE: DNA
<213> ORGANISM: Artificial sequence
<220> FEATURE:
<223> OTHER INFORMATION: Description: Octahedral DNA staple strand,
      name: OC-staple-120

<400> SEQUENCE: 120
gggttattta attacaatat atgtgagtaa ttaataagag tcaatagtga attt         54

<210> SEQ ID NO 121
<211> LENGTH: 39
<212> TYPE: DNA
<213> ORGANISM: Artificial sequence
<220> FEATURE:
<223> OTHER INFORMATION: Description: Construct element: gold
      nanoparticle or quantum dot attachment sequence

<400> SEQUENCE: 121
atccatcact tcatactcta cgttgttgtt gttgttgtt                          39

<210> SEQ ID NO 122
<211> LENGTH: 39
<212> TYPE: DNA
<213> ORGANISM: Artificial sequence
```

```
<220> FEATURE:
<223> OTHER INFORMATION: Description: Construct element: gold
      nanoparticle or quantum dot attachment sequence

<400> SEQUENCE: 122
ctaccatcat acctactcta cgttgttgtt gttgttgtt                    39

<210> SEQ ID NO 123
<211> LENGTH: 15
<212> TYPE: DNA
<213> ORGANISM: Artificial sequence
<220> FEATURE:
<223> OTHER INFORMATION: Description: Construct element: streptavidins
      attachment sequence

<400> SEQUENCE: 123
atccatcact tcttt                                              15

<210> SEQ ID NO 124
<211> LENGTH: 27
<212> TYPE: DNA
<213> ORGANISM: Artificial sequence
<220> FEATURE:
<223> OTHER INFORMATION: Description: Construct element: GOx enzyme
      attachment sequence

<400> SEQUENCE: 124
ttcttcttca tccatactac catctac                                 27

<210> SEQ ID NO 125
<211> LENGTH: 27
<212> TYPE: DNA
<213> ORGANISM: Artificial sequence
<220> FEATURE:
<223> OTHER INFORMATION: Description: Construct element: HRP enzyme
      attachment sequence

<400> SEQUENCE: 125
cttcttctta tacttcacta cctaatc                                 27

<210> SEQ ID NO 126
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 126
tttgcggatg gccaactaaa gtacgggctt gcagctacag agttttttt tttttttttt    60 ttttatccgt ta                                                       72

<210> SEQ ID NO 127
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 127
cttcatcaag agaaatcaac gtaacagaga tttgtcaatc atttttttt tttttttttt    60 ttttatccgt ta                                                       72

<210> SEQ ID NO 128
```

```
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 128
aaagattcat caggaattac gaggcatgct catccttatg cgtttttttt tttttttttt    60
ttttatccgt ta                                                        72

<210> SEQ ID NO 129
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 129
ataaatcata cataaatcgg ttgtactgtg ctggcatgcc tgtttttttt tttttttttt    60
ttttatccgt ta                                                        72

<210> SEQ ID NO 130
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 130
ggtagctatt ttagagaatc gatgaaaaca ttaaatgtgt agtttttttt tttttttttt    60
ttttatccgt ta                                                        72

<210> SEQ ID NO 131
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 131
caaatgcttt aaaaaatcag gtctttaaga gcagccagag ggtttttttt tttttttttt    60
ttttatccgt ta                                                        72

<210> SEQ ID NO 132
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 132
tcatatggtt tacgattgag ggagggaaac gcaatacata cattttttt tttttttttt     60 ttttatccgt ta                                                        72

<210> SEQ ID NO 133
<211> LENGTH: 72
<212> TYPE: DNA
<213> ORGANISM: Artificial sequence
<220> FEATURE:
```

<223> OTHER INFORMATION: Description: Construct component: DNA sticky
     ends for octahedron

<400> SEQUENCE: 133
caacgctcaa cagcagaggc attttcaatc caatgataaa tattttttt tttttttttt      60 ttttatccgt ta                                                        72

<210> SEQ ID NO 134
<211> LENGTH: 72
<212> TYPE: DNA
<213> ORGANISM: Artificial sequence
<220> FEATURE:
<223> OTHER INFORMATION: Description: Construct component: DNA sticky
     ends for octahedron

<400> SEQUENCE: 134
aatagcaata gcaccagaag gaaacctaaa gccactggta attttttttt tttttttttt     60
ttttatccgt ta                                                        72

<210> SEQ ID NO 135
<211> LENGTH: 72
<212> TYPE: DNA
<213> ORGANISM: Artificial sequence
<220> FEATURE:
<223> OTHER INFORMATION: Description: Construct component: DNA sticky
     ends for octahedron

<400> SEQUENCE: 135
gacaggaggt tgaaacaaat aaatccgccc cctccgccac cctttttttt tttttttttt     60
ttttatccgt ta                                                        72

<210> SEQ ID NO 136
<211> LENGTH: 72
<212> TYPE: DNA
<213> ORGANISM: Artificial sequence
<220> FEATURE:
<223> OTHER INFORMATION: Description: Construct component: DNA sticky
     ends for octahedron

<400> SEQUENCE: 136
agctttcatc aacggattga ccgtaaaatc gtataatatt tttttttttt tttttttttt     60
ttttatccgt ta                                                        72

<210> SEQ ID NO 137
<211> LENGTH: 72
<212> TYPE: DNA
<213> ORGANISM: Artificial sequence
<220> FEATURE:
<223> OTHER INFORMATION: Description: Construct component: DNA sticky
     ends for octahedron

<400> SEQUENCE: 137
agagcctaat ttgattttt gtttaaatcc tgaaataaag aattttttt tttttttttt       60 ttttatccgt ta                                                        72

<210> SEQ ID NO 138
<211> LENGTH: 72
<212> TYPE: DNA
<213> ORGANISM: Artificial sequence
<220> FEATURE:
<223> OTHER INFORMATION: Description: Construct component: DNA sticky
     ends for octahedron

<400> SEQUENCE: 138

-continued

```
gctcacaatt ccgtgagcta actcactgga agtaatggtc aatttttttt tttttttttt    60
ttttatccgt ta                                                         72

<210> SEQ ID NO 139
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 139
cttaaacagc ttatatattc ggtcgcttga tggggaacaa gatttttttt tttttttttt    60
ttttatccgt ta                                                         72

<210> SEQ ID NO 140
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 140
aaacgaaaga gggcgaaaca aagtactgac tatattcgag ctttttttttt tttttttttt   60 ttttatccgt ta                                                         72

<210> SEQ ID NO 141
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 141
actgttggga agcagctggc gaaaggatag gtcaagatcg catttttttt tttttttttt    60
ttttatccgt ta                                                         72

<210> SEQ ID NO 142
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 142
ggccctgaga gaagcaggcg aaaatcattg cgtagaggcg gtttttttttt tttttttttt   60 ttttatccgt ta                                                         72

<210> SEQ ID NO 143
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 143
aacgggtatt aaggaatcat taccgccagt aattcaacaa tatttttttt tttttttttt    60
ttttatccgt ta                                                         72
```

<210> SEQ ID NO 144
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 144
cagaatcaag tttcggcatt ttcggttaaa tatatcacca gtttttttttt tttttttttt    60 ttttatccgt ta                                                         72

<210> SEQ ID NO 145
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 145
gaaacatgaa agctcagtac caggcgaaaa atgctgaaca aatttttttt tttttttttt    60
ttttatccgt ta                                                         72

<210> SEQ ID NO 146
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 146
atcaaaatca tatatgtaaa tgctgaacaa acacttgctt ctttttttttt tttttttttt    60 ttttatccgt ta                                                         72

<210> SEQ ID NO 147
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 147
tgattgcttt gagcaaaaga agatgaaata gcagaggttt tgttttttttt tttttttttt    60 ttttatccgt ta                                                         72

<210> SEQ ID NO 148
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 148
tttgcggaac aatggcaatt catcaatctg tataataatt tttttttttt tttttttttt    60
ttttatccgt ta                                                         72

<210> SEQ ID NO 149
<211> LENGTH: 72

```
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 149
tgtagcattc caacgttagt aaatgaagtg ccgcgccacc ctttttttt tttttttttt       60 ttttatccgt ta                                                         72

<210> SEQ ID NO 150
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 150
tttgcggatg gccaactaaa gtacgggctt gcagctacag agttttttt tttttttttt       60 tttttaacgg at                                                         72

<210> SEQ ID NO 151
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 151
cttcatcaag agaaatcaac gtaacagaga tttgtcaatc attttttttt tttttttttt       60
tttttaacgg at                                                         72

<210> SEQ ID NO 152
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 152
aaagattcat caggaattac gaggcatgct catccttatg cgttttttt tttttttttt       60 tttttaacgg at                                                         72

<210> SEQ ID NO 153
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 153
ataaatcata cataaatcgg ttgtactgtg ctggcatgcc tgtttttttt tttttttttt       60
tttttaacgg at                                                         72

<210> SEQ ID NO 154
<211> LENGTH: 72
<212> TYPE: DNA
<213> ORGANISM: Artificial sequence
<220> FEATURE:
<223> OTHER INFORMATION: Description: Construct component: DNA sticky
``` ends for octahedron

<400> SEQUENCE: 154
ggtagctatt ttagagaatc gatgaaaaca ttaaatgtgt agtttttttt tttttttttt    60
tttttaacgg at    72

<210> SEQ ID NO 155
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 155
caaatgcttt aaaaaatcag gtctttaaga gcagccagag ggtttttttt tttttttttt    60
tttttaacgg at    72

<210> SEQ ID NO 156
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 156
tcatatggtt tacgattgag ggagggaaac gcaatacata cattttttt tttttttttt    60 tttttaacgg at    72

<210> SEQ ID NO 157
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 157
caacgctcaa cagcagaggc attttcaatc caatgataaa tattttttt tttttttttt    60 tttttaacgg at    72

<210> SEQ ID NO 158
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 158
aatagcaata gcaccagaag gaaacctaaa gccactggta atttttttt tttttttttt    60 tttttaacgg at    72

<210> SEQ ID NO 159
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 159

```
gacaggaggt tgaaacaaat aaatccgccc cctccgccac cctttttttt tttttttttt    60 ttttttaacgg at                                                        72
```

<210> SEQ ID NO 160
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 160

```
agctttcatc aacggattga ccgtaaaatc gtataatatt tttttttttt tttttttttt    60 ttttttaacgg at                                                        72
```

<210> SEQ ID NO 161
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 161

```
agagcctaat ttgatttttt gtttaaatcc tgaaataaag aatttttttt tttttttttt    60 ttttttaacgg at                                                        72
```

<210> SEQ ID NO 162
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 162

```
gctcacaatt ccgtgagcta actcactgga agtaatggtc aatttttttt tttttttttt    60 ttttttaacgg at                                                        72
```

<210> SEQ ID NO 163
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 163

```
cttaaacagc ttatatattc ggtcgcttga tggggaacaa gatttttttt tttttttttt    60 ttttttaacgg at                                                        72
```

<210> SEQ ID NO 164
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 164

```
aaacgaaaga gggcgaaaca agtactgac tatattcgag ctttttttttt tttttttttt    60 ttttttaacgg at                                                        72
```

```
<210> SEQ ID NO 165
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 165
actgttggga agcagctggc gaaaggatag gtcaagatcg cattttttt tttttttttt        60 tttttaacgg at                                                          72

<210> SEQ ID NO 166
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 166
ggccctgaga gaagcaggcg aaaatcattg cgtagaggcg gttttttttt tttttttttt       60
tttttaacgg at                                                          72

<210> SEQ ID NO 167
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 167
aacgggtatt aaggaatcat taccgccagt aattcaacaa tatttttttt tttttttttt       60
tttttaacgg at                                                          72

<210> SEQ ID NO 168
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 168
cagaatcaag tttcggcatt ttcggttaaa tatatcacca gttttttttt tttttttttt       60
tttttaacgg at                                                          72

<210> SEQ ID NO 169
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 169
gaaacatgaa agctcagtac caggcgaaaa atgctgaaca aatttttttt tttttttttt       60
tttttaacgg at                                                          72

<210> SEQ ID NO 170
<211> LENGTH: 72
<212> TYPE: DNA
```

```
<213> ORGANISM: Artificial sequence
<220> FEATURE:
<223> OTHER INFORMATION: Description: Construct component: DNA sticky
      ends for octahedron

<400> SEQUENCE: 170
atcaaaatca tatatgtaaa tgctgaacaa acacttgctt cttttttttt tttttttttt    60
tttttaacgg at                                                        72

<210> SEQ ID NO 171
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 171
tgattgcttt gagcaaaaga agatgaaata gcagaggttt tgtttttttt tttttttttt    60
tttttaacgg at                                                        72

<210> SEQ ID NO 172
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 172
tttgcggaac aatggcaatt catcaatctg tataataatt tttttttttt tttttttttt    60
tttttaacgg at                                                        72

<210> SEQ ID NO 173
<211> LENGTH: 72
<212> TYPE: DNA
<213> ORGANISM: Artificial sequence
<220> FEATURE:
<223> OTHER INFORMATION: Description: Construct component: DNA sticky
      ends for octahedron

<400> SEQUENCE: 173
tgtagcattc caacgttagt aaatgaagtg ccgcgccacc cttttttttt tttttttttt    60
tttttaacgg at                                                        72

<210> SEQ ID NO 174
<211> LENGTH: 30
<212> TYPE: DNA
<213> ORGANISM: Artificial sequence
<220> FEATURE:
<223> OTHER INFORMATION: Description: Cubic DNA staple sequence,, name:
      Cub-staple-1

<400> SEQUENCE: 174
taaatattga cggaaaattg aggttgtcac                                     30

<210> SEQ ID NO 175
<211> LENGTH: 30
<212> TYPE: DNA
<213> ORGANISM: Artificial sequence
<220> FEATURE:
<223> OTHER INFORMATION: Description: Cubic DNA staple sequence,, name:
      Cub-staple-2

<400> SEQUENCE: 175
```
ccgaacaaag ttaccaaaaa gtataagccc                              30

<210> SEQ ID NO 176
<211> LENGTH: 30
<212> TYPE: DNA
<213> ORGANISM: Artificial sequence
<220> FEATURE:
<223> OTHER INFORMATION: Description: Cubic DNA staple sequence,, name:
      Cub-staple-3

<400> SEQUENCE: 176
tgaatcggcc aacgcggtgc cagaatgagt                              30

<210> SEQ ID NO 177
<211> LENGTH: 30
<212> TYPE: DNA
<213> ORGANISM: Artificial sequence
<220> FEATURE:
<223> OTHER INFORMATION: Description: Cubic DNA staple sequence,, name:
      Cub-staple-4

<400> SEQUENCE: 177
aatcgtaaaa ctagcaagaa tcggggtagc                              30

<210> SEQ ID NO 178
<211> LENGTH: 30
<212> TYPE: DNA
<213> ORGANISM: Artificial sequence
<220> FEATURE:
<223> OTHER INFORMATION: Description: Cubic DNA staple sequence,, name:
      Cub-staple-5

<400> SEQUENCE: 178
agaagccttt atttcagtaa tacgcaaaat                              30

<210> SEQ ID NO 179
<211> LENGTH: 30
<212> TYPE: DNA
<213> ORGANISM: Artificial sequence
<220> FEATURE:
<223> OTHER INFORMATION: Description: Cubic DNA staple sequence,, name:
      Cub-staple-6

<400> SEQUENCE: 179
attgtgaatt accttaaatt tcatcagtga                              30

<210> SEQ ID NO 180
<211> LENGTH: 30
<212> TYPE: DNA
<213> ORGANISM: Artificial sequence
<220> FEATURE:
<223> OTHER INFORMATION: Description: Cubic DNA staple sequence,, name:
      Cub-staple-7

<400> SEQUENCE: 180
atagaaagga acaacttttc agctagcgta                              30

<210> SEQ ID NO 181
<211> LENGTH: 30
<212> TYPE: DNA
<213> ORGANISM: Artificial sequence
<220> FEATURE:
<223> OTHER INFORMATION: Description: Cubic DNA staple sequence,, name:
      Cub-staple-8

<400> SEQUENCE: 181

```
catgtaattt aggcagtatt taatgcgtta                                    30

<210> SEQ ID NO 182
<211> LENGTH: 30
<212> TYPE: DNA
<213> ORGANISM: Artificial sequence
<220> FEATURE:
<223> OTHER INFORMATION: Description: Cubic DNA staple sequence,, name:
      Cub-staple-9

<400> SEQUENCE: 182
acgttgtaaa acgacgggtt ttcaagggcg                                    30

<210> SEQ ID NO 183
<211> LENGTH: 30
<212> TYPE: DNA
<213> ORGANISM: Artificial sequence
<220> FEATURE:
<223> OTHER INFORMATION: Description: Cubic DNA staple sequence,, name:
      Cub-staple-10

<400> SEQUENCE: 183
gacttcaaat atcgcgaaga ggaaatcaaa                                    30

<210> SEQ ID NO 184
<211> LENGTH: 30
<212> TYPE: DNA
<213> ORGANISM: Artificial sequence
<220> FEATURE:
<223> OTHER INFORMATION: Description: Cubic DNA staple sequence,, name:
      Cub-staple-11

<400> SEQUENCE: 184
caaataagaa acgattatta tttgaatctt                                    30

<210> SEQ ID NO 185
<211> LENGTH: 30
<212> TYPE: DNA
<213> ORGANISM: Artificial sequence
<220> FEATURE:
<223> OTHER INFORMATION: Description: Cubic DNA staple sequence,, name:
      Cub-staple-12

<400> SEQUENCE: 185
gagtgaataa ccttgcataa atctcaagaa                                    30

<210> SEQ ID NO 186
<211> LENGTH: 30
<212> TYPE: DNA
<213> ORGANISM: Artificial sequence
<220> FEATURE:
<223> OTHER INFORMATION: Description: Cubic DNA staple sequence,, name:
      Cub-staple-13

<400> SEQUENCE: 186
attgcgtaga ttttcaaaac agattgtttg                                    30

<210> SEQ ID NO 187
<211> LENGTH: 30
<212> TYPE: DNA
<213> ORGANISM: Artificial sequence
<220> FEATURE:
<223> OTHER INFORMATION: Description: Cubic DNA staple sequence,, name:
      Cub-staple-14

<400> SEQUENCE: 187
gtccactatt aaagaaccag ttttggttcc                                    30
```

<210> SEQ ID NO 188
<211> LENGTH: 30
<212> TYPE: DNA
<213> ORGANISM: Artificial sequence
<220> FEATURE:
<223> OTHER INFORMATION: Description: Cubic DNA staple sequence,, name:
      Cub-staple-15

<400> SEQUENCE: 188
cccaattctg cgaacgcata taaaatataa                                      30

<210> SEQ ID NO 189
<211> LENGTH: 30
<212> TYPE: DNA
<213> ORGANISM: Artificial sequence
<220> FEATURE:
<223> OTHER INFORMATION: Description: Cubic DNA staple sequence,, name:
      Cub-staple-16

<400> SEQUENCE: 189
atttaccgtt ccagtaaaag cgcttgaggc                                      30

<210> SEQ ID NO 190
<211> LENGTH: 30
<212> TYPE: DNA
<213> ORGANISM: Artificial sequence
<220> FEATURE:
<223> OTHER INFORMATION: Description: Cubic DNA staple sequence,, name:
      Cub-staple-17

<400> SEQUENCE: 190
ggcttttgca aagaaaacc aaacaaaagg                                       30

<210> SEQ ID NO 191
<211> LENGTH: 30
<212> TYPE: DNA
<213> ORGANISM: Artificial sequence
<220> FEATURE:
<223> OTHER INFORMATION: Description: Cubic DNA staple sequence,, name:
      Cub-staple-18

<400> SEQUENCE: 191 aacttttca aatataacaa agattttaac                                       30

<210> SEQ ID NO 192
<211> LENGTH: 30
<212> TYPE: DNA
<213> ORGANISM: Artificial sequence
<220> FEATURE:
<223> OTHER INFORMATION: Description: Cubic DNA staple sequence,, name:
      Cub-staple-19

<400> SEQUENCE: 192
cgtactcagg aggtttggaa tagtcctcaa                                      30

<210> SEQ ID NO 193
<211> LENGTH: 30
<212> TYPE: DNA
<213> ORGANISM: Artificial sequence
<220> FEATURE:
<223> OTHER INFORMATION: Description: Cubic DNA staple sequence,, name:
      Cub-staple-20

<400> SEQUENCE: 193
ccgtaatggg ataggtacaa acgaaaataa                                      30

```
<210> SEQ ID NO 194
<211> LENGTH: 30
<212> TYPE: DNA
<213> ORGANISM: Artificial sequence
<220> FEATURE:
<223> OTHER INFORMATION: Description: Cubic DNA staple sequence,, name:
      Cub-staple-21

<400> SEQUENCE: 194
taatcaaaat caccgggttt gccgtttgcc                                            30

<210> SEQ ID NO 195
<211> LENGTH: 30
<212> TYPE: DNA
<213> ORGANISM: Artificial sequence
<220> FEATURE:
<223> OTHER INFORMATION: Description: Cubic DNA staple sequence,, name:
      Cub-staple-22

<400> SEQUENCE: 195
agccgttttt attttctcat cgacctaatt                                            30

<210> SEQ ID NO 196
<211> LENGTH: 30
<212> TYPE: DNA
<213> ORGANISM: Artificial sequence
<220> FEATURE:
<223> OTHER INFORMATION: Description: Cubic DNA staple sequence,, name:
      Cub-staple-23

<400> SEQUENCE: 196
agccggaacg aggcgcctgc tcccaagcgc                                            30

<210> SEQ ID NO 197
<211> LENGTH: 30
<212> TYPE: DNA
<213> ORGANISM: Artificial sequence
<220> FEATURE:
<223> OTHER INFORMATION: Description: Cubic DNA staple sequence,, name:
      Cub-staple-24

<400> SEQUENCE: 197
atcggaacga gggtagagca gcgaaccgat                                            30

<210> SEQ ID NO 198
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-25

<400> SEQUENCE: 198
aaaaatgagt tacagcgtct ttccagagaa tcatcatatt cc                              42

<210> SEQ ID NO 199
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-26

<400> SEQUENCE: 199
gaattacatt ctagaggatc cccgggtaat ccgctcacaa tt                              42
```

<210> SEQ ID NO 200
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-27

<400> SEQUENCE: 200
aagcaaagac atctgccagt ttgaggggcc gcttctggtg ag                              42

<210> SEQ ID NO 201
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-28

<400> SEQUENCE: 201
accccggtga gagtctacaa aggctatctc gcaagcggtc ca                              42

<210> SEQ ID NO 202
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-29

<400> SEQUENCE: 202
gagaagggcc tgtaccatgt accgtaaccc accctccacc ct                              42

<210> SEQ ID NO 203
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-30

<400> SEQUENCE: 203
tgaatattat caaaataatg gaagggttgc gcctgtttat ca                              42

<210> SEQ ID NO 204
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-31

<400> SEQUENCE: 204
cctaccaaca gtaatataaa gtaccgacaa tgcagaacgc tc                              42

<210> SEQ ID NO 205
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-32

<400> SEQUENCE: 205
gattataata agtccaacat gttcagctaa aaggtcgtca ga                              42

<210> SEQ ID NO 206

```
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-33

<400> SEQUENCE: 206
cctgataccg aactcaccga cttgagccgg ccggaaacgt cg                              42

<210> SEQ ID NO 207
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-34

<400> SEQUENCE: 207
aaacgcactt accggaaaca atgaaatata caccatcaat at                             42

<210> SEQ ID NO 208
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-35

<400> SEQUENCE: 208
taccgcggta ttaaaaccaa tcaataattc gccttaaatc aa                             42

<210> SEQ ID NO 209
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-36

<400> SEQUENCE: 209
taataatttg ctaatgtcgt ctttccagat gcttgatacc ga                             42

<210> SEQ ID NO 210
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-37

<400> SEQUENCE: 210
gaaacaaagc agcaattacc attagcaaat ttgggcaatc at                             42

<210> SEQ ID NO 211
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-38

<400> SEQUENCE: 211
aggtcagaaa cacttacgaa ggcaccaagg aagtttacat gg                             42

<210> SEQ ID NO 212
<211> LENGTH: 42
```

```
<212> TYPE: DNA
<213> ORGANISM: Artificial sequence
<220> FEATURE:
<223> OTHER INFORMATION: Description: Cubic DNA staple sequence,, name:
      Cub-staple-39

<400> SEQUENCE: 212
cattgccttg ataaccaggg tggtttttga gagagttgca ac                          42

<210> SEQ ID NO 213
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-40

<400> SEQUENCE: 213
taagcaagaa acgctagcaa acgtagaaga actgggataa aa                          42

<210> SEQ ID NO 214
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-41

<400> SEQUENCE: 214
atattcgtct gaaaccgtat aaacagttat aagtttacag ag                          42

<210> SEQ ID NO 215
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-42

<400> SEQUENCE: 215
taaagtaaga tacacagtca ggacgttggt agaaagattc ac                          42

<210> SEQ ID NO 216
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-43

<400> SEQUENCE: 216
agaacggccc aatagcaagc ctccctcaca cttatcattc ca                          42

<210> SEQ ID NO 217
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-44

<400> SEQUENCE: 217
tgctgtatac cacacaacat tattacaggg aagaattagt tt                          42

<210> SEQ ID NO 218
<211> LENGTH: 42
<212> TYPE: DNA
```

```
<213> ORGANISM: Artificial sequence
<220> FEATURE:
<223> OTHER INFORMATION: Description: Cubic DNA staple sequence,, name:
      Cub-staple-45

<400> SEQUENCE: 218
cagaaccggg ttgattagcg gggtttgta caccagtaca aa                              42

<210> SEQ ID NO 219
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-46

<400> SEQUENCE: 219
gaaatcgaat atcaaattaa ctgaacacag aataatccaa cg                             42

<210> SEQ ID NO 220
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-47

<400> SEQUENCE: 220
cagtaatggg cttaagtata aagccaacag gcgaattatt ca                             42

<210> SEQ ID NO 221
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-48

<400> SEQUENCE: 221
atcttcttga tgcagggtta tataactact cagtaccagg cc                             42

<210> SEQ ID NO 222
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-49

<400> SEQUENCE: 222
ataaggccca ataactgaaa aggtggcaaa taaccttaag aa                             42

<210> SEQ ID NO 223
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-50

<400> SEQUENCE: 223
aagggaaaat tgtgcggaga tttgtatcag caccaatgaa ac                             42

<210> SEQ ID NO 224
<211> LENGTH: 42
<212> TYPE: DNA
<213> ORGANISM: Artificial sequence
```

```
<220> FEATURE:
<223> OTHER INFORMATION: Description: Cubic DNA staple sequence,, name:
      Cub-staple-51

<400> SEQUENCE: 224
tgggattttt ttcacgttga aaatgtttcc gaattttctg ta                              42

<210> SEQ ID NO 225
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-52

<400> SEQUENCE: 225
gagtagtatt atactttcgc aaatggtctc aattctacta ac                              42

<210> SEQ ID NO 226
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-53

<400> SEQUENCE: 226
tcaaagcgcg gattcctgac tattatagtt catcaacatt ta                              42

<210> SEQ ID NO 227
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-54

<400> SEQUENCE: 227
gagctaaagc tcataacgtt aatattttaa aacagaggcg gt                              42

<210> SEQ ID NO 228
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-55

<400> SEQUENCE: 228
ttcgcgtcca ttcgccagct ttccggcaac gacgagtgta ga                              42

<210> SEQ ID NO 229
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-56

<400> SEQUENCE: 229
aacagtaaag agaacagtac cttttacaaa tcgcgcagag aa                              42

<210> SEQ ID NO 230
<211> LENGTH: 42
<212> TYPE: DNA
<213> ORGANISM: Artificial sequence
<220> FEATURE:
```

<223> OTHER INFORMATION: Description: Cubic DNA staple sequence,, name:
      Cub-staple-57

<400> SEQUENCE: 230
ccggaacggt catagtagcg cgttttcacg gctgtctttc cc                              42

<210> SEQ ID NO 231
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-58

<400> SEQUENCE: 231
gctattactt ttttcattta acaatttcca gctggcgaaa aa                              42

<210> SEQ ID NO 232
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-59

<400> SEQUENCE: 232
taaccctgta aaatctccaa aaaaaaggat ttcttaaaca ca                              42

<210> SEQ ID NO 233
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-60

<400> SEQUENCE: 233
ctggctcaaa ttgggacgag aaacaccaca atagtagtag ca                              42

<210> SEQ ID NO 234
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-61

<400> SEQUENCE: 234
tcggttggaa ccctcggaat acccaaaaaa tacatacata aa                              42

<210> SEQ ID NO 235
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-62

<400> SEQUENCE: 235
cttttgatcc tcatgccttg atattcactt gaggcaaaag aa                              42

<210> SEQ ID NO 236
<211> LENGTH: 42
<212> TYPE: DNA
<213> ORGANISM: Artificial sequence
<220> FEATURE:
<223> OTHER INFORMATION: Description: Cubic DNA staple sequence,, name:

-continued

Cub-staple-63

<400> SEQUENCE: 236
tagctatata ataacatata ttttaaatag acagtcaaat aa                    42

<210> SEQ ID NO 237
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-64

<400> SEQUENCE: 237
taaatgcgaa ccgccaccct cagagccaac tgagtttcgt tg                    42

<210> SEQ ID NO 238
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-65

<400> SEQUENCE: 238
accaacgcag atgaagaaac caccagaatt taaataacg tc                     42

<210> SEQ ID NO 239
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-66

<400> SEQUENCE: 239
ccaaagatca ccgtgaccaa ctttgaaaca agagtaatct cg                    42

<210> SEQ ID NO 240
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-67

<400> SEQUENCE: 240
tacgagctgc tattcctccc gacttgcgtt atccggaatc at                    42

<210> SEQ ID NO 241
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-68

<400> SEQUENCE: 241
cattttccgc aaatcagata tagaaggcgg aggttttgaa gg                    42

<210> SEQ ID NO 242
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-69

<400> SEQUENCE: 242
atcggtgcgg aagctgtgtg aaattgttcc gagctccaag ct                              42

<210> SEQ ID NO 243
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-70

<400> SEQUENCE: 243
ggtaatacgt ttacgtaaga gcaacactac gttagtaaat ct                              42

<210> SEQ ID NO 244
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-71

<400> SEQUENCE: 244
atttgccaaa atagaccgtc tatcaaatgg agcggaatta ga                              42

<210> SEQ ID NO 245
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-72

<400> SEQUENCE: 245
tttagcgcca ccagaccctc agagccgcga gccgcgccac ca                              42

<210> SEQ ID NO 246
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-73

<400> SEQUENCE: 246 tattttttg cccccaccgc ctggccctct tttcacatat gt                               42

<210> SEQ ID NO 247
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-74

<400> SEQUENCE: 247
atttttatac caaatcagag cataaagcgc aaggtggcaa ca                              42

<210> SEQ ID NO 248
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-75

```
<400> SEQUENCE: 248
acgatctgcc gacatgcttt cgaggtgact ccaaattgcg aa                          42

<210> SEQ ID NO 249
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-76

<400> SEQUENCE: 249
aatcaatatt accctggctg accttcatga ggacattaaa gg                          42

<210> SEQ ID NO 250
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-77

<400> SEQUENCE: 250
aataataaac cgttgtgaga aaggccgggc aatgcaccga gg                          42

<210> SEQ ID NO 251
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-78

<400> SEQUENCE: 251
tgggcgcccc gtcgtcctgt agccagcttc ccggaaacca gg                          42

<210> SEQ ID NO 252
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-79

<400> SEQUENCE: 252
aacaaaattt atcagacgct gagaagagct tagaaaatcg tc                          42

<210> SEQ ID NO 253
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-80

<400> SEQUENCE: 253
tcaaagggag atagcccta taaatcaacc cagagggtaa tt                           42

<210> SEQ ID NO 254
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-81

<400> SEQUENCE: 254
```
tacaaattac ctgaatacca agttacaatc gggagttcga gc                          42

<210> SEQ ID NO 255
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-82

<400> SEQUENCE: 255
aggccgcgga ctaaggagtg tactggtaaa tgccccctgc ac                          42

<210> SEQ ID NO 256
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-83

<400> SEQUENCE: 256
aattacgttt aaactattca ttgaatccag actggcagag gg                          42

<210> SEQ ID NO 257
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-84

<400> SEQUENCE: 257
gcaaggcctg caggtcgact aattttcctc gggggatgtg ct                          42

<210> SEQ ID NO 258
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-85

<400> SEQUENCE: 258
gctttgattt tgcgaggctt gcagggagaa ctatttcgga ac                          42

<210> SEQ ID NO 259
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-86

<400> SEQUENCE: 259
gtcgagagcc accctcagac ctaaatttca cggataagtg cc                          42

<210> SEQ ID NO 260
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-87

<400> SEQUENCE: 260
ttgcgtattt ccagtaattg cgttgcgcag attaaatttt tg          42

<210> SEQ ID NO 261
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-88

<400> SEQUENCE: 261
gtaacaaatc gtaaccgtga ccagaccgga aaatgtgagc ga          42

<210> SEQ ID NO 262
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-89

<400> SEQUENCE: 262
aatcaggatt tttgtaattg ctccttttga agcaatcgag ct          42

<210> SEQ ID NO 263
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-90

<400> SEQUENCE: 263
tgaattacaa aaggtcatat ggtttaccat tgacaagaac cg          42

<210> SEQ ID NO 264
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-91

<400> SEQUENCE: 264
ctccggctaa ttactaaata agaataaaaa tggtttaatt tc          42

<210> SEQ ID NO 265
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-92

<400> SEQUENCE: 265
gaccattcgg tgtcatgttt taaatatgga atcagttgag at          42

<210> SEQ ID NO 266
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-93

<400> SEQUENCE: 266
aaataaatga tacaagactt tttcatgacc taaaacgaaa aa          42

<210> SEQ ID NO 267
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-94

<400> SEQUENCE: 267
atagcccgcg aaaacagcct ttacagagcc tgaacaaagt ta                              42

<210> SEQ ID NO 268
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-95

<400> SEQUENCE: 268
tgcccgcttg ggcgtcagaa aagccccagt taaaattcgc gt                              42

<210> SEQ ID NO 269
<211> LENGTH: 42
<212> TYPE: DNA
<213> ORGANISM: Artificial sequence
<220> FEATURE:
<223> OTHER INFORMATION: Description: Cubic DNA staple sequence,, name:
      Cub-staple-96

<400> SEQUENCE: 269
tgcatgcgat taagcttcgc tattacgcat ttccacacaa ca                              42

<210> SEQ ID NO 270
<211> LENGTH: 54
<212> TYPE: DNA
<213> ORGANISM: Artificial sequence
<220> FEATURE:
<223> OTHER INFORMATION: Description: Cubic DNA staple sequence,, name:
      Cub-staple-97

<400> SEQUENCE: 270
acaatagctt ctgaattatt tgcacgtagg tttaaaaagt aattctgtcc agac                 54

<210> SEQ ID NO 271
<211> LENGTH: 54
<212> TYPE: DNA
<213> ORGANISM: Artificial sequence
<220> FEATURE:
<223> OTHER INFORMATION: Description: Cubic DNA staple sequence,, name:
      Cub-staple-98

<400> SEQUENCE: 271
tagtgaatta attaaatgga aacagtactt ctgtatcctt gaaaacatag cgat                 54

<210> SEQ ID NO 272
<211> LENGTH: 54
<212> TYPE: DNA
<213> ORGANISM: Artificial sequence
<220> FEATURE:
<223> OTHER INFORMATION: Description: Cubic DNA staple sequence,, name:
      Cub-staple-99

<400> SEQUENCE: 272
agaaccatca gactgccccc ttattagcaa ccagacaccc tcagaaccgc cacc                 54

<210> SEQ ID NO 273
<211> LENGTH: 54
<212> TYPE: DNA
<213> ORGANISM: Artificial sequence
<220> FEATURE:
<223> OTHER INFORMATION: Description: Cubic DNA staple sequence,, name:
      Cub-staple-100

<400> SEQUENCE: 273
agaggtctct ttacgcatca aaaagatttt ttaatactcc aacaggtcag gatt        54

<210> SEQ ID NO 274
<211> LENGTH: 54
<212> TYPE: DNA
<213> ORGANISM: Artificial sequence
<220> FEATURE:
<223> OTHER INFORMATION: Description: Cubic DNA staple sequence,, name:
      Cub-staple-101

<400> SEQUENCE: 274
tagttgcaaa gtttacaact ttcaacagaa aggaaaggag cctttaattg tatc        54

<210> SEQ ID NO 275
<211> LENGTH: 54
<212> TYPE: DNA
<213> ORGANISM: Artificial sequence
<220> FEATURE:
<223> OTHER INFORMATION: Description: Cubic DNA staple sequence,, name:
      Cub-staple-102

<400> SEQUENCE: 275
gatattcaga gcaaaagccc tttttaagga aggaactgag taatgtgtag gtaa        54

<210> SEQ ID NO 276
<211> LENGTH: 54
<212> TYPE: DNA
<213> ORGANISM: Artificial sequence
<220> FEATURE:
<223> OTHER INFORMATION: Description: Cubic DNA staple sequence,, name:
      Cub-staple-103

<400> SEQUENCE: 276
tgattatcta acgaaaataa acagccattt tgttgtttg agtaacatta tcat         54

<210> SEQ ID NO 277
<211> LENGTH: 54
<212> TYPE: DNA
<213> ORGANISM: Artificial sequence
<220> FEATURE:
<223> OTHER INFORMATION: Description: Cubic DNA staple sequence,, name:
      Cub-staple-104

<400> SEQUENCE: 277
caaatgcagg catacagacg acgataaagt tttgcatagc gtccaatact gcgg        54

<210> SEQ ID NO 278
<211> LENGTH: 54
<212> TYPE: DNA
<213> ORGANISM: Artificial sequence
<220> FEATURE:
<223> OTHER INFORMATION: Description: Cubic DNA staple sequence,, name:
      Cub-staple-105

<400> SEQUENCE: 278
ttaaatcctc acattcggga aacctgtccg gggaggaaga ttgtataagc aaat        54

```
<210> SEQ ID NO 279
<211> LENGTH: 54
<212> TYPE: DNA
<213> ORGANISM: Artificial sequence
<220> FEATURE:
<223> OTHER INFORMATION: Description: Cubic DNA staple sequence,, name:
      Cub-staple-106

<400> SEQUENCE: 279
ttaggaagct caactggaag tttcattcag tagataaatc tacgttaata aaac            54

<210> SEQ ID NO 280
<211> LENGTH: 54
<212> TYPE: DNA
<213> ORGANISM: Artificial sequence
<220> FEATURE:
<223> OTHER INFORMATION: Description: Cubic DNA staple sequence,, name:
      Cub-staple-107

<400> SEQUENCE: 280
ctattatgtc gctgggatcg tcaccctcca acggcttaac ggggtcagtg cctt            54

<210> SEQ ID NO 281
<211> LENGTH: 54
<212> TYPE: DNA
<213> ORGANISM: Artificial sequence
<220> FEATURE:
<223> OTHER INFORMATION: Description: Cubic DNA staple sequence,, name:
      Cub-staple-108

<400> SEQUENCE: 281
catcgatagt acaatcgaaa tccgcgacag acggtaatta gagccagcaa aatc            54

<210> SEQ ID NO 282
<211> LENGTH: 54
<212> TYPE: DNA
<213> ORGANISM: Artificial sequence
<220> FEATURE:
<223> OTHER INFORMATION: Description: Cubic DNA staple sequence,, name:
      Cub-staple-109

<400> SEQUENCE: 282
gatattcaga aaatgcgaca ttcaaccgtt attcagatga acggtgtaca gacc            54

<210> SEQ ID NO 283
<211> LENGTH: 54
<212> TYPE: DNA
<213> ORGANISM: Artificial sequence
<220> FEATURE:
<223> OTHER INFORMATION: Description: Cubic DNA staple sequence,, name:
      Cub-staple-110

<400> SEQUENCE: 283
ttaacatttg ccctgcttga gatggttttg cgatttgttt agctatattt tcat            54

<210> SEQ ID NO 284
<211> LENGTH: 54
<212> TYPE: DNA
<213> ORGANISM: Artificial sequence
<220> FEATURE:
<223> OTHER INFORMATION: Description: Cubic DNA staple sequence,, name:
      Cub-staple-111

<400> SEQUENCE: 284
tttcaattct taccattgag aatcgccaag gcattaaaca ataacggatt cgcc            54

<210> SEQ ID NO 285
```

```
<211> LENGTH: 54
<212> TYPE: DNA
<213> ORGANISM: Artificial sequence
<220> FEATURE:
<223> OTHER INFORMATION: Description: Cubic DNA staple sequence,, name:
      Cub-staple-112

<400> SEQUENCE: 285
caaagcgctg gcctgattct ccgtgggaca cgttgcagta tcggcctcag gaag          54

<210> SEQ ID NO 286
<211> LENGTH: 54
<212> TYPE: DNA
<213> ORGANISM: Artificial sequence
<220> FEATURE:
<223> OTHER INFORMATION: Description: Cubic DNA staple sequence,, name:
      Cub-staple-113

<400> SEQUENCE: 286
gagcgctgca aaatggttga gtgttgttcg tggaccataa aaacagggaa gcgc          54

<210> SEQ ID NO 287
<211> LENGTH: 54
<212> TYPE: DNA
<213> ORGANISM: Artificial sequence
<220> FEATURE:
<223> OTHER INFORMATION: Description: Cubic DNA staple sequence,, name:
      Cub-staple-114

<400> SEQUENCE: 287
ggaatcatta ggttaatcca atcgcaagtt ttagttgaaa taccgaccgt gtga          54

<210> SEQ ID NO 288
<211> LENGTH: 54
<212> TYPE: DNA
<213> ORGANISM: Artificial sequence
<220> FEATURE:
<223> OTHER INFORMATION: Description: Cubic DNA staple sequence,, name:
      Cub-staple-115

<400> SEQUENCE: 288
tataaaataa agccaacatt atgaccctac gcaagcatga ttaagactcc ttat          54

<210> SEQ ID NO 289
<211> LENGTH: 54
<212> TYPE: DNA
<213> ORGANISM: Artificial sequence
<220> FEATURE:
<223> OTHER INFORMATION: Description: Cubic DNA staple sequence,, name:
      Cub-staple-116

<400> SEQUENCE: 289
ctacaacatt aggatataag tatagcccag taccgcattt tcagggatag caag          54

<210> SEQ ID NO 290
<211> LENGTH: 54
<212> TYPE: DNA
<213> ORGANISM: Artificial sequence
<220> FEATURE:
<223> OTHER INFORMATION: Description: Cubic DNA staple sequence,, name:
      Cub-staple-117

<400> SEQUENCE: 290
gattagtatg tagaaccaag taccgcacat cgtaggtatt ctaagaacgc gagg          54

<210> SEQ ID NO 291
<211> LENGTH: 54
```

```
<212> TYPE: DNA
<213> ORGANISM: Artificial sequence
<220> FEATURE:
<223> OTHER INFORMATION: Description: Cubic DNA staple sequence,, name:
      Cub-staple-118

<400> SEQUENCE: 291
tacactaacg attgtaaagc cagaatggag cgtcatccat taaacgggta aaat          54

<210> SEQ ID NO 292
<211> LENGTH: 54
<212> TYPE: DNA
<213> ORGANISM: Artificial sequence
<220> FEATURE:
<223> OTHER INFORMATION: Description: Cubic DNA staple sequence,, name:
      Cub-staple-119

<400> SEQUENCE: 292
tacgagccgg gcctttgggt aacgccaggc cagtgcgaat tcgtaatcat ggtc          54

<210> SEQ ID NO 293
<211> LENGTH: 54
<212> TYPE: DNA
<213> ORGANISM: Artificial sequence
<220> FEATURE:
<223> OTHER INFORMATION: Description: Cubic DNA staple sequence,, name:
      Cub-staple-120

<400> SEQUENCE: 293
cgctggtgag agatctggag caaacaagtg tcaatccagt gagacgggca acag          54

<210> SEQ ID NO 294
<211> LENGTH: 46
<212> TYPE: DNA
<213> ORGANISM: Artificial sequence
<220> FEATURE:
<223> OTHER INFORMATION: Description: Construct element: gold
      nanoparticle attachment sequence

<400> SEQUENCE: 294
tcacttcata ctctacgttg ttgttgttgt tgttgttgtt gttgtt                   46

<210> SEQ ID NO 295
<211> LENGTH: 62
<212> TYPE: DNA
<213> ORGANISM: Artificial sequence
<220> FEATURE:
<223> OTHER INFORMATION: Description: Construct component: DNA sticky
      end for cube-1

<400> SEQUENCE: 295
accagtagca ccccgtaatc agtagcatta tacatgttac ttttttttttt ttttatccgt   60 ta                                                                    62

<210> SEQ ID NO 296
<211> LENGTH: 62
<212> TYPE: DNA
<213> ORGANISM: Artificial sequence
<220> FEATURE:
<223> OTHER INFORMATION: Description: Construct component: DNA sticky
      end for cube-1

<400> SEQUENCE: 296
attagacggg aggagagata acccacttga tggggaacaa gatttttttt ttttatccgt   60
ta                                                                    62
```

<210> SEQ ID NO 297
<211> LENGTH: 62
<212> TYPE: DNA
<213> ORGANISM: Artificial sequence
<220> FEATURE:
<223> OTHER INFORMATION: Description: Construct component: DNA sticky
      end for cube-1

<400> SEQUENCE: 297
aggcgcatag gcaaatcaac gtaacagttt attgagggaa ggttttttttt ttttatccgt    60 ta                                                                   62

<210> SEQ ID NO 298
<211> LENGTH: 62
<212> TYPE: DNA
<213> ORGANISM: Artificial sequence
<220> FEATURE:
<223> OTHER INFORMATION: Description: Construct component: DNA sticky
      end for cube-1

<400> SEQUENCE: 298
cccaatagga acgcattcca cagacactga gacgtgtatc actttttttt ttttatccgt    60
ta                                                                   62

<210> SEQ ID NO 299
<211> LENGTH: 62
<212> TYPE: DNA
<213> ORGANISM: Artificial sequence
<220> FEATURE:
<223> OTHER INFORMATION: Description: Construct component: DNA sticky
      end for cube-1

<400> SEQUENCE: 299
agcttagatt aaaaatcata ggtctgacaa acaaatatat gttttttttt ttttatccgt    60
ta                                                                   62

<210> SEQ ID NO 300
<211> LENGTH: 62
<212> TYPE: DNA
<213> ORGANISM: Artificial sequence
<220> FEATURE:
<223> OTHER INFORMATION: Description: Construct component: DNA sticky
      end for cube-1

<400> SEQUENCE: 300
acgtaatgcc accatctttg acccccccagg aggagtctct gatttttttt ttttatccgt   60
ta                                                                   62

<210> SEQ ID NO 301
<211> LENGTH: 62
<212> TYPE: DNA
<213> ORGANISM: Artificial sequence
<220> FEATURE:
<223> OTHER INFORMATION: Description: Construct component: DNA sticky
      end for cube-1

<400> SEQUENCE: 301
ctcagagcca ccagccgccg ccagcagaat caaatctttt cattttttttt ttttatccgt    60 ta                                                                   62

<210> SEQ ID NO 302
<211> LENGTH: 62
<212> TYPE: DNA

```
<213> ORGANISM: Artificial sequence
<220> FEATURE:
<223> OTHER INFORMATION: Description: Construct component: DNA sticky
      end for cube-1

<400> SEQUENCE: 302
atagctgttt ccataaagtg taaagctgtt gggccagtca cgttttttttt ttttatccgt     60 ta                                                                    62

<210> SEQ ID NO 303
<211> LENGTH: 62
<212> TYPE: DNA
<213> ORGANISM: Artificial sequence
<220> FEATURE:
<223> OTHER INFORMATION: Description: Construct component: DNA sticky
      end for cube-1

<400> SEQUENCE: 303
gagtaacagt gccatgaaag tattaacacg cataaagaca gctttttttt ttttatccgt     60
ta                                                                    62

<210> SEQ ID NO 304
<211> LENGTH: 62
<212> TYPE: DNA
<213> ORGANISM: Artificial sequence
<220> FEATURE:
<223> OTHER INFORMATION: Description: Construct component: DNA sticky
      end for cube-1

<400> SEQUENCE: 304
agattcaaaa ggctagctga taaattattg agtagcagat agttttttttt ttttatccgt    60 ta                                                                    62

<210> SEQ ID NO 305
<211> LENGTH: 62
<212> TYPE: DNA
<213> ORGANISM: Artificial sequence
<220> FEATURE:
<223> OTHER INFORMATION: Description: Construct component: DNA sticky
      end for cube-1

<400> SEQUENCE: 305
gaactaacgg aattcaacta atgcagattg ctgcagttga ttttttttttt ttttatccgt    60 ta                                                                    62

<210> SEQ ID NO 306
<211> LENGTH: 62
<212> TYPE: DNA
<213> ORGANISM: Artificial sequence
<220> FEATURE:
<223> OTHER INFORMATION: Description: Construct component: DNA sticky
      end for cube-1

<400> SEQUENCE: 306
tttgcggaac aatggcaatt catcaattat cctatcccaa tctttttttt ttttatccgt     60
ta                                                                    62

<210> SEQ ID NO 307
<211> LENGTH: 62
<212> TYPE: DNA
<213> ORGANISM: Artificial sequence
<220> FEATURE:
<223> OTHER INFORMATION: Description: Construct component: DNA sticky
      end for cube-1
```

<400> SEQUENCE: 307
tacgcagtat gtaaagacac cacggaagaa ttattttgcg ggttttttt ttttatccgt    60 ta                                                                 62

<210> SEQ ID NO 308
<211> LENGTH: 62
<212> TYPE: DNA
<213> ORGANISM: Artificial sequence
<220> FEATURE:
<223> OTHER INFORMATION: Description: Construct component: DNA sticky
      end for cube-1

<400> SEQUENCE: 308
tgattgcttt gagcaaaaga agatgatatc atacaacgcc aatttttttt ttttatccgt   60
ta                                                                 62

<210> SEQ ID NO 309
<211> LENGTH: 62
<212> TYPE: DNA
<213> ORGANISM: Artificial sequence
<220> FEATURE:
<223> OTHER INFORMATION: Description: Construct component: DNA sticky
      end for cube-1

<400> SEQUENCE: 309
ttggggcgcg agatcataca ggcaagtgct catactttaa tcttttttt ttttatccgt    60 ta                                                                 62

<210> SEQ ID NO 310
<211> LENGTH: 62
<212> TYPE: DNA
<213> ORGANISM: Artificial sequence
<220> FEATURE:
<223> OTHER INFORMATION: Description: Construct component: DNA sticky
      end for cube-1

<400> SEQUENCE: 310
ctgattgccc ttagcaggcg aaaatcccgg agaatgaacg gtttttttt ttttatccgt    60 ta                                                                 62

<210> SEQ ID NO 311
<211> LENGTH: 62
<212> TYPE: DNA
<213> ORGANISM: Artificial sequence
<220> FEATURE:
<223> OTHER INFORMATION: Description: Construct component: DNA sticky
      end for cube-1

<400> SEQUENCE: 311
atcgcactcc agccattcag gctgcggcca tcagcggatt gatttttttt ttttatccgt   60
ta                                                                 62

<210> SEQ ID NO 312
<211> LENGTH: 62
<212> TYPE: DNA
<213> ORGANISM: Artificial sequence
<220> FEATURE:
<223> OTHER INFORMATION: Description: Construct component: DNA sticky
      end for cube-1

<400> SEQUENCE: 312
aatcgtcata aaagttcaga aaacgaataa cgcatagcga gatttttttt ttttatccgt   60
ta                                                                    62

<210> SEQ ID NO 313
<211> LENGTH: 62
<212> TYPE: DNA
<213> ORGANISM: Artificial sequence
<220> FEATURE:
<223> OTHER INFORMATION: Description: Construct component: DNA sticky
      end for cube-1

<400> SEQUENCE: 313
cgttttagcg aattgcaccc agctacatcc catgaacaag cattttttt ttttatccgt      60 ta                                                                    62

<210> SEQ ID NO 314
<211> LENGTH: 62
<212> TYPE: DNA
<213> ORGANISM: Artificial sequence
<220> FEATURE:
<223> OTHER INFORMATION: Description: Construct component: DNA sticky
      end for cube-1

<400> SEQUENCE: 314
gacgacaata aactgaacaa gaaaaaatcc tgaaataaag aattttttt ttttatccgt      60 ta                                                                    62

<210> SEQ ID NO 315
<211> LENGTH: 62
<212> TYPE: DNA
<213> ORGANISM: Artificial sequence
<220> FEATURE:
<223> OTHER INFORMATION: Description: Construct component: DNA sticky
      end for cube-1

<400> SEQUENCE: 315
taaataaggc gttagaaaaa gcctgtacta cctacgcgag aattttttt ttttatccgt      60 ta                                                                    62

<210> SEQ ID NO 316
<211> LENGTH: 62
<212> TYPE: DNA
<213> ORGANISM: Artificial sequence
<220> FEATURE:
<223> OTHER INFORMATION: Description: Construct component: DNA sticky
      end for cube-1

<400> SEQUENCE: 316
ggtttatcag ctatgacaac aaccattcat agtggagtga gattttttt ttttatccgt      60 ta                                                                    62

<210> SEQ ID NO 317
<211> LENGTH: 62
<212> TYPE: DNA
<213> ORGANISM: Artificial sequence
<220> FEATURE:
<223> OTHER INFORMATION: Description: Construct component: DNA sticky
      end for cube-1

<400> SEQUENCE: 317
atttaaattg tatttttaac caatagggtg cctctgcatt aattttttt ttttatccgt      60 ta                                                                    62

```
<210> SEQ ID NO 318
<211> LENGTH: 62
<212> TYPE: DNA
<213> ORGANISM: Artificial sequence
<220> FEATURE:
<223> OTHER INFORMATION: Description: Construct component: DNA sticky
      end for cube-1

<400> SEQUENCE: 318
agagagtacc ttcggatggc ttagaggacc ataagcccga aattttttt ttttatccgt    60 ta                                                                  62

<210> SEQ ID NO 319
<211> LENGTH: 62
<212> TYPE: DNA
<213> ORGANISM: Artificial sequence
<220> FEATURE:
<223> OTHER INFORMATION: Description: Construct component: DNA sticky
      end for cube-2

<400> SEQUENCE: 319
accagtagca ccccgtaatc agtagcatta tacatgttac tttttttttt tttttaacgg    60
at                                                                  62

<210> SEQ ID NO 320
<211> LENGTH: 62
<212> TYPE: DNA
<213> ORGANISM: Artificial sequence
<220> FEATURE:
<223> OTHER INFORMATION: Description: Construct component: DNA sticky
      end for cube-2

<400> SEQUENCE: 320
attagacggg aggagagata acccacttga tggggaacaa gatttttttt tttttaacgg    60
at                                                                  62

<210> SEQ ID NO 321
<211> LENGTH: 62
<212> TYPE: DNA
<213> ORGANISM: Artificial sequence
<220> FEATURE:
<223> OTHER INFORMATION: Description: Construct component: DNA sticky
      end for cube-2

<400> SEQUENCE: 321
aggcgcatag gcaaatcaac gtaacagttt attgagggaa ggtttttttt tttttaacgg    60
at                                                                  62

<210> SEQ ID NO 322
<211> LENGTH: 62
<212> TYPE: DNA
<213> ORGANISM: Artificial sequence
<220> FEATURE:
<223> OTHER INFORMATION: Description: Construct component: DNA sticky
      end for cube-2

<400> SEQUENCE: 322
cccaatagga acgcattcca cagacactga gacgtgtatc acttttttt tttttaacgg    60 at                                                                  62

<210> SEQ ID NO 323
<211> LENGTH: 62
<212> TYPE: DNA
<213> ORGANISM: Artificial sequence
```

```
<220> FEATURE:
<223> OTHER INFORMATION: Description: Construct component: DNA sticky
      end for cube-2

<400> SEQUENCE: 323
agcttagatt aaaaatcata ggtctgacaa acaaatatat gttttttttt tttttaacgg    60
at                                                                  62

<210> SEQ ID NO 324
<211> LENGTH: 62
<212> TYPE: DNA
<213> ORGANISM: Artificial sequence
<220> FEATURE:
<223> OTHER INFORMATION: Description: Construct component: DNA sticky
      end for cube-2

<400> SEQUENCE: 324
acgtaatgcc accatctttg accccccagg aggagtctct gatttttttt tttttaacgg    60
at                                                                  62

<210> SEQ ID NO 325
<211> LENGTH: 62
<212> TYPE: DNA
<213> ORGANISM: Artificial sequence
<220> FEATURE:
<223> OTHER INFORMATION: Description: Construct component: DNA sticky
      end for cube-2

<400> SEQUENCE: 325
ctcagagcca ccagccgccg ccagcagaat caaatctttt cattttttt tttttaacgg     60 at                                                                  62

<210> SEQ ID NO 326
<211> LENGTH: 62
<212> TYPE: DNA
<213> ORGANISM: Artificial sequence
<220> FEATURE:
<223> OTHER INFORMATION: Description: Construct component: DNA sticky
      end for cube-2

<400> SEQUENCE: 326
atagctgttt ccataaagtg taaagctgtt gggccagtca cgttttttt tttttaacgg     60 at                                                                  62

<210> SEQ ID NO 327
<211> LENGTH: 62
<212> TYPE: DNA
<213> ORGANISM: Artificial sequence
<220> FEATURE:
<223> OTHER INFORMATION: Description: Construct component: DNA sticky
      end for cube-2

<400> SEQUENCE: 327
gagtaacagt gccatgaaag tattaacacg cataaagaca gcttttttt tttttaacgg     60 at                                                                  62

<210> SEQ ID NO 328
<211> LENGTH: 62
<212> TYPE: DNA
<213> ORGANISM: Artificial sequence
<220> FEATURE:
<223> OTHER INFORMATION: Description: Construct component: DNA sticky
      end for cube-2
```

-continued

```
<400> SEQUENCE: 328
agattcaaaa ggctagctga taaattattg agtagcagat agttttttt tttttaacgg    60 at                                                                  62

<210> SEQ ID NO 329
<211> LENGTH: 62
<212> TYPE: DNA
<213> ORGANISM: Artificial sequence
<220> FEATURE:
<223> OTHER INFORMATION: Description: Construct component: DNA sticky
      end for cube-2

<400> SEQUENCE: 329
gaactaacgg aattcaacta atgcagattg ctgcagttga ttttttttt tttttaacgg    60 at                                                                  62

<210> SEQ ID NO 330
<211> LENGTH: 62
<212> TYPE: DNA
<213> ORGANISM: Artificial sequence
<220> FEATURE:
<223> OTHER INFORMATION: Description: Construct component: DNA sticky
      end for cube-2

<400> SEQUENCE: 330
tttgcggaac aatggcaatt catcaattat cctatcccaa tctttttttt tttttaacgg   60
at                                                                  62

<210> SEQ ID NO 331
<211> LENGTH: 62
<212> TYPE: DNA
<213> ORGANISM: Artificial sequence
<220> FEATURE:
<223> OTHER INFORMATION: Description: Construct component: DNA sticky
      end for cube-2

<400> SEQUENCE: 331
tacgcagtat gtaaagacac cacggaagaa ttattttgcg ggttttttt tttttaacgg    60 at                                                                  62

<210> SEQ ID NO 332
<211> LENGTH: 62
<212> TYPE: DNA
<213> ORGANISM: Artificial sequence
<220> FEATURE:
<223> OTHER INFORMATION: Description: Construct component: DNA sticky
      end for cube-2

<400> SEQUENCE: 332
tgattgcttt gagcaaaaga agatgatatc atacaacgcc aatttttttt tttttaacgg   60
at                                                                  62

<210> SEQ ID NO 333
<211> LENGTH: 62
<212> TYPE: DNA
<213> ORGANISM: Artificial sequence
<220> FEATURE:
<223> OTHER INFORMATION: Description: Construct component: DNA sticky
      end for cube-2

<400> SEQUENCE: 333 tggggcgcg agatcataca ggcaagtgct catactttaa tctttttttt tttttaacgg    60
``` at                                                                   62

<210> SEQ ID NO 334
<211> LENGTH: 62
<212> TYPE: DNA
<213> ORGANISM: Artificial sequence
<220> FEATURE:
<223> OTHER INFORMATION: Description: Construct component: DNA sticky
      end for cube-2

<400> SEQUENCE: 334
ctgattgccc ttagcaggcg aaaatcccgg agaatgaacg gttttttttt ttttttaacgg    60 at                                                                   62

<210> SEQ ID NO 335
<211> LENGTH: 62
<212> TYPE: DNA
<213> ORGANISM: Artificial sequence
<220> FEATURE:
<223> OTHER INFORMATION: Description: Construct component: DNA sticky
      end for cube-2

<400> SEQUENCE: 335
atcgcactcc agccattcag gctgcggcca tcagcggatt gatttttttt ttttttaacgg    60 at                                                                   62

<210> SEQ ID NO 336
<211> LENGTH: 62
<212> TYPE: DNA
<213> ORGANISM: Artificial sequence
<220> FEATURE:
<223> OTHER INFORMATION: Description: Construct component: DNA sticky
      end for cube-2

<400> SEQUENCE: 336
aatcgtcata aaagttcaga aaacgaataa cgcatagcga gatttttttt ttttttaacgg    60 at                                                                   62

<210> SEQ ID NO 337
<211> LENGTH: 62
<212> TYPE: DNA
<213> ORGANISM: Artificial sequence
<220> FEATURE:
<223> OTHER INFORMATION: Description: Construct component: DNA sticky
      end for cube-2

<400> SEQUENCE: 337
cgttttagcg aattgcaccc agctacatcc catgaacaag cattttttttt ttttttaacgg   60 at                                                                   62

<210> SEQ ID NO 338
<211> LENGTH: 62
<212> TYPE: DNA
<213> ORGANISM: Artificial sequence
<220> FEATURE:
<223> OTHER INFORMATION: Description: Construct component: DNA sticky
      end for cube-2

<400> SEQUENCE: 338
gacgacaata aactgaacaa gaaaaaatcc tgaaataaag aatttttttt ttttttaacgg    60 at                                                                   62

<210> SEQ ID NO 339

```
<211> LENGTH: 62
<212> TYPE: DNA
<213> ORGANISM: Artificial sequence
<220> FEATURE:
<223> OTHER INFORMATION: Description: Construct component: DNA sticky
      end for cube-2

<400> SEQUENCE: 339
taaataaggc gttagaaaaa gcctgtacta cctacgcgag aattttttt tttttaacgg    60 at                                                                  62

<210> SEQ ID NO 340
<211> LENGTH: 62
<212> TYPE: DNA
<213> ORGANISM: Artificial sequence
<220> FEATURE:
<223> OTHER INFORMATION: Description: Construct component: DNA sticky
      end for cube-2

<400> SEQUENCE: 340
ggtttatcag ctatgacaac aaccattcat agtggagtga gatttttttt tttttaacgg    60
at                                                                  62

<210> SEQ ID NO 341
<211> LENGTH: 62
<212> TYPE: DNA
<213> ORGANISM: Artificial sequence
<220> FEATURE:
<223> OTHER INFORMATION: Description: Construct component: DNA sticky
      end for cube-2

<400> SEQUENCE: 341
atttaaattg tattttaac caatagggtg cctctgcatt aattttttt tttttaacgg    60 at                                                                  62

<210> SEQ ID NO 342
<211> LENGTH: 62
<212> TYPE: DNA
<213> ORGANISM: Artificial sequence
<220> FEATURE:
<223> OTHER INFORMATION: Description: Construct component: DNA sticky
      end for cube-2

<400> SEQUENCE: 342
agagagtacc ttcggatggc ttagaggacc ataagcccga aattttttt tttttaacgg    60 at                                                                  62

<210> SEQ ID NO 343
<211> LENGTH: 39
<212> TYPE: DNA
<213> ORGANISM: Artificial sequence
<220> FEATURE:
<223> OTHER INFORMATION: Description: Tetrahedral DNA staple strand,
      name: tet-staple-1

<400> SEQUENCE: 343
attgtgtagc cgtccccgaa cataccgaac gaacccagc                          39

<210> SEQ ID NO 344
<211> LENGTH: 28
<212> TYPE: DNA
<213> ORGANISM: Artificial sequence
<220> FEATURE:
<223> OTHER INFORMATION: Description: Tetrahedral DNA staple strand,
      name: tet-staple-2
```

```
<400> SEQUENCE: 344
atttgtattg aggacaactc ggaagata                                              28

<210> SEQ ID NO 345
<211> LENGTH: 39
<212> TYPE: DNA
<213> ORGANISM: Artificial sequence
<220> FEATURE:
<223> OTHER INFORMATION: Description: Tetrahedral DNA staple strand,
      name: tet-staple-3

<400> SEQUENCE: 345
aggacagatc ttgagaataa cataaaaaaa cacccgaat                                  39

<210> SEQ ID NO 346
<211> LENGTH: 38
<212> TYPE: DNA
<213> ORGANISM: Artificial sequence
<220> FEATURE:
<223> OTHER INFORMATION: Description: Tetrahedral DNA staple strand,
      name: tet-staple-4

<400> SEQUENCE: 346
acgtagccgg aacgaggccc acaatgaaca atttaatg                                   38

<210> SEQ ID NO 347
<211> LENGTH: 46
<212> TYPE: DNA
<213> ORGANISM: Artificial sequence
<220> FEATURE:
<223> OTHER INFORMATION: Description: Tetrahedral DNA staple strand,
      name: tet-staple-5

<400> SEQUENCE: 347
caggcgcata ccgcgacctg ctccaccaat aagggagaac ctaaaa                          46

<210> SEQ ID NO 348
<211> LENGTH: 41
<212> TYPE: DNA
<213> ORGANISM: Artificial sequence
<220> FEATURE:
<223> OTHER INFORMATION: Description: Tetrahedral DNA staple strand,
      name: tet-staple-6

<400> SEQUENCE: 348
ctcatctaaa atacaaagaa accaccagaa ggagcggaat t                               41

<210> SEQ ID NO 349
<211> LENGTH: 42
<212> TYPE: DNA
<213> ORGANISM: Artificial sequence
<220> FEATURE:
<223> OTHER INFORMATION: Description: Tetrahedral DNA staple strand,
      name: tet-staple-7

<400> SEQUENCE: 349
gctgacgcgc attagaaaag tttgagtcaa cctaaaaggc tg                              42

<210> SEQ ID NO 350
<211> LENGTH: 36
<212> TYPE: DNA
<213> ORGANISM: Artificial sequence
<220> FEATURE:
<223> OTHER INFORMATION: Description: Tetrahedral DNA staple strand,
      name: tet-staple-8
```

<400> SEQUENCE: 350
aggaagtttc cattaaacgg gtttgaccca acggag                                    36

<210> SEQ ID NO 351
<211> LENGTH: 33
<212> TYPE: DNA
<213> ORGANISM: Artificial sequence
<220> FEATURE:
<223> OTHER INFORMATION: Description: Tetrahedral DNA staple strand,
      name: tet-staple-9

<400> SEQUENCE: 351
aaaatgaaaa tagcagcctt tgggtaattg agc                                       33

<210> SEQ ID NO 352
<211> LENGTH: 22
<212> TYPE: DNA
<213> ORGANISM: Artificial sequence
<220> FEATURE:
<223> OTHER INFORMATION: Description: Tetrahedral DNA staple strand,
      name: tet-staple-10

<400> SEQUENCE: 352
ggaacttcat caagagtaat ga                                                   22

<210> SEQ ID NO 353
<211> LENGTH: 48
<212> TYPE: DNA
<213> ORGANISM: Artificial sequence
<220> FEATURE:
<223> OTHER INFORMATION: Description: Tetrahedral DNA staple strand,
      name: tet-staple-11

<400> SEQUENCE: 353
catttttcct ttgaatagat taaaatatct ttagtgaacc ttgaaaaa                        48

<210> SEQ ID NO 354
<211> LENGTH: 31
<212> TYPE: DNA
<213> ORGANISM: Artificial sequence
<220> FEATURE:
<223> OTHER INFORMATION: Description: Tetrahedral DNA staple strand,
      name: tet-staple-12

<400> SEQUENCE: 354
aacgtaatgc cactacgaat acacctgata a                                         31

<210> SEQ ID NO 355
<211> LENGTH: 32
<212> TYPE: DNA
<213> ORGANISM: Artificial sequence
<220> FEATURE:
<223> OTHER INFORMATION: Description: Tetrahedral DNA staple strand,
      name: tet-staple-13

<400> SEQUENCE: 355
tttacaaaca attcgattta gaagtattag ac                                        32

<210> SEQ ID NO 356
<211> LENGTH: 31
<212> TYPE: DNA
<213> ORGANISM: Artificial sequence
<220> FEATURE:
<223> OTHER INFORMATION: Description: Tetrahedral DNA staple strand,
      name: tet-staple-14

<400> SEQUENCE: 356

```
gctaatatca gacgaagccc tttttaagaa a                                          31

<210> SEQ ID NO 357
<211> LENGTH: 31
<212> TYPE: DNA
<213> ORGANISM: Artificial sequence
<220> FEATURE:
<223> OTHER INFORMATION: Description: Tetrahedral DNA staple strand,
      name: tet-staple-15

<400> SEQUENCE: 357
tgaaaatagc aatagctcca gaagaagact c                                          31

<210> SEQ ID NO 358
<211> LENGTH: 42
<212> TYPE: DNA
<213> ORGANISM: Artificial sequence
<220> FEATURE:
<223> OTHER INFORMATION: Description: Tetrahedral DNA staple strand,
      name: tet-staple-16

<400> SEQUENCE: 358
gattagcgaa atcgaaagag gcaaaagaag gcacaacatt at                              42

<210> SEQ ID NO 359
<211> LENGTH: 27
<212> TYPE: DNA
<213> ORGANISM: Artificial sequence
<220> FEATURE:
<223> OTHER INFORMATION: Description: Tetrahedral DNA staple strand,
      name: tet-staple-17

<400> SEQUENCE: 359
atggttaagc tgttactgtg tacagac                                               27

<210> SEQ ID NO 360
<211> LENGTH: 42
<212> TYPE: DNA
<213> ORGANISM: Artificial sequence
<220> FEATURE:
<223> OTHER INFORMATION: Description: Tetrahedral DNA staple strand,
      name: tet-staple-18

<400> SEQUENCE: 360
ataacgtcac cttgcgagca ctaacaaaga gcaagagcaa ta                              42

<210> SEQ ID NO 361
<211> LENGTH: 35
<212> TYPE: DNA
<213> ORGANISM: Artificial sequence
<220> FEATURE:
<223> OTHER INFORMATION: Description: Tetrahedral DNA staple strand,
      name: tet-staple-19

<400> SEQUENCE: 361
tcaacgctga gagccagacc agcatattaa agcgg                                      35

<210> SEQ ID NO 362
<211> LENGTH: 53
<212> TYPE: DNA
<213> ORGANISM: Artificial sequence
<220> FEATURE:
<223> OTHER INFORMATION: Description: Tetrahedral DNA staple strand,
      name: tet-staple-20

<400> SEQUENCE: 362
```
cttattaatt agtcagtcag aacagagaca agaaccggat attcattacc caa        53

<210> SEQ ID NO 363
<211> LENGTH: 36
<212> TYPE: DNA
<213> ORGANISM: Artificial sequence
<220> FEATURE:
<223> OTHER INFORMATION: Description: Tetrahedral DNA staple strand,
      name: tet-staple-21

<400> SEQUENCE: 363
tctaaagatt aaaagttatt aattttacta ctaata        36

<210> SEQ ID NO 364
<211> LENGTH: 45
<212> TYPE: DNA
<213> ORGANISM: Artificial sequence
<220> FEATURE:
<223> OTHER INFORMATION: Description: Tetrahedral DNA staple strand,
      name: tet-staple-22

<400> SEQUENCE: 364
aaacaaatat caaacccggt tatcaataca ttcatcgcta aaaca        45

<210> SEQ ID NO 365
<211> LENGTH: 39
<212> TYPE: DNA
<213> ORGANISM: Artificial sequence
<220> FEATURE:
<223> OTHER INFORMATION: Description: Tetrahedral DNA staple strand,
      name: tet-staple-23

<400> SEQUENCE: 365
gacaatattt ttgaatggct cgcagtatgt tagcaaacg        39

<210> SEQ ID NO 366
<211> LENGTH: 32
<212> TYPE: DNA
<213> ORGANISM: Artificial sequence
<220> FEATURE:
<223> OTHER INFORMATION: Description: Tetrahedral DNA staple strand,
      name: tet-staple-24

<400> SEQUENCE: 366
cgcgaaccat gattgaaacc gaggaaacaa ca        32

<210> SEQ ID NO 367
<211> LENGTH: 33
<212> TYPE: DNA
<213> ORGANISM: Artificial sequence
<220> FEATURE:
<223> OTHER INFORMATION: Description: Tetrahedral DNA staple strand,
      name: tet-staple-25

<400> SEQUENCE: 367
aaacagacag tgccatatct ggtcagttgg caa        33

<210> SEQ ID NO 368
<211> LENGTH: 39
<212> TYPE: DNA
<213> ORGANISM: Artificial sequence
<220> FEATURE:
<223> OTHER INFORMATION: Description: Tetrahedral DNA staple strand,
      name: tet-staple-26

<400> SEQUENCE: 368
taatttgatt tacgactcat ccgccgccag cattggaaa        39

```
<210> SEQ ID NO 369
<211> LENGTH: 28
<212> TYPE: DNA
<213> ORGANISM: Artificial sequence
<220> FEATURE:
<223> OTHER INFORMATION: Description: Tetrahedral DNA staple strand,
      name: tet-staple-27

<400> SEQUENCE: 369
aacgagcaat caatgggtat tgttgagg                                    28

<210> SEQ ID NO 370
<211> LENGTH: 37
<212> TYPE: DNA
<213> ORGANISM: Artificial sequence
<220> FEATURE:
<223> OTHER INFORMATION: Description: Tetrahedral DNA staple strand,
      name: tet-staple-28

<400> SEQUENCE: 370
tcaacgtaac aaagctgcac gattttttgt ttaacgt                          37

<210> SEQ ID NO 371
<211> LENGTH: 39
<212> TYPE: DNA
<213> ORGANISM: Artificial sequence
<220> FEATURE:
<223> OTHER INFORMATION: Description: Tetrahedral DNA staple strand,
      name: tet-staple-29

<400> SEQUENCE: 371
gtgaataggt ttaattatac cagtcaggga actaaccac                        39

<210> SEQ ID NO 372
<211> LENGTH: 38
<212> TYPE: DNA
<213> ORGANISM: Artificial sequence
<220> FEATURE:
<223> OTHER INFORMATION: Description: Tetrahedral DNA staple strand,
      name: tet-staple-30

<400> SEQUENCE: 372
ttgttatccc aatccaaagg aatacggaac aagccacc                         38

<210> SEQ ID NO 373
<211> LENGTH: 40
<212> TYPE: DNA
<213> ORGANISM: Artificial sequence
<220> FEATURE:
<223> OTHER INFORMATION: Description: Tetrahedral DNA staple strand,
      name: tet-staple-31

<400> SEQUENCE: 373
ttagttgtct aagagcgccc aatagcaagc aaatcagata                       40

<210> SEQ ID NO 374
<211> LENGTH: 82
<212> TYPE: DNA
<213> ORGANISM: Artificial sequence
<220> FEATURE:
<223> OTHER INFORMATION: Description: Tetrahedral DNA staple strand,
      name: tet-staple-32

<400> SEQUENCE: 374
gcacccagct acaatttttt tcgctgaggc ttgcagggag tcatcgccca cgcataaccg  60
```

```
atttttttat cctgaatctt ac                                              82

<210> SEQ ID NO 375
<211> LENGTH: 42
<212> TYPE: DNA
<213> ORGANISM: Artificial sequence
<220> FEATURE:
<223> OTHER INFORMATION: Description: Tetrahedral DNA staple strand,
      name: tet-staple-33

<400> SEQUENCE: 375
tagtaagaag aaaaagccgt ttttattctc ccgactaacg ag                        42

<210> SEQ ID NO 376
<211> LENGTH: 22
<212> TYPE: DNA
<213> ORGANISM: Artificial sequence
<220> FEATURE:
<223> OTHER INFORMATION: Description: Tetrahedral DNA staple strand,
      name: tet-staple-34

<400> SEQUENCE: 376
ttggattggg cttgagatag gc                                              22

<210> SEQ ID NO 377
<211> LENGTH: 48
<212> TYPE: DNA
<213> ORGANISM: Artificial sequence
<220> FEATURE:
<223> OTHER INFORMATION: Description: Tetrahedral DNA staple strand,
      name: tet-staple-35

<400> SEQUENCE: 377
aggaatgtac cgcagcatgt agataagtcc tgaaaagcgt ccagtctc                  48

<210> SEQ ID NO 378
<211> LENGTH: 31
<212> TYPE: DNA
<213> ORGANISM: Artificial sequence
<220> FEATURE:
<223> OTHER INFORMATION: Description: Tetrahedral DNA staple strand,
      name: tet-staple-36

<400> SEQUENCE: 378
accacgcgag gcgttttgcc ttaacagagc c                                    31

<210> SEQ ID NO 379
<211> LENGTH: 32
<212> TYPE: DNA
<213> ORGANISM: Artificial sequence
<220> FEATURE:
<223> OTHER INFORMATION: Description: Tetrahedral DNA staple strand,
      name: tet-staple-37

<400> SEQUENCE: 379
ttatcattcc aagaacaatc ggctgtcttt cc                                   32

<210> SEQ ID NO 380
<211> LENGTH: 32
<212> TYPE: DNA
<213> ORGANISM: Artificial sequence
<220> FEATURE:
<223> OTHER INFORMATION: Description: Tetrahedral DNA staple strand,
      name: tet-staple-38

<400> SEQUENCE: 380
gattcatcag ttacactatc ataaccctcg tt                                   32
```

<210> SEQ ID NO 381
<211> LENGTH: 31
<212> TYPE: DNA
<213> ORGANISM: Artificial sequence
<220> FEATURE:
<223> OTHER INFORMATION: Description: Tetrahedral DNA staple strand,
      name: tet-staple-39

<400> SEQUENCE: 381
attttacgag gcatagtata gcccaccacc g                                31

<210> SEQ ID NO 382
<211> LENGTH: 42
<212> TYPE: DNA
<213> ORGANISM: Artificial sequence
<220> FEATURE:
<223> OTHER INFORMATION: Description: Tetrahedral DNA staple strand,
      name: tet-staple-40

<400> SEQUENCE: 382
atcctaccag ttacgggagg ttttgaaagc gaacttcatc gt                    42

<210> SEQ ID NO 383
<211> LENGTH: 35
<212> TYPE: DNA
<213> ORGANISM: Artificial sequence
<220> FEATURE:
<223> OTHER INFORMATION: Description: Tetrahedral DNA staple strand,
      name: tet-staple-41

<400> SEQUENCE: 383
tgttcagcta atgcagaacg cgcctgttta tatga                            35

<210> SEQ ID NO 384
<211> LENGTH: 52
<212> TYPE: DNA
<213> ORGANISM: Artificial sequence
<220> FEATURE:
<223> OTHER INFORMATION: Description: Tetrahedral DNA staple strand,
      name: tet-staple-42

<400> SEQUENCE: 384
gcgttttcat cggcattttc ggtcaagagc agagatttat aagaatcatt ca         52

<210> SEQ ID NO 385
<211> LENGTH: 42
<212> TYPE: DNA
<213> ORGANISM: Artificial sequence
<220> FEATURE:
<223> OTHER INFORMATION: Description: Tetrahedral DNA staple strand,
      name: tet-staple-43

<400> SEQUENCE: 385
ttttcacgtt ccagtcaaga aaataaata acgccagcca tc                     42

<210> SEQ ID NO 386
<211> LENGTH: 35
<212> TYPE: DNA
<213> ORGANISM: Artificial sequence
<220> FEATURE:
<223> OTHER INFORMATION: Description: Tetrahedral DNA staple strand,
      name: tet-staple-44

<400> SEQUENCE: 386
tacttaaagc cagaatgaca ggagaaacca acatt                            35

```
<210> SEQ ID NO 387
<211> LENGTH: 54
<212> TYPE: DNA
<213> ORGANISM: Artificial sequence
<220> FEATURE:
<223> OTHER INFORMATION: Description: Tetrahedral DNA staple strand,
      name: tet-staple-45

<400> SEQUENCE: 387
gaaccgcccc tcagacatta ttggctcatt tcaactttaa tcattgtgaa ttac            54

<210> SEQ ID NO 388
<211> LENGTH: 36
<212> TYPE: DNA
<213> ORGANISM: Artificial sequence
<220> FEATURE:
<223> OTHER INFORMATION: Description: Tetrahedral DNA staple strand,
      name: tet-staple-46

<400> SEQUENCE: 388
tgaatttcca gagcgagaac aagcaatcac tatccc                               36

<210> SEQ ID NO 389
<211> LENGTH: 45
<212> TYPE: DNA
<213> ORGANISM: Artificial sequence
<220> FEATURE:
<223> OTHER INFORMATION: Description: Tetrahedral DNA staple strand,
      name: tet-staple-47

<400> SEQUENCE: 389
gcgatacatg gcttttgcaa caatagaaac cgtctttcat caaga                     45

<210> SEQ ID NO 390
<211> LENGTH: 32
<212> TYPE: DNA
<213> ORGANISM: Artificial sequence
<220> FEATURE:
<223> OTHER INFORMATION: Description: Tetrahedral DNA staple strand,
      name: tet-staple-48

<400> SEQUENCE: 390
accctcacag agccccttat tagcgtttaa ag                                   32

<210> SEQ ID NO 391
<211> LENGTH: 45
<212> TYPE: DNA
<213> ORGANISM: Artificial sequence
<220> FEATURE:
<223> OTHER INFORMATION: Description: Tetrahedral DNA staple strand,
      name: tet-staple-49

<400> SEQUENCE: 391
accaccaact aatcaaaatc accggaacga gccgcataaa acacg                     45

<210> SEQ ID NO 392
<211> LENGTH: 37
<212> TYPE: DNA
<213> ORGANISM: Artificial sequence
<220> FEATURE:
<223> OTHER INFORMATION: Description: Tetrahedral DNA staple strand,
      name: tet-staple-50

<400> SEQUENCE: 392
caggtcaatc ctcaaggagt gtactggtaa taagttt                              37
```

```
<210> SEQ ID NO 393
<211> LENGTH: 39
<212> TYPE: DNA
<213> ORGANISM: Artificial sequence
<220> FEATURE:
<223> OTHER INFORMATION: Description: Tetrahedral DNA staple strand,
      name: tet-staple-51

<400> SEQUENCE: 393
gaatgacatc accgaacgtc atctggccaa cagagaaac                             39

<210> SEQ ID NO 394
<211> LENGTH: 28
<212> TYPE: DNA
<213> ORGANISM: Artificial sequence
<220> FEATURE:
<223> OTHER INFORMATION: Description: Tetrahedral DNA staple strand,
      name: tet-staple-52

<400> SEQUENCE: 394
tttaaaccat ttggattacc accttctg                                        28

<210> SEQ ID NO 395
<211> LENGTH: 39
<212> TYPE: DNA
<213> ORGANISM: Artificial sequence
<220> FEATURE:
<223> OTHER INFORMATION: Description: Tetrahedral DNA staple strand,
      name: tet-staple-53

<400> SEQUENCE: 395
acttcaaaac aggtggatgg cttagagctg ttttattcc                             39

<210> SEQ ID NO 396
<211> LENGTH: 38
<212> TYPE: DNA
<213> ORGANISM: Artificial sequence
<220> FEATURE:
<223> OTHER INFORMATION: Description: Tetrahedral DNA staple strand,
      name: tet-staple-54

<400> SEQUENCE: 396
cgcgactatt atagtcacag ttgaaatatg ctggcaga                              38

<210> SEQ ID NO 397
<211> LENGTH: 46
<212> TYPE: DNA
<213> ORGANISM: Artificial sequence
<220> FEATURE:
<223> OTHER INFORMATION: Description: Tetrahedral DNA staple strand,
      name: tet-staple-55

<400> SEQUENCE: 397
gagcttcaag gcaaaaatca ggtctaacga gtgctgtagg accagt                     46

<210> SEQ ID NO 398
<211> LENGTH: 41
<212> TYPE: DNA
<213> ORGANISM: Artificial sequence
<220> FEATURE:
<223> OTHER INFORMATION: Description: Tetrahedral DNA staple strand,
      name: tet-staple-56

<400> SEQUENCE: 398
gcgtccaata gcgatcaagt ttgcctttag cgtcagactg t                          41

<210> SEQ ID NO 399
```

```
<211> LENGTH: 47
<212> TYPE: DNA
<213> ORGANISM: Artificial sequence
<220> FEATURE:
<223> OTHER INFORMATION: Description: Tetrahedral DNA staple strand,
      name: tet-staple-57

<400> SEQUENCE: 399
agagtacctt taattgcttt tgaatcgcca tatttaacaa cggccaa                47

<210> SEQ ID NO 400
<211> LENGTH: 42
<212> TYPE: DNA
<213> ORGANISM: Artificial sequence
<220> FEATURE:
<223> OTHER INFORMATION: Description: Tetrahedral DNA staple strand,
      name: tet-staple-58

<400> SEQUENCE: 400
ccagacctga atatatcgat agcagcattg ccagagagcg aa                    42

<210> SEQ ID NO 401
<211> LENGTH: 35
<212> TYPE: DNA
<213> ORGANISM: Artificial sequence
<220> FEATURE:
<223> OTHER INFORMATION: Description: Tetrahedral DNA staple strand,
      name: tet-staple-59

<400> SEQUENCE: 401
cagacgacga taaaaaccaa aatactgcca aatgc                            35

<210> SEQ ID NO 402
<211> LENGTH: 22
<212> TYPE: DNA
<213> ORGANISM: Artificial sequence
<220> FEATURE:
<223> OTHER INFORMATION: Description: Tetrahedral DNA staple strand,
      name: tet-staple-60

<400> SEQUENCE: 402
attgcggaag caaactccat at                                          22

<210> SEQ ID NO 403
<211> LENGTH: 48
<212> TYPE: DNA
<213> ORGANISM: Artificial sequence
<220> FEATURE:
<223> OTHER INFORMATION: Description: Tetrahedral DNA staple strand,
      name: tet-staple-61

<400> SEQUENCE: 403
agtagcggcc ggatcaccga ggtaaatatt gacgtgtcac aaagacac              48

<210> SEQ ID NO 404
<211> LENGTH: 31
<212> TYPE: DNA
<213> ORGANISM: Artificial sequence
<220> FEATURE:
<223> OTHER INFORMATION: Description: Tetrahedral DNA staple strand,
      name: tet-staple-62

<400> SEQUENCE: 404
gaagaggctt ttgcaaagtt tagaaaaacg a                                31

<210> SEQ ID NO 405
<211> LENGTH: 32
```

```
<212> TYPE: DNA
<213> ORGANISM: Artificial sequence
<220> FEATURE:
<223> OTHER INFORMATION: Description: Tetrahedral DNA staple strand,
      name: tet-staple-63

<400> SEQUENCE: 405
aatcaccagt agcaccgaat tagagccagc aa                                    32

<210> SEQ ID NO 406
<211> LENGTH: 31
<212> TYPE: DNA
<213> ORGANISM: Artificial sequence
<220> FEATURE:
<223> OTHER INFORMATION: Description: Tetrahedral DNA staple strand,
      name: tet-staple-64

<400> SEQUENCE: 406
gaagtttcat tcaataacct gtttagctat a                                     31

<210> SEQ ID NO 407
<211> LENGTH: 31
<212> TYPE: DNA
<213> ORGANISM: Artificial sequence
<220> FEATURE:
<223> OTHER INFORMATION: Description: Tetrahedral DNA staple strand,
      name: tet-staple-65

<400> SEQUENCE: 407
caaagataca tttcgcaggt ggcagcaaag a                                     31

<210> SEQ ID NO 408
<211> LENGTH: 42
<212> TYPE: DNA
<213> ORGANISM: Artificial sequence
<220> FEATURE:
<223> OTHER INFORMATION: Description: Tetrahedral DNA staple strand,
      name: tet-staple-66

<400> SEQUENCE: 408
tgaattcata aatggtaata gtaaaataga agttccgtaa tc                         42

<210> SEQ ID NO 409
<211> LENGTH: 27
<212> TYPE: DNA
<213> ORGANISM: Artificial sequence
<220> FEATURE:
<223> OTHER INFORMATION: Description: Tetrahedral DNA staple strand,
      name: tet-staple-67

<400> SEQUENCE: 409
attttctgcg ttaccctgtt ttaattc                                          27

<210> SEQ ID NO 410
<211> LENGTH: 42
<212> TYPE: DNA
<213> ORGANISM: Artificial sequence
<220> FEATURE:
<223> OTHER INFORMATION: Description: Tetrahedral DNA staple strand,
      name: tet-staple-68

<400> SEQUENCE: 410
agcattagtt tatttgaaat tattcatatt tagtttagta gt                         42

<210> SEQ ID NO 411
<211> LENGTH: 35
<212> TYPE: DNA
```

```
<213> ORGANISM: Artificial sequence
<220> FEATURE:
<223> OTHER INFORMATION: Description: Tetrahedral DNA staple strand,
      name: tet-staple-69

<400> SEQUENCE: 411
tgggcaacat ataaaagata gaacttagca agaca                                  35

<210> SEQ ID NO 412
<211> LENGTH: 37
<212> TYPE: DNA
<213> ORGANISM: Artificial sequence
<220> FEATURE:
<223> OTHER INFORMATION: Description: Tetrahedral DNA staple strand,
      name: tet-staple-70

<400> SEQUENCE: 412
attagcattt acataactaa atttttgcca ggattag                                37

<210> SEQ ID NO 413
<211> LENGTH: 36
<212> TYPE: DNA
<213> ORGANISM: Artificial sequence
<220> FEATURE:
<223> OTHER INFORMATION: Description: Tetrahedral DNA staple strand,
      name: tet-staple-71

<400> SEQUENCE: 413
cacggaaggg acatccaatg aaaccaatag taaagg                                 36

<210> SEQ ID NO 414
<211> LENGTH: 45
<212> TYPE: DNA
<213> ORGANISM: Artificial sequence
<220> FEATURE:
<223> OTHER INFORMATION: Description: Tetrahedral DNA staple strand,
      name: tet-staple-72

<400> SEQUENCE: 414
gcaatcaata gaaaattgag ggaacttgag cagttcagct ggata                       45

<210> SEQ ID NO 415
<211> LENGTH: 34
<212> TYPE: DNA
<213> ORGANISM: Artificial sequence
<220> FEATURE:
<223> OTHER INFORMATION: Description: Tetrahedral DNA staple strand,
      name: tet-staple-73

<400> SEQUENCE: 415
agaaaataca tacatagcgt aagaatacgt ggca                                   34

<210> SEQ ID NO 416
<211> LENGTH: 39
<212> TYPE: DNA
<213> ORGANISM: Artificial sequence
<220> FEATURE:
<223> OTHER INFORMATION: Description: Tetrahedral DNA staple strand,
      name: tet-staple-74

<400> SEQUENCE: 416
caatcgtctg aaatggatta aaattaagca ataaagcct                              39

<210> SEQ ID NO 417
<211> LENGTH: 32
<212> TYPE: DNA
<213> ORGANISM: Artificial sequence
```

<220> FEATURE:
<223> OTHER INFORMATION: Description: Tetrahedral DNA staple strand,
      name: tet-staple-75

<400> SEQUENCE: 417
ttcaccaagg caagtcaatt ctactaatga cc                              32

<210> SEQ ID NO 418
<211> LENGTH: 33
<212> TYPE: DNA
<213> ORGANISM: Artificial sequence
<220> FEATURE:
<223> OTHER INFORMATION: Description: Tetrahedral DNA staple strand,
      name: tet-staple-76

<400> SEQUENCE: 418
acctgaaaaa ggtgtttacc agcgccaaag aca                             33

<210> SEQ ID NO 419
<211> LENGTH: 39
<212> TYPE: DNA
<213> ORGANISM: Artificial sequence
<220> FEATURE:
<223> OTHER INFORMATION: Description: Tetrahedral DNA staple strand,
      name: tet-staple-77

<400> SEQUENCE: 419
cacgacgtta catctttcaa tcggaacgag ggtagcaat                       39

<210> SEQ ID NO 420
<211> LENGTH: 28
<212> TYPE: DNA
<213> ORGANISM: Artificial sequence
<220> FEATURE:
<223> OTHER INFORMATION: Description: Tetrahedral DNA staple strand,
      name: tet-staple-78

<400> SEQUENCE: 420
taacgcccgg attccgcgca gtacagag                                   28

<210> SEQ ID NO 421
<211> LENGTH: 39
<212> TYPE: DNA
<213> ORGANISM: Artificial sequence
<220> FEATURE:
<223> OTHER INFORMATION: Description: Tetrahedral DNA staple strand,
      name: tet-staple-79

<400> SEQUENCE: 421
gtcatagccg gaaggccctc atagttagac gttagggag                       39

<210> SEQ ID NO 422
<211> LENGTH: 38
<212> TYPE: DNA
<213> ORGANISM: Artificial sequence
<220> FEATURE:
<223> OTHER INFORMATION: Description: Tetrahedral DNA staple strand,
      name: tet-staple-80

<400> SEQUENCE: 422
ttcgcatgcc tgcaggtttt cagctaaatg acgctttt                        38

<210> SEQ ID NO 423
<211> LENGTH: 46
<212> TYPE: DNA
<213> ORGANISM: Artificial sequence
<220> FEATURE:

```
<223> OTHER INFORMATION: Description: Tetrahedral DNA staple strand,
      name: tet-staple-81

<400> SEQUENCE: 423
ttgttatcct tacgacggcc agtgcaagga actgtcgtcc tcagca                46

<210> SEQ ID NO 424
<211> LENGTH: 45
<212> TYPE: DNA
<213> ORGANISM: Artificial sequence
<220> FEATURE:
<223> OTHER INFORMATION: Description: Tetrahedral DNA staple strand,
      name: tet-staple-82

<400> SEQUENCE: 424
gctattaagg caaaattaat tacatttaac aatttcattt gaatt                 45

<210> SEQ ID NO 425
<211> LENGTH: 42
<212> TYPE: DNA
<213> ORGANISM: Artificial sequence
<220> FEATURE:
<223> OTHER INFORMATION: Description: Tetrahedral DNA staple strand,
      name: tet-staple-83

<400> SEQUENCE: 425
aattccatct aaagtagaag atgatgagcg caactggctc ac                    42

<210> SEQ ID NO 426
<211> LENGTH: 36
<212> TYPE: DNA
<213> ORGANISM: Artificial sequence
<220> FEATURE:
<223> OTHER INFORMATION: Description: Tetrahedral DNA staple strand,
      name: tet-staple-84

<400> SEQUENCE: 426
accgcttctg gtgccggaaa cccgccagca gttggg                           36

<210> SEQ ID NO 427
<211> LENGTH: 34
<212> TYPE: DNA
<213> ORGANISM: Artificial sequence
<220> FEATURE:
<223> OTHER INFORMATION: Description: Tetrahedral DNA staple strand,
      name: tet-staple-85

<400> SEQUENCE: 427
actacaacgc ctgtagcatt ccgtatggga tttt                             34

<210> SEQ ID NO 428
<211> LENGTH: 21
<212> TYPE: DNA
<213> ORGANISM: Artificial sequence
<220> FEATURE:
<223> OTHER INFORMATION: Description: Tetrahedral DNA staple strand,
      name: tet-staple-86

<400> SEQUENCE: 428
acgacacaac atacgagctg t                                           21

<210> SEQ ID NO 429
<211> LENGTH: 48
<212> TYPE: DNA
<213> ORGANISM: Artificial sequence
<220> FEATURE:
<223> OTHER INFORMATION: Description: Tetrahedral DNA staple strand,
``` name: tet-staple-87

<400> SEQUENCE: 429
tcaagattat tcagggagaa aggtttaacg tcagtgaata aatcctga                48

<210> SEQ ID NO 430
<211> LENGTH: 31
<212> TYPE: DNA
<213> ORGANISM: Artificial sequence
<220> FEATURE:
<223> OTHER INFORMATION: Description: Tetrahedral DNA staple strand,
      name: tet-staple-88

<400> SEQUENCE: 430
aaagcgccat tcgccatgtg cgggtcccag t                                   31

<210> SEQ ID NO 431
<211> LENGTH: 32
<212> TYPE: DNA
<213> ORGANISM: Artificial sequence
<220> FEATURE:
<223> OTHER INFORMATION: Description: Tetrahedral DNA staple strand,
      name: tet-staple-89

<400> SEQUENCE: 431
taccaagtta caaaatgcct gattgctttg aa                                  32

<210> SEQ ID NO 432
<211> LENGTH: 31
<212> TYPE: DNA
<213> ORGANISM: Artificial sequence
<220> FEATURE:
<223> OTHER INFORMATION: Description: Tetrahedral DNA staple strand,
      name: tet-staple-90

<400> SEQUENCE: 432
gctaaacaac ttaatctcca aaaaaaggc t                                    31

<210> SEQ ID NO 433
<211> LENGTH: 31
<212> TYPE: DNA
<213> ORGANISM: Artificial sequence
<220> FEATURE:
<223> OTHER INFORMATION: Description: Tetrahedral DNA staple strand,
      name: tet-staple-91

<400> SEQUENCE: 433
tgataataat tttttcattt atcaacaatg a                                   31

<210> SEQ ID NO 434
<211> LENGTH: 42
<212> TYPE: DNA
<213> ORGANISM: Artificial sequence
<220> FEATURE:
<223> OTHER INFORMATION: Description: Tetrahedral DNA staple strand,
      name: tet-staple-92

<400> SEQUENCE: 434 tacctttgt aagggaagg gcgatcgtca ggctaacaaa ca                        42

<210> SEQ ID NO 435
<211> LENGTH: 27
<212> TYPE: DNA
<213> ORGANISM: Artificial sequence
<220> FEATURE:
<223> OTHER INFORMATION: Description: Tetrahedral DNA staple strand,
      name: tet-staple-93

<400> SEQUENCE: 435
gaagaataga caagcttctg tgtgaaa						27

<210> SEQ ID NO 436
<211> LENGTH: 42
<212> TYPE: DNA
<213> ORGANISM: Artificial sequence
<220> FEATURE:
<223> OTHER INFORMATION: Description: Tetrahedral DNA staple strand,
      name: tet-staple-94

<400> SEQUENCE: 436
tcttaattat acttcatgaa tatacagcta aggaatgaa tt						42

<210> SEQ ID NO 437
<211> LENGTH: 35
<212> TYPE: DNA
<213> ORGANISM: Artificial sequence
<220> FEATURE:
<223> OTHER INFORMATION: Description: Tetrahedral DNA staple strand,
      name: tet-staple-95

<400> SEQUENCE: 437
ccatgatggc aattcatcaa cggcaggcga aaaac						35

<210> SEQ ID NO 438
<211> LENGTH: 53
<212> TYPE: DNA
<213> ORGANISM: Artificial sequence
<220> FEATURE:
<223> OTHER INFORMATION: Description: Tetrahedral DNA staple strand,
      name: tet-staple-96

<400> SEQUENCE: 438
caacaactaa aggcattttc tacagacaca taaagtgtaa agcctggggt gcc						53

<210> SEQ ID NO 439
<211> LENGTH: 36
<212> TYPE: DNA
<213> ORGANISM: Artificial sequence
<220> FEATURE:
<223> OTHER INFORMATION: Description: Tetrahedral DNA staple strand,
      name: tet-staple-97

<400> SEQUENCE: 439
ttgtttgaca gcattacctg agcaaattaa taacag						36

<210> SEQ ID NO 440
<211> LENGTH: 45
<212> TYPE: DNA
<213> ORGANISM: Artificial sequence
<220> FEATURE:
<223> OTHER INFORMATION: Description: Tetrahedral DNA staple strand,
      name: tet-staple-98

<400> SEQUENCE: 440
atatggaagg gttagaagat tttcacaata aagggtttcc tcttc						45

<210> SEQ ID NO 441
<211> LENGTH: 31
<212> TYPE: DNA
<213> ORGANISM: Artificial sequence
<220> FEATURE:
<223> OTHER INFORMATION: Description: Tetrahedral DNA staple strand,
      name: tet-staple-99

<400> SEQUENCE: 441
atcatattcc tgatggacta aagactttt c                                31

<210> SEQ ID NO 442
<211> LENGTH: 32
<212> TYPE: DNA
<213> ORGANISM: Artificial sequence
<220> FEATURE:
<223> OTHER INFORMATION: Description: Tetrahedral DNA staple strand,
      name: tet-staple-100

<400> SEQUENCE: 442
gcgggattgc gccggcttgc tttcgaggtt gc                              32

<210> SEQ ID NO 443
<211> LENGTH: 33
<212> TYPE: DNA
<213> ORGANISM: Artificial sequence
<220> FEATURE:
<223> OTHER INFORMATION: Description: Tetrahedral DNA staple strand,
      name: tet-staple-101

<400> SEQUENCE: 443
gctttgatat cagatatcaa aattatttgc acg                             33

<210> SEQ ID NO 444
<211> LENGTH: 39
<212> TYPE: DNA
<213> ORGANISM: Artificial sequence
<220> FEATURE:
<223> OTHER INFORMATION: Description: Tetrahedral DNA staple strand,
      name: tet-staple-102

<400> SEQUENCE: 444
acagctgata gcccctcaga gataaagtac cgacaaaca                       39

<210> SEQ ID NO 445
<211> LENGTH: 28
<212> TYPE: DNA
<213> ORGANISM: Artificial sequence
<220> FEATURE:
<223> OTHER INFORMATION: Description: Tetrahedral DNA staple strand,
      name: tet-staple-103

<400> SEQUENCE: 445
ttttcacacc gtacgccacc caagtaat                                   28

<210> SEQ ID NO 446
<211> LENGTH: 39
<212> TYPE: DNA
<213> ORGANISM: Artificial sequence
<220> FEATURE:
<223> OTHER INFORMATION: Description: Tetrahedral DNA staple strand,
      name: tet-staple-104

<400> SEQUENCE: 446
gttccgagtt gttctcaaaa tcataggtgt tgggtcgag                       39

<210> SEQ ID NO 447
<211> LENGTH: 38
<212> TYPE: DNA
<213> ORGANISM: Artificial sequence
<220> FEATURE:
<223> OTHER INFORMATION: Description: Tetrahedral DNA staple strand,
      name: tet-staple-105

<400> SEQUENCE: 447
ggcagttgca gcaagcgaag aacgtatata agtaatttt    38

<210> SEQ ID NO 448
<211> LENGTH: 46
<212> TYPE: DNA
<213> ORGANISM: Artificial sequence
<220> FEATURE:
<223> OTHER INFORMATION: Description: Tetrahedral DNA staple strand,
      name: tet-staple-106

<400> SEQUENCE: 448
ataaatcaaa attcaccgcc tggcccaaat ataacctcct cgagcc    46

<210> SEQ ID NO 449
<211> LENGTH: 45
<212> TYPE: DNA
<213> ORGANISM: Artificial sequence
<220> FEATURE:
<223> OTHER INFORMATION: Description: Tetrahedral DNA staple strand,
      name: tet-staple-107

<400> SEQUENCE: 449
ggccaacaat tgcggtaccg taacactgag tttcgtcacc agtac    45

<210> SEQ ID NO 450
<211> LENGTH: 42
<212> TYPE: DNA
<213> ORGANISM: Artificial sequence
<220> FEATURE:
<223> OTHER INFORMATION: Description: Tetrahedral DNA staple strand,
      name: tet-staple-108

<400> SEQUENCE: 450
agcccgacta ccttttttc agggatacag tcgggaaaga at    42

<210> SEQ ID NO 451
<211> LENGTH: 36
<212> TYPE: DNA
<213> ORGANISM: Artificial sequence
<220> FEATURE:
<223> OTHER INFORMATION: Description: Tetrahedral DNA staple strand,
      name: tet-staple-109

<400> SEQUENCE: 451
aatgagtgag ctaactcaca ttgcgcgggg tttttc    36

<210> SEQ ID NO 452
<211> LENGTH: 34
<212> TYPE: DNA
<213> ORGANISM: Artificial sequence
<220> FEATURE:
<223> OTHER INFORMATION: Description: Tetrahedral DNA staple strand,
      name: tet-staple-110

<400> SEQUENCE: 452
gacgctgaga agagtcaata gttaaatgct gatg    34

<210> SEQ ID NO 453
<211> LENGTH: 21
<212> TYPE: DNA
<213> ORGANISM: Artificial sequence
<220> FEATURE:
<223> OTHER INFORMATION: Description: Tetrahedral DNA staple strand,
      name: tet-staple-111

<400> SEQUENCE: 453
gagagatagg gttgagtaat c                                              21

<210> SEQ ID NO 454
<211> LENGTH: 48
<212> TYPE: DNA
<213> ORGANISM: Artificial sequence
<220> FEATURE:
<223> OTHER INFORMATION: Description: Tetrahedral DNA staple strand,
      name: tet-staple-112

<400> SEQUENCE: 454
aataggcgcc accggaatag ccaggcggat aagttattat taatgccc                 48

<210> SEQ ID NO 455
<211> LENGTH: 31
<212> TYPE: DNA
<213> ORGANISM: Artificial sequence
<220> FEATURE:
<223> OTHER INFORMATION: Description: Tetrahedral DNA staple strand,
      name: tet-staple-113

<400> SEQUENCE: 455
catttgcgct cactgcctgc attaacgggc a                                   31

<210> SEQ ID NO 456
<211> LENGTH: 32
<212> TYPE: DNA
<213> ORGANISM: Artificial sequence
<220> FEATURE:
<223> OTHER INFORMATION: Description: Tetrahedral DNA staple strand,
      name: tet-staple-114

<400> SEQUENCE: 456
cgccaccctc agaacctcag gaggtttagt ac                                  32

<210> SEQ ID NO 457
<211> LENGTH: 31
<212> TYPE: DNA
<213> ORGANISM: Artificial sequence
<220> FEATURE:
<223> OTHER INFORMATION: Description: Tetrahedral DNA staple strand,
      name: tet-staple-115

<400> SEQUENCE: 457
caaatccaat cgttgaaata ccgaccgtgt g                                   31

<210> SEQ ID NO 458
<211> LENGTH: 31
<212> TYPE: DNA
<213> ORGANISM: Artificial sequence
<220> FEATURE:
<223> OTHER INFORMATION: Description: Tetrahedral DNA staple strand,
      name: tet-staple-116

<400> SEQUENCE: 458
aaattctgac ctaaattaca ccggcttacc a                                   31

<210> SEQ ID NO 459
<211> LENGTH: 42
<212> TYPE: DNA
<213> ORGANISM: Artificial sequence
<220> FEATURE:
<223> OTHER INFORMATION: Description: Tetrahedral DNA staple strand,
      name: tet-staple-117

<400> SEQUENCE: 459
ataagtattg cccccctgtcg tgccagccgc tttcgcaagc cc                      42

```
<210> SEQ ID NO 460
<211> LENGTH: 27
<212> TYPE: DNA
<213> ORGANISM: Artificial sequence
<220> FEATURE:
<223> OTHER INFORMATION: Description: Tetrahedral DNA staple strand,
      name: tet-staple-118

<400> SEQUENCE: 460
atcacttttt ctgagagaaa atccctt                                        27

<210> SEQ ID NO 461
<211> LENGTH: 42
<212> TYPE: DNA
<213> ORGANISM: Artificial sequence
<220> FEATURE:
<223> OTHER INFORMATION: Description: Tetrahedral DNA staple strand,
      name: tet-staple-119

<400> SEQUENCE: 461
gcctgtttcg gaaccgccgt cgagaggttt agttaagaaa aa                       42

<210> SEQ ID NO 462
<211> LENGTH: 35
<212> TYPE: DNA
<213> ORGANISM: Artificial sequence
<220> FEATURE:
<223> OTHER INFORMATION: Description: Tetrahedral DNA staple strand,
      name: tet-staple-120

<400> SEQUENCE: 462
aagacagtgc ccgtataaaa ggtatcagaa caacc                               35

<210> SEQ ID NO 463
<211> LENGTH: 51
<212> TYPE: DNA
<213> ORGANISM: Artificial sequence
<220> FEATURE:
<223> OTHER INFORMATION: Description: Tetrahedral DNA staple strand,
      name: tet-staple-121

<400> SEQUENCE: 463
cgctcaacag tagggcaatt tccttttgat aagaggtcag tacggtgtct g             51

<210> SEQ ID NO 464
<211> LENGTH: 53
<212> TYPE: DNA
<213> ORGANISM: Artificial sequence
<220> FEATURE:
<223> OTHER INFORMATION: Description: Tetrahedral DNA staple strand,
      name: tet-staple-122

<400> SEQUENCE: 464
gtataaacca acatctatat ggaatttaca gtttggaaca agagtccact att           53

<210> SEQ ID NO 465
<211> LENGTH: 36
<212> TYPE: DNA
<213> ORGANISM: Artificial sequence
<220> FEATURE:
<223> OTHER INFORMATION: Description: Tetrahedral DNA staple strand,
      name: tet-staple-123

<400> SEQUENCE: 465
cctgcctaga gaatccacca ccctcattat gttgat                              36
```

```
<210> SEQ ID NO 466
<211> LENGTH: 45
<212> TYPE: DNA
<213> ORGANISM: Artificial sequence
<220> FEATURE:
<223> OTHER INFORMATION: Description: Tetrahedral DNA staple strand,
      name: tet-staple-124

<400> SEQUENCE: 466
gttctgaaac atgaaagctc agtagtgtat ccagtgagat gaatc              45

<210> SEQ ID NO 467
<211> LENGTH: 34
<212> TYPE: DNA
<213> ORGANISM: Artificial sequence
<220> FEATURE:
<223> OTHER INFORMATION: Description: Tetrahedral DNA staple strand,
      name: tet-staple-125

<400> SEQUENCE: 467
aacggggtca gtgccagacg acgacaataa acaa                          34

<210> SEQ ID NO 468
<211> LENGTH: 32
<212> TYPE: DNA
<213> ORGANISM: Artificial sequence
<220> FEATURE:
<223> OTHER INFORMATION: Description: Tetrahedral DNA staple strand,
      name: tet-staple-126

<400> SEQUENCE: 468
aggcagaaca aattaatcat aattactatt tc                            32

<210> SEQ ID NO 469
<211> LENGTH: 33
<212> TYPE: DNA
<213> ORGANISM: Artificial sequence
<220> FEATURE:
<223> OTHER INFORMATION: Description: Tetrahedral DNA staple strand,
      name: tet-staple-127

<400> SEQUENCE: 469
tctgtccttg agtaaggctg agactcctca aga                           33

<210> SEQ ID NO 470
<211> LENGTH: 39
<212> TYPE: DNA
<213> ORGANISM: Artificial sequence
<220> FEATURE:
<223> OTHER INFORMATION: Description: Tetrahedral DNA staple strand,
      name: tet-staple-128

<400> SEQUENCE: 470
accttgcgca ttaagccagc taatcaccat caatacagg                     39

<210> SEQ ID NO 471
<211> LENGTH: 28
<212> TYPE: DNA
<213> ORGANISM: Artificial sequence
<220> FEATURE:
<223> OTHER INFORMATION: Description: Tetrahedral DNA staple strand,
      name: tet-staple-129

<400> SEQUENCE: 471
atcaataagc tcatttcgcg tcaaccgt                                 28
```

```
<210> SEQ ID NO 472
<211> LENGTH: 33
<212> TYPE: DNA
<213> ORGANISM: Artificial sequence
<220> FEATURE:
<223> OTHER INFORMATION: Description: Tetrahedral DNA staple strand,
      name: tet-staple-130

<400> SEQUENCE: 472
cttttttaat ggaaacagca gccagctttc cgg                                    33

<210> SEQ ID NO 473
<211> LENGTH: 37
<212> TYPE: DNA
<213> ORGANISM: Artificial sequence
<220> FEATURE:
<223> OTHER INFORMATION: Description: Tetrahedral DNA staple strand,
      name: tet-staple-131

<400> SEQUENCE: 473
aagaacgtgg actccaacca tagcgatagc ttagatt                                37

<210> SEQ ID NO 474
<211> LENGTH: 39
<212> TYPE: DNA
<213> ORGANISM: Artificial sequence
<220> FEATURE:
<223> OTHER INFORMATION: Description: Tetrahedral DNA staple strand,
      name: tet-staple-132

<400> SEQUENCE: 474
ggcgaaagat tttacaccga gtaaaagaaa tacttcctt                              39

<210> SEQ ID NO 475
<211> LENGTH: 38
<212> TYPE: DNA
<213> ORGANISM: Artificial sequence
<220> FEATURE:
<223> OTHER INFORMATION: Description: Tetrahedral DNA staple strand,
      name: tet-staple-133

<400> SEQUENCE: 475 gtcttcccctt agaatcccta tcggctttga ttaggtaa                              38

<210> SEQ ID NO 476
<211> LENGTH: 40
<212> TYPE: DNA
<213> ORGANISM: Artificial sequence
<220> FEATURE:
<223> OTHER INFORMATION: Description: Tetrahedral DNA staple strand,
      name: tet-staple-134

<400> SEQUENCE: 476
ggaagatggt gtagcgtggg aacaaacggc ggattgaccg                             40

<210> SEQ ID NO 477
<211> LENGTH: 42
<212> TYPE: DNA
<213> ORGANISM: Artificial sequence
<220> FEATURE:
<223> OTHER INFORMATION: Description: Tetrahedral DNA staple strand,
      name: tet-staple-135

<400> SEQUENCE: 477
aacaggcatc acgcaaaatg tgagcgaatc tgccaggagc ta                          42

<210> SEQ ID NO 478
```

```
<211> LENGTH: 22
<212> TYPE: DNA
<213> ORGANISM: Artificial sequence
<220> FEATURE:
<223> OTHER INFORMATION: Description: Tetrahedral DNA staple strand,
      name: tet-staple-136

<400> SEQUENCE: 478
tgtcaggccg attaaaggaa cc                                                22

<210> SEQ ID NO 479
<211> LENGTH: 48
<212> TYPE: DNA
<213> ORGANISM: Artificial sequence
<220> FEATURE:
<223> OTHER INFORMATION: Description: Tetrahedral DNA staple strand,
      name: tet-staple-137

<400> SEQUENCE: 479
ccgtcgtcct gtaatttttg atatttaaat tgtagagaat cttgcctg                    48

<210> SEQ ID NO 480
<211> LENGTH: 31
<212> TYPE: DNA
<213> ORGANISM: Artificial sequence
<220> FEATURE:
<223> OTHER INFORMATION: Description: Tetrahedral DNA staple strand,
      name: tet-staple-138

<400> SEQUENCE: 480
ctcatgggcg catcgtacag tatcgtgaat a                                      31

<210> SEQ ID NO 481
<211> LENGTH: 32
<212> TYPE: DNA
<213> ORGANISM: Artificial sequence
<220> FEATURE:
<223> OTHER INFORMATION: Description: Tetrahedral DNA staple strand,
      name: tet-staple-139

<400> SEQUENCE: 481
acgccatcaa aaataatttt taaccaatag ga                                     32

<210> SEQ ID NO 482
<211> LENGTH: 34
<212> TYPE: DNA
<213> ORGANISM: Artificial sequence
<220> FEATURE:
<223> OTHER INFORMATION: Description: Tetrahedral DNA staple strand,
      name: tet-staple-140

<400> SEQUENCE: 482
ctgagtagaa gatggaaata cctacatttt gacg                                   34

<210> SEQ ID NO 483
<211> LENGTH: 31
<212> TYPE: DNA
<213> ORGANISM: Artificial sequence
<220> FEATURE:
<223> OTHER INFORMATION: Description: Tetrahedral DNA staple strand,
      name: tet-staple-141

<400> SEQUENCE: 483
gctttgcaac aggaaaacca aaaaataaaa a                                      31

<210> SEQ ID NO 484
<211> LENGTH: 42
```

<212> TYPE: DNA
<213> ORGANISM: Artificial sequence
<220> FEATURE:
<223> OTHER INFORMATION: Description: Tetrahedral DNA staple strand,
      name: tet-staple-142

<400> SEQUENCE: 484
aaattcttct gtatgagggg acgacgaacc gtgcgtaaca ac                      42

<210> SEQ ID NO 485
<211> LENGTH: 53
<212> TYPE: DNA
<213> ORGANISM: Artificial sequence
<220> FEATURE:
<223> OTHER INFORMATION: Description: Tetrahedral DNA staple strand,
      name: tet-staple-143

<400> SEQUENCE: 485
agagcataaa gctaaatcgg ttgtaacgct caactcaaat tgaaaagtca aag          53

<210> SEQ ID NO 486
<211> LENGTH: 42
<212> TYPE: DNA
<213> ORGANISM: Artificial sequence
<220> FEATURE:
<223> OTHER INFORMATION: Description: Tetrahedral DNA staple strand,
      name: tet-staple-144

<400> SEQUENCE: 486
tttgcgagca aacaaaacgt taatattata ttaccgaata ct                      42

<210> SEQ ID NO 487
<211> LENGTH: 35
<212> TYPE: DNA
<213> ORGANISM: Artificial sequence
<220> FEATURE:
<223> OTHER INFORMATION: Description: Tetrahedral DNA staple strand,
      name: tet-staple-145

<400> SEQUENCE: 487
aactctacaa aggctattga tattctggcc tgatt                              35

<210> SEQ ID NO 488
<211> LENGTH: 84
<212> TYPE: DNA
<213> ORGANISM: Artificial sequence
<220> FEATURE:
<223> OTHER INFORMATION: Description: Tetrahedral DNA staple strand,
      name: tet-staple-146

<400> SEQUENCE: 488
tcatatgtac cccggggtta acaccgcctg caaggtgagg cggtcagtgg cagaaaagcc   60
ccaaaaacag gaagattgta gtaa                                          84

<210> SEQ ID NO 489
<211> LENGTH: 54
<212> TYPE: DNA
<213> ORGANISM: Artificial sequence
<220> FEATURE:
<223> OTHER INFORMATION: Description: Tetrahedral DNA staple strand,
      name: tet-staple-147

<400> SEQUENCE: 489
tttttagtaa tgtgtagtaa tgtgaggcga caggaacggt acgccagaat cctg         54

<210> SEQ ID NO 490

```
<211> LENGTH: 36
<212> TYPE: DNA
<213> ORGANISM: Artificial sequence
<220> FEATURE:
<223> OTHER INFORMATION: Description: Tetrahedral DNA staple strand,
      name: tet-staple-148

<400> SEQUENCE: 490
agagtctaca gtcattcatc aacattaaca ttgtta                            36

<210> SEQ ID NO 491
<211> LENGTH: 45
<212> TYPE: DNA
<213> ORGANISM: Artificial sequence
<220> FEATURE:
<223> OTHER INFORMATION: Description: Tetrahedral DNA staple strand,
      name: tet-staple-149

<400> SEQUENCE: 491
tcagatgaac ggtaatctaa gcaattaaat ctatgtgagg cctca                  45

<210> SEQ ID NO 492
<211> LENGTH: 32
<212> TYPE: DNA
<213> ORGANISM: Artificial sequence
<220> FEATURE:
<223> OTHER INFORMATION: Description: Tetrahedral DNA staple strand,
      name: tet-staple-150

<400> SEQUENCE: 492
agattcacgc aaggcattat gaccctgtcc ag                                32

<210> SEQ ID NO 493
<211> LENGTH: 45
<212> TYPE: DNA
<213> ORGANISM: Artificial sequence
<220> FEATURE:
<223> OTHER INFORMATION: Description: Tetrahedral DNA staple strand,
      name: tet-staple-151

<400> SEQUENCE: 493
gccggagggg gagaagcctt tatttcaaaa agggtttgta gcgtc                  45

<210> SEQ ID NO 494
<211> LENGTH: 25
<212> TYPE: DNA
<213> ORGANISM: Artificial sequence
<220> FEATURE:
<223> OTHER INFORMATION: Description: Tetrahedral DNA staple strand,
      name: tet-staple-152

<400> SEQUENCE: 494
tctagcttga gagatagcat gtcaa                                        25

<210> SEQ ID NO 495
<211> LENGTH: 46
<212> TYPE: DNA
<213> ORGANISM: Artificial sequence
<220> FEATURE:
<223> OTHER INFORMATION: Description: Tetrahedral DNA staple strand,
      name: tet-staple-153

<400> SEQUENCE: 495
aaacaccagt gcaaaataaa cagcctgcag attacgttac accaga                 46

<210> SEQ ID NO 496
<211> LENGTH: 27
```

```
<212> TYPE: DNA
<213> ORGANISM: Artificial sequence
<220> FEATURE:
<223> OTHER INFORMATION: Description: Tetrahedral DNA staple strand,
      name: tet-staple-154

<400> SEQUENCE: 496
gaacaactaa atattatccc tgacgag                                          27

<210> SEQ ID NO 497
<211> LENGTH: 44
<212> TYPE: DNA
<213> ORGANISM: Artificial sequence
<220> FEATURE:
<223> OTHER INFORMATION: Description: Tetrahedral DNA staple strand,
      name: tet-staple-155

<400> SEQUENCE: 497
agagcggtta atcgtcgcta ttatccagaa ttaaccggag aaag                       44

<210> SEQ ID NO 498
<211> LENGTH: 29
<212> TYPE: DNA
<213> ORGANISM: Artificial sequence
<220> FEATURE:
<223> OTHER INFORMATION: Description: Tetrahedral DNA staple strand,
      name: tet-staple-156

<400> SEQUENCE: 498
ccaggtaata attaatttat catagaatc                                        29

<210> SEQ ID NO 499
<211> LENGTH: 65
<212> TYPE: DNA
<213> ORGANISM: Artificial sequence
<220> FEATURE:
<223> OTHER INFORMATION: Description: Tetrahedral DNA staple strand,
      name: tet-staple-157

<400> SEQUENCE: 499
cgtaatgaac tcaatatttt catcgcccag aatacccaaa agaactggtg atagcttaac      60
tgcag                                                                  65

<210> SEQ ID NO 500
<211> LENGTH: 65
<212> TYPE: DNA
<213> ORGANISM: Artificial sequence
<220> FEATURE:
<223> OTHER INFORMATION: Description: Tetrahedral DNA staple strand,
      name: tet-staple-158

<400> SEQUENCE: 500
cgtaatgaac tcaatatttt aataaaataa acatccaata aatcatacgt cacacctcaa      60
catta                                                                  65

<210> SEQ ID NO 501
<211> LENGTH: 66
<212> TYPE: DNA
<213> ORGANISM: Artificial sequence
<220> FEATURE:
<223> OTHER INFORMATION: Description: Tetrahedral DNA staple strand,
      name: tet-staple-159

<400> SEQUENCE: 501
cgtaatgaac tcaatatttt gcgaaaggaa cagcttgata ccgatagtcg tcacctttcc      60
``` agcgta                                                            66

<210> SEQ ID NO 502
<211> LENGTH: 66
<212> TYPE: DNA
<213> ORGANISM: Artificial sequence
<220> FEATURE:
<223> OTHER INFORMATION: Description: Tetrahedral DNA staple strand,
      name: tet-staple-160

<400> SEQUENCE: 502
cgtaatgaac tcaatatttt agtaataatt tagtatcata tgcgttatgg catttggctt    60
agctga                                                            66

<210> SEQ ID NO 503
<211> LENGTH: 62
<212> TYPE: DNA
<213> ORGANISM: Artificial sequence
<220> FEATURE:
<223> OTHER INFORMATION: Description: DNA sticky end for tetrahedron

<400> SEQUENCE: 503
aggaagagtt tttttttttt tttttttttt gcgcgaaaca aagtacccag cgattatacc    60
aa                                                                62

<210> SEQ ID NO 504
<211> LENGTH: 65
<212> TYPE: DNA
<213> ORGANISM: Artificial sequence
<220> FEATURE:
<223> OTHER INFORMATION: Description: DNA sticky end for tetrahedron

<400> SEQUENCE: 504
aggaagagtt tttttttttt tttttttttt tttaccgaac tgaccaactg gtcaatcata    60
aggga                                                             65

<210> SEQ ID NO 505
<211> LENGTH: 63
<212> TYPE: DNA
<213> ORGANISM: Artificial sequence
<220> FEATURE:
<223> OTHER INFORMATION: Description: DNA sticky end for tetrahedron

<400> SEQUENCE: 505
aggaagagtt tttttttttt tttttttttt tttatcaaca gttgaaagga attgaggaat    60
caa                                                               63

<210> SEQ ID NO 506
<211> LENGTH: 84
<212> TYPE: DNA
<213> ORGANISM: Artificial sequence
<220> FEATURE:
<223> OTHER INFORMATION: Description: DNA sticky end for tetrahedron

<400> SEQUENCE: 506
aggaagagtt tttttttttt tttttttttt agtaagcaga tagccgaaca aagttaatct    60
tacgagataa cgcagacttg aaag                                        84

<210> SEQ ID NO 507
<211> LENGTH: 66
<212> TYPE: DNA
<213> ORGANISM: Artificial sequence
<220> FEATURE:

<223> OTHER INFORMATION: Description: DNA sticky end for tetrahedron

<400> SEQUENCE: 507

```
aggaagagtt tttttttttt tttttttttt ttttagaagg cttatccggt atctattttc    60
aacgct                                                               66
```

<210> SEQ ID NO 508
<211> LENGTH: 61
<212> TYPE: DNA
<213> ORGANISM: Artificial sequence
<220> FEATURE:
<223> OTHER INFORMATION: Description: DNA sticky end for tetrahedron

<400> SEQUENCE: 508

```
aggaagagtt tttttttttt tttttttttt cttatgcgat tttaagaact acaggtagaa    60
a                                                                    61
```

<210> SEQ ID NO 509
<211> LENGTH: 62
<212> TYPE: DNA
<213> ORGANISM: Artificial sequence
<220> FEATURE:
<223> OTHER INFORMATION: Description: DNA sticky end for tetrahedron

<400> SEQUENCE: 509

```
aggaagagtt tttttttttt tttttttttt attcacaaac aaataagacg attggccttg    60
at                                                                   62
```

<210> SEQ ID NO 510
<211> LENGTH: 65
<212> TYPE: DNA
<213> ORGANISM: Artificial sequence
<220> FEATURE:
<223> OTHER INFORMATION: Description: DNA sticky end for tetrahedron

<400> SEQUENCE: 510

```
aggaagagtt tttttttttt tttttttttt tttaccctca gaaccgccac tccctcagag    60
ccgcc                                                                65
```

<210> SEQ ID NO 511
<211> LENGTH: 62
<212> TYPE: DNA
<213> ORGANISM: Artificial sequence
<220> FEATURE:
<223> OTHER INFORMATION: Description: DNA sticky end for tetrahedron

<400> SEQUENCE: 511

```
aggaagagtt tttttttttt tttttttttt ttcattgaat cccctggaa tcgtcataaa    60
ta                                                                   62
```

<210> SEQ ID NO 512
<211> LENGTH: 65
<212> TYPE: DNA
<213> ORGANISM: Artificial sequence
<220> FEATURE:
<223> OTHER INFORMATION: Description: DNA sticky end for tetrahedron

<400> SEQUENCE: 512

```
aggaagagtt tttttttttt tttttttttt tttaagatta agaggaagca gcggattgca    60
tcaaa                                                                65
```

-continued

```
<210> SEQ ID NO 513
<211> LENGTH: 63
<212> TYPE: DNA
<213> ORGANISM: Artificial sequence
<220> FEATURE:
<223> OTHER INFORMATION: Description: DNA sticky end for tetrahedron

<400> SEQUENCE: 513
aggaagagtt tttttttttt tttttttttt tttaaagggc gacattcaac cgattgaggc    60
ata                                                                  63

<210> SEQ ID NO 514
<211> LENGTH: 84
<212> TYPE: DNA
<213> ORGANISM: Artificial sequence
<220> FEATURE:
<223> OTHER INFORMATION: Description: DNA sticky end for tetrahedron

<400> SEQUENCE: 514
aggaagagtt tttttttttt tttttttttt ttttcatttg gggcgcgagc tgaaaaaatg    60
gtccatataa gaagcaaccg aaag                                           84

<210> SEQ ID NO 515
<211> LENGTH: 62
<212> TYPE: DNA
<213> ORGANISM: Artificial sequence
<220> FEATURE:
<223> OTHER INFORMATION: Description: DNA sticky end for tetrahedron

<400> SEQUENCE: 515
aggaagagtt tttttttttt tttttttttt tgctgcaagg cgattatggc gaaaggggga    60
tg                                                                   62

<210> SEQ ID NO 516
<211> LENGTH: 65
<212> TYPE: DNA
<213> ORGANISM: Artificial sequence
<220> FEATURE:
<223> OTHER INFORMATION: Description: DNA sticky end for tetrahedron

<400> SEQUENCE: 516
aggaagagtt tttttttttt tttttttttt tttccgagct cgaattcgta gaggatcccc    60
gggta                                                                65

<210> SEQ ID NO 517
<211> LENGTH: 63
<212> TYPE: DNA
<213> ORGANISM: Artificial sequence
<220> FEATURE:
<223> OTHER INFORMATION: Description: DNA sticky end for tetrahedron

<400> SEQUENCE: 517
aggaagagtt tttttttttt tttttttttt ttttaaaaca gaaataaaga aattgcgtac    60
cta                                                                  63

<210> SEQ ID NO 518
<211> LENGTH: 84
<212> TYPE: DNA
<213> ORGANISM: Artificial sequence
<220> FEATURE:
<223> OTHER INFORMATION: Description: DNA sticky end for tetrahedron

<400> SEQUENCE: 518
```

-continued aggaagagtt tttttttttt tttttttttt ccaaaaggag cctttaattg tatcggcgtt    60
gaatcaacag cgactctaat catg    84

<210> SEQ ID NO 519
<211> LENGTH: 62
<212> TYPE: DNA
<213> ORGANISM: Artificial sequence
<220> FEATURE:
<223> OTHER INFORMATION: Description: DNA sticky end for tetrahedron

<400> SEQUENCE: 519
aggaagagtt tttttttttt tttttttttt attgggcgcc agggtggaga ggcggtttgc    60
gt    62

<210> SEQ ID NO 520
<211> LENGTH: 65
<212> TYPE: DNA
<213> ORGANISM: Artificial sequence
<220> FEATURE:
<223> OTHER INFORMATION: Description: DNA sticky end for tetrahedron

<400> SEQUENCE: 520
aggaagagtt tttttttttt tttttttttt tttggcgaaa atcctgtttc tggtttgccc    60
cagca    65

<210> SEQ ID NO 521
<211> LENGTH: 63
<212> TYPE: DNA
<213> ORGANISM: Artificial sequence
<220> FEATURE:
<223> OTHER INFORMATION: Description: DNA sticky end for tetrahedron

<400> SEQUENCE: 521
aggaagagtt tttttttttt tttttttttt tttgaaggat taggattagc ggggttttgt    60
att    63

<210> SEQ ID NO 522
<211> LENGTH: 84
<212> TYPE: DNA
<213> ORGANISM: Artificial sequence
<220> FEATURE:
<223> OTHER INFORMATION: Description: DNA sticky end for tetrahedron

<400> SEQUENCE: 522
aggaagagtt tttttttttt tttttttttt ataaataagg cgttaaataa gaataataat    60
ggtcaagaca gtccacggat ggtg    84

<210> SEQ ID NO 523
<211> LENGTH: 66
<212> TYPE: DNA
<213> ORGANISM: Artificial sequence
<220> FEATURE:
<223> OTHER INFORMATION: Description: DNA sticky end for tetrahedron

<400> SEQUENCE: 523
aggaagagtt tttttttttt tttttttttt ttttaatggg ataggtcacg ttcgcactct    60
acataa    66

<210> SEQ ID NO 524
<211> LENGTH: 61
<212> TYPE: DNA
<213> ORGANISM: Artificial sequence
<220> FEATURE:
<223> OTHER INFORMATION: Description: DNA sticky end for tetrahedron

<400> SEQUENCE: 524
aggaagagtt tttttttttt tttttttttt agaagtgttt ttataatcaa acatcacttg    60
c                                                                    61

<210> SEQ ID NO 525
<211> LENGTH: 62
<212> TYPE: DNA
<213> ORGANISM: Artificial sequence
<220> FEATURE:
<223> OTHER INFORMATION: Description: DNA sticky end for tetrahedron

<400> SEQUENCE: 525
aggaagagtt tttttttttt tttttttttt agagggtagc tattttgata aattaatgcc    60
gg                                                                   62

<210> SEQ ID NO 526
<211> LENGTH: 65
<212> TYPE: DNA
<213> ORGANISM: Artificial sequence
<220> FEATURE:
<223> OTHER INFORMATION: Description: DNA sticky end for tetrahedron

<400> SEQUENCE: 526
aggaagagtt tttttttttt tttttttttt tttaaatgca atgcctgaga accctcatat    60
atttt                                                                65

<210> SEQ ID NO 527
<211> LENGTH: 62
<212> TYPE: DNA
<213> ORGANISM: Artificial sequence
<220> FEATURE:
<223> OTHER INFORMATION: Description: DNA sticky end for tetrahedron

<400> SEQUENCE: 527
ctcttccttt tttttttttt tttttttttt gcgcgaaaca aagtacccag cgattatacc    60
aa                                                                   62

<210> SEQ ID NO 528
<211> LENGTH: 65
<212> TYPE: DNA
<213> ORGANISM: Artificial sequence
<220> FEATURE:
<223> OTHER INFORMATION: Description: DNA sticky end for tetrahedron

<400> SEQUENCE: 528
ctcttccttt tttttttttt tttttttttt tttaccgaac tgaccaactg gtcaatcata    60
aggga                                                                65

<210> SEQ ID NO 529
<211> LENGTH: 63
<212> TYPE: DNA
<213> ORGANISM: Artificial sequence
<220> FEATURE:
<223> OTHER INFORMATION: Description: DNA sticky end for tetrahedron

<400> SEQUENCE: 529
ctcttccttt tttttttttt tttttttttt tttatcaaca gttgaaagga attgaggaat    60
caa                                                                  63

<210> SEQ ID NO 530
<211> LENGTH: 84
<212> TYPE: DNA
<213> ORGANISM: Artificial sequence
<220> FEATURE:
<223> OTHER INFORMATION: Description: DNA sticky end for tetrahedron

<400> SEQUENCE: 530
ctcttccttt tttttttttt tttttttttt agtaagcaga tagccgaaca aagttaatct    60
tacgagataa cgcagacttg aaag                                           84

<210> SEQ ID NO 531
<211> LENGTH: 66
<212> TYPE: DNA
<213> ORGANISM: Artificial sequence
<220> FEATURE:
<223> OTHER INFORMATION: Description: DNA sticky end for tetrahedron

<400> SEQUENCE: 531
ctcttccttt tttttttttt tttttttttt ttttagaagg cttatccggt atctattttc    60
aacgct                                                               66

<210> SEQ ID NO 532
<211> LENGTH: 61
<212> TYPE: DNA
<213> ORGANISM: Artificial sequence
<220> FEATURE:
<223> OTHER INFORMATION: Description: DNA sticky end for tetrahedron

<400> SEQUENCE: 532
ctcttccttt tttttttttt tttttttttt cttatgcgat tttaagaact acaggtagaa    60
a                                                                    61

<210> SEQ ID NO 533
<211> LENGTH: 62
<212> TYPE: DNA
<213> ORGANISM: Artificial sequence
<220> FEATURE:
<223> OTHER INFORMATION: Description: DNA sticky end for tetrahedron

<400> SEQUENCE: 533
ctcttccttt tttttttttt tttttttttt attcacaaac aaataagacg attggccttg    60
at                                                                   62

<210> SEQ ID NO 534
<211> LENGTH: 65
<212> TYPE: DNA
<213> ORGANISM: Artificial sequence
<220> FEATURE:
<223> OTHER INFORMATION: Description: DNA sticky end for tetrahedron

<400> SEQUENCE: 534
ctcttccttt tttttttttt tttttttttt tttaccctca gaaccgccac tccctcagag    60
ccgcc                                                                65

<210> SEQ ID NO 535
<211> LENGTH: 62
<212> TYPE: DNA
<213> ORGANISM: Artificial sequence
<220> FEATURE:
<223> OTHER INFORMATION: Description: DNA sticky end for tetrahedron

<400> SEQUENCE: 535

```
ctcttccttt tttttttttt tttttttttt ttcattgaat cccctggaa tcgtcataaa    60 ta                                                                  62
```

<210> SEQ ID NO 536
<211> LENGTH: 65
<212> TYPE: DNA
<213> ORGANISM: Artificial sequence
<220> FEATURE:
<223> OTHER INFORMATION: Description: DNA sticky end for tetrahedron

<400> SEQUENCE: 536

```
ctcttccttt tttttttttt tttttttttt tttaagatta agaggaagca gcggattgca    60
tcaaa                                                                65
```

<210> SEQ ID NO 537
<211> LENGTH: 63
<212> TYPE: DNA
<213> ORGANISM: Artificial sequence
<220> FEATURE:
<223> OTHER INFORMATION: Description: DNA sticky end for tetrahedron

<400> SEQUENCE: 537

```
ctcttccttt tttttttttt tttttttttt tttaaagggc gacattcaac cgattgaggc    60
ata                                                                  63
```

<210> SEQ ID NO 538
<211> LENGTH: 84
<212> TYPE: DNA
<213> ORGANISM: Artificial sequence
<220> FEATURE:
<223> OTHER INFORMATION: Description: DNA sticky end for tetrahedron

<400> SEQUENCE: 538

```
ctcttccttt tttttttttt tttttttttt ttttcatttg ggcgcgagc tgaaaaaatg    60 gtccatataa gaagcaaccg aaag                                           84
```

<210> SEQ ID NO 539
<211> LENGTH: 62
<212> TYPE: DNA
<213> ORGANISM: Artificial sequence
<220> FEATURE:
<223> OTHER INFORMATION: Description: DNA sticky end for tetrahedron

<400> SEQUENCE: 539

```
ctcttccttt tttttttttt tttttttttt tgctgcaagg cgattatggc gaaaggggga    60
tg                                                                   62
```

<210> SEQ ID NO 540
<211> LENGTH: 65
<212> TYPE: DNA
<213> ORGANISM: Artificial sequence
<220> FEATURE:
<223> OTHER INFORMATION: Description: DNA sticky end for tetrahedron

<400> SEQUENCE: 540

```
ctcttccttt tttttttttt tttttttttt tttccgagct cgaattcgta gaggatcccc    60
gggta                                                                65
```

<210> SEQ ID NO 541
<211> LENGTH: 63
<212> TYPE: DNA

<213> ORGANISM: Artificial sequence
<220> FEATURE:
<223> OTHER INFORMATION: Description: DNA sticky end for tetrahedron

<400> SEQUENCE: 541

```
ctcttccttt tttttttttt tttttttttt ttttaaaaca gaaataaaga aattgcgtac    60
cta                                                                  63
```

<210> SEQ ID NO 542
<211> LENGTH: 84
<212> TYPE: DNA
<213> ORGANISM: Artificial sequence
<220> FEATURE:
<223> OTHER INFORMATION: Description: DNA sticky end for tetrahedron

<400> SEQUENCE: 542

```
ctcttccttt tttttttttt tttttttttt ccaaaaggag cctttaattg tatcggcgtt    60
gaatcaacag cgactctaat catg                                           84
```

<210> SEQ ID NO 543
<211> LENGTH: 62
<212> TYPE: DNA
<213> ORGANISM: Artificial sequence
<220> FEATURE:
<223> OTHER INFORMATION: Description: DNA sticky end for tetrahedron

<400> SEQUENCE: 543

```
ctcttccttt tttttttttt tttttttttt attgggcgcc agggtggaga ggcggtttgc    60
gt                                                                   62
```

<210> SEQ ID NO 544
<211> LENGTH: 65
<212> TYPE: DNA
<213> ORGANISM: Artificial sequence
<220> FEATURE:
<223> OTHER INFORMATION: Description: DNA sticky end for tetrahedron

<400> SEQUENCE: 544

```
ctcttccttt tttttttttt tttttttttt tttggcgaaa atcctgtttc tggtttgccc    60
cagca                                                                65
```

<210> SEQ ID NO 545
<211> LENGTH: 63
<212> TYPE: DNA
<213> ORGANISM: Artificial sequence
<220> FEATURE:
<223> OTHER INFORMATION: Description: DNA sticky end for tetrahedron

<400> SEQUENCE: 545

```
ctcttccttt tttttttttt tttttttttt tttgaaggat taggattagc ggggttttgt    60
att                                                                  63
```

<210> SEQ ID NO 546
<211> LENGTH: 84
<212> TYPE: DNA
<213> ORGANISM: Artificial sequence
<220> FEATURE:
<223> OTHER INFORMATION: Description: DNA sticky end for tetrahedron

<400> SEQUENCE: 546

```
ctcttccttt tttttttttt tttttttttt ataaataagg cgttaaataa gaataataat    60
ggtcaagaca gtccacggat ggtg                                           84
```

<210> SEQ ID NO 547
<211> LENGTH: 66
<212> TYPE: DNA
<213> ORGANISM: Artificial sequence
<220> FEATURE:
<223> OTHER INFORMATION: Description: DNA sticky end for tetrahedron

<400> SEQUENCE: 547
ctcttccttt tttttttttt ttttaatggg ataggtcacg ttcgcactct         60
acataa                                                        66

<210> SEQ ID NO 548
<211> LENGTH: 61
<212> TYPE: DNA
<213> ORGANISM: Artificial sequence
<220> FEATURE:
<223> OTHER INFORMATION: Description: DNA sticky end for tetrahedron

<400> SEQUENCE: 548
ctcttccttt tttttttttt tttttttttt agaagtgttt ttataatcaa acatcacttg    60
c                                                                   61

<210> SEQ ID NO 549
<211> LENGTH: 62
<212> TYPE: DNA
<213> ORGANISM: Artificial sequence
<220> FEATURE:
<223> OTHER INFORMATION: Description: DNA sticky end for tetrahedron

<400> SEQUENCE: 549
ctcttccttt tttttttttt tttttttttt agagggtagc tattttgata aattaatgcc    60
gg                                                                  62

<210> SEQ ID NO 550
<211> LENGTH: 65
<212> TYPE: DNA
<213> ORGANISM: Artificial sequence
<220> FEATURE:
<223> OTHER INFORMATION: Description: DNA sticky end for tetrahedron

<400> SEQUENCE: 550
ctcttccttt tttttttttt tttttttttt tttaaatgca atgcctgaga accctcatat    60
atttt                                                               65

<210> SEQ ID NO 551
<211> LENGTH: 18
<212> TYPE: DNA
<213> ORGANISM: Artificial sequence
<220> FEATURE:
<223> OTHER INFORMATION: Description: Modified DNA sequence attached on
      QDs (525, 605) and streptavidin for octahedral system (HPLC
      purified)
<220> FEATURE:
<221> NAME/KEY: modified_base
<222> LOCATION: 18
<223> OTHER INFORMATION: biotinylated

<400> SEQUENCE: 551
tatgaagtga tggatgat                                                 18

<210> SEQ ID NO 552
<211> LENGTH: 18
<212> TYPE: DNA

```
<213> ORGANISM: Artificial sequence
<220> FEATURE:
<223> OTHER INFORMATION: Description: Modified DNA sequence attached on
      QDs (705) for octahedral system (HPLC purified)
<220> FEATURE:
<221> NAME/KEY: modified_base
<222> LOCATION: 18
<223> OTHER INFORMATION: biotinylated

<400> SEQUENCE: 552
taggtatgat ggtagtag                                                   18

<210> SEQ ID NO 553
<211> LENGTH: 18
<212> TYPE: DNA
<213> ORGANISM: Artificial sequence
<220> FEATURE:
<223> OTHER INFORMATION: Description: Modified DNA sequence attached on
      gold nanoparticle for octahedral system (HPLC purified)
<220> FEATURE:
<221> NAME/KEY: modified_base
<222> LOCATION: 33
<223> OTHER INFORMATION: thiolated

<400> SEQUENCE: 553
tatgaagtga tggatgat                                                   18

<210> SEQ ID NO 554
<211> LENGTH: 33
<212> TYPE: DNA
<213> ORGANISM: Artificial sequence
<220> FEATURE:
<223> OTHER INFORMATION: Description: Modified DNA sequence attached on
      gold nanoparticle for cubic system (HPLC purified)
<220> FEATURE:
<221> NAME/KEY: modified_base
<222> LOCATION: 33
<223> OTHER INFORMATION: thiolated

<400> SEQUENCE: 554
gtagagtatg aagtgatgga tgatgatgat gat                                  33

<210> SEQ ID NO 555
<211> LENGTH: 36
<212> TYPE: DNA
<213> ORGANISM: Artificial sequence
<220> FEATURE:
<223> OTHER INFORMATION: Description: Modified DNA sequence attached on
      gold nanoparticle for tetrahedral system (HPLC purified)
<220> FEATURE:
<221> NAME/KEY: modified_base
<222> LOCATION: 36
<223> OTHER INFORMATION: thiolated

<400> SEQUENCE: 555
tattgagttc attacgtttt tttttttttt tttttt                               36

<210> SEQ ID NO 556
<211> LENGTH: 23
<212> TYPE: DNA
<213> ORGANISM: Artificial sequence
<220> FEATURE:
<223> OTHER INFORMATION: Description: Modified DNA sequence attached on
      glucose oxidase for enzyme lattice (standard desalting)
<220> FEATURE:
<221> NAME/KEY: modified_base
<222> LOCATION: 1
<223> OTHER INFORMATION: thiolated

<400> SEQUENCE: 556
```

```
tttttgtaga tggtagtatg gat                                         23

<210> SEQ ID NO 557
<211> LENGTH: 23
<212> TYPE: DNA
<213> ORGANISM: Artificial sequence
<220> FEATURE:
<223> OTHER INFORMATION: Description: Modified DNA sequence attached on
      horseradish peroxidase for enzyme lattice (standard desalting)
<220> FEATURE:
<221> NAME/KEY: modified_base
<222> LOCATION: 1
<223> OTHER INFORMATION: thiolated

<400> SEQUENCE: 557
tttttgatta ggtagtgaag tat                                         23
```